US011023736B2

(12) United States Patent
Chang et al.

(10) Patent No.: US 11,023,736 B2
(45) **Date of Patent: *Jun. 1, 2021**

(54) METHODS AND SYSTEMS OF SPATIOTEMPORAL PATTERN RECOGNITION FOR VIDEO CONTENT DEVELOPMENT

(71) Applicant: Second Spectrum, Inc., Los Angeles, CA (US)

(72) Inventors: Yu-Han Chang, South Pasadena, CA (US); Rajiv Maheswaran, San Marino, CA (US); Jeffrey Wayne Su, South Pasadena, CA (US); Noel Hollingsworth, San Francisco, CA (US)

(73) Assignee: Second Spectrum, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,884

(22) Filed: Mar. 20, 2020

(65) Prior Publication Data

US 2020/0218902 A1 Jul. 9, 2020

Related U.S. Application Data

(63) Continuation of application No. 16/561,972, filed on Sep. 5, 2019, now Pat. No. 10,762,351, which is a (Continued)

(51) Int. Cl.
*G06K 9/00* (2006.01)
*H04N 21/466* (2011.01)
(Continued)

(52) U.S. Cl.
CPC .......... *G06K 9/00724* (2013.01); *A63F 13/60* (2014.09); *G06F 3/012* (2013.01);
(Continued)

(58) Field of Classification Search
CPC .......... G06K 9/00724; G06K 9/00744; H04N 13/204; H04N 5/2224; H04N 21/2187;
(Continued)

(56) References Cited

U.S. PATENT DOCUMENTS 5,060,171 A 10/1991 Steir et al.
6,959,253 B2 10/2005 Jackson et al.
(Continued)

FOREIGN PATENT DOCUMENTS

CN 101271527 A 9/2008
CN 102750695 A 10/2012
(Continued)

OTHER PUBLICATIONS 15754985.8, "European Application Serial No. 15754985.8, Extended European Search Report dated Nov. 15, 2017", Second Spectrum, Inc., 10 Pages.

(Continued)

*Primary Examiner* — Loi H Tran
(74) *Attorney, Agent, or Firm* — GTC Law Group PC & Affiliates

(57) ABSTRACT

Presenting event-specific video content that conforms to a user selection of an event type includes processing at least one video feed through at least one spatiotemporal pattern recognition algorithm that uses machine learning to develop an understanding of at least one event within the at least one video feed to determine at least one event type, wherein the at least one event type includes an entry in a relationship library at least detailing a relationship between two visible features of the at least one video feed, extracting the video content displaying the at least one event and associating the understanding with the video content in a video content data structure. A user interface is configured to permit a user to indicate a preference for at least one event type that is used
(Continued)

to retrieve and provide corresponding extracted video content with the data structure in a new video feed.

8 Claims, 57 Drawing Sheets

Related U.S. Application Data continuation of application No. 15/600,355, filed on May 19, 2017, now Pat. No. 10,460,176, which is a continuation of application No. 15/586,379, filed on May 4, 2017, now Pat. No. 10,521,671.

(60) Provisional application No. 62/395,886, filed on Sep. 16, 2016.

(51) Int. Cl.

| | |
|---|---|
| *H04N 21/44* | (2011.01) |
| *H04N 21/434* | (2011.01) |
| *H04N 21/234* | (2011.01) |
| *H04N 21/25* | (2011.01) |
| *H04N 21/4223* | (2011.01) |
| *H04N 21/45* | (2011.01) |
| *G06N 20/00* | (2019.01) |
| *H04N 5/222* | (2006.01) |
| *A63F 13/60* | (2014.01) |
| *H04N 13/204* | (2018.01) |
| *G11B 27/031* | (2006.01) |
| *G11B 27/28* | (2006.01) |
| *H04N 21/2187* | (2011.01) |
| *H04N 21/8549* | (2011.01) |
| *G06F 3/01* | (2006.01) |
| *H04N 13/243* | (2018.01) |
| *H04N 13/117* | (2018.01) |
| *G06N 20/10* | (2019.01) |

(52) U.S. Cl.

CPC ......... *G06F 3/013* (2013.01); *G06K 9/00744* (2013.01); *G06N 20/00* (2019.01); *G11B 27/031* (2013.01); *G11B 27/28* (2013.01); *H04N 5/2224* (2013.01); *H04N 13/204* (2018.05); *H04N 21/2187* (2013.01); *H04N 21/23418* (2013.01); *H04N 21/251* (2013.01); *H04N 21/4223* (2013.01); *H04N 21/4345* (2013.01); *H04N 21/44008* (2013.01); *H04N 21/4532* (2013.01); *H04N 21/4662* (2013.01); *H04N 21/8549* (2013.01); *G06N 20/10* (2019.01); *G06T 2207/20081* (2013.01); *G06T 2207/30221* (2013.01); *H04N 13/117* (2018.05); *H04N 13/243* (2018.05)

(58) Field of Classification Search

CPC ........... H04N 21/23418; H04N 21/251; H04N 21/4223; H04N 21/4345; H04N 21/44008; H04N 21/4532; H04N 21/4662; H04N 21/8549; H04N 13/117; H04N 13/243; G06N 20/00; G06F 3/012; G06F 3/013; G06T 2207/20081; G06T 2207/30221; G11B 27/031; G11B 27/28

USPC .......................................................... 386/282

See application file for complete search history.

(56) References Cited

U.S. PATENT DOCUMENTS

| | | | |
|---|---|---|---|
| 7,085,322 B2 | 8/2006 | Ngai et al. | |
| 7,143,083 B2 | 11/2006 | Carlbom et al. | |
| 7,657,836 B2 | 2/2010 | Pan et al. | |
| 7,699,707 B2 | 4/2010 | Bahou | |
| 7,796,155 B1 | 9/2010 | Neely et al. | |
| 7,932,923 B2 * | 4/2011 | Lipton | G06F 16/7837 348/143 |
| 8,238,662 B2 | 8/2012 | Banerjee et al. | |
| 8,275,672 B1 | 9/2012 | Nguyen et al. | |
| 8,295,683 B2 | 10/2012 | Widdowson | |
| 8,453,027 B2 | 5/2013 | Bartz et al. | |
| 8,597,133 B2 | 12/2013 | Priester | |
| 8,620,077 B1 | 12/2013 | Kwatra et al. | |
| 8,810,408 B2 | 8/2014 | Hanson et al. | |
| 8,856,030 B2 | 10/2014 | Russek | |
| 8,965,172 B2 | 2/2015 | Yu et al. | |
| 9,110,988 B1 | 8/2015 | Tan | |
| 9,124,856 B2 | 9/2015 | Deshpande et al. | |
| 9,141,258 B2 | 9/2015 | Sundstrom | |
| 9,168,452 B2 | 10/2015 | Walker et al. | |
| 9,171,369 B2 | 10/2015 | Leal et al. | |
| 9,294,710 B2 | 3/2016 | Lim et al. | |
| 9,339,710 B2 | 5/2016 | Thurman et al. | |
| 9,342,785 B2 | 5/2016 | Lucey et al. | |
| 9,440,152 B2 | 9/2016 | Thompson et al. | |
| 9,596,399 B2 | 3/2017 | Eledath et al. | |
| 9,609,373 B2 | 3/2017 | Rango et al. | |
| 9,613,661 B2 | 4/2017 | Matsunaga et al. | |
| 9,740,977 B1 | 8/2017 | Moon et al. | |
| 9,740,984 B2 | 8/2017 | Lucey et al. | |
| 9,744,457 B2 | 8/2017 | Ibrahim et al. | |
| 9,750,433 B2 | 9/2017 | Hu et al. | |
| 9,814,977 B2 | 11/2017 | Stafford et al. | |
| 9,881,221 B2 | 1/2018 | Bala et al. | |
| 9,992,470 B1 | 6/2018 | Hofmann | |
| 10,231,787 B2 | 3/2019 | Schmidt et al. | |
| 10,248,812 B2 | 4/2019 | Pinpin et al. | |
| 10,360,685 B2 | 7/2019 | Marty et al. | |
| 10,460,176 B2 | 10/2019 | Chang et al. | |
| 10,460,177 B2 | 10/2019 | Chan et al. | |
| 10,521,671 B2 | 12/2019 | Chang et al. | |
| 10,650,442 B2 | 5/2020 | Shihadah et al. | |
| 10,713,494 B2 | 7/2020 | Chang et al. | |
| 10,748,008 B2 | 8/2020 | Chang et al. | |
| 10,755,102 B2 | 8/2020 | Chang et al. | |
| 10,755,103 B2 | 8/2020 | Chang et al. | |
| 10,762,351 B2 | 9/2020 | Chang et al. | |
| 10,769,446 B2 | 9/2020 | Chang et al. | |
| 10,832,057 B2 | 11/2020 | Chan et al. | |
| 2003/0093810 A1 | 5/2003 | Taniguchi et al. | |
| 2003/0172346 A1 | 9/2003 | Gould et al. | |
| 2003/0225536 A1 | 12/2003 | Jackson et al. | |
| 2004/0017389 A1 | 1/2004 | Pan et al. | |
| 2004/0199923 A1 | 10/2004 | Russek | |
| 2005/0107159 A1 | 5/2005 | Sato | |
| 2005/0160458 A1 | 7/2005 | Baumgartner | |
| 2006/0252476 A1 | 11/2006 | Bahou | |
| 2006/0256210 A1 | 11/2006 | Ryall et al. | |
| 2007/0167216 A1 | 7/2007 | Walker et al. | |
| 2007/0238538 A1 | 10/2007 | Priester | |
| 2008/0193016 A1 | 8/2008 | Lim et al. | |
| 2008/0225130 A1 | 9/2008 | Paaaho et al. | |
| 2008/0260347 A1 | 10/2008 | Widdowson | |
| 2008/0312010 A1 * | 12/2008 | Marty | A63B 69/00 473/447 |
| 2009/0022394 A1 | 1/2009 | Banerjee et al. | |
| 2009/0077503 A1 | 3/2009 | Sundstrom | |
| 2009/0183103 A1 | 7/2009 | McCartie et al. | |
| 2011/0013087 A1 | 1/2011 | House et al. | |
| 2011/0044602 A1 | 2/2011 | Lim et al. | |
| 2011/0066908 A1 | 3/2011 | Bartz et al. | |
| 2011/0202397 A1 | 8/2011 | Lam et al. | |
| 2011/0275045 A1 | 11/2011 | Bhupathi et al. | |
| 2012/0017236 A1 | 1/2012 | Stafford et al. | |
| 2012/0265758 A1 | 10/2012 | Han et al. | |
| 2012/0313785 A1 | 12/2012 | Hanson et al. | |
| 2013/0027757 A1 | 1/2013 | Lee et al. | |
| 2013/0182119 A1 | 7/2013 | Eledath et al. | |
| 2013/0208963 A1 | 8/2013 | Leal et al. | |
| 2013/0266286 A1 | 10/2013 | Yu et al. | |
| 2014/0029921 A1 | 1/2014 | Warren et al. | |

(56) References Cited

U.S. PATENT DOCUMENTS

| | | | |
|---|---|---|---|
| 2014/0037140 | A1 | 2/2014 | Benhimane et al. |
| 2014/0058992 | A1* | 2/2014 | Lucey .................... G06N 5/043 706/46 |
| 2014/0064693 | A1* | 3/2014 | Deshpande .......... H04N 9/8205 386/230 |
| 2014/0085443 | A1* | 3/2014 | Sathish ........... H04N 21/23418 348/61 |
| 2014/0135959 | A1 | 5/2014 | Thurman et al. |
| 2014/0245152 | A1 | 8/2014 | Carter et al. |
| 2014/0286621 | A1 | 9/2014 | Matsunaga et al. |
| 2015/0086072 | A1 | 3/2015 | Kompalli et al. |
| 2015/0116493 | A1 | 4/2015 | Bala et al. |
| 2015/0121436 | A1 | 4/2015 | Rango et al. |
| 2015/0131845 | A1 | 5/2015 | Forouhar et al. |
| 2015/0142716 | A1 | 5/2015 | Lucey et al. |
| 2015/0248917 | A1 | 9/2015 | Chang |
| 2015/0332465 | A1 | 11/2015 | Schmidt et al. |
| 2015/0375117 | A1 | 12/2015 | Thompson et al. |
| 2016/0007912 | A1 | 1/2016 | Hu et al. |
| 2016/0080830 | A1 | 3/2016 | Kim et al. |
| 2016/0148650 | A1 | 5/2016 | Laksono |
| 2016/0234566 | A1 | 8/2016 | Suoknuuti et al. |
| 2017/0001118 | A1 | 1/2017 | Ibrahim et al. |
| 2017/0046967 | A1 | 2/2017 | Sundquist et al. |
| 2017/0132264 | A1 | 5/2017 | Li et al. |
| 2017/0238055 | A1 | 8/2017 | Chang et al. |
| 2017/0255826 | A1 | 9/2017 | Chang et al. |
| 2017/0255827 | A1 | 9/2017 | Chang et al. |
| 2017/0255828 | A1 | 9/2017 | Chang et al. |
| 2017/0255829 | A1 | 9/2017 | Chang et al. |
| 2017/0269819 | A1 | 9/2017 | Pinpin et al. |
| 2018/0025078 | A1 | 1/2018 | Quennesson |
| 2019/0075176 | A1 | 3/2019 | Nguyen et al. |
| 2019/0114485 | A1 | 4/2019 | Chan et al. |
| 2019/0205651 | A1 | 7/2019 | Chang et al. |
| 2019/0294631 | A1 | 9/2019 | Alcantara et al. |
| 2019/0354765 | A1 | 11/2019 | Chan et al. |
| 2019/0392219 | A1 | 12/2019 | Chang et al. |
| 2020/0012861 | A1 | 1/2020 | Chan et al. |
| 2020/0074181 | A1 | 3/2020 | Chang et al. |
| 2020/0074182 | A1 | 3/2020 | Chang et al. |
| 2020/0193163 | A1 | 6/2020 | Chang et al. |
| 2020/0342233 | A1 | 10/2020 | Chang et al. |
| 2020/0401809 | A1 | 12/2020 | Chang et al. |

FOREIGN PATENT DOCUMENTS

| | | | |
|---|---|---|---|
| CN | 102985926 | A | 3/2013 |
| CN | 103294716 | A | 9/2013 |
| WO | 9631047 | A2 | 10/1996 |
| WO | 02071334 | A2 | 9/2002 |
| WO | 2013166456 | A2 | 11/2013 |
| WO | 2015060691 | A1 | 4/2015 |
| WO | 2015/131084 | A1 | 9/2015 |
| WO | 2016057844 | A1 | 4/2016 |
| WO | 2018053257 | A1 | 3/2018 |
| WO | 2019183235 | A1 | 9/2019 |
| WO | 2019183235 | A8 | 10/2019 |

OTHER PUBLICATIONS 17851597.9, "European Application Serial No. 17851597.9, Extended European Search Report dated Aug. 9, 2019", Second Spectrum, Inc., 8 pages.

Kim, "Automatic Classification of Offensive Patterns for Soccer Game Highlights Using Neural Networks", Malaysian Journal of Computer Science, XP055422797, Retrieved from the Internet: URL:http://citeseerx.ist.psu.edujviewdocjdownload?doi=l0.1.1.630.7271&rep=rep1&type=pdf, Jun. 1, 2002, pp. 57-67.

PCT/US2015/018077, "International Application Serial No. PCT/US2015/018077, International Preliminary Report on Patentability and Written Opinion dated Sep. 15, 2016", Second Spectrum, Inc., 9 Pages.

PCT/US2015/018077, "International Application Serial No. PCT/US2015/018077, International Search Report and Written Opinion dated May 27, 2015", Second Spectrum, Inc., 13 pages.

PCT/US2017/051768, "International Application Serial No. PCT/US2017/051768, International Search Report and Written Opinion dated Feb. 28, 2018", Second Spectrum, Inc., 33 Pages.

PCT/US2017/051768, "International Application Serial No. PCT/US2017/051768, Invitation to Pay Additional Fees and, Where Applicable, Protest Fee dated Nov. 29, 2017", Second Spectrum, Inc., 7 Pages.

PCT/US2019/023192, "International Application Serial No. PCT/US2019/023192, International Search Report and Written Opinion dated Jul. 2, 2019", Second Spectrum, Inc., 22 pages.

U.S. Appl. No. 16/795,834, filed Feb. 20, 2020, Pending.

U.S. Appl. No. 16/678,520, filed Nov. 8, 2019, Pending.

U.S. Appl. No. 17/006,962, filed Aug. 31, 2020, Pending, Yu-Han Chang et al.

U.S. Appl. No. 17/029,808, filed Sep. 23, 2020, Pending, Edward Shek Chan et al.

PCT/US2017/051768, "International Application Serial No. PCT/US2017/051768, International Preliminary Report on Patentability dated Mar. 28, 2019", 24 pages.

PCT/US2019/023192, "International Application Serial No. PCT/US2019/023192, International Preliminary Report on Patentability dated Oct. 1, 2020", Second Spectrum, Inc., 18 pages.

* cited by examiner

| | | |
|---|---|---|
| EAGLE STACK 100 | CUSTOMIZATION 102 | TEAM-SPECIFIC ANALYTICS, VISUALIZATIONS AND TOOLS<br>ANALYTICS EXPORTS, CROWD-SOURCED FEEDBACK |
| | INTERACTION 104 | REAL-TIME INTERACTIVE TOOLS TO SLICE AND DICE DATA<br>SHOT MATRIX, SCREEN BREAKDOWN, POSSESSION DETECTIVE |
| | VISUALIZATIONS 108 | DYNAMIC VISUALIZATIONS OF PATTERNS AND ANALYTICS<br>SCATTER RANK, SHOT COMPARISON, CLIP VIEW |
| | ANALYTICS 110 | NEW METRICS BASED ON AI, MACHINE LEARNING<br>SITUATIONAL EFG, VORONOI-BASED RB% |
| | PATTERNS 112 | INFRASTRUCTURE FOR RAPID DISCOVERY OF NEW PATTERNS<br>SCREENS, DEFENSE, FACE-UP, POST-UP, TRANSITION,..... |
| | EVENTS 114 | CREATE NEW EVENTS AND CORRECT CURRENT ERRORS<br>ANALYZE ACCURACY OF MARKINGS [FGA,DRB,...] |
| | DATA 118 | CATALOGUE, CORRECT AND ADAPT RAW DATA [X,Y,Z,T]<br>MANAGE ONLINE WAREHOUSING IN THE CLOUD |

*FIG. 1*

EAGLE - RANKINGS

| RANKINGS | BREAKDOWNS | COURT VIEW | COURT COMPARISON | VIDEO | REPORTS | PLAYS | GAMES | SIGN OUT |

RANK [SHOOTING ▲▼] FOR [PLAYERS ▲▼] ON [OFFENSE ▲▼]  [CUSTOMIZE]
         402                404                      408

...TISFY FILTERS AND 178 MEET MINIMUM REQUIREMENTS.

POSITION: [ ▽ ] PG SG SF PF CTR    MIN OPPORTUNITIES: [500]    [EXPORT]

| ...TER | TEAM | PLAYER POS | SHOTS | ▽ EFG | SEFG | EFG+ |
|---|---|---|---|---|---|---|
| PLAYER1 | TEAM1 | C | 147 | 54.4 | 53.0 | 9 |
| PLAYER2 | TEAM2 | SG, SF | 85 | 59.1 | 56.0 | 8 |
| PLAYER3 | TEAM1 | C | 63 | 63.2 | 62.1 | 7 |
| PLAYER4 | TEAM3 | SF, PF | 123 | 47.2 | 46.3 | 7 |
| PLAYER5 | TEAM3 | C | 131 | 48.0 | 45.0 | 6 |
| PLAYER6 | TEAM4 | SG | 65 | 49.0 | 47.0 | 6 |
| PLAYER7 | TEAM5 | PF | 231 | 51.2 | 50.3 | 7 |
| PLAYER8 | TEAM8 | PG, SG | 147 | 53.6 | 52.4 | 9 |
| PLAYER9 | TEAM2 | SF | 151 | 55.0 | 53.3 | 8 |
| PLAYER10 | TEAM3 | SG, SF | 220 | 47.3 | 45.2 | 9 |

410 →
- ✓ SHOOTING
- REBOUNDING
- ISOS (CHANCE)
- ISOS (DIRECT)
- PICKS (CHANCE)
- PICKS (DIRECT)
- POSTUPS (CHANCE)
- POSTUPS (DIRECT)
- HANDOFFS (CHANCE)
- HANDOFFS (DIRECT)
- LINEUPS (CHANCE)
- MATCHUPS (CHANCE)
- POSSESSIONS (METRICS)
- POSSESSIONS (ACTIONS)
- TRANSITIONS (CHANCES)
- PLAYS (CHANCE)
- CHANCES

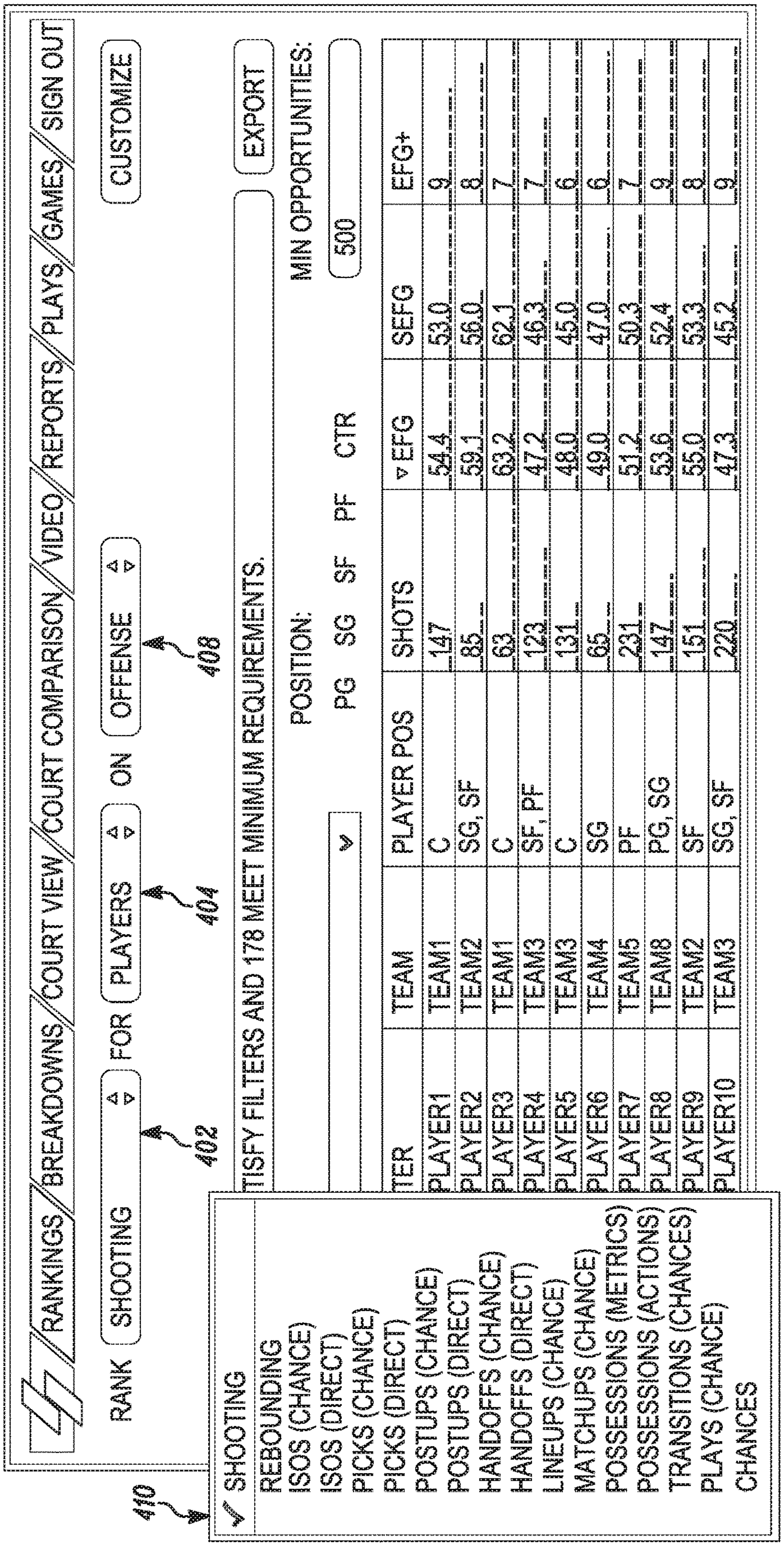

*FIG. 4*

| | BALLHANDLER | SCREENER | TEAM | ACTI... | D | DA% | DPT... | I | IA% | IPTS/A | V | VA% | PTS/A | GAMES | DP/G | P/G | VIDEO |
|---|---|---|---|---|---|---|---|---|---|---|---|---|---|---|---|---|---|
| 1 | PLAYER1 | PLAYER1' | 1 | 250 | 168 | 67.200 | 1.244 | 67 | 26.800 | 0.940 | 235 | 94.000 | 1.157 | 56 | 3.000 | 4.464 | WATCH |
| 2 | PLAYER2 | PLAYER2' | 2 | 851 | 606 | 71.210 | 1.144 | 170 | 19.976 | 0.871 | 776 | 91.187 | 1.084 | 76 | 7.974 | 11.197 | WATCH |
| 3 | PLAYER3 | PLAYER3' | 3 | 372 | 293 | 78.763 | 1.126 | 65 | 17.473 | 0.908 | 358 | 96.237 | 1.087 | 80 | 3.663 | 4.650 | WATCH |
| 4 | PLAYER4 | PLAYER4' | 4 | 305 | 214 | 70.164 | 1.117 | 68 | 22.295 | 0.853 | 282 | 92.459 | 1.053 | 74 | 2.892 | 4.122 | WATCH |

| | | | | | | | | | | | | | | | | | |
|---|---|---|---|---|---|---|---|---|---|---|---|---|---|---|---|---|---|
| 5 | PLAYER5 | PLAYER5' | 5 | 334 | 153 | 45.808 | 1.098 | 154 | 46.108 | 0.916 | 307 | 91.916 | 1.007 | 67 | 2.284 | 4.985 | WATCH |
| 6 | PLAYER6 | PLAYER6' | 3 | 205 | 159 | 77.561 | 1.094 | 31 | 15.122 | 0.968 | 190 | 92.683 | 1.074 | 63 | 2.524 | 3.254 | WATCH |
| 7 | PLAYER7 | PLAYER7' | 6 | 208 | 134 | 64.423 | 1.090 | 61 | 29.327 | 0.820 | 195 | 93.750 | 1.005 | 23 | 5.826 | 9.043 | WATCH |
| 8 | PLAYER8 | PLAYER8' | 7 | 367 | 229 | 62.398 | 1.087 | 114 | 31.063 | 0.930 | 343 | 93.460 | 1.035 | 52 | 4.404 | 7.058 | WATCH |
| 9 | PLAYER9 | PLAYER9' | 8 | 330 | 236 | 71.515 | 1.085 | 71 | 21.515 | 0.789 | 307 | 93.030 | 1.016 | 64 | 3.688 | 5.156 | WATCH |
| 10 | PLAYER10 | PLAYER10' | 9 | 294 | 189 | 64.286 | 1.085 | 86 | 29.252 | 0.930 | 275 | 93.537 | 1.036 | 46 | 4.109 | 6.391 | WATCH |
| 11 | PLAYER11 | PLAYER11' | 10 | 206 | 133 | 64.563 | 1.083 | 61 | 29.612 | 0.967 | 194 | 94.175 | 1.046 | 24 | 5.542 | 8.538 | WATCH |
| 12 | PLAYER12 | PLAYER12' | 5 | 253 | 160 | 63.241 | 1.063 | 78 | 30.830 | 1.141 | 238 | 94.071 | 1.088 | 52 | 3.077 | 4.865 | WATCH |
| 13 | PLAYER13 | PLAYER13' | 1 | 263 | 150 | 57.034 | 1.060 | 96 | 36.502 | 0.813 | 246 | 93.536 | 0.963 | 51 | 2.941 | 5.157 | WATCH |
| 14 | PLAYER14 | PLAYER14' | 11 | 216 | 151 | 69.907 | 1.060 | 55 | 25.463 | 1.109 | 206 | 95.370 | 1.073 | 49 | 3.082 | 4.408 | WATCH |
| 15 | PLAYER15 | PLAYER15' | 8 | 272 | 188 | 69.118 | 1.059 | 65 | 23.897 | 0.692 | 253 | 93.015 | 0.964 | 49 | 3.837 | 5.551 | WATCH |

*FIG. 5B*

| VIDEO | BREAKDOWNS | RANKINGS | REPORTS | OTHERS ▽ | | | | | | | | | ▽ ACCOUNT |
|---|---|---|---|---|---|---|---|---|---|---|---|---|---|

RANK [PICKS ▽] [ACTION ▽] FOR [PLAYERS ▽] ON [OFFENSE ▽] [CUSTOMIZE]

FILTERS [RESET] [EXPORT]

GAME | TEAM | LOCATION | OTHER | OFFENSE | DEFENSE

BALLHANDLER POSITION
[SELECT SOME OPTIONS]

SCREENER POSITION
[SELECT SOME OPTIONS]

BALLHANDLER OUTCOME  SCREENER OUTCOME
[SELECT SOME OPTIONS]

DIRECT    PICK TYPE
[ALL ▽]   [SELECT SOME OPTIONS]

MIN OPPORTUNITIES: [200]

| D | DA% | DPT... | I | IA% | IPTS/A | V | VA% | PTS/A | GAMES | DP/G | P/G | VIDEO |
|---|---|---|---|---|---|---|---|---|---|---|---|---|
| 168 | | | | | | | | | | | | |
| 806 | 71.210 | 1.144 | 170 | 19.976 | 0.871 | 776 | 91.187 | 1.084 | 76 | 7.974 | 11.197 | WATCH |
| 293 | 78.763 | 1.126 | 65 | 17.473 | 0.908 | 358 | 96.237 | 1.087 | 80 | 3.663 | 4.650 | WATCH |
| 214 | 70.164 | 1.117 | 68 | 22.295 | 0.853 | 282 | 92.459 | 1.053 | 74 | 2.892 | 4.122 | WATCH |
| 153 | 45.808 | 1.098 | 154 | 46.108 | 0.916 | 307 | 91.916 | 1.007 | 67 | 2.284 | 4.985 | WATCH |
| 159 | 77.561 | 1.094 | 31 | 15.122 | 0.968 | 190 | 92.683 | 1.074 | 63 | 2.524 | 3.254 | WATCH |
| 134 | 64.423 | 1.090 | 61 | 29.327 | 0.820 | 195 | 93.750 | 1.005 | 23 | 5.826 | 9.043 | WATCH |

Note: first data row: 67.200 | 1.244 | 67 | 26.800 | 0.940 | 235 | 94.000 | 1.157 | 56 | 3.000 | 4.464 | WATCH

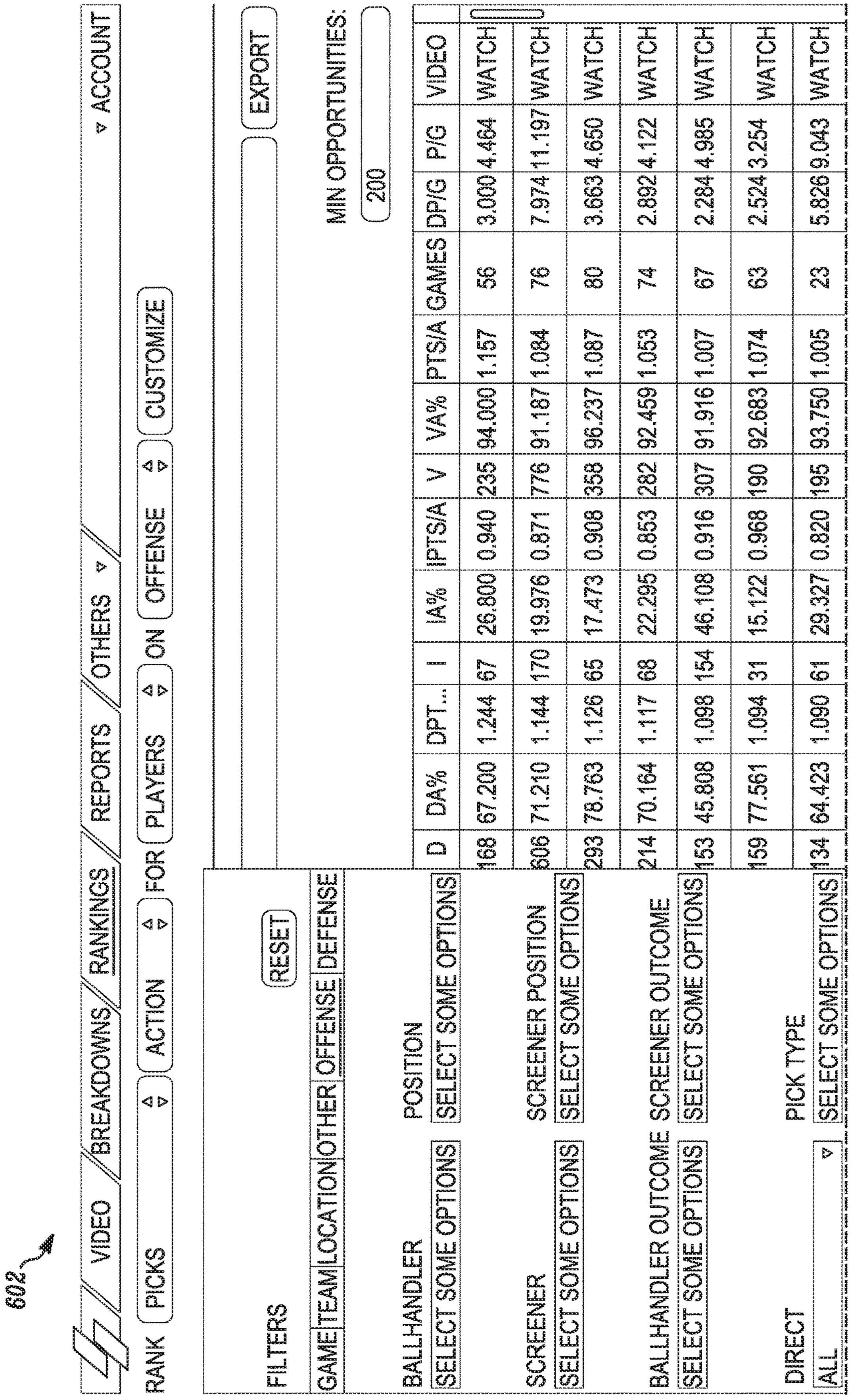

*FIG. 6A*

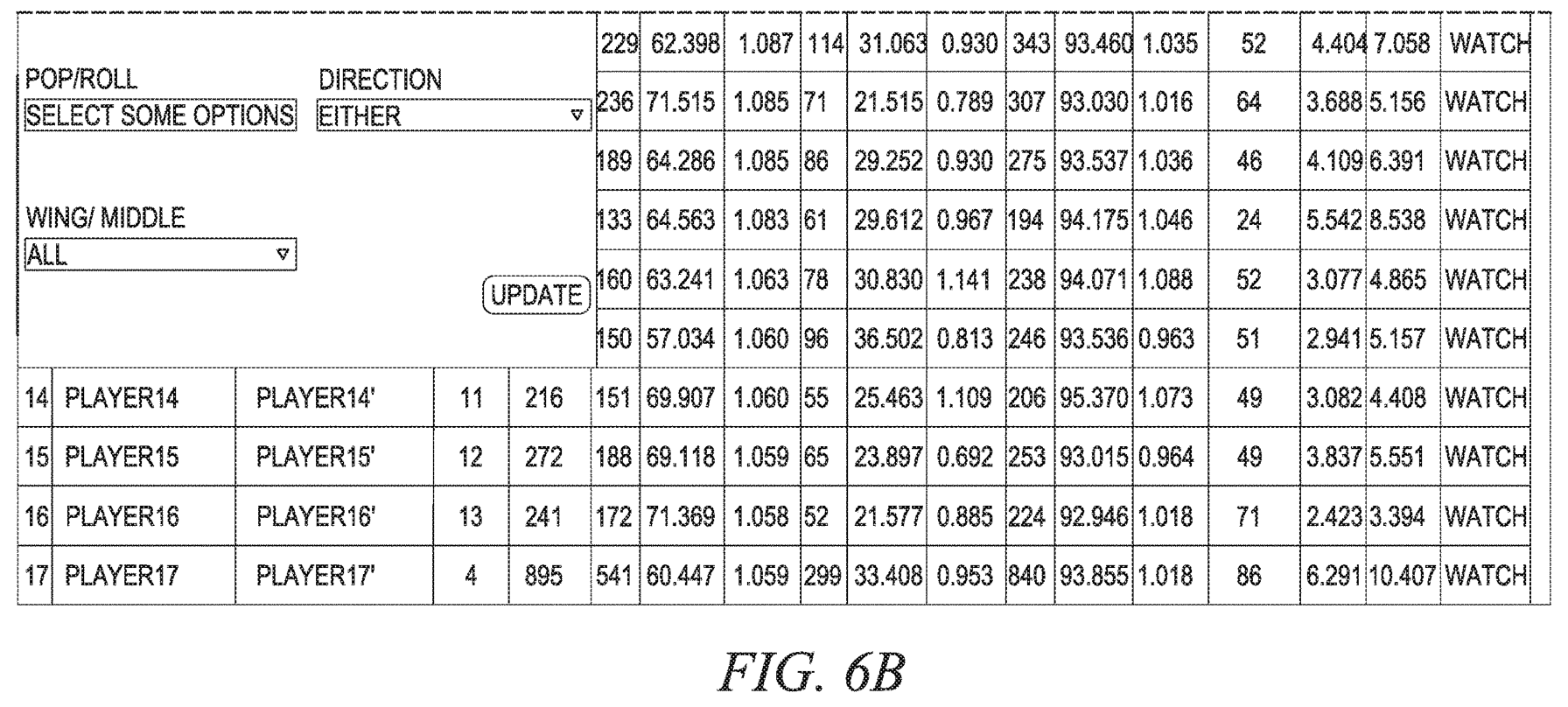

POP/ROLL
SELECT SOME OPTIONS

DIRECTION
EITHER ▿

WING/ MIDDLE
ALL ▿

UPDATE

| | | | | | | | | | | | | | | | | | |
|---|---|---|---|---|---|---|---|---|---|---|---|---|---|---|---|---|---|
| | | | | | 229 | 62.398 | 1.087 | 114 | 31.063 | 0.930 | 343 | 93.460 | 1.035 | 52 | 4.404 | 7.058 | WATCH |
| | | | | | 236 | 71.515 | 1.085 | 71 | 21.515 | 0.789 | 307 | 93.030 | 1.016 | 64 | 3.688 | 5.156 | WATCH |
| | | | | | 189 | 64.286 | 1.085 | 86 | 29.252 | 0.930 | 275 | 93.537 | 1.036 | 46 | 4.109 | 6.391 | WATCH |
| | | | | | 133 | 64.563 | 1.083 | 61 | 29.612 | 0.967 | 194 | 94.175 | 1.046 | 24 | 5.542 | 8.538 | WATCH |
| | | | | | 160 | 63.241 | 1.063 | 78 | 30.830 | 1.141 | 238 | 94.071 | 1.088 | 52 | 3.077 | 4.865 | WATCH |
| | | | | | 150 | 57.034 | 1.060 | 96 | 36.502 | 0.813 | 246 | 93.536 | 0.963 | 51 | 2.941 | 5.157 | WATCH |
| 14 | PLAYER14 | PLAYER14' | 11 | 216 | 151 | 69.907 | 1.060 | 55 | 25.463 | 1.109 | 206 | 95.370 | 1.073 | 49 | 3.082 | 4.408 | WATCH |
| 15 | PLAYER15 | PLAYER15' | 12 | 272 | 188 | 69.118 | 1.059 | 65 | 23.897 | 0.692 | 253 | 93.015 | 0.964 | 49 | 3.837 | 5.551 | WATCH |
| 16 | PLAYER16 | PLAYER16' | 13 | 241 | 172 | 71.369 | 1.058 | 52 | 21.577 | 0.885 | 224 | 92.946 | 1.018 | 71 | 2.423 | 3.394 | WATCH |
| 17 | PLAYER17 | PLAYER17' | 4 | 895 | 541 | 60.447 | 1.059 | 299 | 33.408 | 0.953 | 840 | 93.855 | 1.018 | 86 | 6.291 | 10.407 | WATCH |

*FIG. 6B*

VIDEO / BREAKDOWNS / RANKINGS / REPORTS / OTHER ACCOUNT
GENERATE PDF
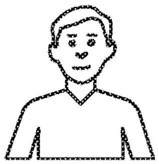
PLAYER4
#35 | SF, SG, PF | 6'9", 215 LBS | TEAM5
| | MP | FG | FGA | FG% | 3P | 3PA | 3P% | 2P | 2PA | 2P% | FT | FTA | FT% | ORB | DRB | TRB | AST | STL | BLK | TOV | PTS |
|---|---|---|---|---|---|---|---|---|---|---|---|---|---|---|---|---|---|---|---|---|---|
| PLAYER | 38.5 | 10.5 | 20.8 | 50.3 | 2.4 | 6.1 | 39.1 | 8.1 | 14.8 | 54.9 | 8.7 | 9.9 | 87.3 | 0.7 | 6.7 | 7.4 | 5.5 | 1.3 | 0.7 | 3.5 | 32.0 |
| LG PERCENTILE | 99% | 100% | 100% | 84% | 97% | 97% | 86% | 99% | 98% | 88% | 100% | 100% | 91% | 55% | 96% | 92% | 94% | 91% | 84% | 98% | 100% |
OFFENSE
1102
SHOOTING
CATCH AND SHOOT
1102
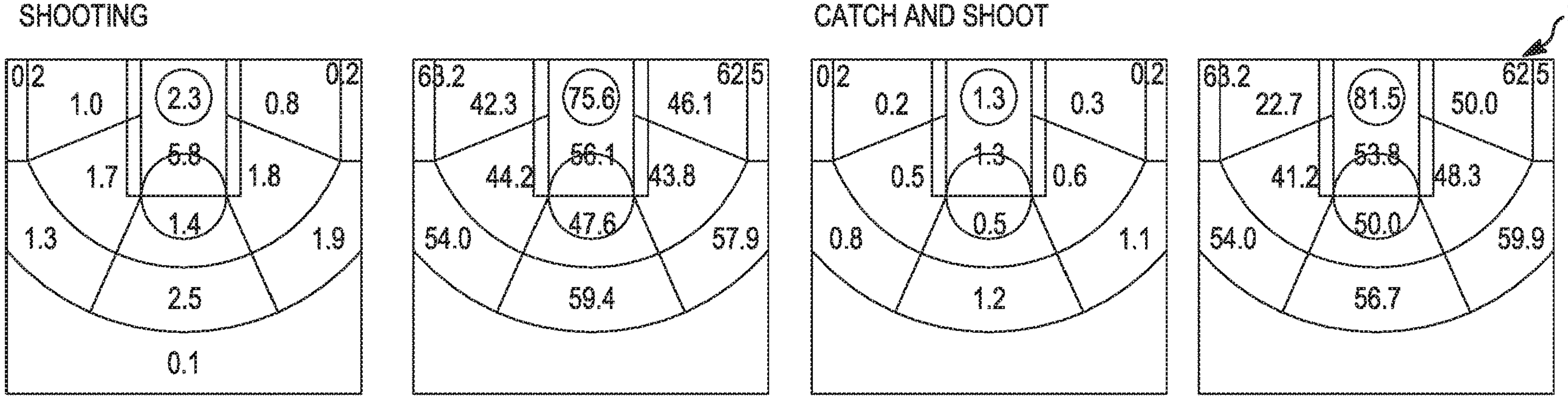
FGA/G EFG% FGA/G EFG%
SHOTS BY LOCATION
*FIG. 11*

VIDEO | BREAKDOWNS | RANKINGS | REPORTS | OTHER play by play

NOTE: CHANGES WILL ONLY BE SAVED WHEN YOU CLICK "SUBMIT MARKINGS".

FIND & REPLACE TAGS | FIND & REPLACE TAGS

1402

| DATE | PERIOD | HOME TEAM | AWAY TEAM | CLOCK | INDEX | PTS | EVENTS | DESCRIPTION | TAGS |
|---|---|---|---|---|---|---|---|---|---|
| 2014/6/15 | 2 | 1 | 4 | 11:49 | 0 | 2 | FGM | PLAYER1 MAKES AN ALLEY OOP DUNK 2 FEET OUT. PLAYER3 WITH THE ASSIST. | |
| 2014/6/15 | 2 | 1 | 4 | 11:32 | 1 | 0 | TO | PLAYER4 STEALS THE BALL FROM PLAYER3. | |
| 2014/6/15 | 2 | 1 | 4 | 11:32 | 2 | 2 | JMP | JUMP BALL: PLAYER2 VS PLAYER4 _PLAYER6 GAINS POSSESSION. | |
| 2014/6/15 | 2 | 1 | 4 | 11:09 | 2 | 2 | FGM | PLAYER4 MAKES A JUMP SHOT FROM 20 FEET OUT. | |
| 2014/6/15 | 2 | 1 | 4 | 10:48 | 3 | 2 | FGM | PLAYER3 MAKES A JUMP SHOT FROM 23 FEET OUT. PLAYER5 WITH THE ASSIST. | |
| 2014/6/15 | 2 | 1 | 4 | 10:30 | 4 | 0 | FGX | PLAYER4 MISSES A 3_POINT JUMP SHOT FROM 23 FEET OUT. | |
| 2014/6/15 | 2 | 1 | 4 | 10:29 | 4 | 0 | DRB | PLAYER1 WITH A DEFENSIVE REBOUND . | |
| 2014/6/15 | 2 | 1 | 4 | 10:15 | 5 | 0 | FGX | PLAYER1 MISSES A 3_POINT JUMP SHOT FROM 25 FEET OUT . | |

*FIG. 14*

1804
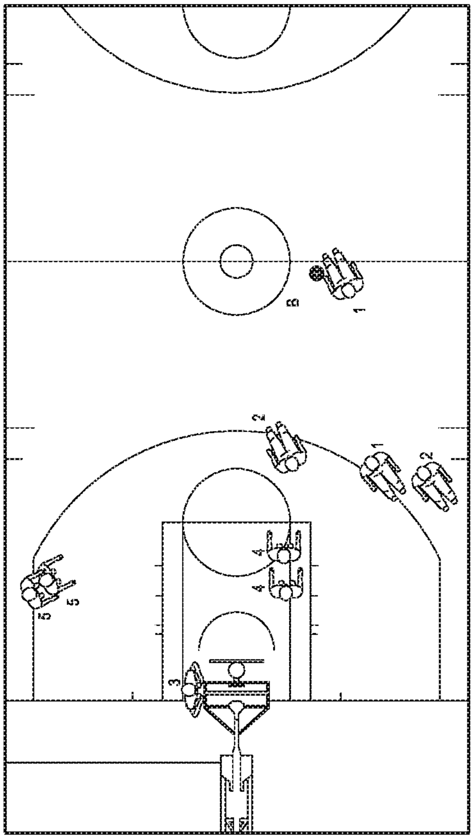
1802
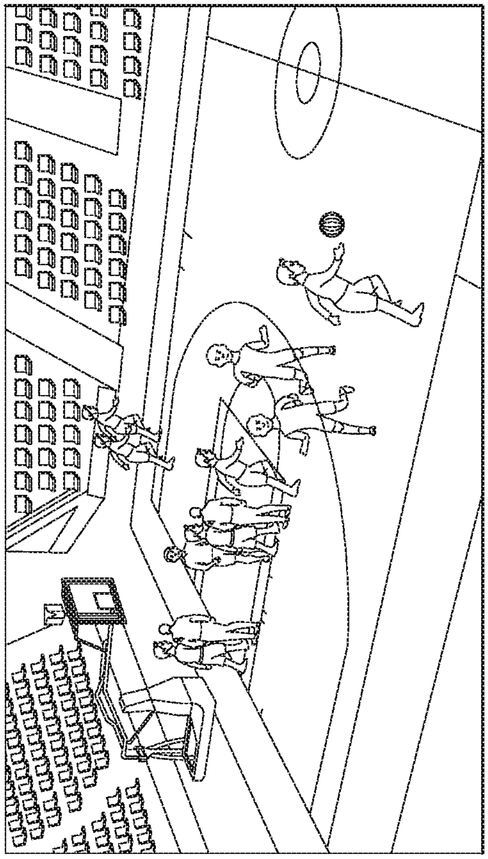
FIG. 18

2004

2002

TEAM COMPARISON 2402

| SHOOTING | TEAM 4 OFFENSE | | | | TEAM 7 DEFENSE | | | |
|---|---|---|---|---|---|---|---|---|
| FIELD GOAL PERCENTAGE | | | | | | | | |
| FG% | 44.91 | #16 | #1 MIA (52.80) | (42.36) #1 MIL | #30 DET (47.00) | (41.47) #1 IND | #19 | 45.86 |
| EFFECTIVE FIELD GOAL PERCENTAGE | | | | | | | | |
| EFG | 49.96 | #13 | #1 MIA (56.05) | (42.46) #1 MIL | #30 PHI (52.05) | (45.19) #1 IND | #14 | 49.47 |
| SHOT QUALITY | | | #1 HOU (50.82) | (46.95) #30 CIL | #30 UTA (49.53) | (46.73) #1 SAS | | |
| SHOT QUALITY | 47.55 | #25 | | | | | #5 | 47.66 |
| EFG ABOVE SHOT QUALITY | | | #1 MIA (5.28) | (-2.59) #30 PHI | #30 MIN (2.91) | (-1.75) #1 IND | | |
| EFG+(SHOOTING ABILITY) | 2.41 | #8 | | | | | #16 | 1.81 |
| FGX REBOUNDING | TEAM 4 OFFENSE | | | | TEAM 7 DEFENSE | | | |
| PERCENT OF FGX.... | | | #1 DET (31.04) | (20.36) #30 MIA | #30 LAL (62.66) | (69.46) #1 WAS | | |
| FB% | 22.13 | #26 | | | | | #6 | 68.12 |
| RB... | | | #1 MEM (30.05) | (23.34) #30 LAL | #30 MIA (70.72) | (75.88) #1 ORL | | |
| RB POSITIONING (SHOT) | 24.68 | #25 | | | | | #6 | 74.66 |
| SHOT QUALITY | | | #1 DET (32.52) | (25.69) #30 MIA | #30 DET (67.64) | (72.09) #1 ORL | | |
| RB POSITIONING (RIM) | 28.33 | #24 | | | | | #6 | 70.83 |
| RB ..... | | | #1 POR (5.26) | (1.75) #30 ORL | #30 SAS (-4.47) | (-1.98) #1 MIA | | |
| RB CRASH | 3.64 | #11 | | | | | #22 | -3.83 |
| PRO .... | | | #1 DET (67.93) | (59.46) #30 ORL | #30 MIL (83.69) | (88.34) #1 GSW | | |

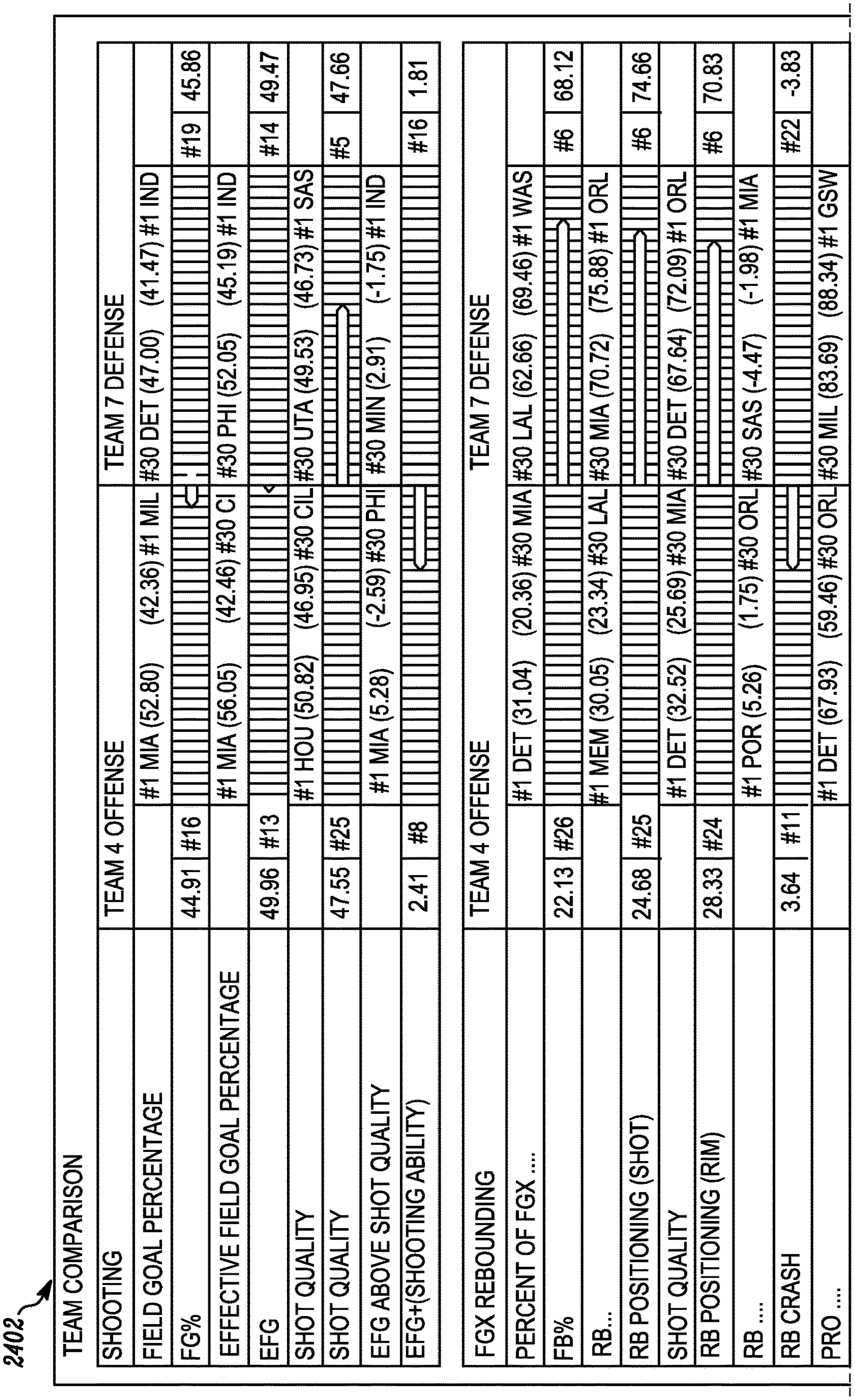

*FIG. 24A*

| | | | | | | |
|---|---|---|---|---|---|---|
| FB OPP % | 62.60 | #22 | | | #3 | 88.19 |
| FB OPP %... | | | #1 MIL (40.24) (32.70) #30 MEM | #30 MIL (10.88) (15.57) #1 MIA | | |
| RB HUSTLE | 37.92 | #12 | | | #13 | 13.53 |
| PERCENT... | | | #1 PRO (46.09) (34.01) #30 MIA | #30 LAL (73.38) (79.17) #1 MEM | | |
| RB CONVERSION % | 35.34 | #27 | | | #14 | 77.24 |
| RB PERCENT .... | | | #1 POR (2.39) (-4.67) #30 ATL | #30 MIL (-9.43) (-3.23) #1 WAS | | |
| RB %+ | -2.56 | #26 | | | #11 | -6.54 |

| | | | | | | |
|---|---|---|---|---|---|---|
| BASIC | TEAM 4 OFFENSE | | | TEAM 7 DEFENSE | | |
| DEEF.... | | | #1 HOU (0.23) (0.18) #30 LAL | #30 NOP (0.22) (0.17) #1 CHA | | |
| DEFFOULS PER POSSESSION | 0.20 | #7 | | | #7 | 0.18 |
| ASS... | | | #1 ATL (0.27) (0.20) #30 PHX | #30 PHI (0.27) (0.19) #1 IND | | |
| ASSISTS PER POSS.. | 0.22 | #18 | | | #4 | 0.21 |
| BLOCK.... | | | #1 MIA (0.03) (0.07) #30 PHI | #30 MIN (0.04) (0.07) #1 NOP | | |
| BLOCK PER POSS. | 0.04 | #9 | | | #12 | 0.05 |
| STEALS PER POSSE... | | | #1 CHA (0.07) (0.10) #30 LAL | #30 POR (0.06) (0.10) #1 MIA | | |
| STEALS PER POSS. | 0.08 | #15 | | | #30 | 0.06 |

FIG. 24B

| PERIOD | GAME CLOCK | PRETTY CLOCK | BALL-HANDLER | SCREENER |
|---|---|---|---|---|
| 1 | 676.86 | 11:17 | PLAYER 7 | PLAYER 2 |
| 1 | 645.60 | 10:46 | PLAYER 8 | PLAYER 2 |
| 1 | 630.62 | 10:31 | PLAYER 9 | PLAYER 3 |
| 1 | 578.42 | 9:38 | PLAYER 10 | PLAYER 2 |
| 1 | 544.88 | 9:05 | PLAYER 7 | PLAYER 2 |
| 1 | 523.89 | 8:44 | PLAYER 11 | PLAYER 4 |
| 1 | 523.61 | 8:44 | PLAYER 11 | PLAYER 3 |
| 1 | 517.40 | 8:37 | PLAYER 11 | PLAYER 3 |
| 1 | 465.46 | 7:45 | PLAYER 7 | PLAYER 2 |
| 1 | 456.51 | 7:37 | PLAYER 9 | PLAYER 4 |
| 1 | 441.59 | 7:22 | PLAYER 10 | PLAYER 2 |
| 1 | 431.09 | 7:11 | PLAYER 4 | PLAYER 3 |
| 1 | 412.55 | 6:53 | PLAYER 9 | PLAYER 4 |
| 1 | 397.66 | 6:38 | PLAYER 10 | PLAYER 2 |
| 1 | 380.66 | 6:21 | PLAYER 9 | PLAYER 1 |
| 1 | 346.88 | 5:47 | PLAYER 9 | PLAYER 4 |
| 1 | 332.47 | 5:32 | PLAYER 10 | PLAYER 2 |
| 1 | 268.16 | 4:28 | PLAYER 7 | PLAYER 2 |
| 1 | 249.06 | 4:09 | PLAYER 12 | PLAYER 5 |
| 1 | 169.45 | 2:49 | PLAYER 13 | PLAYER 6 |
| 1 | 162.97 | 2:43 | PLAYER 14 | PLAYER 6 |

2902

JSONS

3002

| | | | |
|---|---|---|---|
| CAMERA.JSON | [CHOOSE FILE] N...n ✓ | VORONOI-POLS.JSON | [CHOOSE FILE] N...n ⓘ |
| COURT.JSON | [CHOOSE FILE] N...n ⓘ | PLAYERS-3D-ALL.JSON | [CHOOSE FILE] N...n ✓ |
| | | PLAYER-POS.JSON | [CHOOSE FILE] N...n ⓘ |
| | | HEATMAP-POLS.JSON | [CHOOSE FILE] N...n ⓘ |

✓ UPDATE

⚐ CAMERA.JSON
⚐ COURT.JSON
⚐ VORONOI-POLS.JSON
⚐ PLAYERS-3D-ALL.JSON
⚐ PLAYER-POS.JSON

CLIP

| | | | |
|---|---|---|---|
| GAME ID | 2014000001 | WIDTH | 1280 |
| UNIQUE ID | 1 | HEIGHT | 720 |
| CLIP | [CHOOSE FILE] N...n ✓ | FRAME RATE | 29.97 |

[⊙ UPLOAD]
⚐ CLIP.MP4

PROJECT

| TYPE | START AT | DURATION | |
|---|---|---|---|
| PAUSE | 0.867 | 15 | 🗑 |
| PAUSE | 2.266 | 15 | 🗑 |
| PAUSE | 3.066 | 15 | 🗑 |

[⟳ GENERATE]
⚐ SCRIPT.JSX

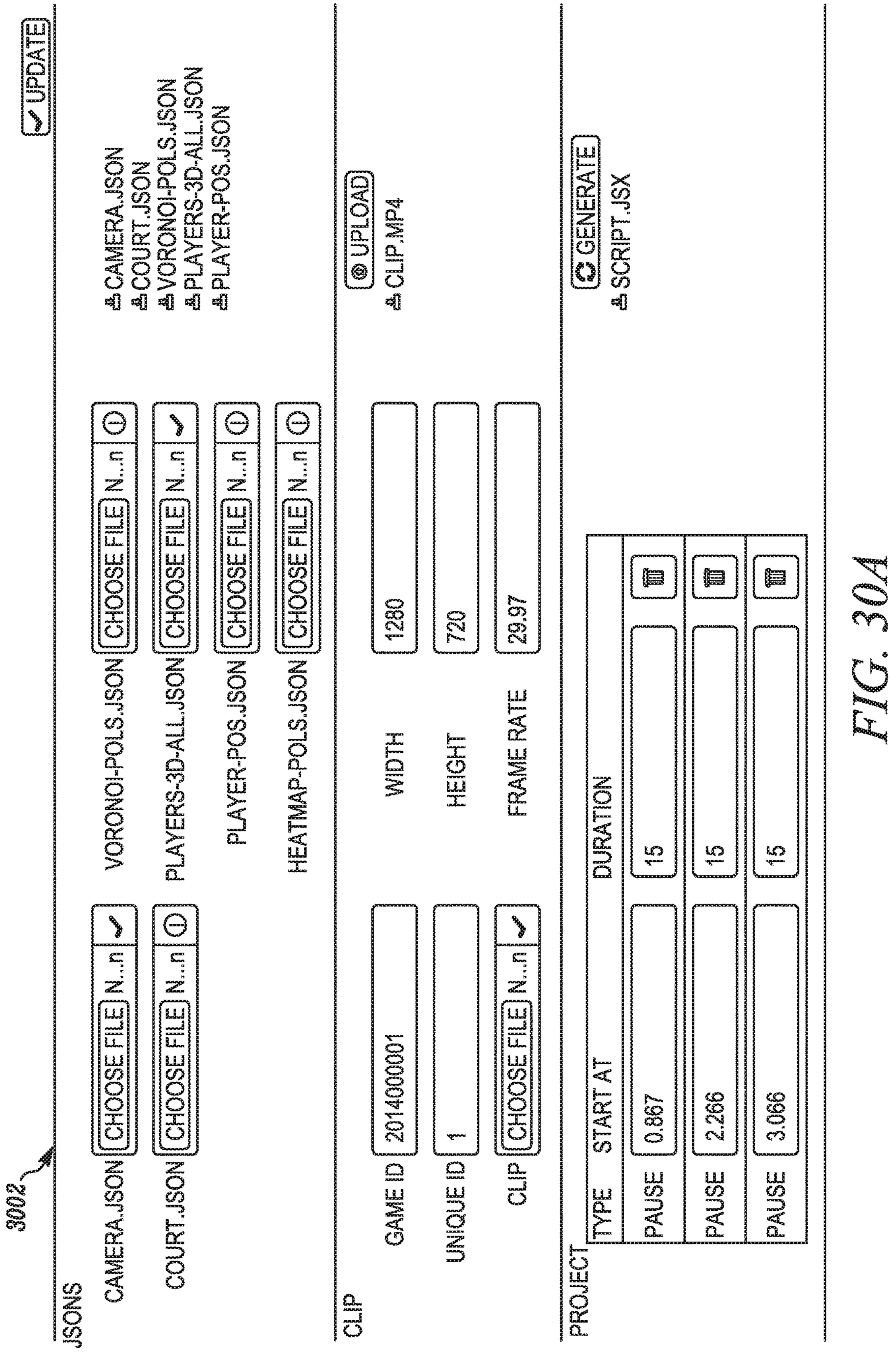

*FIG. 30A*

PLAYER CIRCLES

| FRAME ID | START AT | DURATION | PLAYER | COLOR | GET BALLS | BALL TIME | | |
|---|---|---|---|---|---|---|---|---|
| 27 | 1.367 | 14.5 | 1 | RE �️ | ☐ | 0 | 🗑 | |
| 27 | 1.617 | 14.25 | 2 | WH �️ | ☐ | 0 | 🗑 | |

+ ADD CIRCLE
⟳ GENERATE
⬇ SCRIPT.JSX

SCREEN ARROWS

| FRAME ID | START AT | DURATION | PLAYER | C/CC | ROTATION | FLICKER AT |
|---|---|---|---|---|---|---|

+ ADD ARROW
⟳ GENERATE
⬇ SCRIPT.JSX

SCREEN CALLOUTS

| FRAME ID | START AT | DURATION | PLAYER | TEXT | NUMBER | ARROW |
|---|---|---|---|---|---|---|

+ ADD ARROW
⟳ GENERATE
⬇ SCRIPT.JSX

3102

3202

3302

3402

3502

3602

4208

METHODS AND SYSTEMS OF SPATIOTEMPORAL PATTERN RECOGNITION FOR VIDEO CONTENT DEVELOPMENT

CROSS REFERENCE TO RELATED APPLICATIONS

This application is a continuation of U.S. patent application Ser. No. 16/561,972, filed Sep. 5, 2019. U.S. patent application Ser. No. 16/561,972 is a continuation of U.S. patent application Ser. No. 15/600,355 filed May 19, 2017, which issued on Oct. 29, 2019 as U.S. Pat. No. 10,460,176. U.S. patent application Ser. No. 15/600,355 is a continuation of U.S. patent application Ser. No. 15/586,379 filed May 4, 2017, which issued on Dec. 31, 2019 as U.S. Pat. No. 10,521,671. U.S. patent application Ser. No. 15/586,379 claims the benefit of U.S. provisional patent application Ser. No. 62/395,886 filed Sep. 16, 2016. Each of the applications/patents listed above and elsewhere herein is hereby incorporated by reference in its entirety.

BACKGROUND

Field of the Invention

The present application generally relates to a system and method for performing analysis of events that appear in live and recorded video feeds, such as sporting events. In particular, the present application relates to a system and methods for enabling spatiotemporal analysis of component attributes and elements that make up events within a video feed, such as of a sporting event, systems for discovering, learning, extracting, and analyzing such events, metrics and analytic results relating to such events, and methods and systems for display, visualization, and interaction with outputs from such methods and systems.

Description of the Related Art

Live events, such as sports, especially at the college and professional levels, continue to grow in popularity and revenue as individual colleges and franchises reap billions in revenue each year. To provide valuable insights and gain a competitive advantage in such endeavors, quantitative methodologies, such as Sabermetrics, have grown in importance and ubiquity as a valuable augmentation to traditional scouting methods. However, as no one person can evaluate and accurately store all of the information available from the vast volumes of sporting information generated on a daily basis, there seldom exists a storehouse of properly coded and stored information reflecting such large volumes of sports information and, even were such information available, there is lacking the provision of tools capable of mining and analyzing such information.

Systems are now available for capturing and encoding event information, such as sporting event information, such as "X, Y, Z" motion data captured by imaging cameras deployed in National Basketball Association (NBA) arenas. However, there are many challenges with such systems, including difficulty handling the data, difficulty transforming X, Y, Z data into meaningful and existing sports terminology, difficulty identifying meaningful insights from the data, difficulty visualizing results, and others. Also, there are opportunities to identify and extract novel insights from the data. Accordingly, a need exists for methods and systems that can take event data captured in video feeds and enable discovery and presentation of relevant events, metrics, analytic results, and insights.

SUMMARY

In accordance with various exemplary and non-limiting embodiments, methods and systems disclosed herein enable the exploration of event data captured from video feeds, the discovery of relevant events (such as within a video feed of a sporting event), and the presentation of novel insights, analytic results, and visual displays that enhance decision-making, provide improved entertainment, and provide other benefits.

Embodiments include taking data from a video feed and enabling an automated machine understanding of a game, aligning video sources to the understanding and utilizing the video sources to automatically deliver highlights to an end-user. In embodiments, using machine learning to develop an understanding of an event further comprises using events in position tracking data over time obtained from at least one of the video feed and a chip-based tracking system and is based on at least two of spatial configuration, relative motion, and projected motion of at least one of a player and an item used in a game. In embodiments, using machine learning to develop an understanding of an event further comprises aligning multiple unsynchronized input feeds related to an event (e.g. tracking video, broadcast video/audio, play-by-play data) using at least one of a hierarchy of algorithms and a hierarchy of users, wherein the unsynchronized input feeds are selected from the group consisting of one or more broadcast video feeds of the event, one or more feeds of tracking video for the event, and one or more play-by-play data feeds of the event. In embodiments, the multiple unsynchronized input feeds include a variety of feeds of varying types, such as three or more feeds of two or more types related to the event. Embodiments may further include validating, confirming, refining, or modifying the understanding or the alignment of the unsynchronized input feeds using a hierarchy involving at least two of one or more algorithms, one or more human operators and one or more input feeds.

In embodiments, content displaying an event is automatically extracted from a video feed, such as based on a machine understanding of the event. In embodiments, extracting the content displaying the event includes automatically extracting a cut from the video feed using a combination of machine understanding of events and a machine understanding of another input feed, such as a broadcast video feed, an audio feed, and/or a closed caption feed. In embodiments, the machine understanding of the other input feed includes understanding at least one of a portion of content of a broadcast commentary and a change in camera view in the input feed. Embodiments may further include using a combination of machine understanding of events from the video feed and a machine understanding of another input feed related to the events, such as a broadcast video feed, an audio feed and a closed caption feed to at least one of edit the video cut and combine the video cut with other content. The machine understanding of the other input feed may include understanding at least one of a portion of content of a broadcast commentary and a change in camera view in the input feed.

Embodiments may further include automatically developing a semantic index of a video feed based on the machine understanding of at least one event in the video feed to indicate the time of the event in the video feed and the location of the display of the event in the video feed, such as a pixel location, a voxel location, a raster image location, or the like that indicates where the event can be found on a display screen. The semantic index of the video feed may be provided to enable augmentation of the video feed, such as for adding content based on to the identified location and enabling at least one of a touch interface feature and a mouse interface feature based on the identified location.

In accordance with further exemplary and non-limiting embodiments, a method comprises receiving a sport playing field configuration and at least one image and determining a camera pose based, at least in part, upon the sport playing field configuration and at least one image.

In accordance with further exemplary and non-limiting embodiments, a method comprises performing automatic recognition of a camera pose based, at least in part, on video input comprising a scene and augmenting the video input with at least one of additional imagery and graphics rendered within the reconstructed 3D space of the scene.

Methods and systems described herein may include taking a video feed of an event; using machine learning to develop an understanding of the event; automatically, under computer control, aligning the video feed with the understanding; and producing a transformed video feed that includes at least one highlight that may be extracted from the machine learning of the event. In embodiments, the event may be a sporting event. In embodiments, the event may be an entertainment event. In embodiments, the event may be at least one of a television event and a movie event. In embodiments, the event may be a playground pickup game or other amateur sports game. In embodiments, the event may be any human activity or motion in a home or commercial establishment. In embodiments, the transformed video feed creates a highlight video feed of video for a defined set of players. In embodiments, the defined set of players may be a set of players from a fantasy team. Embodiments may include delivering the video feed to at least one of an inbox, a mobile device, a table, an application, a scoreboard, a Jumbotron board, a video board, and a television network.

Methods and systems described herein may include taking a source data feed relating to an event; using machine learning to develop an understanding of the event; automatically, under computer control, aligning the source feed with the understanding; and producing a transformed feed that includes at least one highlight that may be extracted from the machine learning of the event. In embodiments, the event may be a sporting event. In embodiments, the event may be an entertainment event. In embodiments, the event may be at least one of a television event and a movie event. In embodiments, the source feed may be at least one of an audio feed, a text feed, a statistics feed, and a speech feed.

Methods and systems described herein may include: taking a data set associated with a video feed of a live event; taking spatiotemporal features of the live event; applying machine learning to determine at least one spatiotemporal pattern of the event; and using a human validation process to at least one of validate and teach the machine learning of the spatiotemporal pattern. In embodiments, the event may be a sporting event.

Methods and systems described herein may include taking at least one of a video feed and an image feed; taking data relating to a known configuration of a venue; and automatically, under computer control, recognizing a camera pose based on the video feed and the known configuration. In embodiments, the venue may be a sporting event venue.

Methods and systems described herein may include taking at least one feed, selected from the group consisting of a video feed and an image feed of a scene; taking data relating to a known configuration of a venue; automatically, under computer control, recognizing a camera pose based on the video feed and the known configuration; and automatically, under computer control, augmenting the at least one feed with at least one of an image and a graphic within the space of the scene. The methods and systems may include using human input to at least one of validate and assist the automatic recognition of the camera pose. The methods and system may include presenting at least one metric in the augmented feed. The methods and systems may include enabling a user to interact with at least one of the video feed and a frame of the video feed in a 3D user interface. The methods and systems may include augmenting the at least one feed to create a transformed feed. In embodiments, the transformed video feed may create a highlight video feed of video for a defined set of players.

Methods and systems described herein may include taking a data set associated with a video feed of a live event; taking spatiotemporal features of the live event; applying machine learning to determine at least one spatiotemporal pattern of the event; and calculating a metric based on the determined pattern. In embodiments, the metric may be at least one of a shot quality (SEFG) metric, an EFG+metric, a rebound positioning metric, a rebounding attack metric, a rebounding conversion metric, an event-count per playing time metric, and an efficiency per event-count metric.

Methods and systems described herein may include providing an interactive, graphical user interface for exploration of data extracted by machine learning from the video capture of live events. In embodiments, the graphical user interface enables exploration and analysis of events. In embodiments, the graphical user interface is at least one of a mobile device interface, a laptop interface, a tablet interface, a large-format touchscreen interface, and a personal computer interface. In embodiments, the data may be organized to present at least one of a breakdown, a ranking, a field-based comparison, and a statistical comparison. In embodiments, the exploration enables at least one of a touch interaction, a gesture interaction, a voice interaction, and a motion-based interaction.

Methods and systems described herein may include taking a data set associated with a video feed of a live event; automatically, under computer control, recognizing a camera pose for the video; tracking at least one of a player and an object in the video feed; and placing the tracked items in a spatial location corresponding to spatial coordinates.

Methods and systems described herein may include taking a data set associated with a video feed of a live event; taking spatiotemporal features of the live event; applying machine learning to determine at least one spatiotemporal pattern of the event; and delivering contextualized information during the event. In embodiments, the contextualized information includes at least one of a statistic, a replay, a visualization, a highlight, a compilation of highlights, and a replay. In embodiments, the information may be delivered to at least one of a mobile device, a laptop, a tablet, and a broadcast video feed. The methods and systems may include providing a touch screen interaction with a visual representation of at least one item of the contextualized information.

In embodiments, the methods and systems provided herein may include taking a video feed of an event in which there is a participant; identifying a point of view of the participant; and automatically, under computer control, selecting a plurality of video frames from the video feed showing at least one view from the point of view of the participant. The methods and systems may further include rendering a 3D video using the selected plurality of video frames. The methods and systems may further include providing an interface wherein a user may select the participant from a plurality of participants. In embodiments, the event may be a sporting event and the participant may be a player. In embodiments, the event may be basketball and the video feed may be associated with 3D motion capture data from cameras that capture the video feed.

In embodiments, a method for providing enhanced video content includes processing at least one video feed through at least one spatiotemporal pattern recognition algorithm that uses machine learning to develop an understanding of a plurality of events and to determine at least one event type for each of the plurality of events within the at least one video feed. The at least one event type includes an entry in a relationship library at least detailing a relationship between two visible features of the at least one video feed. The method includes extracting a plurality of video cuts from the at least one video feed. The method includes indexing the extracted plurality of video cuts based on the at least one event type determined by the understanding developed by the machine learning that corresponds to an event in the plurality of events detectable in the plurality of video cuts. The method further includes automatically, under computer control, generating an enhanced video content data structure using the extracted plurality of video cuts based on the indexing of the extracted plurality of video cuts.

In embodiments, the at least one spatiotemporal pattern recognition algorithm is based on at least one pattern selected from the group consisting of relative motion of two visible features toward each other for at least a duration threshold, acceleration of motion of at least two visible features with respect to each other for acceleration of at least an acceleration threshold, rate of motion of two visible features toward each other, projected point of intersection of the two visible features, and separation distance between the two visible features being less than a separation threshold. In embodiments, automatically generating the enhanced video content data structure includes combining the understanding of the plurality of events with an understanding of at least one of a broadcast video event or a broadcast audio event developed with the machine learning. In embodiments, generating the enhanced video content data structure is based at least in part on at least one of a user preference and a user profile for a user for which the enhanced video content data structure is generated.

In embodiments, the method includes providing a user interface for display on a mobile device. The user interface includes at least one of a search option and a filtering option to allow a user to at least one of specify and select a description of a type of event. The enhanced video content data structure is generated to match the description. In embodiments, using the machine learning to develop the understanding of the event further comprises using the plurality of events in position tracking data over time obtained from at least one of the at least one video feed and a chip-based player tracking system. The understanding developed by the machine learning is based on at least two of spatial configuration, relative motion, and projected motion of at least one of a player and an item used in a game.

In embodiments, using the machine learning to develop the understanding of the plurality of events further comprises aligning multiple unsynchronized input feeds related to an event of the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two event types related to the event. In embodiments, the method includes further comprising at least one of validating and modifying the alignment of the unsynchronized input feeds using a hierarchy involving at least two of one or more algorithms, one or more human operators, and one or more input feeds. In embodiments, the method includes at least one of validating the understanding and modifying the understanding developed by the machine learning using a hierarchy involving at least two of one or more algorithms, one or more human operators, and one or more input feeds. In embodiments, the method includes automatically developing a semantic index of the at least one video feed based on the understanding developed with the machine learning of at least one event of the plurality of events in the video feed to indicate a game time of the at least one event in the video feed and a location of a display of the at least one event in the video feed.

In embodiments, the location of the display of the at least one event in the video feed includes at least one of a pixel location, a voxel location, a raster image location. In embodiments, the method includes providing the semantic index of the video feed with the video feed configured to enable semantic-based augmentation of the video feed. In embodiments, augmentation of the video feed includes adding content based on the identified location and enabling at least one of a touch interface feature and a mouse interface feature based on the identified location.

In embodiments, extracting the plurality of video cuts includes automatically extracting a cut from the video feed using a combination of the machine learning developed understanding of the plurality of events and an understanding developed with the machine learning of another input feed selected from the group consisting of a broadcast video feed, an audio feed, and a closed caption feed. In embodiments, the method includes the understanding developed with the machine learning of the another input feed includes understanding at least one of a portion of content of a broadcast commentary and a change in camera view in the another input feed.

In embodiments, the method includes processing at least one video feed through at least one spatiotemporal pattern recognition algorithm that uses machine learning to develop an understanding of a plurality of events within at least one video feed to determine at least one event type for each of the plurality of events. The at least one event type includes an entry in a relationship library at least detailing a relationship between two visible features of the video feed. The method includes extracting a plurality of video cuts from the at least one video feed. The method includes indexing the plurality of video cuts based on the at least one event type determined by the understanding developed by machine learning. The method further includes providing a mobile application having a user interface configured to permit a user to find the extracted plurality of video cuts based on the indexing of the extracted plurality of video cuts with the mobile application.

In embodiments, the at least one spatiotemporal pattern recognition algorithm is based on at least one pattern selected from the group consisting of relative motion of two visible features toward each other for at least a duration threshold, acceleration of motion of at least two visible features with respect to each other for acceleration of at least an acceleration threshold, rate of motion of two visible features toward each other, projected point of intersection of the two visible features, and separation distance between the two visible features being less than a separation threshold. In embodiments, the method includes the understanding developed by the machine learning includes generating at least one metric associated with at least one event of the plurality of events. The user interface of the mobile application is configured to permit the user to enhance a video cut from the plurality of video cuts by selecting the metric to be included in the video cut. In embodiments, the method includes the user interface of the mobile application is configured to permit the user to share an edited video via the mobile application. In embodiments, the method includes using the machine learning to develop the understanding of the plurality of events further comprises using the plurality of events in position tracking data over time obtained from at least one of the at least one video feed and a chip-based player tracking system. The understanding developed with the machine learning is based on at least two of spatial configuration, relative motion, and projected motion of at least one of a player and an item used in a game.

In embodiments, the method includes using the machine learning to develop the understanding of the plurality of events further comprises aligning multiple unsynchronized input feeds related to an event of the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event of the plurality of events.

In embodiments, the method includes at least one of validating and modifying the alignment of the unsynchronized input feeds using a hierarchy involving at least two of one or more algorithms, one or more human operators and one or more input feeds where at least one algorithm in the hierarchy for validation is based on the nature of the input feed. In embodiments, the method includes at least one of validating the understanding and modifying the understanding using a hierarchy involving at least two of one or more algorithms, one or more human operators and one or more input feeds where at least one algorithm in the hierarchy for validating is based on a nature of the input feed. In embodiments, extracting the plurality of video cuts from the at least one video feed includes automatically extracting a cut from the at least one video feed using a combination of the understanding developed with the machine learning of the plurality of events and an understanding developed with the machine learning of another input feed selected from the group consisting of a broadcast video feed, an audio feed, and a closed caption feed. In embodiments, the understanding of the another input feed includes an understanding developed with the machine learning of at least one of a portion of content of a broadcast commentary and a change in camera view in the input feed.

In embodiments, a method for providing enhanced video content includes processing at least one video feed through at least one spatiotemporal pattern recognition algorithm that uses machine learning to develop an understanding of a plurality of events within at least one video feed to determine at least one event type for each of the plurality of events. The method includes extracting a plurality of video cuts from the at least one video feed. The method includes indexing the extracted plurality of video cuts based on the at least one event type determined by the understanding developed by machine learning and determining at least one pattern relating to the extracted plurality of video cuts. The method further includes indexing at least a portion of the plurality of the extracted video cuts with an indicator of the pattern.

In embodiments, the at least one pattern is developed by applying machine learning. In embodiments, the understanding developed by the machine learning includes identifying at least one player involved in an event. Indexing of the extracted plurality of video cuts includes identifying at least one player represented in at least one of the video cuts from the plurality of the video cuts. In embodiments, the at least one pattern relates to a series of same event types involving a same player over time. In embodiments, the plurality of video cuts includes a player during multiple, identical event types over time.

In embodiments, the method includes providing an enhanced video feed that shows a player during the plurality of events over time. The enhanced video feed is at least one of a simultaneous, superimposed video of the player involved in multiple, identical event types and a sequential video of the player involved in the same event type. In embodiments, determining at least one pattern includes identifying sequences of events that predict a given action that is likely to follow. In embodiments, the method includes determining the at least one pattern includes identifying similar sequences of events across the plurality of video feeds. In embodiments, the method includes providing a user interface that enables a user to at least one of view and interact with the at least one pattern.

In embodiments, the at least one pattern and the interaction options are personalized based on at least one of a user preference and a user profile. In embodiments, the at least one pattern relates to an anticipated outcome of at least one of a game and an event within a game. In embodiments, the method includes providing a user with at least one of a statistic, trend information and a prediction based on the at least one pattern. In embodiments, the at least one the statistic, the trend information or the prediction is based on at least one of a user preference and a user profile. In embodiments, the method includes the at least one pattern relates to play of an athlete. In embodiments, the method includes providing a comparison of the play of the athlete with another athlete based on a similarity of at least one of the extracted plurality of video cuts and the at least one pattern. In embodiments, the comparison is between a professional athlete and a non-professional user. In embodiments, the comparison is based on a similarity of a playing style of the professional athlete, as determined by the understanding developed with the machine learning of at least one event of the plurality of events and the at least one pattern, with at least one feature of the playing style of the non-professional user.

In embodiments, the understanding developed with the machine learning of the plurality of events further comprises using the plurality of events in position tracking data over time obtained from at least one of the at least one video feed and a chip-based player tracking system. The understanding developed with the machine learning is based on at least two of spatial configuration, relative motion, and projected motion of at least one of a player and an item used in a game. In embodiments, the understanding developed with the machine learning of the plurality of events further comprises aligning multiple unsynchronized input feeds related to an event of the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating the understanding and modifying the understanding developed with the machine learning using a hierarchy involving at least two of one or more algorithms, one or more human operators, and one or more input feeds. In embodiments, the method includes extracting the plurality of video cuts from the at least one video feed includes automatically extracting a cut from the at least one video feed using a combination of the understanding developed with the machine learning of the plurality of events and an understanding developed with the machine learning of another input feed selected from the group consisting of a broadcast video feed, an audio feed, and a closed caption feed. In embodiments, the understanding of the other input feed includes an understanding developed with the machine learning of at least one of a portion of content of a broadcast commentary and a change in camera view in the input feed.

In embodiments, a method for providing enhanced video content including processing at least one video feed through at least one spatiotemporal pattern recognition algorithm that uses machine learning to develop an understanding of a plurality of events within at least one video feed to determine at least one event type for each of the plurality of events. The method includes extracting a plurality of video cuts from the at least one video feed. The method includes indexing the extracted plurality of video cuts based on at least one event type determined by the understanding developed by machine learning. The method further includes automatically, under computer control, delivering the extracted plurality of video cuts to at least one user based on at least one of a user profile and a user preference.

In embodiments, the at least one of the user preference and the user profile is continuously updated based on a user's indication of at least one of liking and disliking at least one of video cuts of the plurality of extracted video cuts. In embodiments, the understanding developed with the machine learning is based on human-identified video alignment labels for semantic events. In embodiments, the at least one spatiotemporal pattern recognition algorithm uses time-aligned content from multiple input sources to develop the understanding with the machine learning. In embodiments, the method includes the at least one spatiotemporal pattern recognition algorithm uses a hierarchy involving at least two of one or more algorithms, one or more human operators, and one or more input feeds to handle the multiple input sources.

In embodiments, using machine learning to develop the understanding of the plurality of events further comprises using the plurality of events in position tracking data over time obtained from at least one of the at least one video feed and a chip-based player tracking system. The understanding developed with the machine learning is based on at least two of spatial configuration, relative motion, and projected motion of at least one of a player and an item used in a game. In embodiments, using machine learning to develop the understanding of the plurality of events further comprises aligning multiple unsynchronized input feeds related to an event of the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event.

In embodiments, the method includes at least one of validating and modifying the alignment of the unsynchronized input feeds using a hierarchy involving at least two of one or more algorithms, one or more human operators, and one or more input feeds. In embodiments, the method includes at least one of validating the understanding and modifying the understanding developed with the machine learning using a hierarchy involving at least two of one or more algorithms, one or more human operators and one or more input feeds where at least one algorithm in the hierarchy for validation is based on the nature of the input feed.

In embodiments, extracting the plurality of video cuts from the at least one video feed includes automatically extracting a cut from the at least one video feed using a combination of the understanding developed with the machine learning of the plurality of events and an understanding developed with the machine learning of another input feed selected from the group consisting of a broadcast video feed, an audio feed, and a closed caption feed. In embodiments, the method includes the understanding developed with the machine learning of the other input feed includes an understanding developed with machine learning of at least one video cut of the plurality of video cuts of a broadcast commentary and a change in camera view in the input feed.

In embodiments, a method for enabling a user to express preferences relating to display of video content includes processing at least one video feed through at least one spatiotemporal pattern recognition algorithm that uses machine learning to develop an understanding of at least one event within the at least one video feed to determine at least one event type. The at least one event type includes an entry in a relationship library at least detailing a relationship between two visible features of the at least one video feed. The method includes automatically, under computer control, extracting the video content displaying the at least one event and associating the understanding developed with the machine learning of the event type with the video content in a video content data structure. The method includes providing a user interface configured to permit a user to indicate a preference for at least one event type. The method includes upon receiving an indication of the preference by the user, retrieving the at least one video content data structure that was determined by the machine learning to be associated with the at least one event type indicated by the user. The method further includes providing the user with a video feed containing the video content including the at least one video content data structure.

In embodiments, using machine learning to develop the understanding of the at least one event further comprises using events in position tracking data over time obtained from at least one of the at least one video feed and a chip-based player tracking system. The understanding is based on at least two of spatial configuration, relative motion, and projected motion of at least one of a player and an item used in a game. In embodiments, using machine learning to develop the understanding of the at least one event further comprises aligning multiple unsynchronized input feeds related to the at least one event using at least one of a hierarchy of algorithms and a hierarchy of human operators. The unsynchronized input feeds are selected from a group consisting of one or more broadcast video feeds of the at least one event, one or more feeds of tracking video for the at least one event, and one or more play-by-play data feeds of the at least one event. In embodiments, the multiple unsynchronized input feeds include at least three feeds selected from at least two types related to the at least one event. In embodiments, the method includes at least one of validating and modifying the alignment of the unsynchronized input feeds using a hierarchy involving at least two of one or more algorithms, one or more human operators and one or more input feeds. In embodiments, the method includes at least one of validating the understanding and modifying the understanding developed by the machine learning using a hierarchy involving at least two of at least one algorithm, at least one human operator, and at least one input feed where at least one item in the hierarchy used for validating the understanding is based on a nature of the one or more input feeds.

In embodiments, the method includes the user interface is at least one of a mobile application, a browser, a desktop application, a remote control device, a tablet, a touch screen device, a virtual reality or augmented reality headset, and a smart phone. In embodiments, the method includes the user interface further comprises an element configured to permit a user to indicate a preference as to how content will be presented to the user. In embodiments, the method includes the understanding developed by the machine learning includes a context for the at least one of event and the context is stored with the at least one video content data structure. In embodiments, the user interface further comprises an element configured to permit a user to indicate a preference for the context.

In embodiments, the method includes retrieving portion of the video content corresponding to the context and displaying the portion of the video content corresponding to the context to the user upon receiving an indication of the preference for the context. In embodiments, the context comprises at least one of a presence of a preferred player in the at least one video feed, a preferred matchup of players in the at least one video feed, a preferred team in the at least one video feed, and a preferred matchup of teams in the at least one video feed. In embodiments, the user interface is configured to permit a user to select at least one of a metric and a graphic element to be displayed on the video feed. The at least one metric is based at least in part on the understanding developed by the machine learning. In embodiments, extracting the content displaying the at least one event includes automatically extracting a cut from the video feed using a combination of the understanding of events developed with the machine learning and an understanding developed with the machine learning of another input feed selected from a group consisting of a broadcast video feed, an audio feed, and a closed caption feed. In embodiments, the understanding developed with the machine learning of the other input feed includes at least one of a portion of content of a broadcast commentary and a change in camera view in the input feed.

In embodiments, a method for enabling a mobile application that allows user interaction with video content includes taking a video feed and processing the video feed through at least one spatiotemporal pattern recognition algorithm that uses machine learning to develop an understanding of an event within the video feed. The understanding includes identifying context information relating to the event and an entry in a relationship library at least detailing a relationship between two visible features of the video feed. The method includes automatically, under computer control, extracting content displaying the event and associating the extracted content with the context information. The method includes producing a video content data structure that includes the context information. The method includes automatically, under computer control, producing a story that includes the video content data structure. A portion of the story is based on a user preference, the context information, and the video content data structure.

In embodiments, extracting the content displaying the event includes automatically extracting a cut from the video feed using a combination of the understanding of the event developed with the machine learning and an understanding developed with the machine learning of another input feed selected from a group consisting of a broadcast video feed, an audio feed, and a closed caption feed. In embodiments, the understanding developed with the machine learning of the other input feed includes at least one of a portion of content of a broadcast commentary and a change in camera view in the input feed. In embodiments, the method includes using a combination of the understanding developed with the machine learning of the event from the video feed and an understanding developed with the machine learning of another input feed selected from a group consisting of a broadcast video feed, an audio feed, and a closed caption feed to at least one of edit the video cut and combine the video cut with other content. In embodiments, the understanding developed with the machine learning of the other input feed includes at least one of a portion of content of a broadcast commentary and a change in camera view in the input feed.

In embodiments, the method includes automatically developing a semantic index of a video feed based on the understanding developed with the machine learning of at least one event in the video feed indicative of a time of the event in the video feed and a location of a display of the event in the video feed. In embodiments, the location of the display of the event in the video feed includes at least one of a pixel location, a voxel location, a raster image location. In embodiments, the method includes providing the semantic index of the video feed with the video feed in combination to enable augmentation of the video feed. In embodiments, the augmentation of the video feed includes adding content based on to the location of the display and enabling at least one of a touch interface feature and a mouse interface feature based on the identified location.

In embodiments, the method includes using machine learning to develop the understanding of the event further comprises using events in position tracking data over time obtained from at least one of the video feed and a chip-based player tracking system. The understanding developed with machine learning is based on at least two of spatial configuration, relative motion, and projected motion of at least one of a player and an item used in a game. In embodiments, the method includes using machine learning to develop the understanding of the event further comprises aligning multiple unsynchronized input feeds related to the event using at least one of a hierarchy of algorithms and a hierarchy of human operators. The unsynchronized input feeds are selected from a group consisting of one or more broadcast video feeds of the event, one or more feeds of tracking video for the event, and one or more play-by-play data feeds of the event.

In embodiments, the method includes the multiple unsynchronized input feeds include at least three feeds selected from at least two types related to the event.

In embodiments, the method includes at least one of validating and modifying the alignment of the unsynchronized input feeds using a hierarchy involving at least two of one or more algorithms, one or more human operators and one or more input feeds where at least one algorithm in the hierarchy for validation is based on a nature of the input feeds. In embodiments, the method includes at least one of validating the understanding and modifying the understanding using a hierarchy involving at least two of one or more algorithms, one or more human operators and one or more input feeds where at least one algorithm in the hierarchy for validation is based on the nature of the input feed. In embodiments, the user preference for a type of content is based on at least one of a user expressed preference and a preference that is inferred based on user interaction with an item of content.

In embodiments, a system for enabling a user to express preferences relating to display of video content includes a machine learning facility that uses at least one spatiotemporal pattern recognition algorithm for developing an understanding of at least one event within at least one video feed to determine at least one event type. The understanding includes an entry in a relationship library at least detailing a relationship between two visible features of the at least one video feed. The system includes a video production facility for automatically, under computer control, extracting the video content displaying the at least one event and associating the understanding developed with the machine learning of the event type with the video content in at least one video content data structure. The system includes a server for serving data to a user interface that is configured to permit a user to indicate a preference for at least one event type, that retrieves the at least one video content data structure that was determined by the machine learning to have an event type preferred by the user, and that provides the user with a video feed containing the event type preferred by the user.

In embodiments, the method includes the user interface that is configured to permit the user to indicate the preference for at least one event type is at least one of a mobile application, a browser, a desktop application, a remote control device, a tablet, and a smart phone.

In embodiments, the user interface that is configured to permit the user to indicate the preference for at least one event type further comprises an element configured to permit a user to indicate a preference as to how content will be presented to the user. In embodiments, the understanding developed by the machine learning facility includes a context for the at least one event and the context is stored with the at least one video content data structure. In embodiments, the user interface further comprises an element configured to permit a user to indicate a preference for at least one context. In embodiments, the server for serving data to the user interface retrieves video content corresponding to the preference for at least one context and displays the video content to the user upon receiving an indication of the preference for the at least one context.

In embodiments, the method includes the at least one context comprises at least one of a presence of a preferred player in the video feed, a preferred matchup of players in the video feed, a preferred team in the video feed, and a preferred matchup of teams in the video feed.

In embodiments, the user interface is configured to permit a user to select at least one of a metric and a graphic element to be displayed on the video feed. The metric is based at least in part on the understanding developed with the machine learning facility. In embodiments, the machine learning facility to develop the understanding of the at least one event uses events in position tracking data over time obtained from at least one of the at least one video feed and a chip-based player tracking system. The understanding is based on at least two of spatial configuration, relative motion, and projected motion of at least one of a player and an item used in a game. In embodiments, the machine learning facility to develop the understanding of the at least one event aligns multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the at least one event. In embodiments, the video production facility at least one of validates and modifies the alignment of the unsynchronized input feeds using a hierarchy involving at least two of one or more algorithms, one or more human operators, and one or more input feeds.

In embodiments, the video production facility at least one of validates the understanding and modifies the understanding developed by the machine learning facility using a hierarchy involving at least two of one or more algorithms, one or more human operators and one or more input feeds where at least one algorithm in the hierarchy for validation is based on the nature of the input feed. In embodiments, the video production facility for automatically, under computer control, extracting the video content displaying the at least one event includes automatically extracting a cut from the at least one video feed using a combination of the understanding of the at least one event developed with the machine learning facility and an understanding developed with the machine learning facility of another input feed selected from the group consisting of a broadcast video feed, an audio feed, and a closed caption feed. In embodiments, the understanding developed with the machine learning facility of the another input feed includes at least one of a portion of content of a broadcast commentary and a change in camera view in the at least one video feed.

In embodiments, a method for delivering personalized video content includes processing at least one video feed through at least one spatiotemporal pattern recognition algorithm that uses machine learning to develop an understanding of at least one event within the at least one video feed to determine at least one event type. The at least one event type includes an entry in a relationship library at least detailing a relationship between two visible features of the at least one video feed. The method includes automatically, under computer control, extracting the video content displaying the at least one event and associating the understanding developed with the machine learning of the event type with the video content in a video content data structure. The method includes developing a personal profile for a user based on at least one of expressed preferences of the user, information about the user, and information collected about actions taken by the user with respect to at least one event type. The method further includes upon receiving an indication of the user profile, retrieving at least one video content data structure that was determined by the machine learning to have an event type likely to be preferred by the user based on the personal profile for the user.

Using the machine learning to develop the understanding of the at least one event further comprises using the at least one event in position tracking data over time obtained from at least one of the at least one video feed and a chip-based player tracking system. The understanding developed by the machine learning is based on at least two of spatial configuration, relative motion, and projected motion of at least one of a player and an item used in a game.

In embodiments, the method includes using the machine learning to develop the understanding of the at least one event further comprises aligning multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the at least one event. In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds.

In embodiments, the method includes at least one of validating and modifying the understanding developed with the machine learning using a hierarchy involving at least two of one or more algorithms, one or more human operators, and one or more input feeds. In embodiments, the method includes extracting the video content displaying the at least one event includes automatically extracting a cut from the at least one video feed using a combination of the understanding of the at least one event developed with the machine learning and an understanding developed with the machine learning of another input feed selected from the group consisting of a broadcast video feed, an audio feed, and a closed caption feed. In embodiments, the method includes the understanding of the other input feed developed with the machine learning includes at least one of a portion of content of a broadcast commentary and a change in camera view in the input feed.

In embodiments, a method for delivering personalized video content includes processing at least one video feed through at least one spatiotemporal pattern recognition algorithm that uses machine learning to develop an understanding of at least one event within the at least one video feed of a professional game. The understanding developed by the machine learning includes an entry in a relationship library at least detailing a relationship between two visible features of the at least one video feed. The method includes developing an understanding using the machine learning of at least one event within a data feed relating to motion of a non-professional player. The method includes automatically, under computer control, providing an enhanced video feed that represents the non-professional player playing within a context of the professional game based on the understanding of the at least one event within the at least one video feed of the professional game and a data feed relating to the motion of the non-professional player.

In embodiments, the method includes providing a facility having cameras for capturing 3D motion data, and capturing video of a non-professional player to provide the data feed for the non-professional player. In embodiments, the method includes the non-professional player is represented by mixing video of the non-professional player with at least one video of the professional game. In embodiments, the method includes the non-professional player is represented as an animation having attributes based on the data feed relating to motion of the non-professional player. In embodiments, the method includes using the machine learning to develop the understanding of the at least one event further comprises using the at least one event in position tracking data over time obtained from at least one of the at least one video feed and a chip-based player tracking system. The understanding is based on at least two of spatial configuration, relative motion, and projected motion of at least one of a player and an item used in a game.

In embodiments, using the machine learning to develop the understanding of the at least one event further comprises aligning multiple unsynchronized input feeds related to the at least one event using at least one of a hierarchy of algorithms and a hierarchy of human operators. The unsynchronized input feeds are selected from a group consisting of one or more broadcast video feeds of the event, one or more feeds of tracking video for the event, and one or more play-by-play data feeds of the at least one event. In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating the understanding and modifying the understanding using a hierarchy involving at least two of one or more algorithms, one or more human operators, and one or more input feeds.

In embodiments, a method includes taking a video feed and processing the video feed through a spatiotemporal pattern recognition algorithm that uses machine learning to develop an understanding of an event within the video feed. The understanding includes identifying context information relating to the event and an entry in a relationship library at least detailing a relationship between two visible features of the video feed. The method includes automatically, under computer control, extracting content displaying the event and associating the extracted content with the context information. The method further includes producing a video content data structure that includes the context information.

In embodiments, the method includes determining a plurality of semantic categories for the context information, and filtering a plurality of video content data structures based on the plurality of semantic categories. Each of the video content data structures of the plurality of video content data structures includes context information relating to the event. In embodiments, the method includes matching events that occur in a first video feed to events that occur in a second video feed, the second video feed separate from the first video feed, and using a semantic understanding captured in the first video feed to at least one of filter and cut a separate second video feed based on the matching events that occur in the first video feed and the second video feed. In embodiments, the method includes determining a pattern relating to a plurality of events and providing a content data structure based on the pattern. In embodiments, the pattern comprises a plurality of important plays in a sports event that are identified based on comparison to similar plays from previous sports events. In embodiments, the pattern comprises a plurality of plays in a sports event that is determined to be unusual based on comparison to video feeds from other sports events.

In embodiments, the method includes extracting semantic events over time to draw a comparison of at least one of a player and a team over time. In embodiments, the method includes superimposing video of events extracted from video feeds from at least two different time periods to illustrate the comparison. In embodiments, the method includes allowing a user to interact with the video content data structure to produce an edited video data stream that includes the video data structure. In embodiments, the interaction includes at least one of editing, mixing, cutting, and sharing a video clip that includes the video content data structure.

In embodiments, the method includes enabling users to interact with the video content data structure through a user interface to enhance the video content data structure with at least one graphic element selected from a menu of options. In embodiments, the method includes enabling a user to share the enhanced video content. In embodiments, the method includes enabling a user to find similar video clips based on a semantic context identified in the video clips. In embodiments, the method includes using the video data structure and the context information to construct modified video content for a second screen that includes the video content data structure. In embodiments, the modified video content for the second screen correlates to the timing of an event displayed on a first screen. In embodiments, the modified video content for the second screen includes a metric determined based on the machine understanding. The metric is selected based on the context information. In embodiments, using the machine learning to develop the understanding of the event further comprises using events in position tracking data over time obtained from at least one of the video feed and a chip-based player tracking system. The understanding developed with the machine learning is based on at least two of spatial configuration, relative motion, and projected motion of at least one of a player and an item used in a game.

In embodiments, using the machine learning to develop the understanding of the event further comprises aligning multiple unsynchronized input feeds related to the event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating and modifying the understanding developed with the machine learning using a hierarchy involving at least two of one or more algorithms, one or more human operators, and one or more input feeds.

In embodiments, the method includes automatically developing a semantic index of the video feed based on the understanding developed with the machine learning of the event in the video feed to indicate a time of the event in the video feed and a location of a display of the event in the video feed. In embodiments, the location of the display of the event in the video feed includes at least one of a pixel location, a voxel location, a raster image location. In embodiments, the method includes providing the semantic index of the video feed with the video feed to enable augmentation of the video feed. In embodiments, the augmentation of the video feed includes adding content based on to the location of the display and enabling at least one of a touch interface feature and a mouse interface feature based on the identified location.

In embodiments, automatically, under computer control, extracting content displaying the event includes automatically extracting a cut from the video feed using a combination of the understanding of events developed from the machine learning and an understanding developed with the machine learning of another input feed selected from the group consisting of a broadcast video feed, an audio feed, and a closed caption feed. In embodiments, the understanding of the other input feed developed by the machine learning includes at least one of a portion of content of a broadcast commentary and a change in camera view in the input feed.

In embodiments, a system includes an ingestion facility for ingesting a plurality of video feeds. The system includes a machine learning system for processing the video feed through a spatiotemporal pattern recognition algorithm that applies machine learning on a series of events in the plurality of video feeds in order to develop an understanding of the series of events within the plurality of video feeds. The understanding includes identifying context information relating to the series of events and an entry in a relationship library at least detailing a relationship between two visible features of the plurality of video feeds. The system includes an extraction facility for automatically, under computer control, extracting content displaying the series of events and associating the extracted content with the context information. The system includes a video publishing facility for producing a video content data structure that includes the context information.

In embodiments, the system includes an analytic facility for determining a plurality of semantic categories for the context information, and filtering the plurality of video content data structures based on the semantic categories. In embodiments, the system includes a matching engine for matching a series of events that occur in a first video feed to those that occur in a second video feed, the first video feed being separate from the second video feed, and using a semantic understanding captured in the first video feed to at least one of filter and cut the second video feed based on the matching of the series of events that occur in the first video feed with those that occur in the second video feed. In embodiments, the system includes a pattern recognition facility that determines a pattern relating to the series of events and provides a content data structure based on the pattern. In embodiments, using machine learning to develop the understanding of the series of events further comprises using events in position tracking data over time obtained from the plurality of video feeds and a chip-based player tracking system. The understanding developed with the machine learning is based on at least two of spatial configuration, relative motion, and projected motion of at least one of a player and an item used in a game.

In embodiments, using machine learning to develop the understanding of the series of events further comprises aligning multiple unsynchronized input feeds related to the series of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event.

In embodiments, the system includes at least one of validating and modifying the alignment of the unsynchronized input feeds using a hierarchy involving at least two of one or more algorithms, one or more human operators, and one or more input feeds and at least one algorithm in the hierarchy for validation of the alignment of the unsynchronized input feeds is based on a nature of the input feeds. In embodiments, the system includes at least one of validating and modifying the understanding developed with the machine learning using a hierarchy involving at least two of one or more algorithms, one or more human operators and one or more input feeds. The one or more algorithms is based on the nature of the input feed.

In embodiments, the system includes automatically developing a semantic index of a video feed from the plurality of video feeds based on the understanding developed by the machine learning of at least one event from the series of events in the video feed. The semantic index of the video feed indicates a time of the event in the video feed and a location of a display of the event in the video feed. In embodiments, the location of the display of the event in the video feed includes at least one of a pixel location, a voxel location, a raster image location. In embodiments, the system includes providing the semantic index of the video feed with the video feed to enable augmentation of the video feed. In embodiments, augmentation of the video feed includes adding content based on to the location of the display and enabling at least one of a touch interface feature and a mouse interface feature based on the identified location.

In embodiments, a system for enabling interaction with a broadcast video content stream includes a machine learning facility for processing at least one video feed through a spatiotemporal pattern recognition algorithm that applies machine learning on at least one event in the at least one video feed in order to develop an understanding of the at least one event with the at least one video feed. The at least one video feed is for a video broadcast. The understanding includes identifying context information relating to the at least one event and an entry in a relationship library at least detailing a relationship between two visible features of the plurality of video feeds. The system includes a touch screen user interface configured to permit at least one broadcaster to interact with the at least one video feed. The touch screen user interface includes options for interaction with the at least one broadcaster that are based on the context information. The touch screen user interface is configured to control a portion of content of the at least one video feed for the video broadcast. The method includes an interface configured to permit remote viewers to control the portion of the content of the at least one video feed for the video broadcast. Alternatively, the touch screen user interface includes options that are based on the context information for controlling a portion of content of the at least one video feed.

In embodiments, the touch screen interface is a relatively large screen configured to be seen by viewers of the video broadcast as the broadcaster uses the touch screen interface. In embodiments, the touch screen interface is configured to permit the broadcaster to select from a plurality of context-relevant metrics to be displayed on the large screen. In embodiments, the touch screen interface is configured to permit the broadcaster to display a plurality of video feeds that have similar contexts as determined by the machine learning facility. In embodiments, the similarity of contexts is determined by comparing events within the plurality of video feeds. In embodiments, the touch screen interface is configured to permit the broadcaster to display a superimposed view of at least two video feeds to facilitate a comparison of events from the plurality of video feeds. In embodiments, the comparison of the events the from the plurality of video feeds is of similar players from different time periods of the video broadcast.

In embodiments, the understanding developed by the machine learning includes detail regarding similarity of players based on characteristics of the players identified during the different time periods.

In embodiments, the touch screen interface is configured to permit the broadcaster to display a plurality of highlights that is automatically determined by an understanding developed with the machine learning of a live sports event that is a subject of the at least one video feed. In embodiments, the plurality of highlights is determined to be based on similarity to highlights that have been identified for other events. In embodiments, using the machine learning to develop the understanding of the at least one event further comprises using events in position tracking data over time obtained from at least one of the at least one video feed and a chip-based player tracking system. The understanding developed with the machine learning is based on at least two of spatial configuration, relative motion, and projected motion of at least one of a player and an item used in a game.

In embodiments, using the machine learning to develop the understanding of the at least one event further comprises aligning multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event. In embodiments, the system includes at least one of validating and modifying the alignment of the unsynchronized input feeds using a hierarchy involving at least two of one or more algorithms, one or more human operators and one or more input feeds where at least one algorithm in the hierarchy for validation is based on the nature of the input feed. In embodiments, the system includes at least one of validating and modifying the understanding developed with the machine learning using a hierarchy involving at least two of one or more algorithms, one or more human operators, and one or more input feeds. The one or more algorithms in the hierarchy for validation is based on a nature of an input feed. In embodiments, the system includes automatically developing a semantic index of the at least one video feed based on the understanding developed with the machine learning of the at least one event in the at least one video feed to indicate at least one time of the at least one event in the at least one video feed and a location of a display of the at least one event in the at least one video feed. In embodiments, the location of the display of the at least one event in the at least one video feed includes at least one of a pixel location, a voxel location, a raster image location. In embodiments, the system includes providing the semantic index of the at least one video feed with the at least one video feed to enable augmentation of the at least one video feed. In embodiments, the enabled augmentation of the at least one video feed includes adding content based on the location of the display. The touch screen user interface is configured to enable a touch screen feature and a mouse interface feature based on the identified location.

In embodiments, a method of enabling interaction with a broadcast video content stream includes processing a video feed through a spatiotemporal pattern recognition algorithm that uses machine learning to develop an understanding of an event within the video feed for a video broadcast. The understanding includes identifying context information relating to the event and an entry in a relationship library at least detailing a relationship between two visible features of the video feed. The method includes providing a touch screen user interface configured to permit a broadcaster to interact with the video feed and configured to permit the broadcaster to select options in the touch screen user interface based on the context information. The options in the touch screen user interface control content of a portion of the video broadcast. In embodiments, the touch screen interface is a relatively large screen adapted to be seen by viewers of the video broadcast as the broadcaster uses the touch screen interface. In embodiments, the touch screen interface is configured to permit the broadcaster to select from a plurality of metrics relevant to the context information relating to the event and to display the plurality of metrics on the large screen. In embodiments, the touch screen interface is configured to permit the broadcaster to display a plurality of video feeds for the video broadcast. The understanding developed with the machine learning includes similar context information in the plurality of video feeds for the video broadcast. In embodiments, the system includes the similar context information in the plurality of video feeds for the video broadcast is determined by comparing events within the plurality of video feeds.

In embodiments, the touch screen interface is configured to permit the broadcaster to display a superimposed view of at least two video feeds to facilitate a comparison of events from a plurality of video feeds. In embodiments, the comparison of the events from the plurality of video feeds is of similar players from different time periods.

In embodiments, the understanding developed by the machine learning includes similarity of players based on characteristics of the similar players from the different time periods. In embodiments, the understanding developed by the machine learning includes a plurality of highlights based on a live sports event that is a subject of the video feed. The touch screen interface is configured to permit the broadcaster to display the plurality of highlights. In embodiments, the system includes the plurality of highlights is determined based on similarity to highlights identified for other events. In embodiments, using the machine learning to develop the understanding of the event further comprises using events in position tracking data over time obtained from at least one of the video feed and a chip-based player tracking system. The understanding is based on at least two of spatial configuration, relative motion, and projected motion of at least one of a player and an item used in a game.

In embodiments, the system includes using the machine learning to develop the understanding of the event further comprises aligning multiple unsynchronized input feeds related to the event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the at least one event.

In embodiments, the multiple unsynchronized input feeds include at least three feeds selected from at least two types related to the event. In embodiments, the method includes at least one of validating and modifying the aligning of the multiple unsynchronized input feeds related to the event using a hierarchy involving at least two of one or more algorithms, one or more human operators, and one or more input feeds. In embodiments, the method includes at least one of validating and modifying the understanding using a hierarchy involving at least two of one or more algorithms, one or more human operators, and one or more input feeds. In embodiments, the method includes automatically developing a semantic index of the video feed based on the understanding developed with the machine learning of the event in the video feed to indicate a time of the event in the video feed and a location of a display of the event in the video feed.

In embodiments, the location of the display of the event in the video feed includes at least one of a pixel location, a voxel location, a raster image location. In embodiments, the method includes providing the semantic index of the video feed with the video feed to enable augmentation of the video feed. In embodiments, the method includes augmentation of the video feed includes adding content based on to the location of the display and enabling at least one of a touch interface feature and a mouse interface feature based on the identified location.

In embodiments, a system for enabling user interaction with video content includes an ingestion facility, that may be executing on at least one processor and may be adapted or configured to access at least one video feed. The system includes a machine learning system that may be adapted or configured to process the at least one video feed through a spatiotemporal pattern recognition algorithm that applies machine learning on an event in the at least one feed in order to develop an understanding of the event within the at least one video feeds. The understanding includes identifying context information relating to the event and an entry in a relationship library at least detailing a relationship between two visible features of the at least one video feed. The system includes an extraction facility that may be adapted or configured to automatically, under computer control, extract content displaying the event and associate the extracted content with the context information. The system includes a video production facility that may be adapted or configured to produce a video content data structure that includes the context information. The system further includes an application having a user interface configured to permit a user to interact with the video content data structure. The user interface may further be configured with options for user interaction that are based on the context information.

In embodiments, the application is a mobile application. In embodiments, the application is at least one of a smart television application, a virtual reality headset application and an augmented reality application. In embodiments, the user interface is a touch screen interface. In embodiments, the user interface is configured to permit a user to enhance the video feed by selecting a content element to be added to the video feed.

In embodiments, the content element is at least one of a metric and a graphic element that is based on the understanding developed with the machine learning. In embodiments, the user interface is configured to permit the user to select content for a particular player of a sports event. In embodiments, the user interface is configured to permit the user to select content relating to a context involving a matchup of two particular players in a sports event. In embodiments, the system takes at least two video feeds from different time periods, the machine learning facility determines a context that includes a similarity between at least one of a plurality of players and a plurality of plays in the two feeds. The user interface is configured to permit the user to select at least one of the players and the plays to obtain a video feed that illustrates a comparison. In embodiments, the user interface includes options for at least one of editing, cutting and sharing a video clip that includes the video data structure. In embodiments, the at least one video feed comprises 3D motion camera data captured from a live sports venue. In embodiments, the machine learning facility increases its ability to develop the understanding by ingesting a plurality of events for which context has already been identified. In embodiments, the method includes using machine learning to develop the understanding of the event further comprises using events in position tracking data over time obtained from at least one of the at least one video feed and a chip-based player tracking system. The understanding is based on at least two of spatial configuration, relative motion, and projected motion of at least one of a player and an item used in a game.

In embodiments, using the machine learning to develop the understanding of the event further comprises aligning multiple unsynchronized input feeds related to the event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event. In embodiments, the system includes at least one of validating and modifying the alignment of the unsynchronized input feeds using a hierarchy involving at least two of one or more algorithms, one or more human operators, and one or more input feeds. In embodiments, the system includes at least one of validating the understanding and modifying the understanding using a hierarchy involving at least two of one or more algorithms, one or more human operators, and one or more input feeds.

In embodiments, the system includes automatically developing a semantic index of a video feed based on the machine understanding of the event in the video feed to indicate a time of the event in the video feed and a location of a display of the event in the video feed. In embodiments, the location of the display of the event in the video feed includes at least one of a pixel location, a voxel location, a raster image location. In embodiments, the system includes providing the semantic index of the video feed with the video feed to enable augmentation of the video feed.

In embodiments, augmentation of the video feed includes adding content based on to the location of the display and enabling at least one of a touch interface feature and a mouse interface feature based on the identified location.

In embodiments, extracting the content displaying the event includes automatically extracting a cut from the at least one video feed using a combination of the understanding developed with the machine learning and an understanding developed with the machine learning of another input feed selected from the group consisting of a broadcast video feed, an audio feed, and a closed caption feed. In embodiments, the system includes the understanding developed with machine learning of the other input feed includes at least one of a portion of content of a broadcast commentary and a change in camera view in the input feed.

In embodiments, a method for enabling a mobile application allowing user interaction with video content includes taking at least one video feed and processing the at least one video feed through a spatiotemporal pattern recognition algorithm that uses machine learning to develop an understanding of an event within the at least one video feed. The understanding includes identifying context information relating to the event and an entry in a relationship library at least detailing a relationship between two visible features of the at least one video feed. The method includes automatically, under computer control, extracting content displaying the event and associating the extracted content with the context information. The method includes producing a video content data structure that includes the context information. The method further includes providing a mobile application having a user interface configured to permit a user to interact with the video content data structure. The user interface is configured to include options for user interaction based on the context information.

In embodiments, the user interface is a touch screen interface. In embodiments, the user interface is configured to permit a user to enhance the video feed by selecting a content element to be added to the video feed. In embodiments, the content element is at least one of a metric and a graphic element that is based on the machine understanding. In embodiments, the user interface is configured to permit the user to select content for a particular player of a sports event. In embodiments, the system includes the user interface is configured to permit the user to select content relating to a context involving the matchup of two particular players in a sports event.

In embodiments, the method includes taking at least two video feeds from different time periods, the machine learning facility determines a context the includes a similarity between at least one of a plurality of players and a plurality of plays in the at least two feeds and the user interface is configured to permit the user to select at least one of the players and the plays to obtain a video feed that illustrates a comparison. In embodiments, the user interface includes options for at least one of editing, cutting and sharing a video clip that includes the video data structure.

In embodiments, the video feed comprises 3D motion camera data captured from a live sports venue. In embodiments, the method includes the machine learning facility increases its ability to develop the understanding by ingesting a plurality of events for which context has already been identified. In embodiments, the method includes the machine learning to develop the understanding of the event further comprises using events in position tracking data over time obtained from at least one of the at least one video feed and a chip-based player tracking system, and the understanding is based on at least two of spatial configuration, relative motion, and projected motion of at least one of a player and an item used in a game.

In embodiments, the method includes using the machine learning to develop the understanding of the event further comprises aligning multiple unsynchronized input feeds related to the event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating and modifying the understanding using a hierarchy involving at least two of one or more algorithms, one or more human operators, and one or more input feeds. In embodiments, the method includes automatically developing a semantic index of a video feed based on the understanding developed with the machine learning of at least one event in the video feed to indicate a time of the event in the video feed and a location of a display of the event in the video feed. In embodiments, the method includes the location of the display of the event in the video feed includes at least one of a pixel location, a voxel location, a raster image location. In embodiments, the method includes providing the semantic index of the video feed with the video feed to enable augmentation of the video feed. In embodiments, augmentation of the video feed includes adding content based on to the location of the display and enabling at least one of a touch interface feature and a mouse interface feature based on the identified location.

In embodiments, a method for providing enhanced video content includes processing at least one video feed through at least one spatiotemporal pattern recognition algorithm that uses machine learning to develop an understanding of a plurality of events and to determine at least one event type for each of the plurality of events within the at least one video feed. The at least one event type includes an entry in a relationship library at least detailing a relationship between two visible features of the at least one video feed. The method includes extracting a plurality of video cuts from the at least one video feed and indexing the plurality of video cuts based on at least one event type determined by the understanding developed by the machine learning. The method includes making the indexed and extracted video cuts available to a user.

In embodiments, the method includes enabling the user to at least one of edit, cut, and mix the plurality of video cuts to provide an enhanced video containing at least one video cut from the plurality of the video cuts. In embodiments, the user is enabled to share the enhanced video. In embodiments, the method includes indexing at least one shared, enhanced video with a semantic understanding of the event type determined by the machine learning. In embodiments, the indexing of the at least one shared, enhanced video with the semantic understanding of the event type determined by the machine learning is used to determine similarity between the shared, enhanced video and at least one other video content item. In embodiments, the similarity between the shared, enhanced video and at least one other video content item is used to identify additional extracted, indexed video cuts of interest to the user.

In embodiments, the similarity between the shared, enhanced video and at least one other video content item is used to identify other users who have shared similar enhanced video. In embodiments, the method includes the similarity between the shared, enhanced video and at least one other video content item is used to identify other users who are likely to have an interest in the shared, enhanced video. In embodiments, the method includes recommending at least one of the shared, enhanced video and one of the video cuts based on an understanding of the preferences of the other users.

In embodiments, the similarity between the shared, enhanced video and at least one other video content item is based at least in part on user profile information for users who have indicated an interest in the video cut and the other video content item. In embodiments, using the machine learning to develop the understanding of the plurality of events further comprises using events in position tracking data over time obtained from at least one of the at least one video feed and a chip-based player tracking system. The understanding is based on at least two of spatial configuration, relative motion, and projected motion of at least one of a player and an item used in a game.

In embodiments, using the machine learning to develop the understanding of the plurality of events further comprises aligning multiple unsynchronized input feeds related to the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds.

In embodiments, the method includes at least one of validating and modifying the understanding using a hierarchy involving at least two of one or more algorithms, one or more human operators, and one or more input feeds. In embodiments, extracting the plurality of video cuts from the at least one video feed includes using a combination of the understanding of the plurality of events developed with machine learning and an understanding developed with the machine learning of another input feed selected from the group consisting of a broadcast video feed, an audio feed, and a closed caption feed. In embodiments, the method includes the understanding developed with the machine learning of the other input feed includes at least one of a portion of content of a broadcast commentary and a change in camera view in an input feed.

In embodiments, a method for providing enhanced video content includes processing at least one video feed through at least one spatiotemporal pattern recognition algorithm that uses machine learning to develop an understanding of a plurality of events and to determine at least one event type for each of the plurality of events within the at least one video feed. The at least one event type includes an entry in a relationship library at least detailing a relationship between two visible features of the at least one video feed. The method includes extracting a plurality of video cuts from the at least one video feed and indexing the plurality of video cuts to form an indexed set of extracted video cuts. The indexing is based on at least one event type determined by the understanding developed with the machine learning. The method includes determining at least one pattern relating to the plurality of events in the at least one video feed. The method includes adding the determined the at least one pattern to the indexed set of video cuts and making the indexed and extracted video cuts available to a user.

In embodiments, the user is enabled to at least one of edit, cut, and mix the plurality of video cuts to provide an enhanced video containing the plurality of video cuts. In embodiments, the user is enabled to share the enhanced video. In embodiments, the plurality of video cuts is clustered based on the patterns that exist within the plurality of video cuts.

In embodiments, the pattern is determined automatically using an understanding developed with the machine learning and is based on the understanding developed with the machine learning of the plurality of events in the at least one video feed.

In embodiments, the method includes the pattern being a highlight event within the at least one video feed. In embodiments, a highlight event is presented to the user when the indexed and extracted plurality of video cuts is made available to the user. In embodiments, the user is prompted to watch a longer video feed upon viewing the indexed and extracted plurality of video cuts. In embodiments, using the machine learning to develop the understanding of the plurality of events further comprises using the plurality of events in position tracking data over time obtained from at least one of the at least one video feed and a chip-based player tracking system. The understanding developed with the machine learning is based on at least two of spatial configuration, relative motion, and projected motion of at least one of a player and an item used in a game.

In embodiments, using the machine learning to develop the understanding of the plurality of events further comprises aligning multiple unsynchronized input feeds related to the plurality of events using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating and modifying the understanding using a hierarchy involving at least two of one or more algorithms, one or more human operators, and one or more input feeds.

In embodiments, extracting the plurality of video cuts from the at least one video includes automatically extracting a cut from the at least video feed using a combination of the understanding of events developed with the machine learning and an understanding developed with the machine learning of another input feed selected from the group consisting of a broadcast video feed, an audio feed, and a closed caption feed. In embodiments, the understanding developed with the machine learning of the other input feed includes at least one of a portion of content of a broadcast commentary and a change in camera view in the input feed.

In embodiments, a method for embedding video content in an application includes taking a video feed and using machine learning to develop an understanding of an event within the video feed. The understanding including identifying context information relating to the event. The method includes automatically, under computer control, extracting the content displaying the event and associating the extracted content with the context information. The method includes producing a video content data structure that includes the associated context information and taking an application that displays video content. The method also includes embedding the video content data structure in the application.

In embodiments, the user interface of the application offers the user the option to control the presentation of the video content from the video content data structure in the application. In embodiments, the control of the presentation is based on at least one of a user preference and a user profile. In embodiments, the application is a mobile application that provides a story about an event. The video content data structure comprises at least one of a content card and a digital still image.

In embodiments, the method includes using machine learning to develop an understanding of an event further comprises using events in position tracking data over time obtained from at least one of the at least one video feed and a chip-based player tracking system. The understanding is based on at least two of spatial configuration, relative motion, and projected motion of at least one of a player and an item used in a game.

In embodiments, using machine learning to develop an understanding of an event further comprises aligning multiple unsynchronized input feeds related to an event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the method includes the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds.

In embodiments, the method includes at least one of validating the understanding and modifying the understanding using a hierarchy involving at least two of one or more algorithms, one or more human operators, and one or more input feeds. In embodiments, the method includes automatically developing a semantic index of a video feed based on the machine understanding of at least one event in the video feed to indicate the time of the event in the video feed and the location of the display of the event in the video feed. In embodiments, the location of the display of the event in the video feed includes at least one of a pixel location, a voxel location, a raster image location. In embodiments, the method includes providing the semantic index of the video feed with the video feed to enable augmentation of the video feed. In embodiments, augmentation of the video feed includes adding content based on to the identified location and enabling at least one of a touch interface feature and a mouse interface feature based on the identified location.

In embodiments, a system for enabling a mobile application that allows user interaction with video content includes a video ingestion facility for taking a video feed and a machine learning facility for developing an understanding of an event within the video feed. The understanding includes identifying context information relating to the event. The system includes a video production facility for automatically, under computer control, extracting the content displaying the event, associating the extracted content with the context information and producing a video content data structure that includes the associated context information. The system also includes using the context information for a plurality of such video content data structures to generate, automatically under computer control, a story that includes a sequence of the video content data structures. In embodiments, the content of the story is based on a user profile that is based on at least one of an expressed user preference, information about a user interaction with video content, and demographic information about the user.

In embodiments, the method includes determining a pattern relating to a plurality of events in the video feed and associating the determined pattern with the video content data structure as additional context information. In embodiments, the pattern relates to a highlight event within the video feed. In embodiments, the method includes the highlight event is associated with at least one of a player and a team.

In embodiments, the embedded application allows a user to indicate at least one of a player and a team for which the user wishes to obtain video feeds containing the highlight events. In embodiments, the pattern relates to a comparison of events occurring at least one of within the video feed or within a plurality of video feeds. In embodiments, the comparison is between events occurring over time. In embodiments, the embedded application allows a user to select at least one player to obtain a video providing a comparison between the player and at least one of a past representation of the same player and a representation of another player. In embodiments, the pattern is a cause-and-effect pattern related to the occurrence of a following type of event after the occurrence of a pre-cursor type of event. In embodiments, the user to review video cuts in a sequence that demonstrate the cause-and-effect pattern.

In embodiments, the application provides a user interface for allowing a user to enter at least one of text and audio input to provide a narrative for a sequence of events within the video feed. In embodiments, the user may select a sequence of video events from within the feed for display in the application. In embodiments, the method includes upon accepting the user narrative, the system automatically generates an electronic story containing the events from the video feed and the narrative. In embodiments, using machine learning to develop the understanding of the event further comprises using events in position tracking data over time obtained from at least one of the at least one video feed and a chip-based player tracking system and. The understanding is based on at least two of spatial configuration, relative motion, and projected motion of at least one of a player and an item used in a game. In embodiments, using machine learning to develop an understanding of the event further comprises aligning multiple unsynchronized input feeds related to an event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the method includes the multiple unsynchronized input feeds include at least three feeds selected from at least two types related to the event.

In embodiments, the system includes at least one of validating and modifying the alignment of the unsynchronized input feeds using a hierarchy involving at least two of one or more algorithms, one or more human operators, and one or more input feeds. In embodiments, the system includes at least one of validating the understanding and modifying the understanding using a hierarchy involving at least two of one or more algorithms, one or more human operators and one or more input feeds where at least one algorithm in the hierarchy for validation is based on the nature of the input feed. In embodiments, the system includes automatically developing a semantic index of a video feed based on the machine understanding of at least one event in the video feed to indicate the time of the event in the video feed and the location of the display of the event in the video feed.

In embodiments, the location of the display of the event in the video feed includes at least one of a pixel location, a voxel location, a raster image location. In embodiments, the system includes providing the semantic index of the video feed with the video feed to enable augmentation of the video feed. In embodiments, augmentation of the video feed includes adding content based on to the identified location and enabling at least one of a touch interface feature and a mouse interface feature based on the identified location. In embodiments, the system includes extracting the content displaying the event includes automatically extracting a cut from the video feed using a combination of machine understanding of events and a machine understanding of another input feed selected from the group consisting of a broadcast video feed, an audio feed, and a closed caption feed. In embodiments, the machine understanding of the other input feed includes understanding at least one of a portion of content of a broadcast commentary and a change in camera view in the input feed.

In embodiments, a method for enabling a mobile application that allows user interaction with video content includes taking a video feed and using a machine learning facility to develop an understanding of an event within the video feed, the understanding including identifying context information relating to the event. The method includes automatically, under computer control, extracting the content displaying the event, associating the extracted content with the context information and producing a video content data structure that includes the associated context information.

In embodiments, the system includes using the context information for a plurality of such video content data structures to generate, automatically under computer control, a story that includes a sequence of the video content data structures.

In embodiments, using machine learning to develop an understanding of an event further comprises using events in position tracking data over time obtained from at least one of the at least one video feed and a chip-based player tracking system. The understanding is based on at least two of spatial configuration, relative motion, and projected motion of at least one of a player and an item used in a game. In embodiments, using machine learning to develop the understanding of the event further comprises aligning multiple unsynchronized input feeds related to an event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the system includes the multiple unsynchronized input feeds include at least three feeds selected from at least two types related to the event. In embodiments, the system includes at least one of validating and modifying the alignment of the unsynchronized input feeds using a hierarchy involving at least two of one or more algorithms, one or more human operators, and one or more input feeds. In embodiments, the system includes at least one of validating the understanding and modifying the understanding using a hierarchy involving at least two of one or more algorithms, one or more human operators, and one or more input feeds. In embodiments, the system includes automatically developing a semantic index of a video feed based on the machine understanding of at least one event in the video feed to indicate the time of the event in the video feed and the location of the display of the event in the video feed.

In embodiments, the location of the display of the event in the video feed includes at least one of a pixel location, a voxel location, a raster image location. In embodiments, the system includes providing the semantic index of the video feed with the video feed to enable augmentation of the video feed.

In embodiments, augmentation of the video feed includes adding content based on to the identified location and enabling at least one of a touch interface feature and a mouse interface feature based on the identified location. In embodiments, the system includes extracting the content displaying the event includes automatically extracting a cut from the video feed using a combination of machine understanding of events and a machine understanding of another input feed selected from the group consisting of a broadcast video feed, an audio feed, and a closed caption feed. In embodiments, the system includes the machine understanding of the other input feed includes understanding at least one of a portion of content of a broadcast commentary and a change in camera view in the input feed.

In embodiments, a method includes taking a video feed and using machine learning to develop an understanding of a semantically relevant event within the video feed. The method includes indexing video segments of the video feed with information indicating the semantically relevant events identified within the feed by the machine learning. The method includes applying machine learning to a plurality of the semantically relevant events to determine a pattern of events. In embodiments, the pattern is within a video feed. In embodiments, the pattern is across a plurality of video feeds. In embodiments, the pattern corresponds to a narrative structure. In embodiments, the narrative structure corresponds to a recurring pattern of events. In embodiments, the system includes the narrative structure relates to a sporting event. The pattern relates to at least one of a blow-out victory pattern, a comeback win pattern, a near comeback pattern, a back-and-forth game pattern, an individual achievement pattern, an injury pattern, a turning point moment pattern, a close game pattern, and a team achievement pattern.

In embodiments, the indexed video segments are arranged to support the narrative structure. In embodiments, the arranged segments are provided in an interface for developing a story using the segments that follow the narrative structure. A user may at least one of edit and enter additional content for the story. In embodiments, the system includes summary content for the narrative structure is automatically generated, under computer control, to provide a story that includes the video sequences. In embodiments, the system includes delivering a plurality of the automatically generated stories from at least one of a defined time period and of a defined type, allowing a user to indicate whether they like or dislike the delivered stories, and using the indications to inform later delivery of at least one additional story.

In embodiments, the pattern is relevant to a prediction. In embodiments, the prediction is related to a wager, and the pattern corresponds to similar patterns that were used to make predictions that resulted in successful wagers in other situations. In embodiments, using machine learning to develop an understanding of an event further comprises using events in position tracking data over time obtained from at least one of the at least one video feed and a chip-based player tracking system and the understanding is based on at least two of spatial configuration, relative motion, and projected motion of at least one of a player and an item used in a game.

In embodiments, using machine learning to develop the understanding of the event further comprises aligning multiple unsynchronized input feeds related to an event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the system includes at least one of validating and modifying the alignment of the unsynchronized input feeds using a hierarchy involving at least two of one or more algorithms, one or more human operators, and one or more input feeds. In embodiments, the system includes at least one of validating the understanding and modifying the understanding using a hierarchy involving at least two of one or more algorithms, one or more human operators, and one or more input feeds.

In embodiments, a method includes machine-extracting semantically relevant events from a video content stream, determining a pattern relating to the events, and providing a content stream based on the pattern. In embodiments, the content stream is used to provide coaching information based on the pattern. In embodiments, the content stream is used to assist prediction of an outcome in a fantasy sports contest. In embodiments, the pattern is used to provide content for a viewer of a sporting event.

In embodiments, a method includes machine-extracting semantically relevant events from a video content stream and determining a pattern relating to the events. The method includes storing the pattern information with the extracted events and providing a user with the option to view and interact with the patterns. At least one of the patterns and the interaction options are personalized based on a profile of the user.

In embodiments, the profile is based on at least one of user indication of a preference, information about actions of the user, and demographic information about the user. In embodiments, the pattern comprises at least one of a trend and a statistic that is curated to correspond with the user profile. In embodiments, the pattern relates to a comparison of a professional athlete to another athlete. In embodiments, the other athlete is the user and the comparison is based on a playing style of the user as determined by at least one of information indicated by the user and a video feed of the user. In embodiments, the system includes the pattern relates to an occurrence of an injury. In embodiments, the pattern information is used to provide coaching to prevent an injury. In embodiments, the system includes automatically generating, under computer control, an injury prevention regimen based on the pattern and based on information about the user. In embodiments, the system includes automatically developing a semantic index of a video feed based on the machine understanding of at least one event in the video feed to indicate the time of the event in the video feed and the location of the display of the event in the video feed.

In embodiments, the location of the display of the event in the video feed includes at least one of a pixel location, a voxel location, a raster image location. In embodiments, the system includes providing the semantic index of the video feed with the video feed to enable augmentation of the video feed. In embodiments, augmentation of the video feed includes adding content based on to the identified location and enabling at least one of a touch interface feature and a mouse interface feature based on the identified location.

In embodiments, an analytic system includes a video ingestion facility for ingesting at least one video feed and a machine learning system for processing the at least one video feed through a spatiotemporal pattern recognition algorithm that applies machine learning on at least one event in the at least one video feed in order to develop an understanding of the at least one event within the at least one video feed. The understanding includes identifying at least one event type and a time of the at least one event in an event data structure. The understanding includes an entry in a relationship library at least detailing a relationship between two visible features of the at least one video feed. The method includes a computing architecture enabling a model that takes an event data structures as input and applies at least one calculation to transform the event data structures into an output data structure. The method further includes a data transport layer of the computing architecture for populating the model with the event data structure as input to the model.

In embodiments, the output data structure includes at least one prediction. In embodiments, the prediction is of an outcome of at least one of a sporting event and at least one second event occurring within a sporting event. In embodiments, the at least one video feed is of a live sporting event. The prediction is made during the live sporting event. The prediction relates to the same sporting event. In embodiments, the prediction is based on the event data structure from the at least one video feed. In embodiments, the prediction is used for at least one of placing a wager, setting a line for a wager, interacting with a fantasy program, setting a parameter of a fantasy program, providing insight to a coach and providing information to a fan. In embodiments, the system includes the model takes inputs from a plurality of data sources in addition to the event data structure obtained from the at least one video feed.

In embodiments, the system includes a pattern analysis facility that takes a plurality of event data structures and enables analysis of patterns among the plurality of event data structures. In embodiments, the pattern analysis facility uses distributions over observed outcomes from the plurality of event data structures that are characterized by similar motion data.

In embodiments, the user can specify use of probability distributions conditioned on multiple types of motion/position data and other data to generate metrics, pattern analysis or predictions. In embodiments, the pattern analysis facility includes at least one tool selected from the group consisting of a pattern visualization tool, a statistical analysis tool, a machine learning tool, and a simulation tool.

In embodiments, the system includes a second machine learning facility for refining the model based on outcomes of a plurality of predictions made using the model. In embodiments, using the machine learning to develop the understanding of the at least one event further comprises using events in position tracking data over time obtained from at least one of the at least one video feed and a chip-based player tracking system. The understanding developed with the machine learning is based on at least two of spatial configuration, relative motion, and projected motion of at least one of a player and an item used in a game.

In embodiments, using the machine learning to develop the understanding of the at least one event further comprises aligning multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event.

In embodiments, the system includes at least one of validating and modifying the alignment of the unsynchronized input feeds using a hierarchy involving at least two of one or more algorithms, one or more human operators, and one or more input feeds.

In embodiments, the system includes at least one of validating and modifying the understanding using a hierarchy involving at least two of one or more algorithms, one or more human operators, and one or more input feeds.

In embodiments, an analytic method includes ingesting at least one video feed in a computing platform capable of handling video data. The method includes processing the at least one video feed through a spatiotemporal pattern recognition algorithm that applies machine learning on at least one event in the at least one video feed in order to develop an understanding of the at least one event within the at least one video feed. The understanding includes identifying at least one event type and a time of the at least one event in an event data structure. The understanding includes an entry in a relationship library at least detailing a relationship between two visible features of the at least one video feed. The method includes providing a computing architecture that enables a model that takes the event data structure as input and applies at least one calculation to transform the event data structure into an output data structure. The method further includes populating the model with the event data structure as input to the model.

In embodiments, the output data structure includes at least one prediction. In embodiments, the prediction is of an outcome of at least one of a sporting event and at least one second event occurring within a sporting event. In embodiments, the video feed is of a live sporting event. The prediction is made during the live sporting event. The prediction relates to the same sporting event. In embodiments, the prediction is based on the event data structure from the plurality of video feeds. In embodiments, the prediction is used for at least one of placing a wager, setting a line for a wager, interacting with a fantasy program, setting a parameter of a fantasy program, providing insight to a coach and providing information to a fan. In embodiments, the model takes inputs from a plurality of data sources in addition to the event data structure obtained from the at least one video feed.

In embodiments, the system includes, further comprising providing a pattern analysis facility that takes a plurality of event data structures and enabling analysis of patterns among the plurality of event data structures. In embodiments, the system includes the pattern analysis facility uses distributions over observed outcomes from the plurality of event data structures that are characterized by similar motion data. In embodiments, the pattern analysis facility includes at least one tool selected from the group consisting of a pattern visualization tool, a statistical analysis tool, a machine learning tool, and a simulation tool. In embodiments, the system includes at least one of providing and using a second machine learning facility to refine the model based on outcomes of a plurality of predictions made using the model.

In embodiments, the system includes using the machine learning to develop the understanding of the at least one event further comprises using events in position tracking data over time obtained from at least one of the at least one video feed and a chip-based player tracking system. The understanding is based on at least two of spatial configuration, relative motion, and projected motion of at least one of a player and an item used in a game. In embodiments, using the machine learning to develop the understanding of the at least one event further comprises aligning multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event. In embodiments, the system includes at least one of validating and modifying the alignment of the unsynchronized input feeds using a hierarchy involving at least two of one or more algorithms, one or more human operators, and one or more input feeds. In embodiments, the system includes at least one of validating and modifying the understanding using a hierarchy involving at least two of one or more algorithms, one or more human operators, and one or more input feeds.

In embodiments, a method includes taking a video feed of a recreational event at a computing facility capable of handling video data. The method includes processing the video feed through a spatiotemporal pattern recognition algorithm that applies machine learning on at least one event in the at least one video feed in order to develop an understanding of the at least one event within the at least one video feed. The understanding includes an entry in a relationship library at least detailing a relationship between two visible features of the video feed of the recreational event. The method includes providing an output data structure including information about a player in the recreational event based on the understanding developed with the machine learning.

In embodiments, the method includes using the understanding developed with the machine learning of the at least one event to develop at least one characteristic of the player based on the output data structure. In embodiments, the at least one characteristic is selected from the group consisting of a size of the player, a height of the player, a weight of the player, a style of the player, a pattern of play of the player, a strength of the player and a weakness of the player.

In embodiments, the system includes providing a comparison of the player to at least one professional player based on a similarity with respect to the at least one characteristic. In embodiments, the recreational event is at least one of a practice, a warm-up session, and a game. In embodiments, the understanding includes identifying at least one event type. In embodiments, the method includes extracting at least one video cut from the video feed and associating the at least one event type for at least one event within the at least one video cut. In embodiments, the method includes automatically, under computer control, assembling a plurality of video cuts into a highlight reel for the player based on the event type contained in the plurality of video cuts.

In embodiments, the method includes developing at least one metric based on the understanding developed with the machine learning of the at least one event and associating the metric with the at least one video cut. In embodiments, the method includes displaying the at least one metric within a video cut. In embodiments, the method includes providing a player with a personalized video cut of the recreational event that displays at least one metric associated with the player.

In embodiments, the method includes providing a sports fantasy game that uses the at least one event for a player in the recreational event as input to determining an outcome of the sports fantasy game. In embodiments, the method includes using the events from the recreational event to compare the events to similar events from a professional event. In embodiments, the comparison is associated with at least one item of content for coaching the recreational player based on the comparison.

In embodiments, the comparison includes displaying at least one video cut from the at least one video feed of the recreational feed and at least one video cut from a video feed of a professional event. In embodiments, the method includes the displaying of the video cuts is at least one of simultaneous and sequential. In embodiments, the method includes using the events understood from the recreational event and similar events understood from a video feed of a professional event to produce a highlight reel that features both recreational and professional video cuts of similar events.

In embodiments, the method includes enabling a user to at least one of edit, cut, mix, and share at least one video clip of the recreational event that is identified based on the output data structure. In embodiments, the method includes providing a pattern analysis facility that takes a plurality of the output data structures and enables analysis of patterns among the output data structures.

In embodiments, the method includes the pattern analysis facility includes at least one tool selected from the group consisting of a pattern visualization tool, a statistical analysis tool, a machine learning tool, and a simulation tool. In embodiments, the method includes the pattern analysis facility supports the ability to recognize patterns in recreational player activity and draw comparisons to other players.

In embodiments, the method includes providing physical feedback to a player based on real time recognition of a pattern. In embodiments, the physical feedback is at least one of a lighting feedback, an audio feedback, a haptic feedback, and a visual feedback. In embodiments, the method includes developing at least one metric for the recreational player based on recognizing at least one pattern of events. In embodiments, the at least one metric is used to compare the player to another player. In embodiments, the method includes using the machine learning to develop the understanding of the event further comprises using events in position tracking data over time obtained from at least one of the at least one video feed and a chip-based player tracking system. The understanding is based on at least two of spatial configuration, relative motion, and projected motion of at least one of a player and an item used in a game.

In embodiments, using the machine learning to develop the understanding of an event further comprises aligning multiple unsynchronized input feeds related to the at least one event using at least one of a hierarchy of algorithms and a hierarchy of human operators. The unsynchronized input feeds are selected from the group consisting of one or more broadcast video feeds of the event, one or more feeds of tracking video for the event, and one or more play-by-play data feeds of the event.

In embodiments, the multiple unsynchronized input feeds include at least three feeds selected from at least two types related to the event. In embodiments, the method includes at least one of validating and modifying the alignment of the unsynchronized input feeds using a hierarchy involving at least two of one or more algorithms, one or more human operators, and one or more input feeds. In embodiments, the method includes at least one of validating and modifying the understanding using a hierarchy involving at least two of one or more algorithms, one or more human operators, and one or more input feeds.

In embodiments, a method includes taking a video feed of a recreational event at a computing facility capable of handling video data and using machine learning to develop an understanding of at least one event within the video feed. The method includes providing an output data structure including information about a player in the recreational event based on the machine understanding.

In embodiments, the method further includes using the machine learning understanding of the at least one event to develop at least one characteristic of the player based on the output data structure. In embodiments, the characteristic is selected from the group consisting of a size of the player, a height of the player, a weight of the player, a style of the player, a pattern of play of the player, a strength of the player and a weakness of the player. In embodiments, the method further includes providing a comparison of the player to at least one professional player based on a similarity with respect to the at least one characteristic. In embodiments, the recreational event is at least one of a practice, a warm-up session, and a game. In embodiments, the machine learning understanding provides at least one type for the event.

In embodiments, the method further includes extracting at least one video cut from the video feed and associating the at least one type for at least one event within the at least one video cut. In embodiments, the method further includes automatically, under computer control, assembling a plurality of video cuts into a highlight reel for the player based on the type of events contained in the video cuts. In embodiments, the method further includes developing at least one metric based on the machine understanding of the at least one event and associating the metric with the at least one video cut. In embodiments, the method further includes displaying the at least one metric within a video cut. In embodiments, the method further includes providing a player with a personalized video cut of the recreational event that displays at least one metric associated with the player. In embodiments, the method further includes providing a sports fantasy game that uses the events for a player in the recreational event as input to determining an outcome of the sports fantasy game.

In embodiments, the method further includes using the events from the recreational event to compare the events to similar events from a professional event. In embodiments, the comparison is associated with at least one item of content for coaching the recreational player based on the comparison. In embodiments, the comparison includes displaying at least one video cut from the at least one video feed of the recreational feed and at least one video cut from a video feed of a professional event. In embodiments, the displaying of the video cuts is at least one of simultaneous and sequential. In embodiments, the method further includes using the events understood from the recreational event and similar events understood from a video feed of a professional event to produce a highlight reel that features both recreational and professional video cuts of similar events. In embodiments, the method further includes enabling a user to at least one of edit, cut, mix, and share at least one video clip of the recreational event that is identified based on the output data structure.

In embodiments, the method further includes providing a pattern analysis facility that takes a plurality of the output data structures and enables analysis of patterns among the output data structures. In embodiments, the pattern analysis facility includes at least one tool selected from the group consisting of a pattern visualization tool, a statistical analysis tool, a machine learning tool, and a simulation tool. In embodiments, the pattern analysis facility supports the ability to recognize patterns in recreational player activity and draw comparisons to other players. In embodiments, the method further includes providing physical feedback to a player based on real time recognition of a pattern. In embodiments, the physical feedback is at least one of a lighting feedback, an audio feedback, a haptic feedback, and a visual feedback. In embodiments, the method further includes developing at least one metric for the recreational player based on recognizing at least one pattern of events. In embodiments, the method further includes the at least one metric is used to compare the player to another player.

In embodiments, using machine learning to develop the understanding of the event further comprises using events in position tracking data over time obtained from at least one of the at least one video feed and a chip-based player tracking system and wherein the understanding is based on at least two of spatial configuration, relative motion, and projected motion of at least one of a player and an item used in a game. In embodiments, using machine learning to develop an understanding of an event further comprises aligning multiple unsynchronized input feeds related to the events using at least one of a hierarchy of algorithms and a hierarchy of human operators, wherein the unsynchronized input feeds are selected from the group consisting of one or more broadcast video feeds of the event, one or more feeds of tracking video for the event, and one or more play-by-play data feeds of the event. In embodiments, the multiple unsynchronized input feeds include at least three feeds selected from at least two types related to the event. In embodiments, the method further includes at least one of validating and modifying the alignment of the unsynchronized input feeds using a hierarchy involving at least two of one or more algorithms, one or more human operators, and one or more input feeds. In embodiments, the method further includes at least one of validating the understanding and modifying the understanding using a hierarchy involving at least two of one or more algorithms, one or more human operators, and one or more input feeds.

In embodiments, a method includes taking a video feed of an event in which there is a participant and identifying a point of view of the participant. The method includes automatically, under computer control, selecting a plurality of video frames from the video feed showing at least one view from the point of view of the participant.

In embodiments, the method includes rendering a 3D video using the selected plurality of video frames. In embodiments, the method further includes providing an interface wherein a user may select the participant from a plurality of participants. In embodiments, the event is a sporting event and the participant is a player. In embodiments, the method further includes the event is basketball and wherein the video feed is associated with 3D motion capture data from cameras that capture the video feed.

BRIEF DESCRIPTION OF THE FIGURES

The following detailed description of certain embodiments may be understood by reference to the following figures:

FIG. 1 illustrates a technology stack according to an exemplary and non-limiting embodiment.

FIG. 4 illustrates ranking user interface according to an exemplary and non-limiting embodiment.

FIGS. 5A-5B illustrate a ranking user interface according to an exemplary and non-limiting embodiment.

FIGS. 6A-6B illustrate a filters user interface according to an exemplary and non-limiting embodiment.

FIG. 11 illustrates an alternative report according to an exemplary and non-limiting embodiment.

FIG. 14 illustrates a report according to an exemplary and non-limiting embodiment.

FIG. 18 illustrates test inputs according to an exemplary and non-limiting embodiment.

FIGS. 24A-24B illustrate reports according to an exemplary and non-limiting embodiment.

FIGS. 30A-30C illustrate scripted storytelling with assets according to an exemplary and non-limiting embodiment.

DETAILED DESCRIPTION

Figure 2:
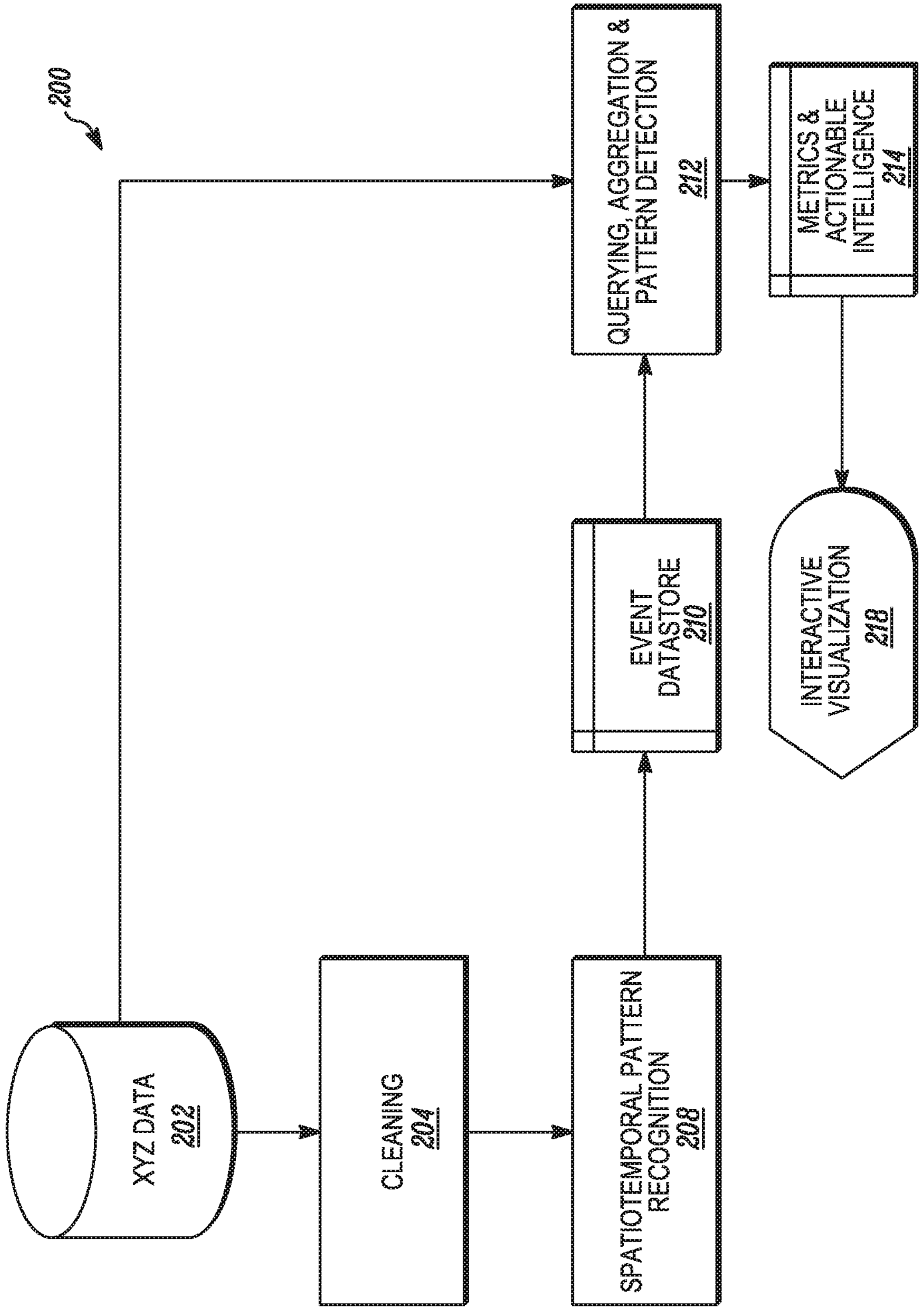
FIG. 2 illustrates a stack flow according to an exemplary and non-limiting embodiment.

FIG. 1 illustrates a technology stack 100 indicative of technology layers configured to execute a set of capabilities, in accordance with an embodiment of the present invention. The technology stack 100 may include a customization layer 102, an interaction layer 104, a visualizations layer 108, an analytics layer 110, a patterns layer 112, an events layer 114, and a data layer 118, without limitations. The different technology layers or the technology stack 100 may be referred to as an “Eagle” Stack 100, which should be understood to encompass the various layers allow precise monitoring, analytics, and understanding of spatiotemporal data associated with an event, such as a sports event and the like. For example, the technology stack may provide an analytic platform that may take spatiotemporal data (e.g., 3D motion capture “XYZ” data) from National Basketball Association (NBA) arenas or other sports arenas and, after cleansing, may perform spatiotemporal pattern recognition to extract certain “events”. The extracted events may be for example (among many other possibilities) events that correspond to particular understandings of events within the overall sporting event, such as “pick and roll” or “blitz.” Such events may correspond to real events in a game, and may, in turn, be subject to various metrics, analytic tools, and visualizations around the events. Event recognition may be based on pattern recognition by machine learning, such as spatiotemporal pattern recognition, and in some cases, may be augmented, confirmed, or aided by human feedback.

The customization layer 102 may allow performing custom analytics and interpretation using analytics, visualization, and other tools, as well as optional crowd-sourced feedback for developing team-specific analytics, models, exports, and related insights. For example, among many other possibilities, the customization layer 102 may facilitate in generating visualizations for different spatiotemporal movements of a football player, or group of players and counter movements associated with other players or groups of players during a football event.

The interaction layer 104 may facilitate generating real-time interactive tasks, visual representations, interfaces, videos clips, images, screens, and other such vehicles for allowing viewing of an event with enhanced features or allowing interaction of a user with a virtual event derived from an actual real-time event. For example, the interaction layer 104 may allow a user to access features or metrics such as a shot matrix, a screens breakdown, possession detection, and many others using real-time interactive tools that may slice, dice, and analyze data obtained from the real-time event such as a sports event.

The visualizations layer 108 may allow dynamic visualizations of patterns and analytics developed from the data obtained from the real-time event. The visualizations may be presented in the form of a scatter rank, shot comparisons, a clip view, and many others. The visualizations layer 108 may use various types of visualizations and graphical tools for creating visual depictions. The visuals may include various types of interactive charts, graphs, diagrams, comparative analytical graphs, and the like. The visualizations layer 108 may be linked with the interaction layer so that the visual depictions may be presented in an interactive fashion for a user interaction with real-time events produced on a virtual platform such as the analytic platform of the present invention.

The analytics layer 110 may involve various analytics and Artificial Intelligence (AI) tools to perform analysis and interpretation of data retrieved from the real-time event such as a sports event so that the analyzed data results in insights that make sense out of the pulled big data from the real-time event. The analytics and AI tools may comprise such as search and optimization tools, inference rules engines, algorithms, learning algorithms, logic modules, probabilistic tools and methods, decision analytics tools, machine learning algorithms, semantic tools, expert systems, and the like without limitations.

Output from the analytics 110 and patterns layers 112 is exportable by the user as a database that enables the customer to configure their own machines to read and access the events and metrics stored in the system. In accordance with various exemplary and non-limiting embodiments, patterns and metrics are structured and stored in an intuitive way. In general, the database utilized for storing the events and metric data is designed to facilitate easy export and to enable integration with a team's internal workflow. In one embodiment, there is a unique file corresponding to each individual game. Within each file, individual data structures may be configured in accordance with included structure definitions for each data type indicative of a type of event for which data may be identified and stored. For example, types of events that may be recorded for a basketball game include, but are not limited to, isos, handoffs, posts, screens, transitions, shots, closeouts, and chances. With reference to, for example, the data type "screens", table 1 is an exemplary listing of the data structure for storing information related to each occurrence of a screen. As illustrated, each data type is comprised of a plurality of component variable definitions each comprised of a data type and a description of the variable.

TABLE 1

| screens | |
|---|---|
| id | INT<br>Internal ID of this screen. |
| possession_id | STRING<br>Internal ID of the possession in which this event took place. |
| frame | INT<br>Frame ID, denoting frame number from the start of the current period. Currently, this marks the frame at which the screener and ballhandler are closest. |
| frame_time | INT<br>Time stamp provided in SportVU data for a frame, measured in milliseconds in the current epoch (i.e. from 00:00:00 UTC on 1 Jan. 1970). |
| game_code | INT<br>Game code provided in SportVU data. |
| period | INT<br>Regulation periods 1-4, overtime periods 5 and up. |
| game_clock | NUMBER<br>Number of seconds remaining in period, from 720.00 to 0.00. |
| location_x | NUMBER<br>Location along length of court, from 0 to 94. |
| location_y | NUMBER<br>Location along baseline of court, from 0 to 50. |
| screener | INT<br>ID of screener, matches SportVU ID. |
| ballhandler | INT<br>ID of the ballhandler, matches SportVU ID. |
| screener_defender | INT<br>ID of the screener's defender, matches SportVU ID. |
| ballhandler_defender | INT<br>ID of the ballhandler's defender, matches Sport VU ID. |
| oteam | INT<br>ID of team on offense, matches IDs in SportVU data. |
| dteam | INT<br>ID of team on defense, matches IDs in SportVU data. |
| rdef | STRING<br>String representing the observed actions of the ballhandler's defender. |
| sdef | STRING<br>String representing the observed actions of the screener's defender. |
| scr_type | STRING<br>Classification of the screen into take, reject, or slip. |
| outcomes_bhr | ARRAY<br>Actions by the ballhandler, taken from the outcomes described at the end of the document, such as FGX or FGM. |
| outcomes_scr | ARRAY<br>Actions by the screener, taken from the outcomes described at the end of the document, such as FGX or FGM. |

These exported files, one for each game, enable other machines to read the stored understanding of the game and build further upon that knowledge. In accordance with various embodiments, the data extraction and/or export is optionally accomplished via a JSON schema.

The patterns layer 112 may provide a technology infrastructure for rapid discovery of new patterns arising out of the retrieved data from the real-time event such as a sports event. The patterns may comprise many different patterns that corresponding to an understanding of the event, such as a defensive pattern (e.g., blitz, switch, over, under, up to touch, contain-trap, zone, man-to-man, or face-up pattern), various offensive patterns (e.g., pick-and-roll, pick-and-pop, horns, dribble-drive, off-ball screens, cuts, post-up, and the like), patterns reflecting plays (scoring plays, three-point plays, "red zone" plays, pass plays, running plays, fast break plays, etc.) and various other patterns associated with a player in the game or sports, in each case corresponding to distinct spatiotemporal events.

The events layer 114 may allow creating new events or editing or correcting current events. For example, the events layer may allow for the analyzing of the accuracy of markings or other game definitions and may comment on whether they meet standards and sports guidelines. For example, specific boundary markings in an actual real-time event may not be compliant with the guidelines and there may exist some errors, which may be identified by the events layers through analysis and virtual interactions possible with the platform of the present invention. Events may correspond to various understandings of a game, including offensive and defensive plays, matchups among players or groups of players, scoring events, penalty or foul events, and many others.

The data layer 118 facilitates management of the big data retrieved from the real-time event such as a sports event. The data layer 118 may allow creating libraries that may store raw data, catalogs, corrected data, analyzed data, insights, and the like. The data layer 118 may manage online warehousing in a cloud storage setup or in any other manner in various embodiments.

FIG. 2 illustrates a process flow diagram 200, in accordance with an embodiment of the present invention. The process 200 may include retrieving spatiotemporal data associated with a sports or game and storing in a data library at step 202. The spatiotemporal data may relate to a video feed that was captured by a 3D camera, such as one positioned in a sports arena or other venue, or it may come from another source.

The process 200 may further include cleaning of the rough spatiotemporal data at step 204 through analytical and machine learning tools and utilizing various technology layers as discussed in conjunction with FIG. 1 so as to generate meaningful insights from the cleansed data.

The process 200 may further include recognizing spatiotemporal patterns through analysis of the cleansed data at step 208. Spatiotemporal patterns may comprise a wide range of patterns that are associated with types of events. For example, a particular pattern in space, such as the ball bouncing off the rim, then falling below it, may contribute toward recognizing a "rebound" event in basketball. Patterns in space and time may lead to recognition of single events or multiple events that comprise a defined sequence of recognized events (such as in types of plays that have multiple steps).

The recognized patterns may define a series of events associated with the sports that may be stored in an event datastore at step 210. These events may be organized according to the recognized spatiotemporal patterns; for example, a series of events may have been recognized as "pick," "rebound," "shot," or like events in basketball, and they may be stored as such in the event datastore 210. The event datastore 210 may store a wide range of such events, including individual patterns recognized by spatiotemporal pattern recognitions and aggregated patterns, such as when one pattern follows another in an extended, multi-step event (such as in plays where one event occurs and then another occurs, such as "pick and roll" or "pick and pop" events in basketball, football events that involve setting an initial block, then springing out for a pass, and many others).

The process 200 may further include querying or aggregation or pattern detection at step 212. The querying of data or aggregation may be performed with the use of search tools that may be operably and communicatively connected with the data library or the events datastore for analyzing, searching, aggregating the rough data, cleansed, or analyzed data, or events data or the events patterns.

At step 214, metrics and actionable intelligence may be used for developing insights from the searched or aggregated data through artificial intelligence and machine learning tools.

At step 218, for example, the metrics and actionable intelligence may convert the data into interactive visualization portals or interfaces for use by a user in an interactive manner.

In embodiments, an interactive visualization portal or interface may produce a 3D reconstruction of an event, such as a game. In embodiments, a 3D reconstruction of a game may be produced using a process that presents the reconstruction from a point of view, such as a first person point of view of a participant in an event, such as a player in a game.

Raw input XYZ data obtained from various data sources is frequently noisy, missing, or wrong. XYZ data is sometimes delivered with attached basic events already identified in it, such as possession, pass, dribble, and shot events; however, these associations are frequently incorrect. This is important because event identification further down the process (in Spatiotemporal Pattern Recognition) sometimes depends on the correctness of these basic events. For example, if two players' XY positions are switched, then "over" vs "under" defense would be incorrectly characterized, since the players' relative positioning is used as a critical feature for the classification. Even player-by-player data sources are occasionally incorrect, such as associating identified events with the wrong player.

First, validation algorithms are used to detect all events, including the basic events such as possession, pass, dribble, shot, and rebound that are provided with the XYZ data. Possession/Non-possession models may use a Hidden Markov Model to best fit the data to these states. Shots and rebounds may use the possession model outputs, combined with 1) projected destination of the ball, and 2) player by player information (PBP) information. Dribbles may be identified using a trained ML algorithm and also using the output of the possession model. These algorithms may decrease the basic event labeling error rate by approximately 50% or more.

Second, the system has a library of anomaly detection algorithms to identify potential problems in the data including, but not limited to, temporal discontinuities (intervals of missing data are flagged), spatial discontinuities (objects traveling is a non-smooth motion, "jumping") and interpolation detection (data that is too smooth, indicating that post-processing was done by the data supplier to interpolate between known data points in order to fill in missing data).

This problem data is flagged for human review so that events detected during these periods are subject to further scrutiny.

Spatiotemporal Pattern Recognition

Spatiotemporal pattern recognition 208 is used to automatically identify relationships between physical and temporal patterns and various types of events. In the example of basketball, one challenge is how to turn x, y, z positions of ten players and one ball at twenty-five frames per second into usable input for machine learning and pattern recognition algorithms. For patterns, one is trying to detect (e.g. pick & rolls), the raw inputs may not suffice. The instances within each pattern category can look very different from each other. One, therefore, may benefit from a layer of abstraction and generality. Features that relate multiple actors in time are key components to the input. Examples include, but are not limited to, the motion of player one (P1) towards player two (P2), for at least T seconds, a rate of motion of at least V m/s for at least T seconds and at the projected point of intersection of paths A and B, and a separation distance less than D.

In embodiments, an algorithm for spatiotemporal pattern recognition can use relative motion of visible features within a feed, duration of relative motion of such features, rate of motion of such features with respect to each other, rate of acceleration of such features with respect to each other, a projected point of intersection of such features, the separation distance of such features, and the like to identify or recognize a pattern with respect to visible features in a feed, which in turn can be used for various other purposes disclosed herein, such as recognition of a semantically relevant event or feature that relates to the pattern. In embodiments, these factors may be based on a pre-existing model or understanding of the relevance of such features, such as where values or thresholds may be applied within the pattern recognition algorithm to aid pattern recognition. Thus, thresholds or values may be applied to rates of motion, durations of motion, and the like to assist in pattern recognition. However, in other cases pattern recognition may occur by adjusting weights or values of various input features within a machine learning system, without a pre-existing model or understanding of the significance of particular values and without applying thresholds or the like. Thus, the spatiotemporal pattern recognition algorithm may be based on at least one pattern recognized by adjusting at least one of an input type and a weight within a machine learning system. This recognition may occur independently of any a priori model or understanding of the significance of particular input types, features, or characteristics. In embodiments, an input type may be selected from the group consisting of relative direction of motion of at least two visible features, duration of relative motion of visible features with respect to each other, rate of motion of at least two visible features with respect to each other, acceleration of motion of at least two visible feature with respect to each other, projected point of intersection of at least two visible features with respect to each other and separation distance between at least two visible features with respect to each other, and the like.

In embodiments of the present disclosure, there is provided a library of such features involving multiple actors over space and time. In the past machine learning (ML) literature, there has been relatively little need for such a library of spatiotemporal features, because there were few datasets with these characteristics on which learning could have been considered as an option. The library may include relationships between actors (e.g., players one through ten in basketball), relationships between the actors and other objects such as the ball, and relationships to other markers, such as designated points and lines on the court or field, and to projected locations based on predicted motion.

Another key challenge is there have not been a labeled dataset for training the ML algorithms. Such a labeled dataset may be used in connection with various embodiments disclosed herein. For example, there has previously been no XYZ player-tracking dataset that already has higher level events, such as pick and roll (P&R) events labeled at each time frame they occur. Labeling such events, for many different types of events and sub-types, is a laborious process. Also, the number of training examples required to adequately train the classifier may be unknown. One may use a variation of active learning to solve this challenge. Instead of using a set of labeled data as training input for a classifier trying to distinguish A and B, the machine finds an unlabeled example that is closest to the boundary between As and Bs in the feature space. The machine then queries a human operator/labeler for the label for this example. It uses this labeled example to refine its classifier and then repeats.

In one exemplary embodiment of active learning, the system also incorporates human input in the form of new features. These features are either completely devised by the human operator (and inputted as code snippets in the active learning framework), or they are suggested in template form by the framework. The templates use the spatiotemporal pattern library to suggest types of features that may be fruitful to test. The operator can choose a pattern, and test a particular instantiation of it, or request that the machine test a range of instantiations of that pattern.

Multi-Loop Iterative Process

Some features are based on outputs of the machine learning process itself. Thus, multiple iterations of training are used to capture this feedback and allow the process to converge. For example, a first iteration of the ML process may suggest that the Bulls tend to ice the P&R. This fact is then fed into the next iteration of ML training as a feature, which biases the algorithm to label Bulls' P&R defense as ices. The process converges after multiple iterations. In practice, two iterations have typically been sufficient to yield good results.

In accordance with exemplary embodiments, a canonical event datastore 210 may contain a definitive list of events that the system knows occurred during a game. This includes events extracted from the XYZ data, as well as those specified by third-party sources, such as PBP data from various vendors. The events in the canonical event datastore 210 may have game clock times specified for each event. The datastore 210 may be fairly large. To maintain efficient processing, it is shared and stored in-memory across many machines in the cloud. This is similar in principle to other methods such as Hadoop™; however, it is much more efficient, because in embodiments involving events, such as sporting events, where there is some predetermined structure that is likely to be present (e.g., the 24-second shot clock, or quarters or halves in a basketball game), it makes key structural assumptions about the data. Because the data is from sports games, for example, in embodiments one may enforce that no queries will run across multiple quarters/periods. Aggregation steps can occur across quarters/periods, but query results will not. This is one instantiation of this assumption. Any other domain in which locality of data can be enforced will also fall into this category.

Such a design allows rapid and complex querying across all of the data, allowing arbitrary filters, rather than relying on either 1) long-running processes, or 2) summary data, or 3) pre-computed results on pre-determined filters.

In accordance with exemplary and non-limiting embodiments, data is divided into small enough shards that each worker shard has a low latency response time. Each distributed machine may have multiple workers corresponding to the number of processes the machine can support concurrently. Query results never rely on more than one shard, since we enforce that events never cross quarter/period boundaries. Aggregation functions all run incrementally rather than in batch process so that as workers return results, these are incorporated into the final answer immediately. To handle results such as rankings pages, where many rows must be returned, the aggregator uses hashes to keep track of the separate rows and incrementally updates them.

Figure 3:
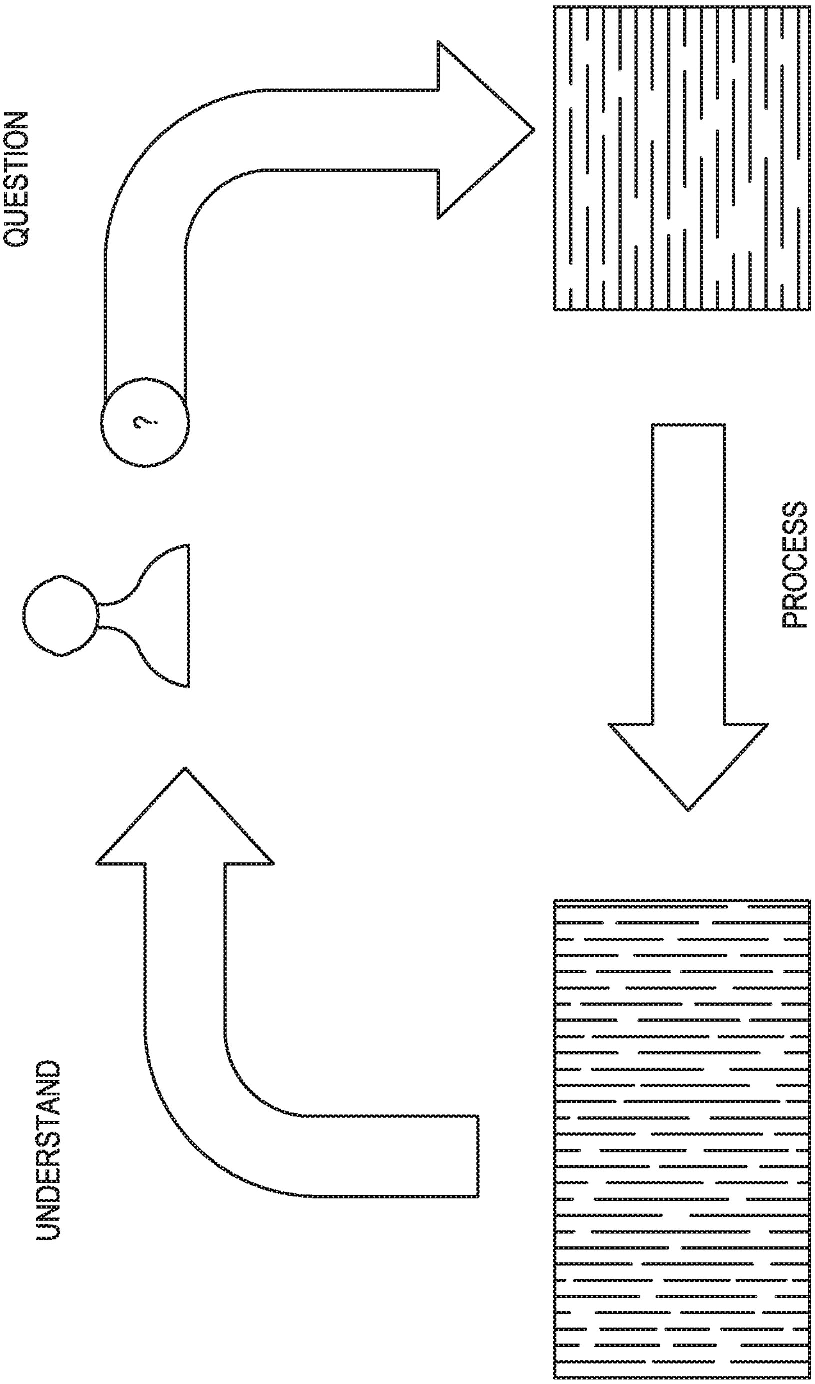
FIG. 3 illustrates an exploration loop according to an exemplary and non-limiting embodiment.

Referring to FIG. 3, an exploration loop may be enabled by the methods and systems disclosed herein, where questioning and exploration can occur, such as using visualizations (e.g., data effects, referred to as DataFX in this disclosure), processing can occur, such as to identify new events and metrics, and understanding emerges, leading to additional questions, processing and understanding.

Referring to FIG. 4, the present disclosure provides an instant player rankings feature as depicted in the illustrated user interface. A user can select among various types of available rankings 402, as indicated in the drop down list 410, such as rankings relating to shooting, rebounding, rebound ratings, isolations (Isos), picks, postups, handoffs, lineups, matchups, possessions (including metrics and actions), transitions, plays and chances. Rankings can be selected in a menu element 404 for players, teams, or other entities. Rankings can be selected for different types of play in the menu element 408, such as for offense, defense, transition, special situations, and the like. The ranking interface allows a user to quickly query the system to answer a particular question instead of thumbing through pages of reports. The user interface lets a user locate essential factors and evaluate talent of a player to make more informed decisions.

Figure 5A:
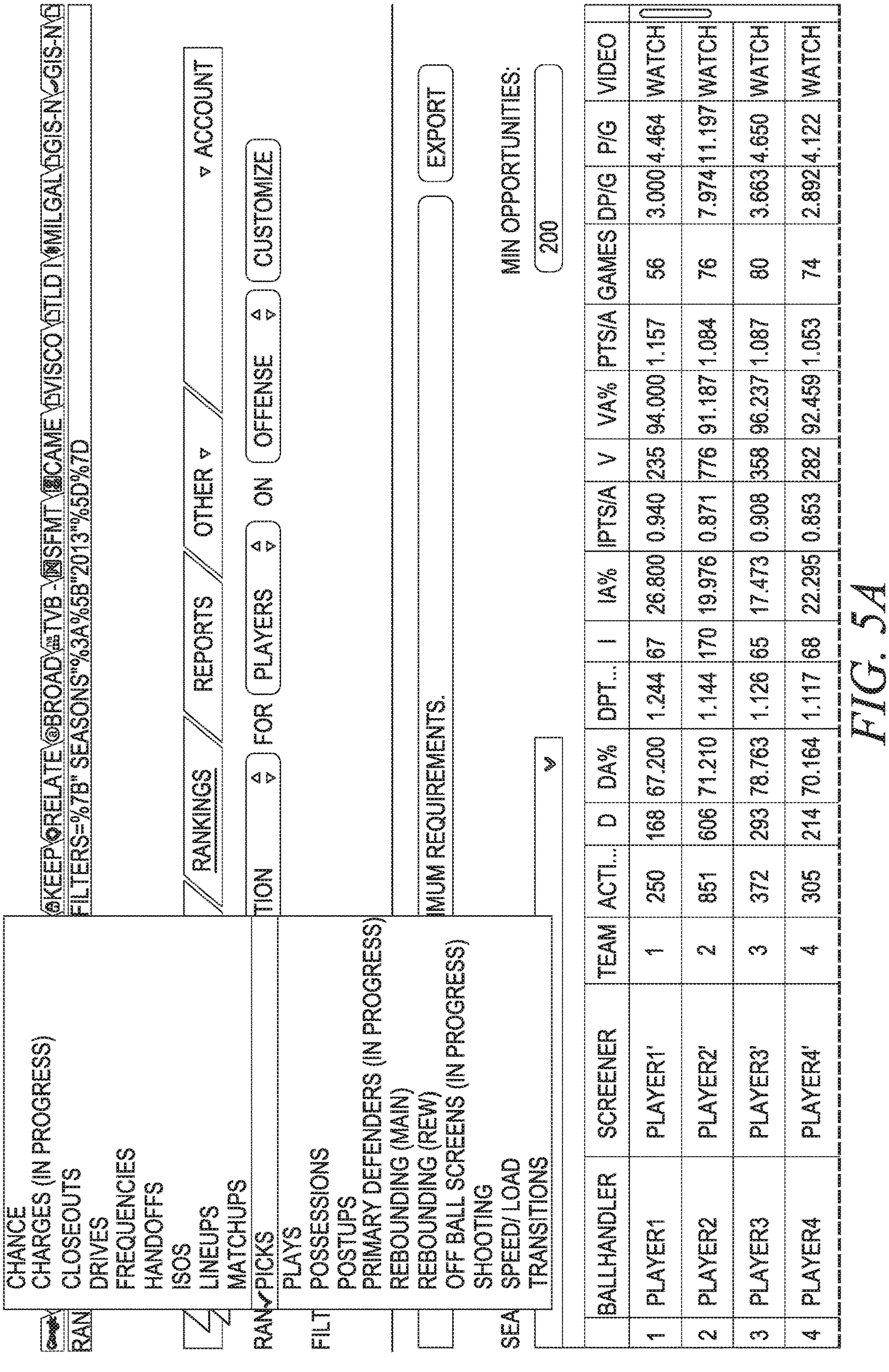

FIGS. 5A-5B shows certain basic, yet quite in-depth, pages in the systems described herein, referred to in some cases as the "Eagle system." This user interface may allow the user to rank players and teams by a wide variety of metrics. This may include identified actions, metrics derived from these actions, and other continuous metrics. Metrics may relate to different kinds of events, different entities (players and teams), different situations (offense and defense) and any other patterns identified in the spatiotemporal pattern recognition system. Examples of items on which various entities can be ranked in the case of basketball include chances, charges, closeouts, drives, frequencies, handoffs, isolations, lineups, matches, picks, plays, possessions, postups, primary defenders, rebounding (main and raw), off ball screens, shooting, speed/load and transitions.

The Rankings UI makes it easy for a user to understand relative quality of one row item versus other row items, along any metric. Each metric may be displayed in a column, and that row's ranking within the distribution of values for that metrics may be displayed for the user. Color coding makes it easy for the user to understand relative goodness.

FIGS. 6A-6B show a set of filters in the UI, which can be used to filter particular items to obtain greater levels of detail or selected sets of results. Filters may exist for seasons, games, home teams, away teams, earliest and latest date, postseason/regular season, wins/losses, offense home/away, offensive team, defensive team, layers on the court for offense/defense, players off court for offense/defense, locations, offensive or defensive statistics, score differential, periods, time remaining, after timeout play start, transition/no transition, and various other features. The filters 602 for offense may include selections for the ballhandler, the ballhandler position, the screener, the screener position, the ballhandler outcome, the screener outcome, the direction, the type of pick, the type of pop/roll, the direction of the pop/roll, and presence of the play (e.g., on the wing or in the middle). Many other examples of filters are possible, as a filter can exist for any type of parameter that is tracked with respect to an event that is extracted by the system or that is in the spatiotemporal data set used to extract events. The present disclosure also allows situational comparisons. The user interface allows a user to search for a specific player that may fit into offense. The highly accurate dataset and easy to use interface allow the user to compare similar players in similar situations. The user interface may allow the user to explore player tendencies. The user interface may allow locating shot locations and also may provide advanced search capabilities.

Filters enable users to subset the data in a large number of ways and immediately receive metrics calculated on the subset. Using multiple loops for convergence in machine learning enables the system to return the newly filtered data and metrics in real-time, whereas existing methods would require minutes to re-compute the metrics given the filters, leading to inefficient exploration loops (FIG. 3). Given that the data exploration and investigation process often requires many loops, these inefficiencies can otherwise add up quickly.

As illustrated with reference to FIGS. 6A-6B, there are many filters that may enable a user to select specific situations of interest to analyze. These filters may be categorized into logical groups, including, but not limited to, Game, Team, Location, Offense, Defense, and Other. The possible filters may automatically change depending on the type of event being analyzed, for example, Shooting, Rebounding, Picks, Handoffs, Isolations, Postups, Transitions, Closeouts, Charges, Drives, Lineups, Matchups, Play Types, Possessions.

For all event types, under the Game category, filters may include Season, specific Games, Earliest Date, Latest Date, Home Team, Away Team, where the game is being played Home/Away, whether the outcome was Wins/Losses, whether the game was a Playoff game, and recency of the game.

For all event types, under the Team category, filters may include Offensive Team, Defensive Team, Offensive Players on Court, Defenders Players on Court, Offensive Players Off Court, Defenders Off Court.

For all event types, under the Location category, the user may be given a clickable court map that is segmented into logical partitions of the court. The user may then select any number of these partitions in order to filter only events that occurred in those partitions.

For all event types, under the Other category, the filters may include Score Differential, Play Start Type (Multi-Select: Field Goal ORB, Field Goal DRB, Free Throw ORB, Free Throw DRB, Jump Ball, Live Ball Turnover, Defensive Out of Bounds, Sideline Out of Bounds), Periods, Seconds Remaining, Chance After Timeout (T/F/ALL), Transition (T/F/ALL).

For Shooting, under the Offense category, the filters may include Shooter, Position, Outcome (Made/Missed/All), Shot Value, Catch and Shoot (T/F/ALL), Shot Distance, Simple Shot Type (Multi-Select: Heave, Angle Layup, Driving Layup, Jumper, Post), Complex Shot Type (Multi-Select: Heave, Lob, Tip, Standstill Layup, Cut Layup, Driving Layup, Floater, Catch and Shoot), Assisted (T/F/ALL), Pass From (Player), Blocked (T/F/ALL), Dunk (T/F/ALL), Bank (T/F/ALL), Goaltending (T/F/ALL), Shot Attempt Type (Multi-select: FGA No Foul, FGM Foul, FGX Foul), Shot SEFG (Value Range), Shot Clock (Range), Previous Event (Multi-Select: Transition, Pick, Isolation, Handoff, Post, None).

For Shooting, under the Defense category, the filters may include Defender Position (Multi-Select: PG, SG, SF, PF, CTR), Closest Defender, Closest Defender Distance, Blocked By, Shooter Height Advantage.

For Picks, under the Offense category, the filters may include Ballhandler, Ballhandler Position, Screener, Screener Position, Ballhandler Outcome (Pass, Shot, Foul, Turnover), Screener Outcome (Pass, Shot, Foul, Turnover), Direct or Indirect Outcome, Pick Type (Reject, Slip, Pick), Pop/Roll, Direction, Wing/Middle, Middle/Wing/Step-Up.

For Picks, under the Defense category, the filters may include Ballhandler Defender, Ballhandler Defender Position, Screener Defender, Screener Defender Position, Ballhandler Defense Type (Over, Under, Blitz, Switch, Ice), Screener Defense Type (Soft, Show, Ice, Blitz, Switch), Ballhandler Defense (Complex) (Over, Under, Blitz, Switch, Ice, Contain Trap, Weak), Screener Defense (Complex) (Over, Under, Blitz, Switch, Ice, Contain Trap, Weak, Up to Touch).

For Drives, under the Offense category, the filters may include Ballhandler, Ballhandler Position, Ballhandler Outcome, Direct or Indirect, Drive Category (Handoff, Iso, Pick, Closeout, Misc.), Drive End (Shot Near Basket, Pullup, Interior Pass, Kickout, Pullout, Turnover, Stoppage, Other), Direction, Blowby (T/F).

For Drives, under the Defense category, the filters may include Ballhandler Defender, Ballhandler Defender Position, Help Defender Present (T/F), Help Defenders.

For most other events, under the Offense category, the filters may include Ballhandler, Ballhandler Position, Ballhandler Outcome, Direct or Indirect.

For most other events, under the Defense category, the filters may include Ballhandler Defender, Ballhandler Defender Position.

For Postups, under the Offense category, the filters may additionally include Area (Left, Right, Middle).

For Postups, under the Defense category, the filters may additionally include Double Team (T/F).

Figure 7:
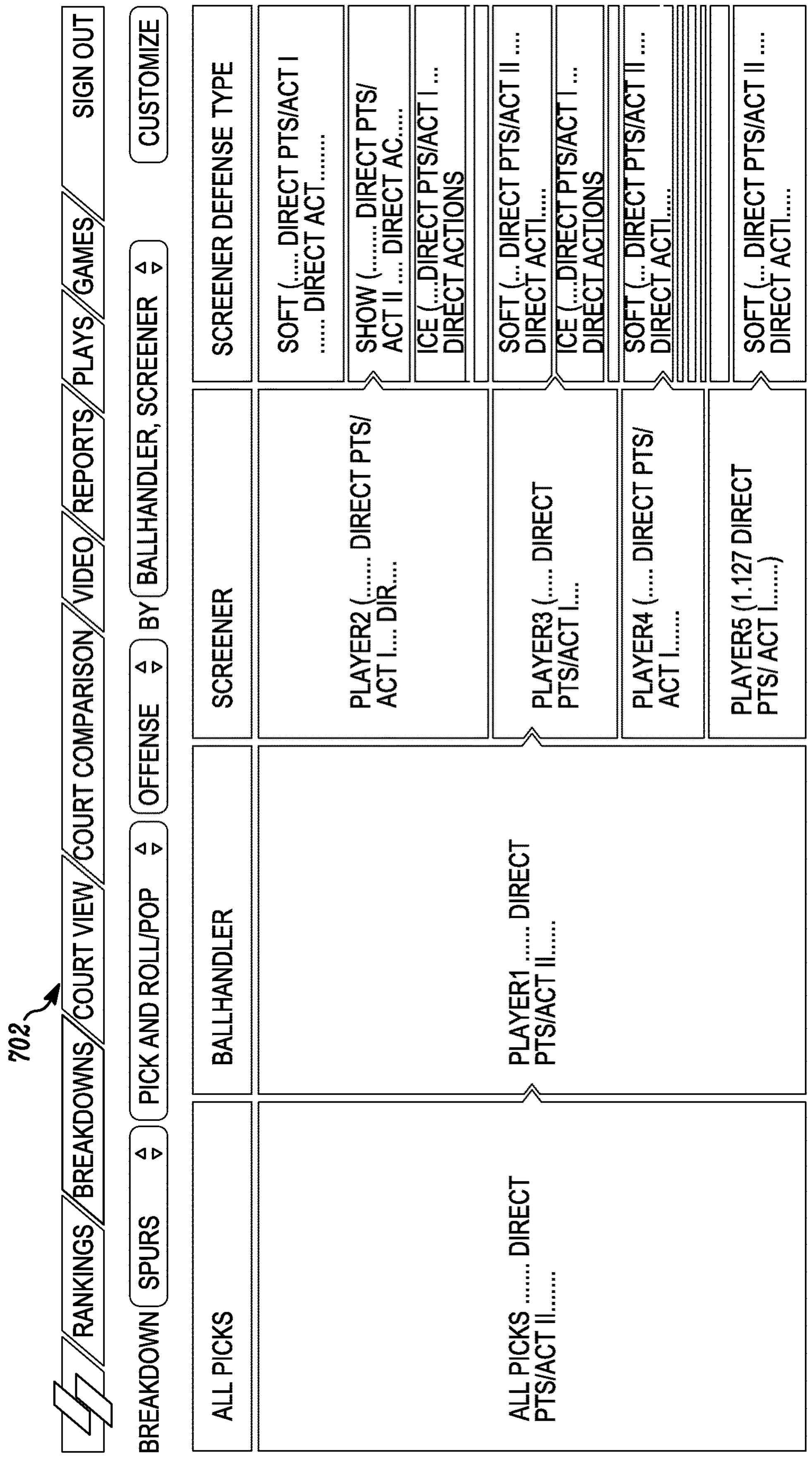
FIG. 7 illustrates a breakdown user interface according to an exemplary and non-limiting embodiment.

The present disclosure provides detailed analysis capabilities, such as through the depicted user interface embodiment of FIG. 7. In an example depicted in FIG. 7, the user interface may be used to know if a player should try and ice the pick and roll or not between two players. Filters can go from all picks, to picks involving a selected player as ballhandler, to picks involving that ballhandler with a certain screener, to the type of defense played by that screener. By filtering down to particular matchups (by player combinations and actions taken), the system allows rapid exploration of the different options for coaches and players, and selection of preferred actions that had the best outcomes in the past. Among other things, the system may give a detailed breakdown of a player's opponent and a better idea of what to expect during a game. The user interface may be used to know and highlight opponent capabilities. A breakdowns UI may make it easy for a user to drill down to a specific situation, all while gaining insight regarding frequency and efficacy of relevant slices through the data.

Figure 8:
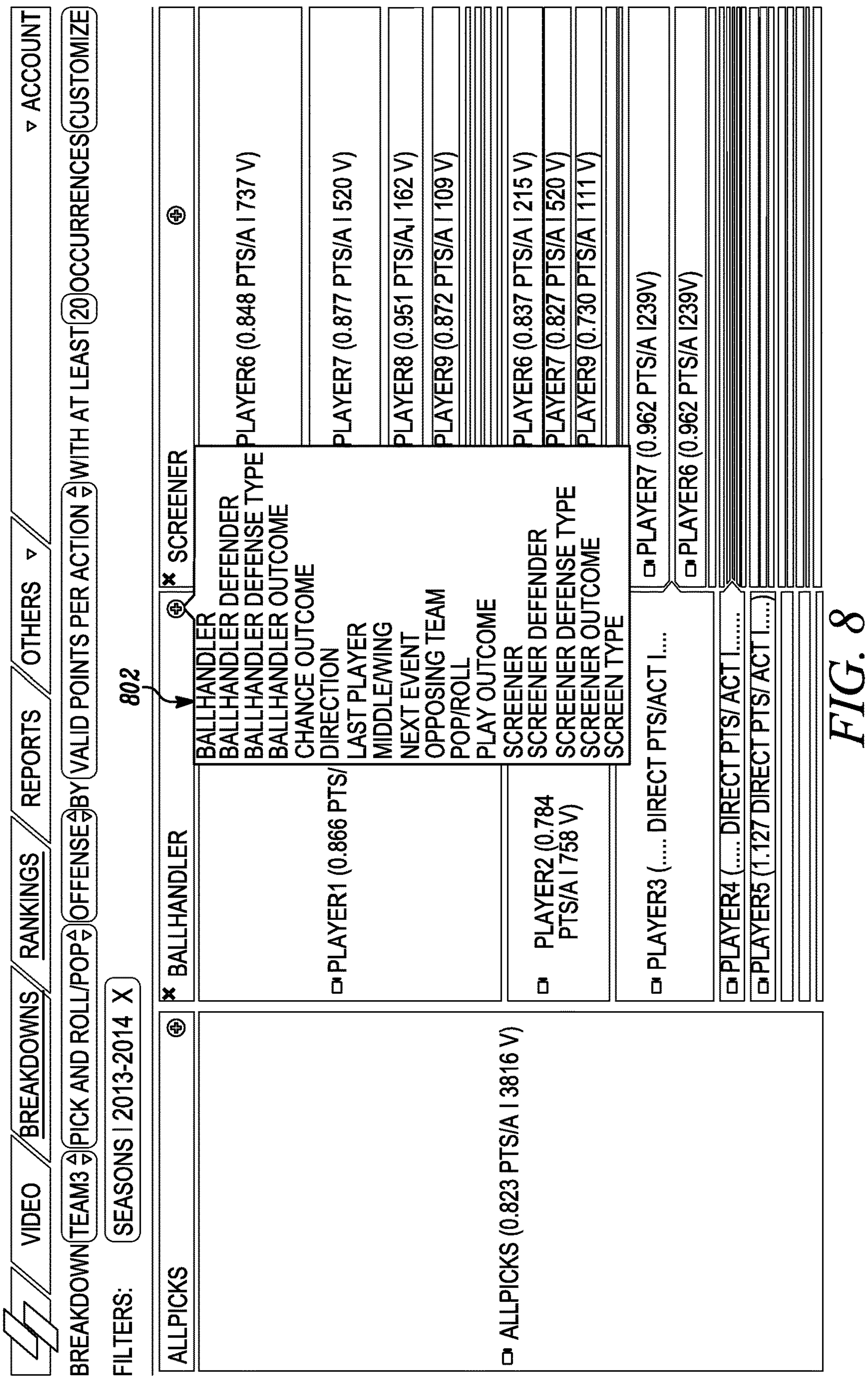
FIG. 8 illustrates a breakdown user interface according to an exemplary and non-limiting embodiment.
Figure 9:
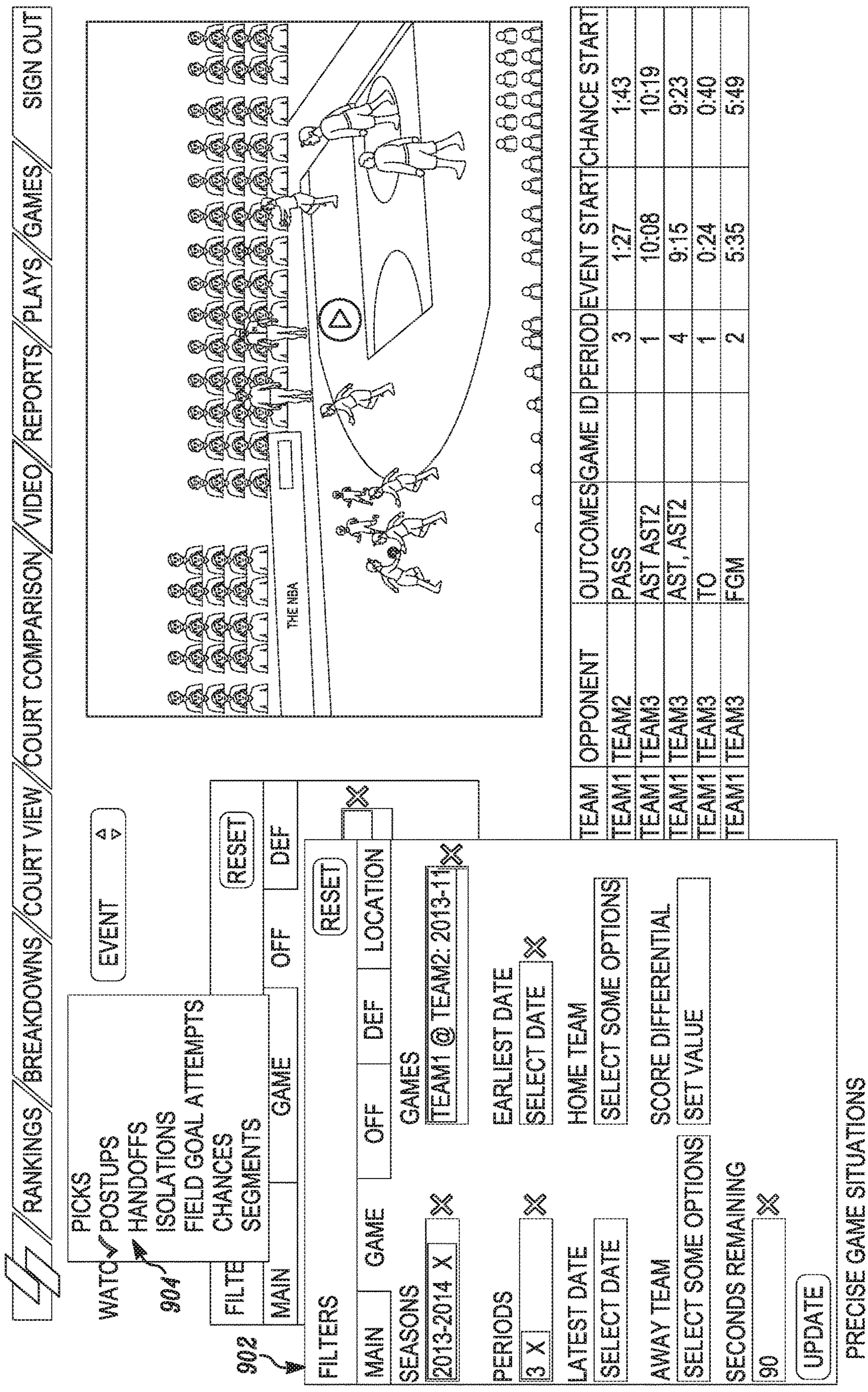
FIG. 9 illustrates a personalized user interface according to an exemplary and non-limiting embodiment.
Figure 10:
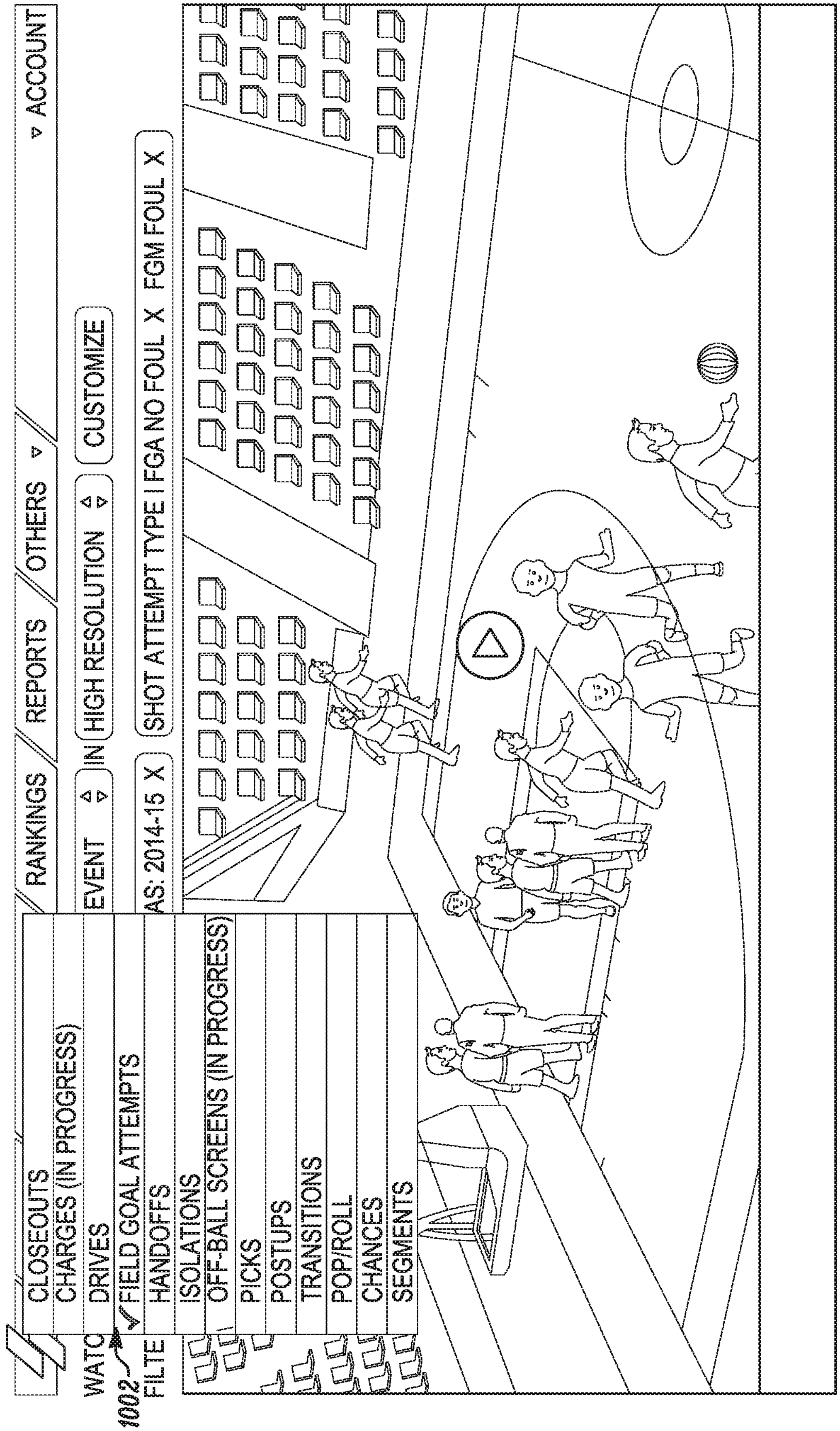
FIG. 10 illustrates an alternative video user interface according to an exemplary and non-limiting embodiment.

The events captured by the present system may be capable of being manipulated using the UI. FIG. 8 shows a visualization, where a dropdown feature 802 allows a user to select various parameters related to the ballhandler, such as to break down to particular types of situations involving that ballhandler. These types of "breakdowns" facilitate improved interactivity with video data, including enhanced video data created with the methods and systems disclosed herein. Most standard visualizations are static images. For large and complex datasets, especially in cases where the questions to be answered are unknown beforehand, interactivity enables the user to explore the data, ask new questions, get new answers. Visualizations may be color coded good (e.g., orange) to bad (e.g., blue) based on outcomes in particular situations for easy understanding without reading the detailed numbers. Elements like the sizes of partitions can be used, such as to denote frequency. Again, a user can comprehend significance from a glance. In embodiments, each column represents a variable for partitioning the dataset. It is easy for a user to add, remove, and re-arrange columns by clicking and dragging. This makes it easy to experiment with different visualizations. Furthermore, the user can drill into a particular scenario by clicking on the partition of interest, which zooms into that partition, and redraws the partitions in the columns to the right so that they are re-scaled appropriately. This enables the user to view the relative sample sizes of the partitions in columns to the right, even when they are small relative to all possible scenarios represented in columns further to the left. In embodiments, a video icon takes a user to video clips of the set of plays that correspond to a given partition. Watching the video gives the user ideas for other variables to use for partitioning.

Various interactive visualizations may be created to allow users to better understand insights that arise from the classification and filtering of events, such as ones that emphasize color coding for easy visual inspection and detection of anomalies (e.g. a generally good player with lots of orange but is bad/blue in one specific dimension). Conventionally, most standard visualizations are static images. However, for large and complex datasets, especially in cases where the questions to be answered are unknown beforehand, interactivity enables the user to explore the data, ask new questions, get new answers. For example, a breakdown view may be color coded good (orange) to bad (blue) for easy understanding without reading the numbers. Sizes of partitions may denote the frequency of events. Again, one can comprehend from a glance the events that occur most frequently. Each column of a visualization may represent a variable for partitioning the dataset. It may be easy to add, remove, and re-arrange columns by clicking and dragging. This makes it easy to experiment with possible visualizations. In embodiments, a video icon may take a user to video clips, such as of the set of plays that correspond to that partition. Watching the video gives the user ideas for other variables to use for partitioning.

In embodiments, a ranking view is provided. Upon moussing over each row of a ranking view, histograms above each column may give the user a clear contextual understanding that row's performance for each column variable. The shape of a distribution is often informative. Color-coded bars within each cell may also provide a view of each cell's performance that is always available, without moussing over. Alternatively, the cells themselves may be color-coded.

The system may provide a personalized video in embodiments of the methods and systems described herein. For example, with little time to scout the opposition, the system can provide a user relevant information to quickly prepare the team. The team may rapidly retrieve the most meaningful plays, cut, and compiled to specific needs of players. The system may provide immediate video cut-ups. In embodiments, the present disclosure provides a video that is synchronized with identified actions. For example, if spatiotemporal machine learning identifies a segment of a video as showing a pick and roll involving two players, then that video segment may be tagged, so that when that event is found (either by browsing or by filtering to that situation), the video can be displayed. Because the machine understands the precise moment that an event occurs in the video, a user-customizable segment of video can be created. For example, the user can retrieve video corresponding to x seconds before, and y seconds after, each event occurrence. Thus, the video may be tagged and associated with events. The present disclosure may provide a video that may allow customization by numerous filters of the type disclosed above, relating to finding a video that satisfies various parameters, that displays various events, or combinations thereof. For example, in embodiments, an interactive interface provided by the present disclosure allows watching videos clips for specific game situations or actions.

Reports may provide a user with easy access to printable pages summarizing pre-game information about an opponent, scouting report for a particular player, or a post-game summary. For example, the reports may collect actionable useful information in one to two easy-to-digest pages. These pages may be automatically scheduled to be sent to other staff members, e.g. post-game reports sent to coaches after each game. Referring to FIG. 11, a report may include statistics for a given player, as well as visual representations, such as of locations 1102 where shots were taken, including shots of a particular type (such as catch and shoot shots).

Figure 12:
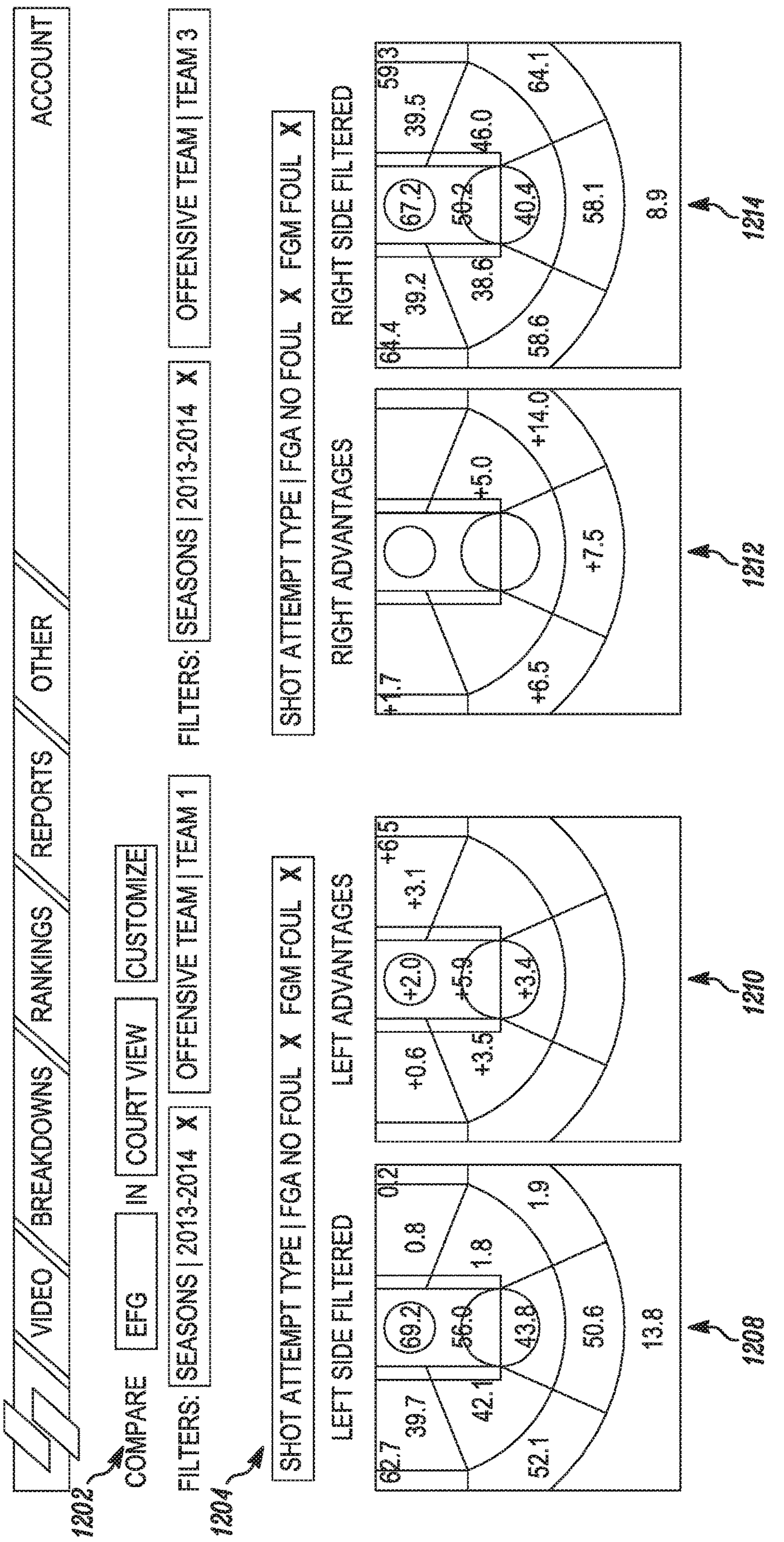
FIG. 12 illustrates a court comparison view according to an exemplary and non-limiting embodiment.

The UI as illustrated in FIG. 12 provides a court comparison view 1202 among several parts of a sports court (and can be provided among different courts as well). For example, filters 1204 may be used to select the type of statistic to show for a court. Then statistics can be filtered to show results filtered by left side 1208 or right side 1214. Where the statistics indicate an advantage, the advantages can be shown, such as of left side advantages 1210 and right side advantages 1212.

In sports, the field of play is an important domain constant or elements. Many aspects of the game are best represented for comparison on a field of play. In embodiments, a four court comparison view 1202 is a novel way to compare two players, two teams, or other entities, to gain an overview view of each player/team (Leftmost and Rightmost figures 1208, 1214) and understand each one's strengths/weaknesses (Left and Right Center figures 1210, 1212).

Figure 13:
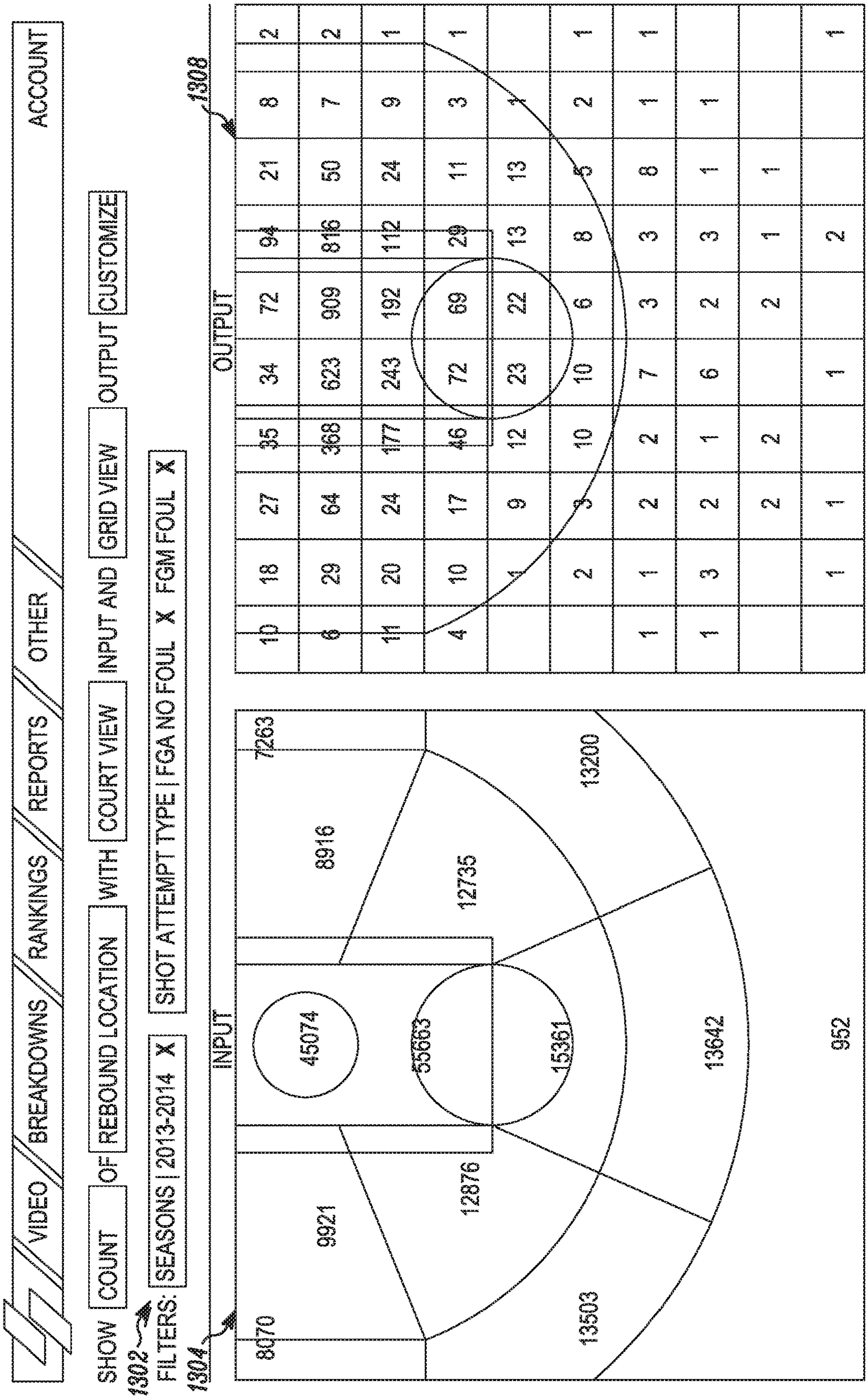
FIG. 13 illustrates a court view according to an exemplary and non-limiting embodiment.

The court view UI 1302 as illustrated in FIG. 13 provides a court view 1304 of a sport arena 1304, in accordance with an embodiment of the present disclosure. Statistics for very specific court locations can be presented on a portion 1308 of the court view. The UI may provide a view of custom markings, in accordance with an embodiment of the present invention.

Referring to FIG. 14, filters may enable users to subset the data in a large number of ways, and immediately receive metrics calculated on the subset. Descriptions of particular events may be captured and made available to users.

Figure 15:
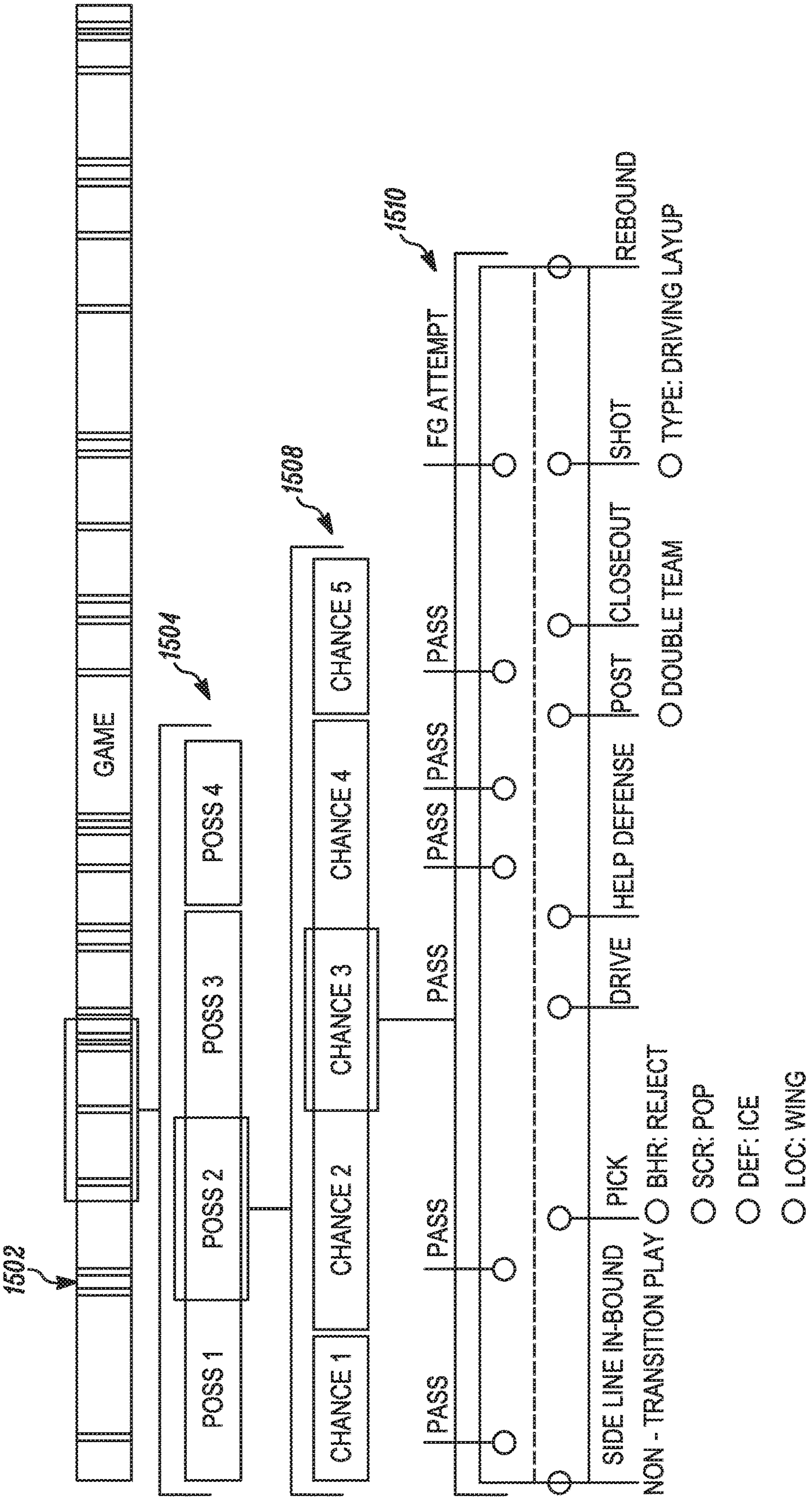
FIG. 15 illustrates a detailed depiction of a game according to an exemplary and non-limiting embodiment.

Various events may be labeled in a game, as reflected in FIG. 15, which provides a detailed view of a timeline 1502 of a game, broken down by possession 1504, by chances 1508, and by specific events 1510 that occurred along the timeline 1502, such as determined by spatiotemporal pattern recognition, by human analysis, or by a combination of the two. Filter categories available by a user interface of the present disclosure may include ones based on seasons, games, home teams, away teams, earliest date, latest date, postseason/regular season, wins/losses, offense home/away, offensive team, defensive team, players on the court for offense/defense, players off court for offense/defense, location, score differential, periods, time remaining, play type (e.g., after timeout play) and transition/no transition. Events may include ones based on primitive markings, such as shots, shots with a corrected shot clock, rebounds, passes, possessions, dribbles, and steals, and various novel event types, such as SEFG (shot quality), EFG+, player adjusted SEFG, and various rebounding metrics, such as positioning, opportunity percentage, attack, conversion percentage, rebounding above position (RAP), attack+, conversion+ and RAP+. Offensive markings may include simple shot types (e.g., angled layup, driving layup, heave, post shot, jumper), complex shot types (e.g., post shot, heave, cut layup, standstill layup, lob, tip, floater, driving layup, catch and shoot stationary, catch and shoot on the move, shake & raise, over screen, pullup and stepback), and other information relating to shots (e.g., catch and shoot, shot clock, 2/3S, assisted shots, shooting foul/not shooting foul, made/missed, blocked/not blocked, shooter/defender, position/defender position, defender distance and shot distance). Other events that may be recognized, such as through the spatiotemporal learning system, may include ones related to picks (ballhandler/screener, ballhandler/screener defender, pop/roll, wing/middle, step-up screens, reject/slip/take, direction (right/left/none), double screen types (e.g., double, horns, L, and handoffs into pick), and defense types (ice, blitz, switch, show, soft, over, under, weak, contain trap, and up to touch), ones related to handoffs (e.g., receive/setter, receiver/setter defender, handoff defense (ice, blitz, switch, show, soft, over, or under), handback/dribble handoff, and wing/step-up/middle), ones related to isolations (e.g., ballhandler/defender and double team), and ones related to post-ups (e.g., ballhandler/defender, right/middle/left and double teams).

Defensive markings are also available, such as ones relating to closeouts (e.g. ballhandler/defender), rebounds (e.g., players going for rebounds (defense/offense)), pick/handoff defense, post double teams, drive blow-bys and help defender on drives), ones relating to off ball screens (e.g., screener/cutter and screener/cutter defender), ones relating to transitions (e.g. when transitions/fast breaks occur, players involved on offense and defense, and putback/no putback), ones relating to how plays start (e.g., after timeout/not after timeout, sideline out of bounds, baseline out of bounds, field goal offensive rebound/defensive rebound, free throw offensive rebound/defensive rebound and live ball turnovers), and ones relating to drives, such as ballhandler/defender, right/left, blowby/no blowby, help defender presence, identity of help defender, drive starts (e.g., handoff, pick, isolation or closeout) and drive ends (e.g., shot near basket, interior pass, kickout, pullup, pullout, stoppage, and turnover). These examples and many others from basketball and other sports may be defined, based on any understanding of what constitutes a type of event during a game. Markings may relate to off ball screens (screener/cutter), screener/cutter defender, screen types (down, pro cut, UCLA, wedge, wide pin, back, flex, clip, zipper, flare, cross, and pin in).

Figure 16:
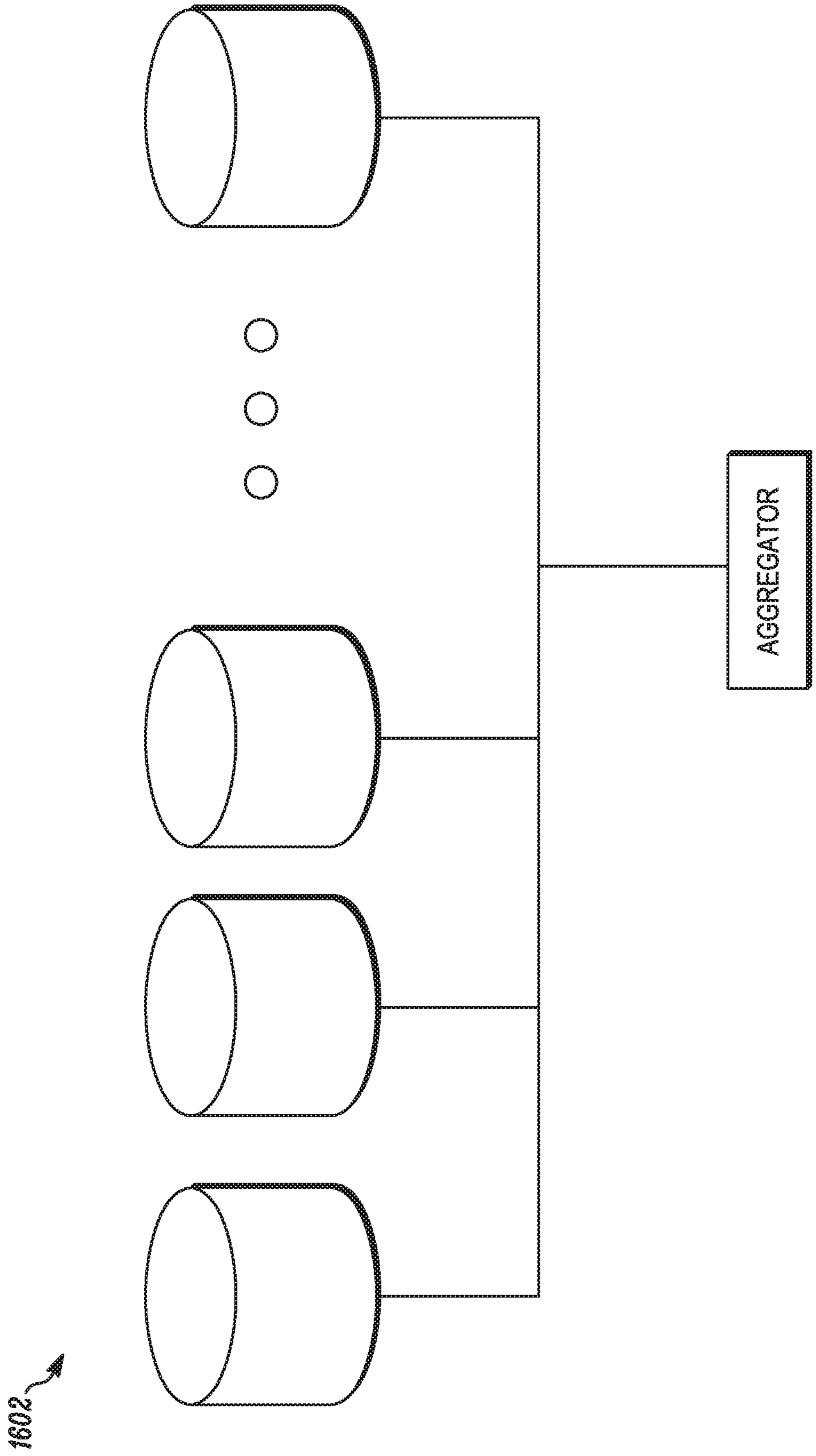
FIG. 16 illustrates querying and aggregation according to an exemplary and non-limiting embodiment.

FIG. 16 shows a system 1602 for querying and aggregation. In embodiments, data is divided into small enough shards that each worker has low latency response time. Each distributed machine may have multiple workers corresponding to the number of processes the machine can support concurrently. Query results never rely on more than one shard, since we enforce that events never cross quarter/period boundaries. Aggregation functions all run incrementally rather than in batch process, so that as workers return results, these are incorporated into the final answer immediately. To handle results such as rankings pages, where many rows must be returned, the aggregator uses hashes to keep track of the separate rows and incrementally updates them.

Figure 17:
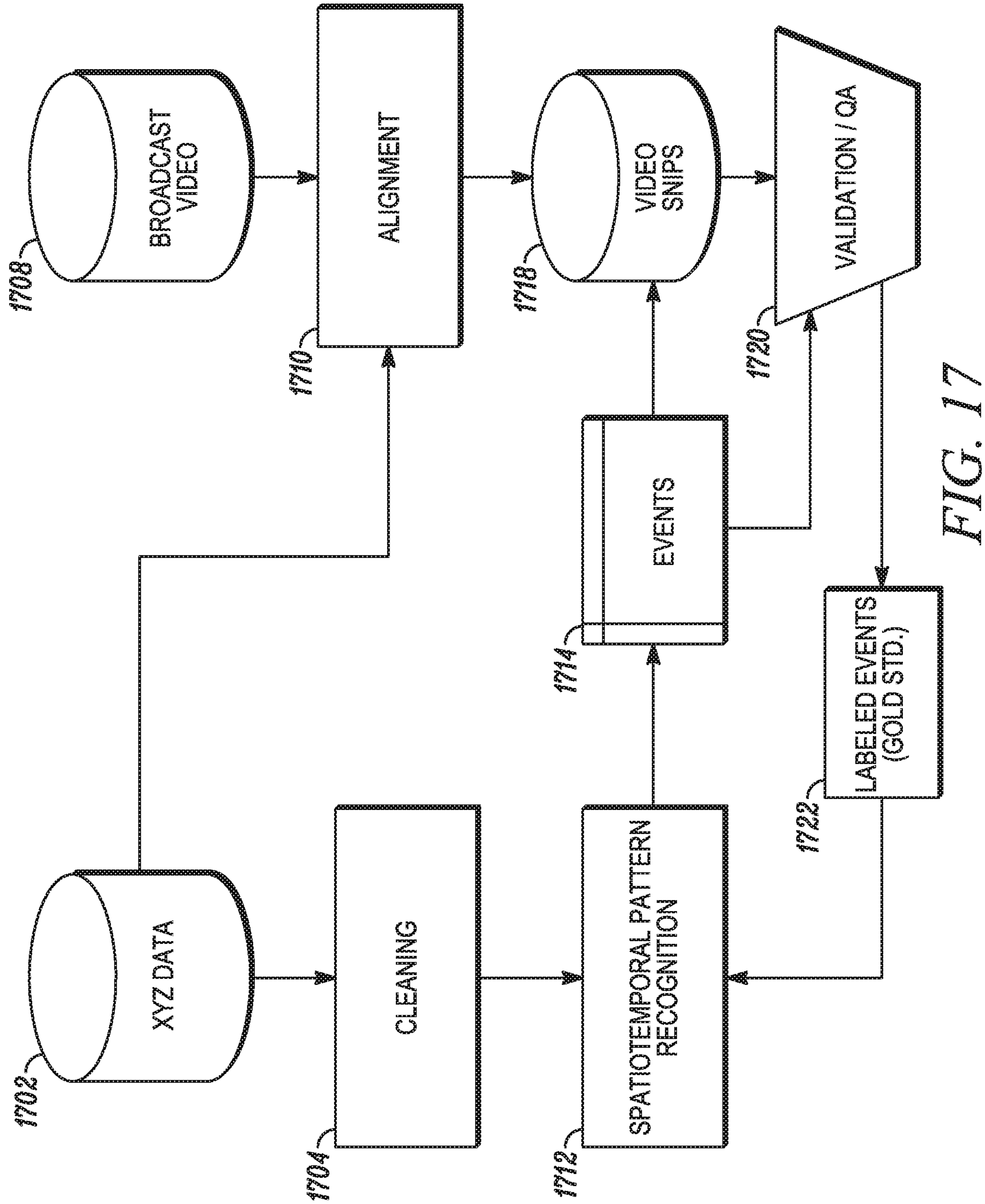
FIG. 17 illustrates a hybrid classification process flow according to an exemplary and non-limiting embodiment.

FIG. 17 shows a process flow for a hybrid classification process that uses human labelers together with machine learning algorithms to achieve high accuracy. This is similar to the flow described above in connection with FIG. 2, except with the explicit inclusion of the human-machine validation process. By taking advantage of aligned video as described herein, one may provide an optimized process for human validation of machine labeled data. Most of the components are similar to those described in connection with FIG. 2 and in connection with the description of aligned video, such as the XYZ data source 1702, cleaning process 1704, spatiotemporal pattern recognition module 1712, event processing system 1714, video source 1708, alignment facility 1710 and video snippets facility 1718. Additional components include a validation and quality assurance process 1720 and an event-labeling component 1722. Machine learning algorithms are designed to output a measure of confidence. For the most part, this corresponds to the distance from a separating hyperplane in the feature space. In embodiments, one may define a threshold for confidence. If an example is labeled by the machine and has confidence above the threshold, the event goes into the canonical event datastore 210 and nothing further is done. If an example has a confidence score below the threshold, then the system may retrieve the video corresponding to this candidate event, and ask a human operator to provide a judgment. The system asks two separate human operators for labels. If the given labels agree, the event goes into the canonical event datastore 210. If they do not, a third person, known as the supervisor, is contacted for final opinion. The supervisor's decision may be final. The canonical event datastore 210 may contain both human marked and completely automated markings. The system may use both types of marking to further train the pattern recognition algorithms. Event labeling is similar to the canonical event datastore 210, except that sometimes one may either 1) develop the initial gold standard set entirely by hand, potentially with outside experts, or 2) limit the gold standard to events in the canonical event datastore 210 that were labeled by hand, since biases may exist in the machine labeled data.

FIG. 18 shows test video input for use in the methods and systems disclosed herein, including views of a basketball court from simulated cameras, both simulated broadcast camera views 1802, as well as purpose-mounted camera views 1804.

Figure 19:
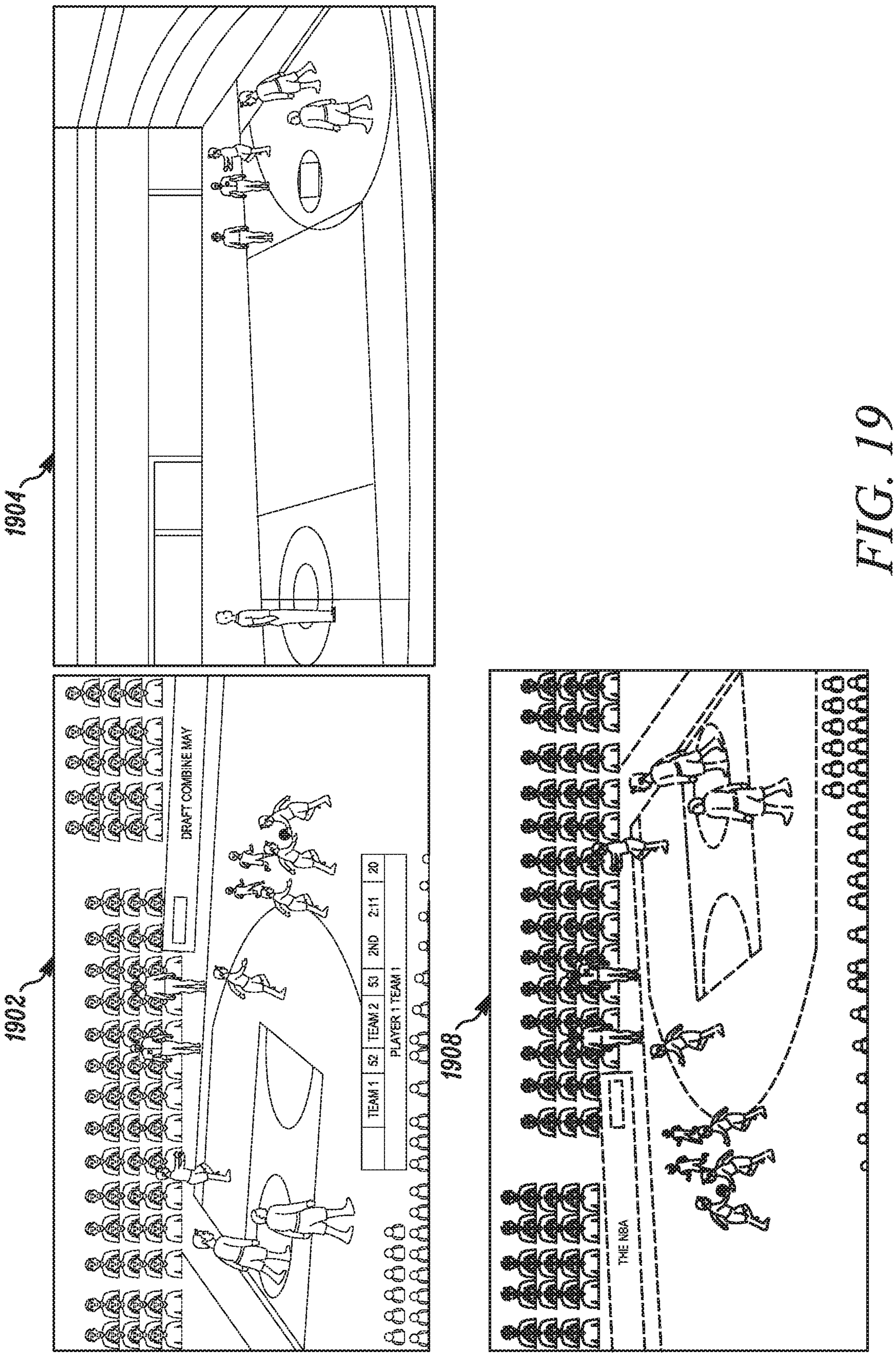
FIG. 19 illustrates test inputs according to an exemplary and non-limiting embodiment.
Figure 20:
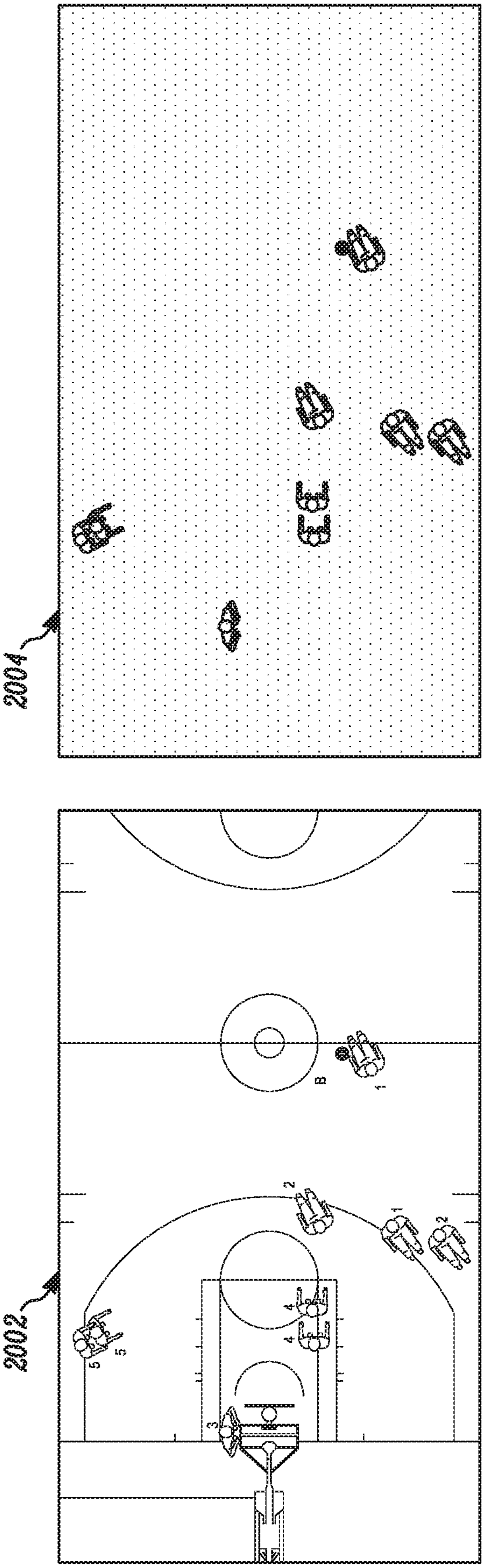
FIG. 20 illustrates player detection according to an exemplary and non-limiting embodiment.

FIG. 19 shows additional test video input for use in the methods and systems disclosed herein, including input from broadcast video 1902 and from purpose-mounted cameras 1904 in a venue. Referring to FIG. 20, probability maps 2004 may be computed based on likelihood there is a person standing at each x, y location.

Figure 21:
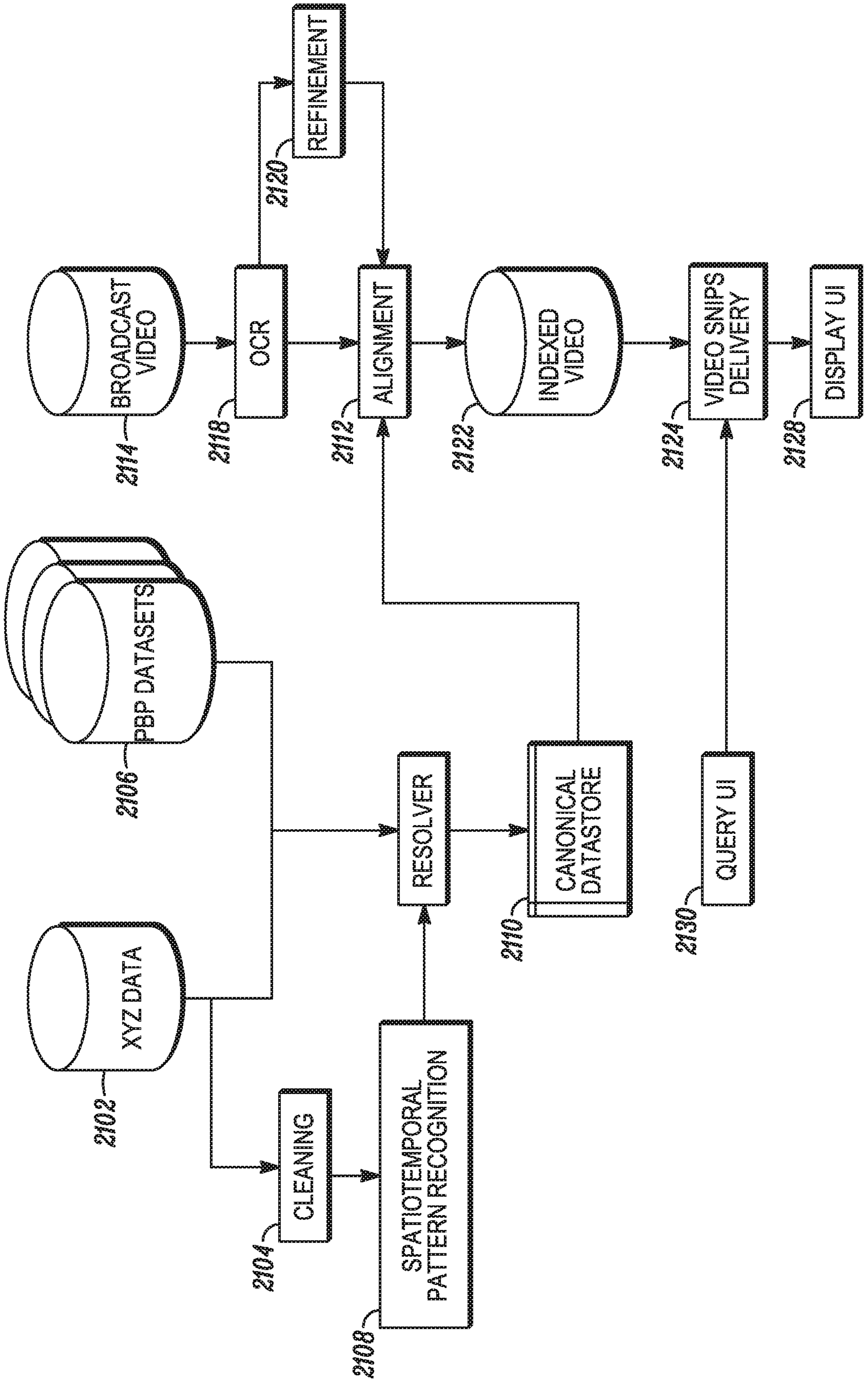
FIG. 21 illustrates a process flow according to an exemplary and non-limiting embodiment.

FIG. 21 shows a process flow of an embodiment of the methods and systems described herein. Initially, in an OCR process 2118, machine vision techniques are used to automatically locate the "score bug" and determine the location of the game clock, score, and quarter information. This information is read and recognized by OCR algorithms. Post-processing algorithms using various filtering techniques are used to resolve issues in the OCR. Kalman filtering/HMMs used to detect errors and correct them. Probabilistic outputs (which measure degree of confidence) assist in this error detection/correction. Next, in a refinement process 2120, sometimes, a score bug is non-existent or cannot be detected automatically (e.g. sometimes during PIP or split screens). In these cases, remaining inconsistencies or missing data is resolved with the assistance of human input. Human input is designed to be sparse so that labelers do not have to provide input at every frame. Interpolation and other heuristics are used to fill in the gaps. Consistency checking is done to verify game clock. Next, in an alignment process, 2112 the Canonical Datastore 2110 (referred to elsewhere in this disclosure alternatively as the event datastore) contains a definitive list of events that the system knows occurred during a game. This includes events extracted from the XYZ data 2102, such as after cleansing 2104 and spatiotemporal pattern recognition 2108, as well as those specified by third-party sources such as player-by-player data sets 2106, such as available from various vendors. Differences among the data sources can be resolved, such as by a resolver process. The events in the canonical datastore 2110 may have game clock times specified for each event. Depending on the type of event, the system knows that the user will be most likely to be interested in a certain interval of game play tape before and after that game clock. The system can thus retrieve the appropriate interval of video for the user to watch.

One challenge pertains to the handling of dead ball situations and other game clock stoppages. The methods and systems disclosed herein include numerous novel heuristics to enable computation of the correct video frame that shows the desired event, which has a specified game clock, and which could be before or after the dead ball since those frames have the same game clock. The game clock is typically specified only at the one-second level of granularity, except in the final minute of each quarter.

Another advance is to use machine vision techniques to verify some of the events. For example, video of a made shot will typically show the score being increased, or will show a ball going through a hoop. Either kind of automatic observation serves to help the alignment process result in the correct video frames being shown to the end user.

Next, in a query UI component 2130, the UI enables a user to quickly and intuitively request all video clips associated with a set of characteristics: player, team, play type, ballhandler, ballhandler velocity, time remaining, quarter, defender, etc. In addition, when a user is watching a video clip, the user can request all events that are similar to whatever just occurred in the video. The system uses a series of cartoon-like illustration to depict possible patterns that represent "all events that are similar." This enables the user to choose the intended pattern, and quickly search for other results that match that pattern.

Next, the methods and systems may enable delivery of enhanced video, or video snips 2124, which may include rapid transmission of clips from stored data in the cloud. The system may store video as chunks (e.g., one minute chunks), such as in AWS S3, with each subsequent file overlapping with a previous file, such as by 30 seconds. Thus, each video frame may be stored twice. Other instantiations of the system may store the video as different sized segments, with different amounts of overlap, depending on the domain of use. In embodiments, each video file is thus kept at a small size. The 30-second duration of overlap may be important because most basketball possessions (or chances in our terminology) do not last more than 24 seconds. Thus, each chance can be found fully contained in one video file, and in order to deliver that chance, the system does not need to merge content from multiple video files. Rather, the system simply finds the appropriate file that contains the entire chance (which in turn contains the event that is in the query result), and returns that entire file, which is small. With the previously computed alignment index, the system is also able to inform the UI to skip ahead to the appropriate frame of the video file in order to show the user the query result as it occurs in that video file. This delivery may occur using AWS S3 as the file system, the Internet as transport, and a browser-based interface as the UI. It may find other instantiations with other storage, transport, and UI components.

Figure 22:
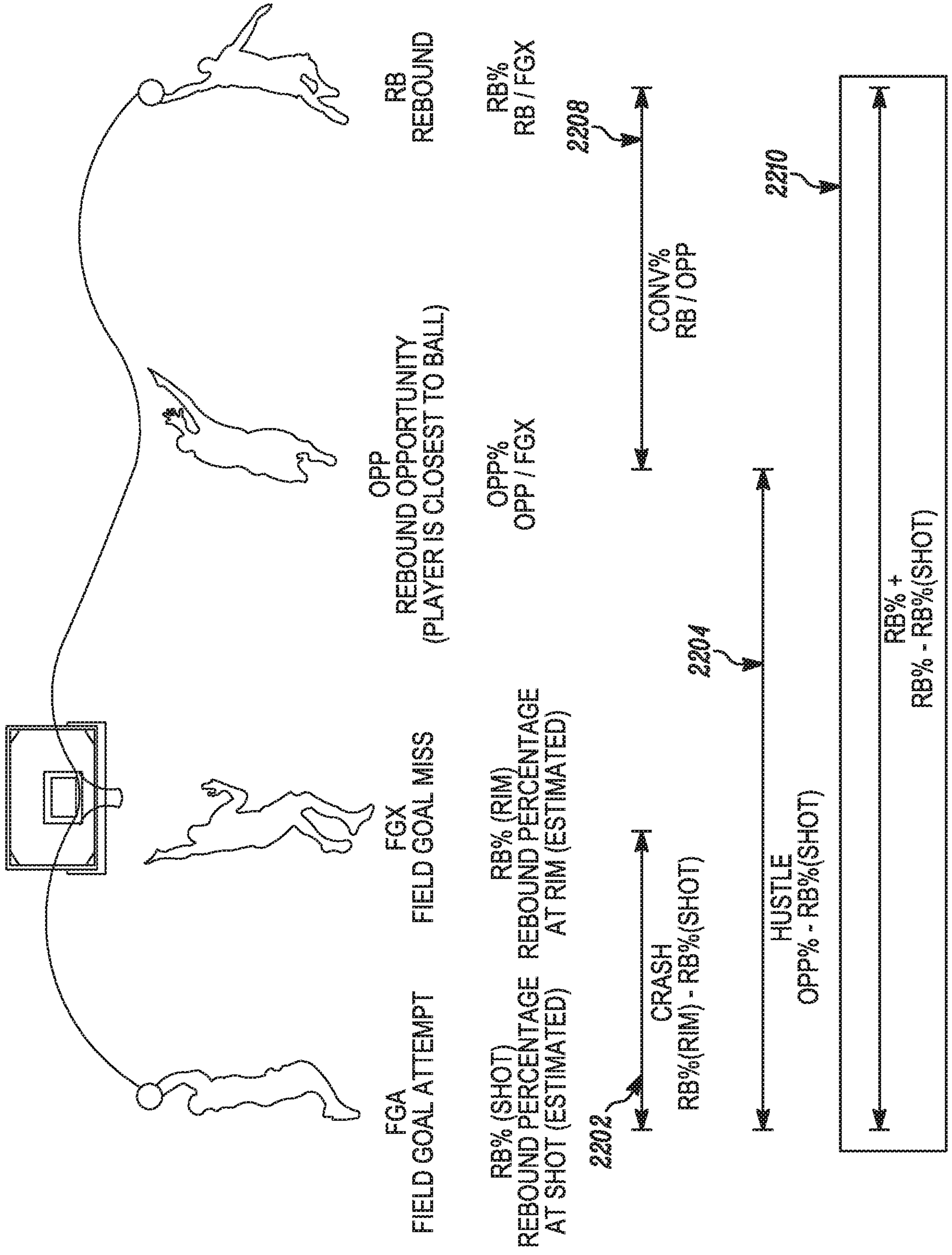
FIG. 22 illustrates rebounding according to an exemplary and non-limiting embodiment.

FIG. 22 shows certain metrics that can be extracted using the methods and systems described herein, relating to rebounding in basketball. These metrics include positioning metrics, attack metrics, and conversion metrics. For positioning, the methods and systems described herein first address how to value the initial position of the players when the shot is taken. This is a difficult metric to establish. The methods and systems disclosed herein may give a value to the real estate that each player owns at the time of the shot. This breaks down into two questions: (1) what is the real estate for each player? (2) what is it worth? To address the first question, one may apply the technique of using Voronoi (or Dirichlet) tessellations. Voronoi tessellations are often applied to problems involving spatial allocation. These tessellations partition a space into Voronoi cells given a number of points in that space. For any point, it is the intersection of the self-containing halfspaces defined by hyper-planes equidistant from that point to all other points. That is, a player's cell is all the points on the court that are closer to the player than any other player. If all players were equally capable they should be able to control any rebound that occurred in this cell. One understands that players are not equally capable however this establishment of real estate is to set a baseline for performance. Over performance or under performance of this baseline will be indicative of their ability. To address the second question, one may condition based on where the shot was taken and calculate a spatial probability distribution of where all rebounds for similar shots were obtained. For each shot attempt, one may choose a collection of shots closest to the shot location that provides enough samples to construct a distribution. This distribution captures the value of the real estate across the court for a given shot. To assign each player a value for initial positioning, i.e., the value of the real estate at the time of the shot, one may integrate the spatial distribution over the Voronoi cell for that player. This yields the likelihood of that player getting the rebound if no one moved when the shot was taken and they controlled their cell. We note that because we use the distribution of location of the rebound conditioned on the shot, it is not a matter of controlling more area or even necessarily area close to the basket, but the most valuable area for that shot. While the most valuable areas are almost always close to the basket, there are some directional effects.

For an attack or hustle metric, one may look at phases following a shot, such as an initial crash phase. To analyze this, one may look at the trajectory of the ball and calculate the time that it gets closest to the center of the rim. At this point, one may reapply the Voronoi-based analysis and calculate the rebound percentages of each player, i.e., the value of the real the estate that each player has at the time the ball hits the rim. The change in this percentage from the time the shot is taken to the time it hits the rim is the value or likelihood the player had added during the phase. Players can add value by crashing the boards, i.e., moving closer to the basket towards places where the rebound is likely to go, or by blocking out, i.e., preventing other players by taking valuable real estate that is already established. A useful, novel metric for the crash phase is generated by subtracting the rebound probability at the shot from the rebound probability at the rim. The issue is that the ability to add probability is not independent from the probability at the shot. Consider a case of a defensive player who plays close to the basket. The player is occupying high value real estate, and once the shot is taken, other players are going to start coming into this real estate. It is difficult for players with high initial positioning value to have positive crash deltas. Now consider a player out by the three-point line. Their initial value is very low and moving any significant distance toward the rim will give them a positive crash delta. Thus, it is not fair to compare these players on the same scale. To address this, one may look at the relationship of the raw crash deltas (the difference between the probability at rim and probability at shot) compared to the probability at shot. In order to normalize for this effect, one may subtract the value of the regression at the player's initial positioning value from the raw crash delta to form the player's Crash value. Intuitively, the value indicates how much more probability is added by this player beyond what a player with similar initial positioning would add. One may apply this normalization methodology to all the metrics the initial positioning affects the other dimensions and it can be beneficial to control for it.

A player has an opportunity to rebound the ball if they are the closest player to the ball once the ball gets below ten feet (or if they possess the ball while it is above ten feet). The player with the first opportunity may not get the rebound so multiple opportunities could be created after a single field goal miss. One may tally the number of field goal misses for which a player generated an opportunity for themselves and divided by the number of field goals to create an opportunity percentage metric. This indicates the percentage of field goal misses for which that player ended up being closest to the ball at some point. The ability for a player to generate opportunities beyond his initial position is the second dimension of rebounding: Hustle. Again, one may then apply the same normalization process as described earlier for Crash.

The reason that there are often multiple opportunities for rebounds for every missed shot is that being closest to the ball does not mean that a player will convert it into a rebound. Thus, the third dimension of rebounding, conversion. The raw conversion metric for players is calculated simply by dividing the number of rebounds obtained by the number of opportunities generated.

Formally, given a shot is described by its 2D coordinates on the court, $s_x$ and $s_y$, which is followed by a rebound r, also described by its coordinates on the court of $r_x$ and $r_y$, one may estimate $P(r_y, r_x|s_x, s_y)$, the probability density of the rebound occurring at each position on the court given its shot location.

This may be accomplished by first discretizing the court into, for example, 156 bins, created by separating the court into 13 equally spaced columns, and 12 equally spaced rows. Then, given some set S of shots from a particular bin, the rebounds from S will be distributed in the bins of the court according to a multinomial distribution. One may then apply maximum likelihood estimation to determine the probability of a rebound in each of the bins of the court, given the training set S. This process may be performed for bins that shots may fall in, giving 156 distributions for the court.

Using these distributions one may determine $P(r_y, r_x|s_x, s_y)$. First, the shot is mapped to an appropriate bin. The probability distribution determined in the previous step is then utilized to determine the probability of the shot being rebounded in every bin of the court. One assumes that within a particular bin, the rebound is uniformly likely to occur in any coordinate. Thus, a probability density of the probability of the rebound falling in the bin is assigned to all points in the bin.

Using the probability density P(r_y, r_x|s_x, s_y), one may determine the probability that each particular player grabs the rebound given their location and the position of the other players on the court.

To accomplish this, one may first create a Voronoi diagram of the court, where the set of points is the location (p_x, p_y) for each player on the court. In such a diagram, each player is given a set of points that they control. Formally one may characterize the set of points that player P_k controls in the following manner, where X is all points on the court, and d denotes the Cartesian distance between 2 points.

$$R_k=\{x\in X|d(x,P_k)\leq d(x,P_j) \text{ for all } j\neq k\}$$

Now there exist the two components for determining the probability that each player gets the rebound given their location, specifically, the shot's location, and the location of all the other players on the court. One may determine this value by assuming that if a ball is rebounded, it will always be rebounded by the closest available player. Therefore, by integrating the probability of a rebound over each location in the player's Voronoi cell, we determine their rebound probability:

$$\int_R P(r_x,r_y|S_x,S_y)\,\mathrm{dxdy}$$

The preceding section describes a method for determining the players rebounding probability, assuming that the players are stationary. However, players often move in order to get into better positions for the rebound, especially when they begin in poor positions. One may account for these phenomena. Let the player's raw rebound probability be denoted by $r_p$ and let d be an indicator variable denoting whether the player is on defense.

One may then attempt to estimate the player's probability of getting a rebound, which we express in the following manner:

$$P(r|rp,d)$$

One does this by performing two linear regressions, one for the offensive side of the ball and one for the defensive. One may attempt to estimate p(r|$r_p$, d) in the following manner:

$$P(r|r_p,d=0)=A_o*r_p+B_o$$

$$P(r|r_p,d=1)=A_d*r_p+B_d$$

This results in four quantities to estimate. One may do this by performing an ordinary least squares regression for offensive and defensive players' overall rebounds in the test set. One may use 1 as a target variable when the player rebounds the ball, and 0 when he does not. This regression is performed for offense to determine $A_o$ and $B_o$ and for defense to determine $A_d$ and $B_d$. One can then use the values to determine the final probability of each player getting the rebound given the shots location and the other players on the court.

Novel shooting metrics can also be created using this system. One is able to determine the probability of a shot being made given various features of the shot s, denoted as F. Formally each shot can be characterized by a feature vector of the following form:

[dist(hoop, shooter), dist(shooter, defender$_0$), |angle (hoop, shooter, defender$_0$)|,|angle(shooter, hoop, hoop$_{other}$), I(shot=catchAndShoot), dist(shooter, defender$_1$)].

Here, the hoop represents the basket the shooter is shooting at, defender$_0$ refers to the closest defender to the shooter, defender$_1$ refers to the second closest defender, and hoop$_{other}$ refers to the hoop on the other end of the court. The angle function refers to the angle between three points, with the middle point serving as the vertex. I(shot=catchAndShoot) is an indicator variable, set to 1 if the shooter took no dribbles in the individual possession before shooting the shot, otherwise set to 0.

Given these features, one seeks to estimate P(s=make). To do this, one may first split the shots into 2 categories, one for where dist(hoop, shooter) is less than 10, and the other for the remaining shots. Within each category one may find coefficients $\beta_0$, $\beta_1$, . . . , $\beta_5$ for the following equation:

$$1/(1+e\hat{\ }(-t))$$

where $$t=F_0*\beta_0+F_1*\beta_1+\ldots+F_5*\beta_5$$

Here, $F_0$ through $F_5$ denote the feature values for the particular shot. One may find the coefficient values $\beta_0$, $\beta_1$, . . . , $\beta_5$ using logistic regression on the training set of shots S. The target for the regression is 0 when the shot is missed and 1 when the shot is made. By performing two regressions, one is able to find appropriate values for the coefficients, for both shots within 10 feet, and longer shots outside 10 feet.

Figure 23:
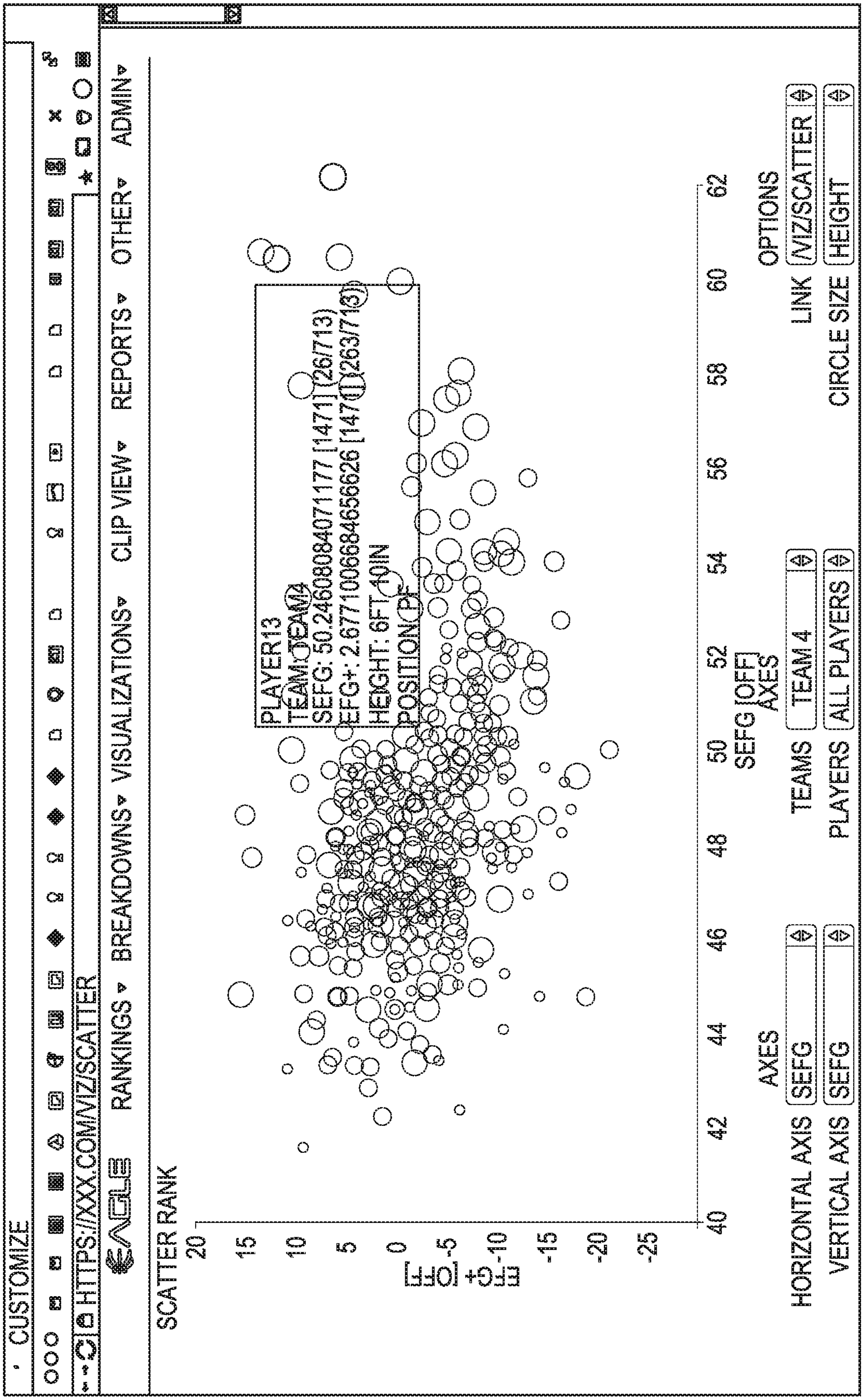
FIG. 23 illustrates scatter rank according to an exemplary and non-limiting embodiment.

As depicted in FIG. 23, three or four dimensions can be dynamically displayed on a 2-D graph scatter rank view 2302, including the x, y, size of the icon, and changes over time. Each dimension may be selected by the user to represent a variable of the user's choice. Also, on mouse-over, related icons may highlight, e.g. moussing over one player may highlight all players on the same team.

As depicted in FIGS. 24A-24B, reports 2402 can be customized by the user so that a team can create a report that is specifically tailored to that team's process and workflow. Another feature is that the report may visually display not only the advantages and disadvantages for each category shown, but also the size of that advantage or disadvantage, along with the value and rank of each side being compared. This visual language enables a user to quickly scan the report and understanding the most important points.

Figure 25:
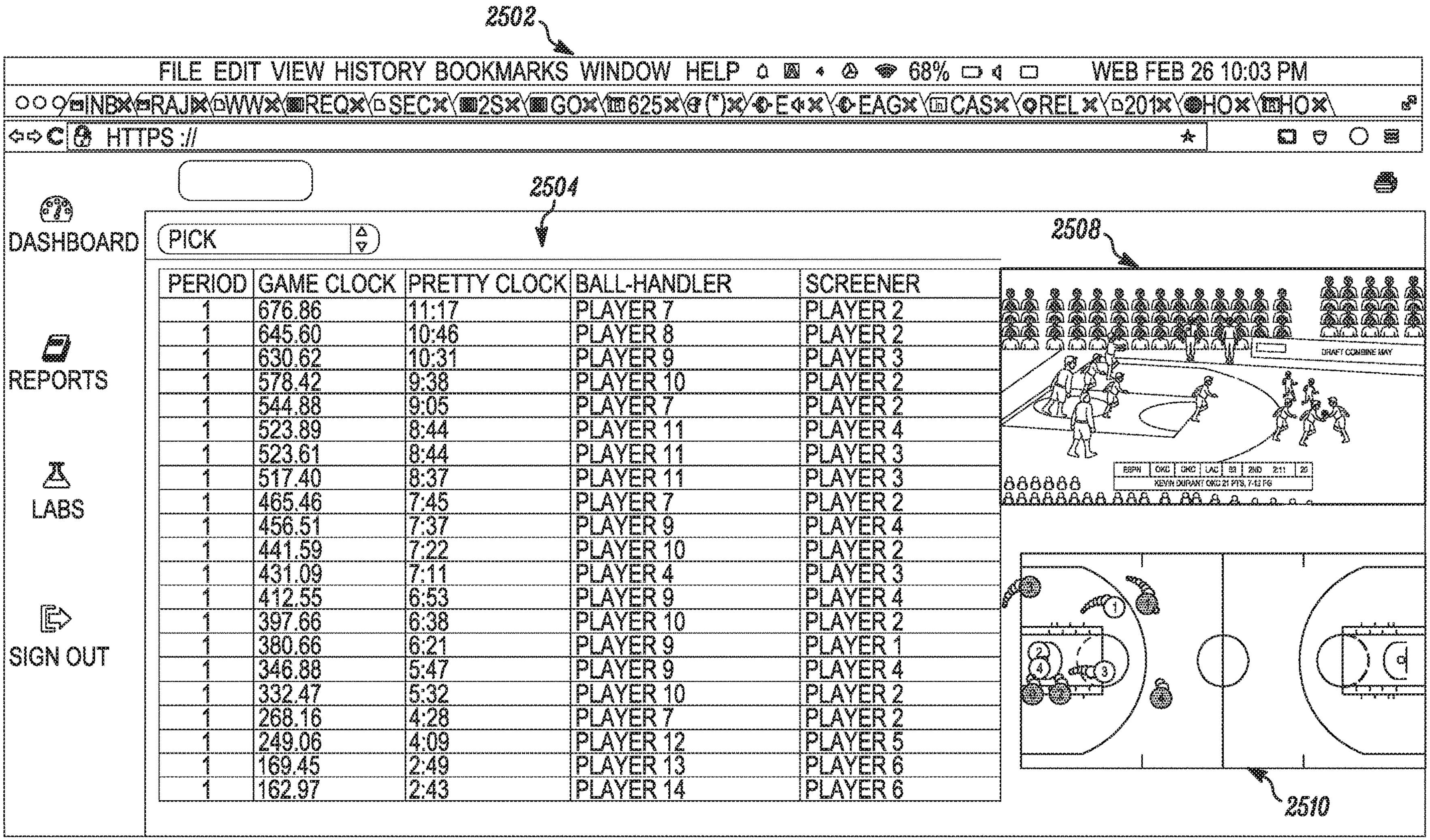
FIG. 25 illustrates a quality assurance user interface according to an exemplary and non-limiting embodiment.
Figure 26:
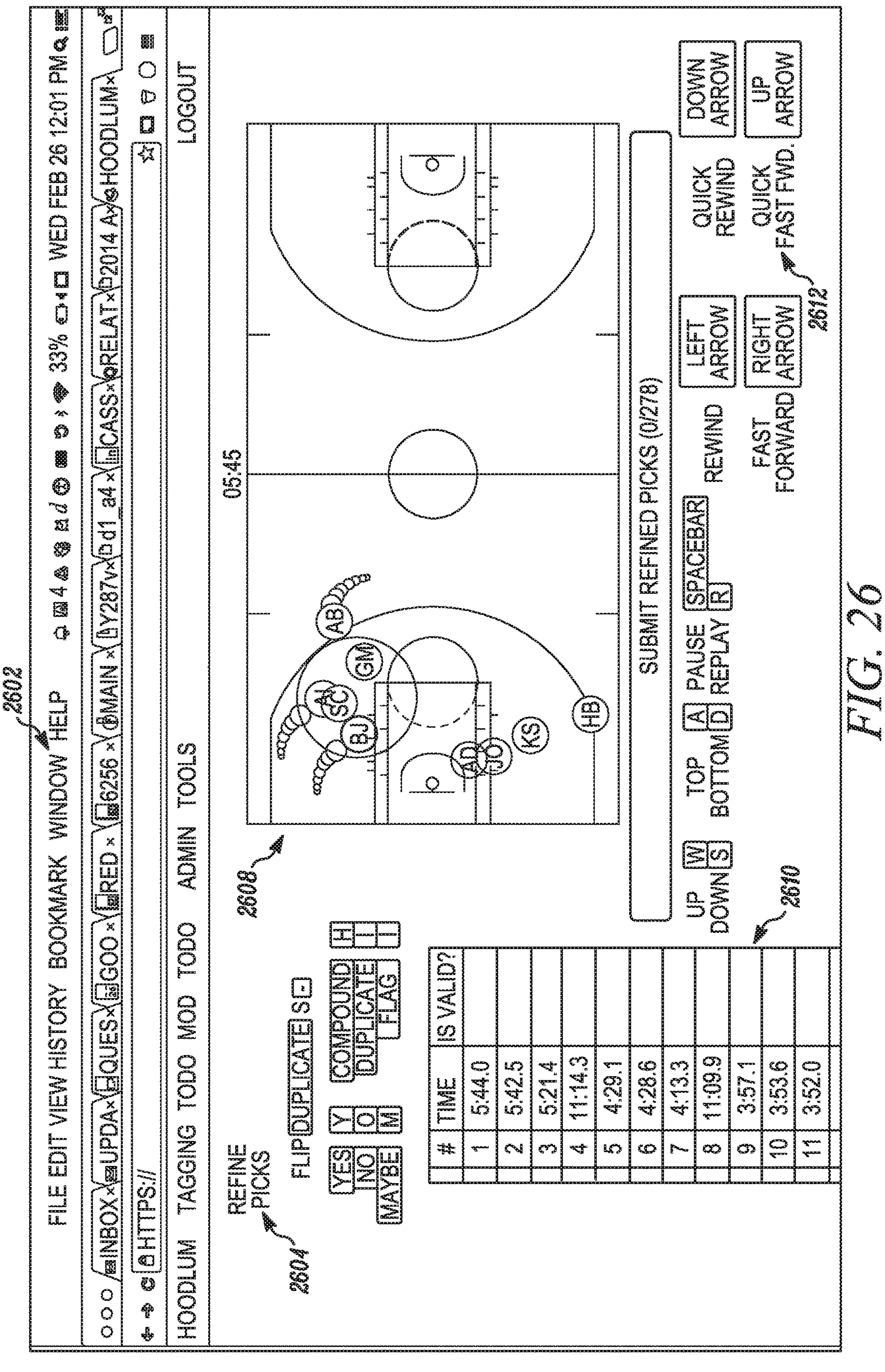
FIG. 26 illustrates a quality assurance user interface according to an exemplary and non-limiting embodiment.

Referring to FIG. 25, an embodiment of a quality assurance UI 2502 is provided. The QA UI 2502 presents the human operator with both an animated 2D overhead view 2510 of the play, as well as a video clip 2508 of the play. A key feature is that only the few seconds relevant to that play are shown to the operator, instead of an entire possession, which might be over 20 seconds long, or even worse, requiring the human operator to fast forward in the game tape to find the event herself. Keyboard shortcuts are used for all operations, to maximize efficiency. Referring to FIG. 26, the operator's task is simplified to its core, so that we lighten the cognitive load as much as possible: if the operator is verifying a category of plays X, the operator has to simply choose, in an interface element 2604 of the embodiment of the QA UI 2602 whether the play shown in the view 2608 is valid (Yes or No), or (Maybe). She can also deem the play to be a (Duplicate), a (Compound) play that means it is just one type-X action in a consecutive sequence of type-X actions, or choose to (Flag) the play for supervisor review for any reason. Features of the UI 2602 include the ability to fast word, rewind, submit and the like, as reflected in the menu element 2612. A table 2610 can allow a user to indicate the validity of plays occurring at designated times.

Figure 27:
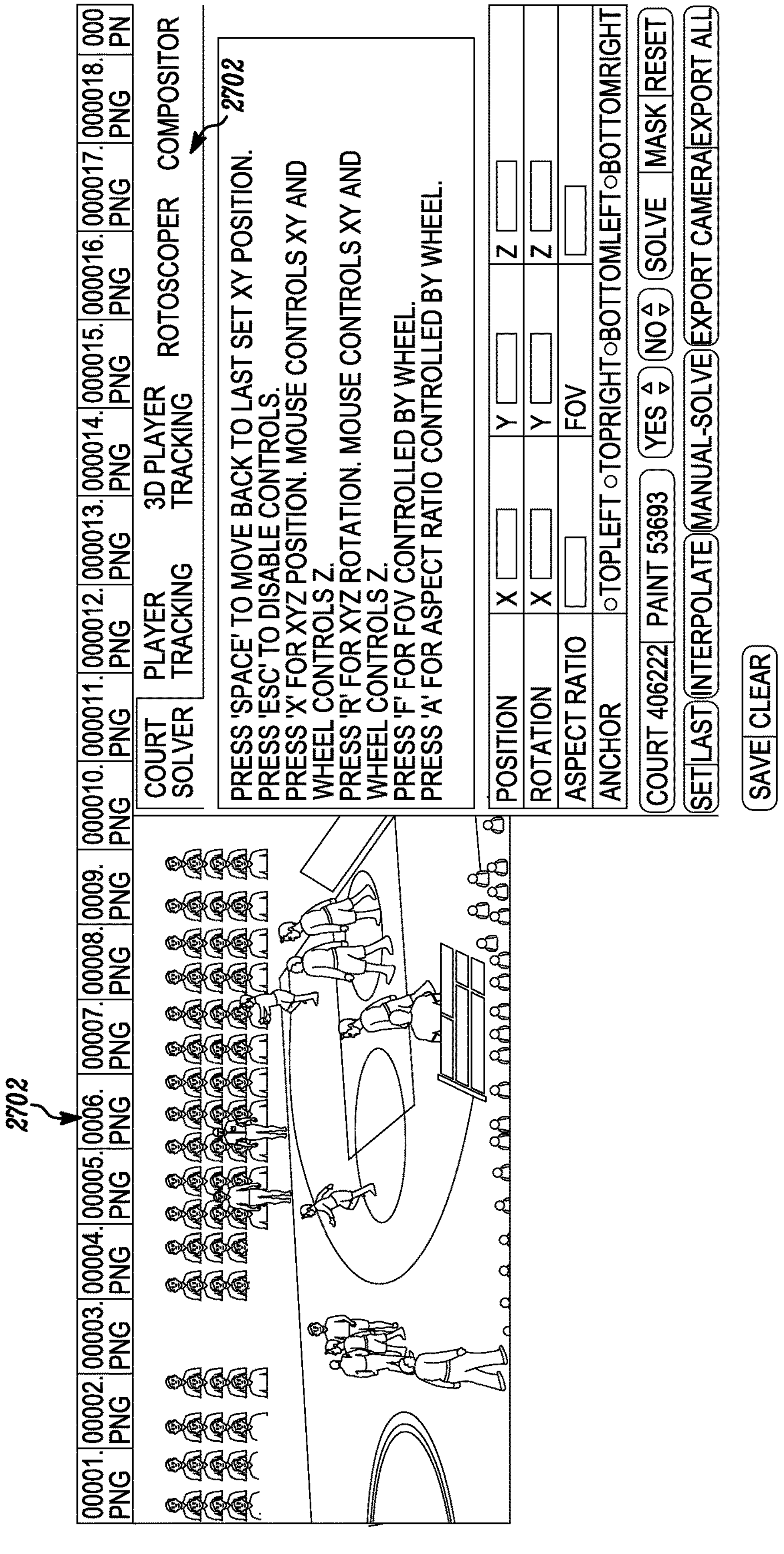
FIG. 27 illustrates camera pose detection according to an exemplary and non-limiting embodiment.

FIG. 27 shows a method of camera pose detection, also known as "court solving." The figure shows the result of automatic detection of the "paint," and use of the boundary lines to solve for the camera pose. The court lines and hoop location, given the solved camera pose, are then shown projected back onto the original image 2702. This projection is from the first iteration of the solving process, and one can see that the projected court and the actual court do not yet align perfectly. One may use machine vision techniques to find the hoop and to find the court lines (e.g. paint boundaries), then use found lines to solve for the camera pose. Multiple techniques may be used to determine court lines, including detecting the paint area. Paint area detection can be done automatically. One method involves automatically removing the non-paint area of the court by automatically executing a series of "flood fill" type actions across the image, selecting for court-colored pixels. This leaves the paint area in the image, and it is then straightforward to find the lines/points. One may also detect all lines on the court that are visible, e.g. background or 3-point arc. In either case, intersections provide points for camera solving. A human interface 2702 may be provided for providing points or lines to assist algorithms, to fine-tune the automatic solver. Once all inputs are provided, the camera pose solver is essentially a randomized hill climber that uses the mathematical models as a guide (since it may be under-constrained). It may use multiple random initializations. It may advance a solution if it is one of the best in that round. When an iteration is done, it may repeat until the error is small. FIG. 46 shows the result of automatic detection of the "paint", and use of the boundary lines to solve for the camera pose. The court lines and hoop location, given the solved camera pose, are then shown projected back onto the original image. This projection is from the first iteration of the solving process, and one can see that the projected court and the actual court do not yet align perfectly.

Figure 28:
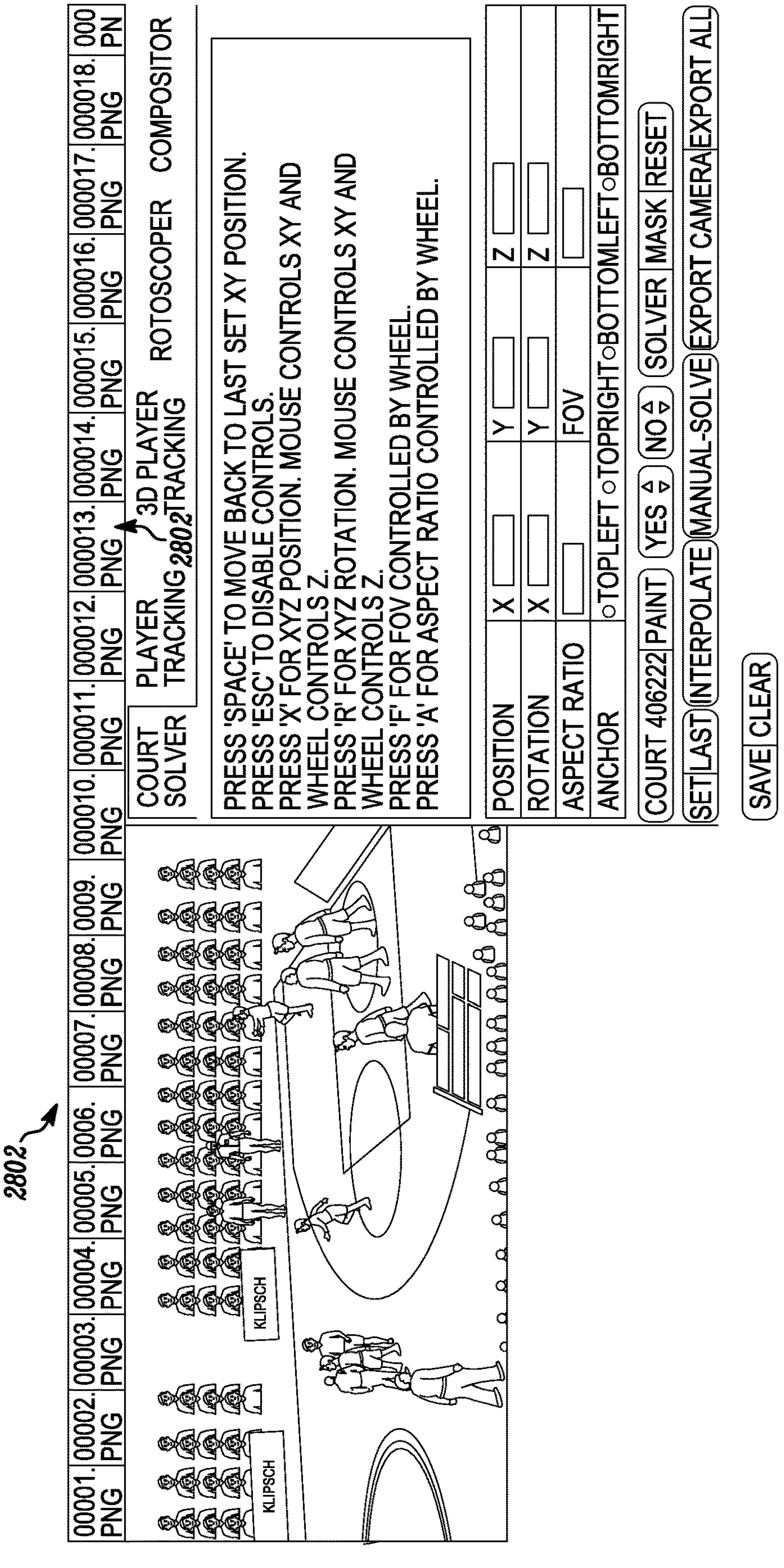
FIG. 28 illustrates camera pose detection according to an exemplary and non-limiting embodiment.

FIG. 28 relates to camera pose detection. The second step 2802 shown in the Figure shows how the human can use this GUI to manually refine camera solutions that remain slightly off.

Figure 29:
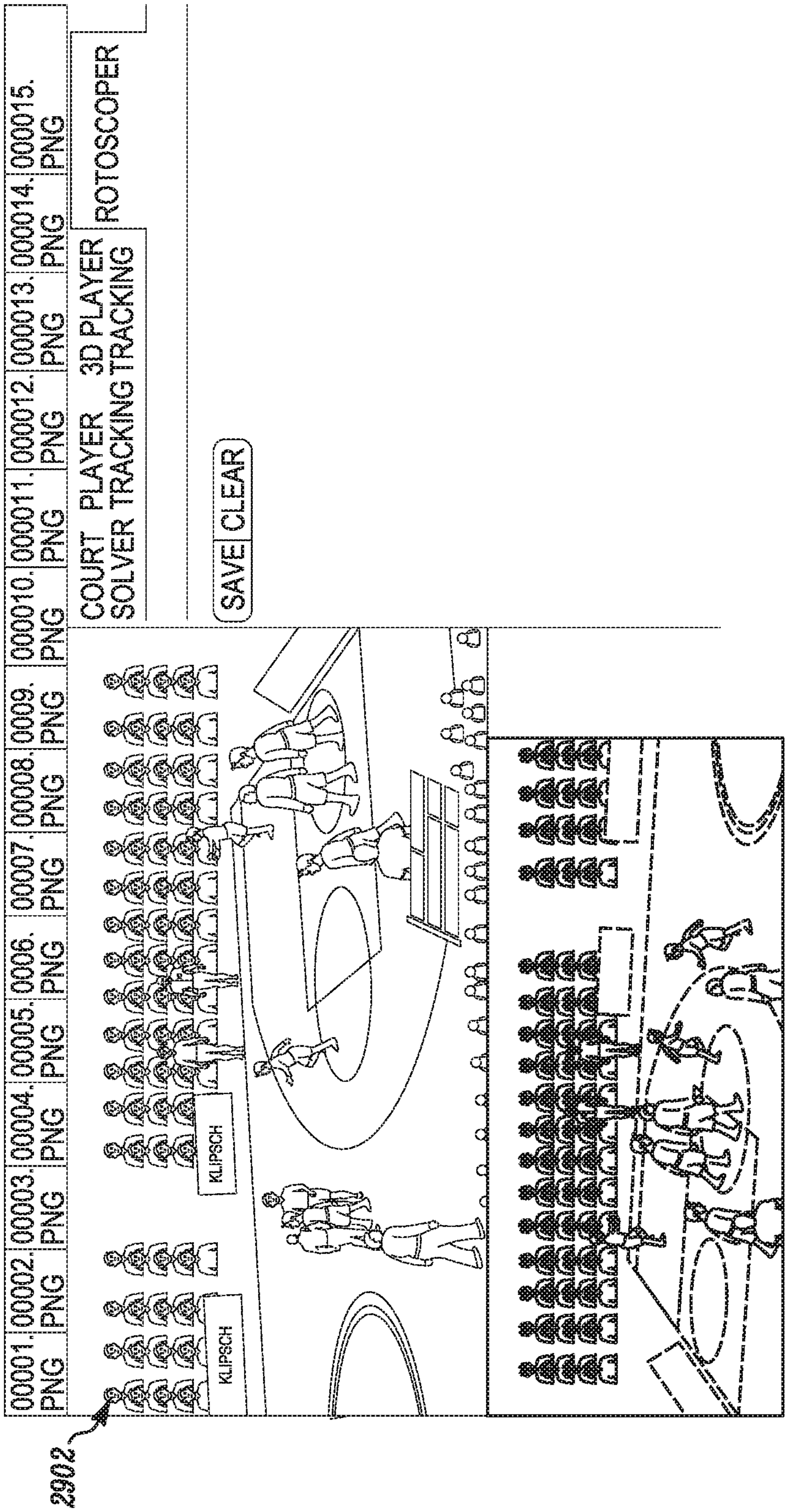
FIG. 29 illustrates auto-rotoscoping according to an exemplary and non-limiting embodiment.

FIG. 29 relates to auto-rotoscoping. Rotoscoping 2902 is required in order to paint graphics around players without overlapping the players' bodies. Rotoscoping is partially automated by selecting out the parts of the image with similar color as the court. Masses of color left in the image can be detected to be human silhouettes. The patch of color can be "vectorized" by finding a small number of vectors that surround the patch, but without capturing too many pixels that might not represent a player's body.

Figure 30B:
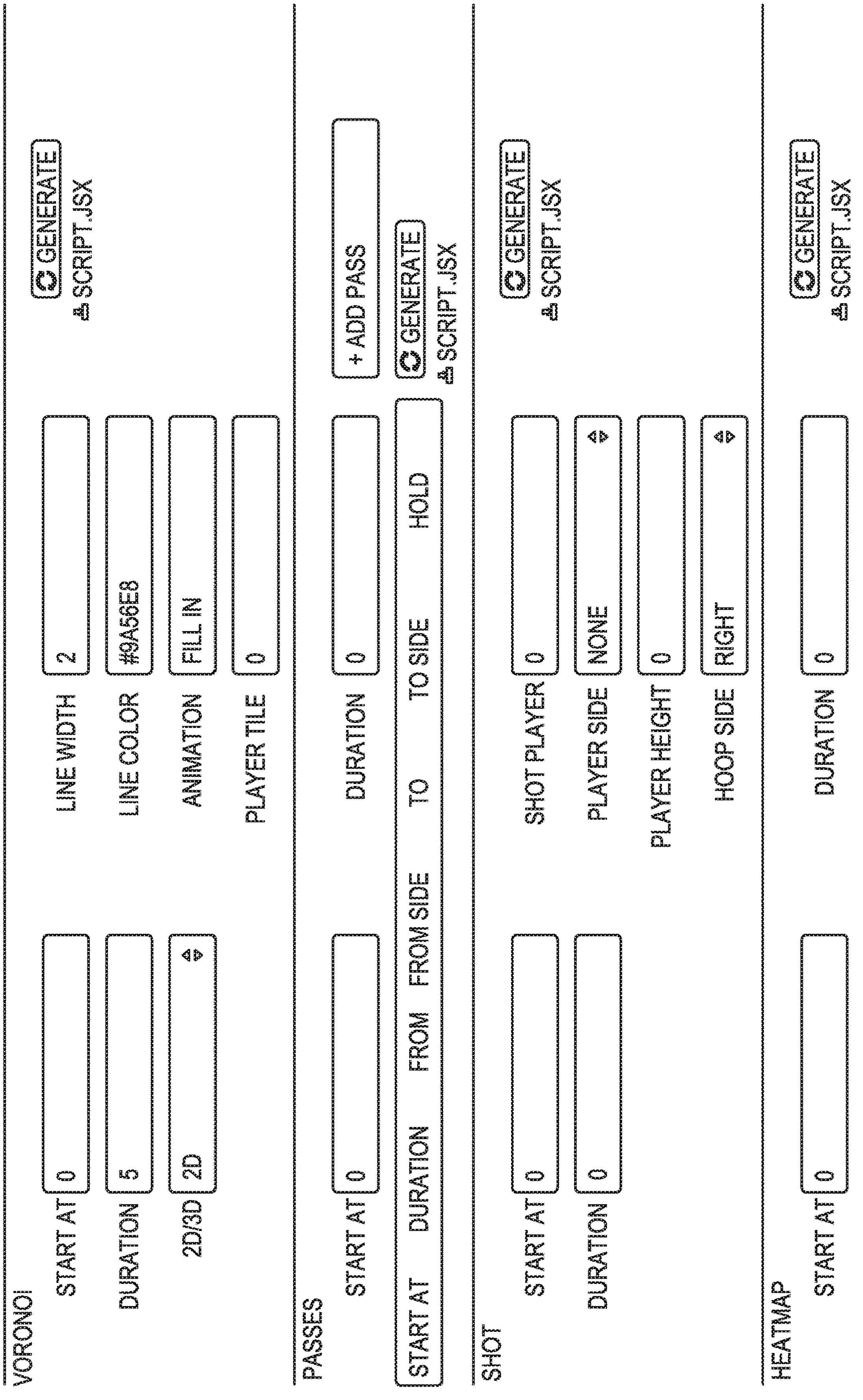
Figure 30C:
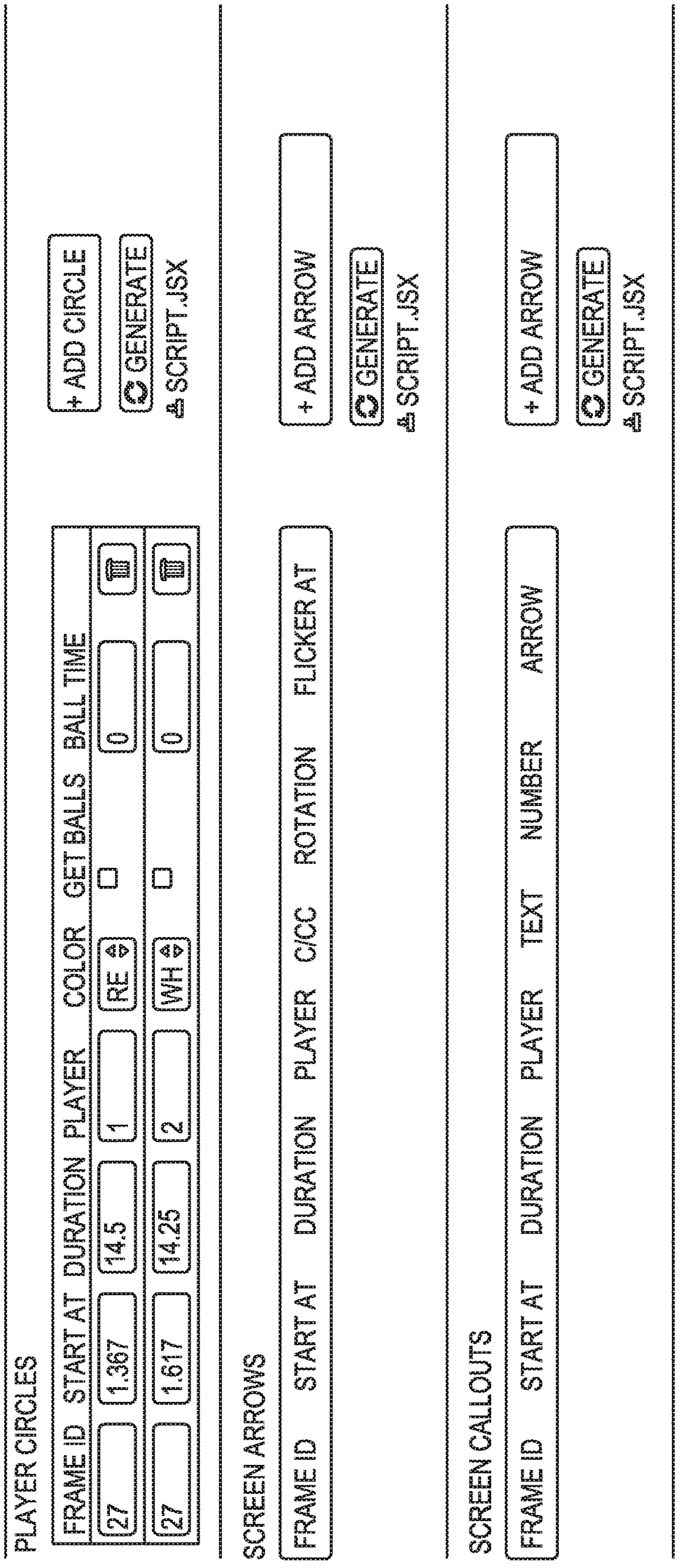
Figure 31:
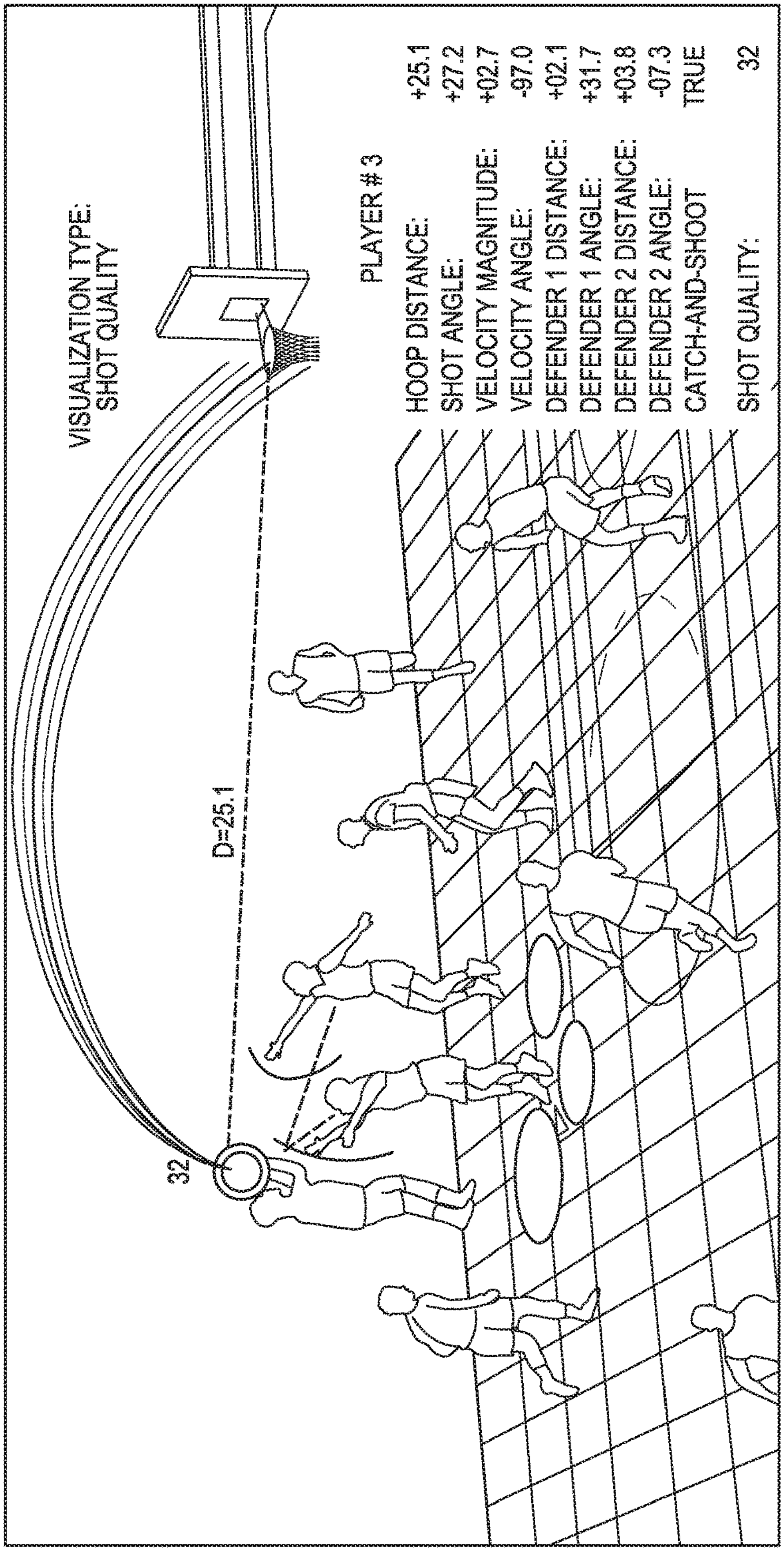
FIG. 31 illustrates an example according to an exemplary and non-limiting embodiment.

FIGS. 30A-30C relate to scripted storytelling with an asset library 3002. To produce the graphics-augmented clips, a company may either learn heavily on a team of artists, or a company may determine how best to handle scripting based on a library of assets. For example, instead of manually tracing a player's trajectory and increasing the shot probability in each frame as the player gets closer to the ball, a scripting language allows the methods and systems described herein to specify this augmentation in a few lines of code. In another example, for rebound clips, the Voronoi partition and the associated rebound positioning percentages can be difficult to compute for every frame. A library of story element effects may list each of these current and future effects. Certain combinations of scripted story element effects may be best suited for certain types of clips. For example, a rebound and put-back will likely make use of the original shot probability, the rebound probabilities including Voronoi partitioning, and then go back to the shot probability of the player going for the rebound. This entire script can be learned as being well-associated with the event type in the video. Over time, the system can automatically infer the best, or at least retrieve an appropriate, story line to match up with a selected video clip containing certain events. This enables augmented video clips, referred to herein as DataFX clips, to be auto-generated and delivered throughout a game.

Figure 32:
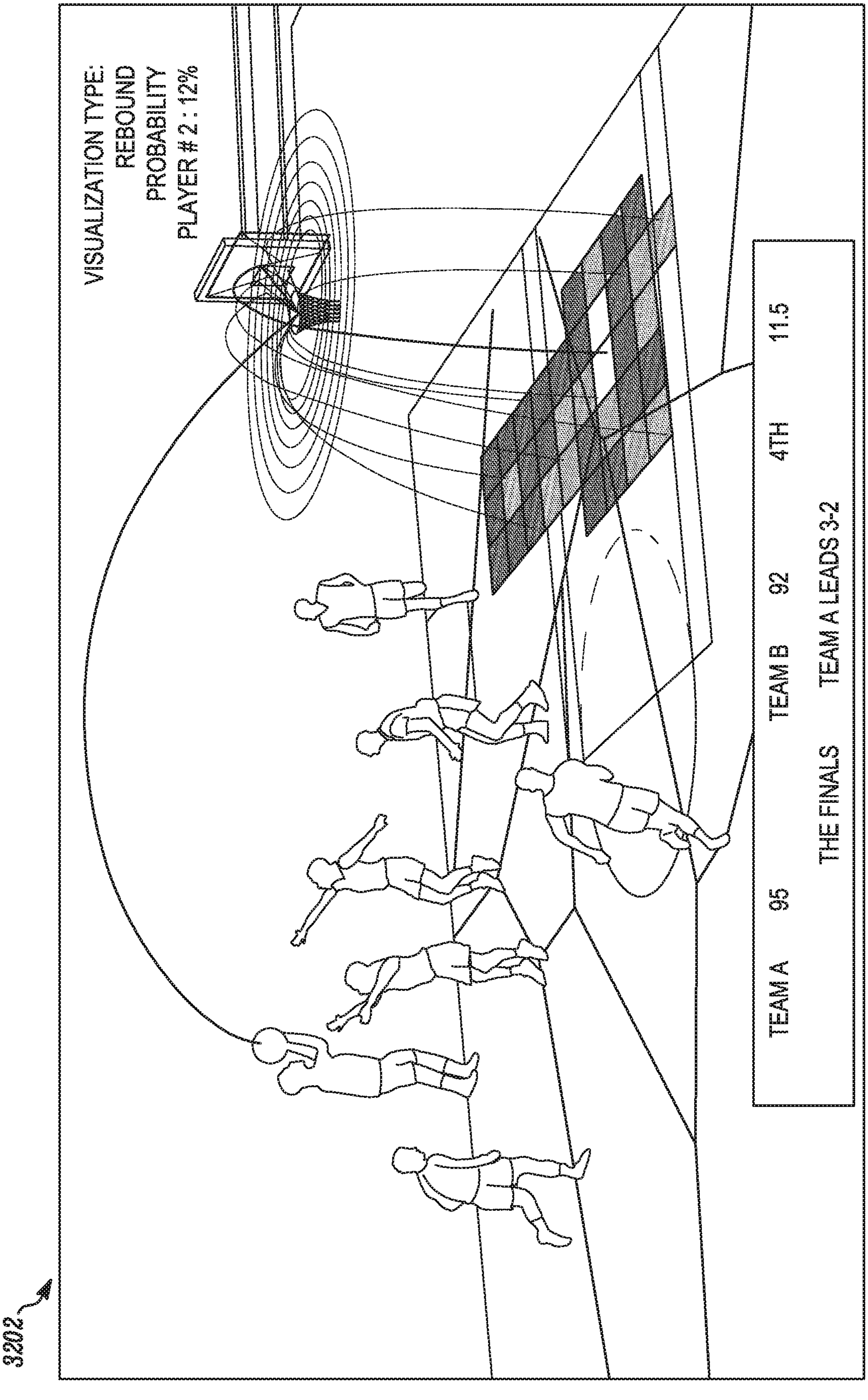
FIG. 32 illustrates an example according to an exemplary and non-limiting embodiment.
Figure 33:
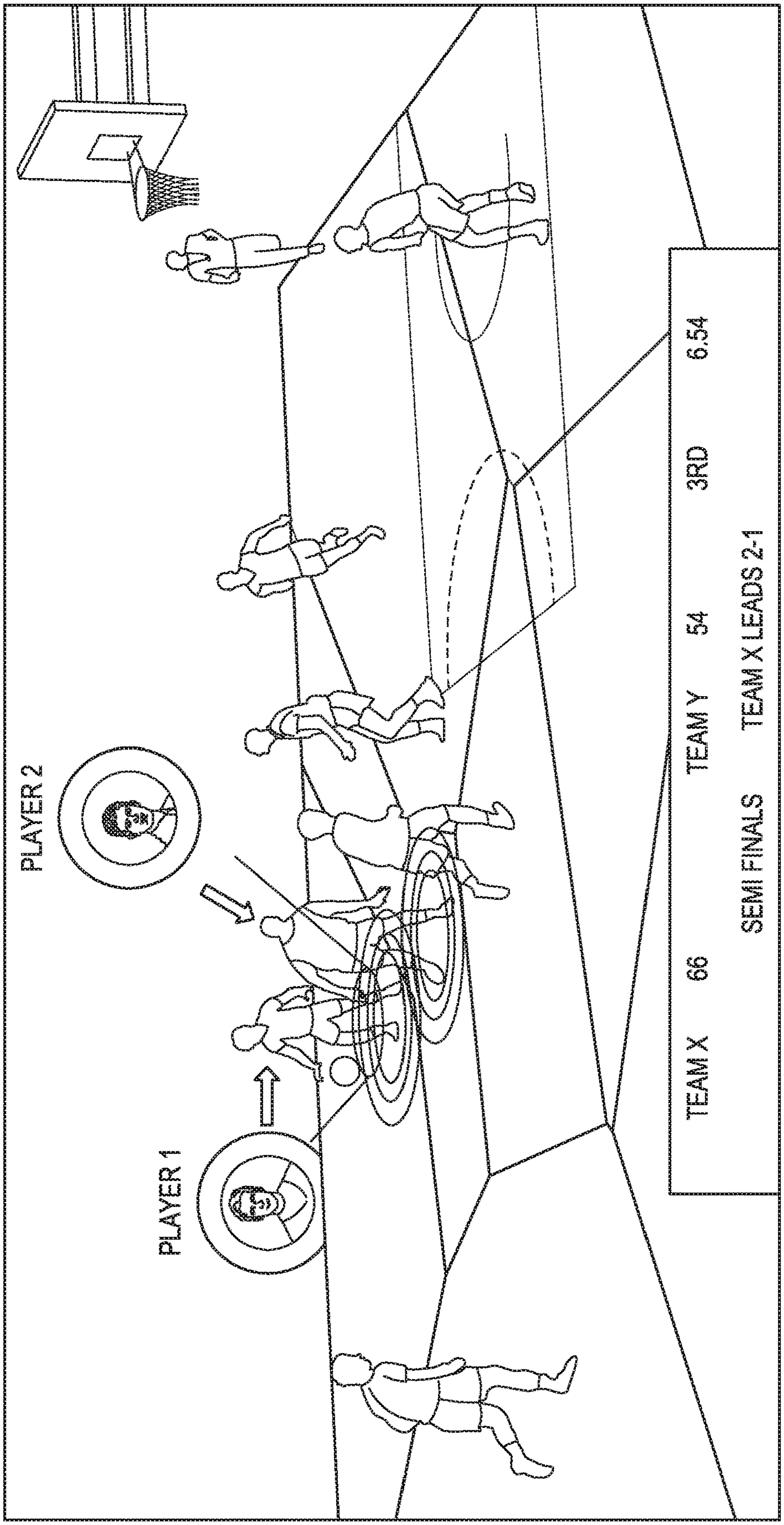
FIG. 33 illustrates an example according to an exemplary and non-limiting embodiment.
Figure 34:
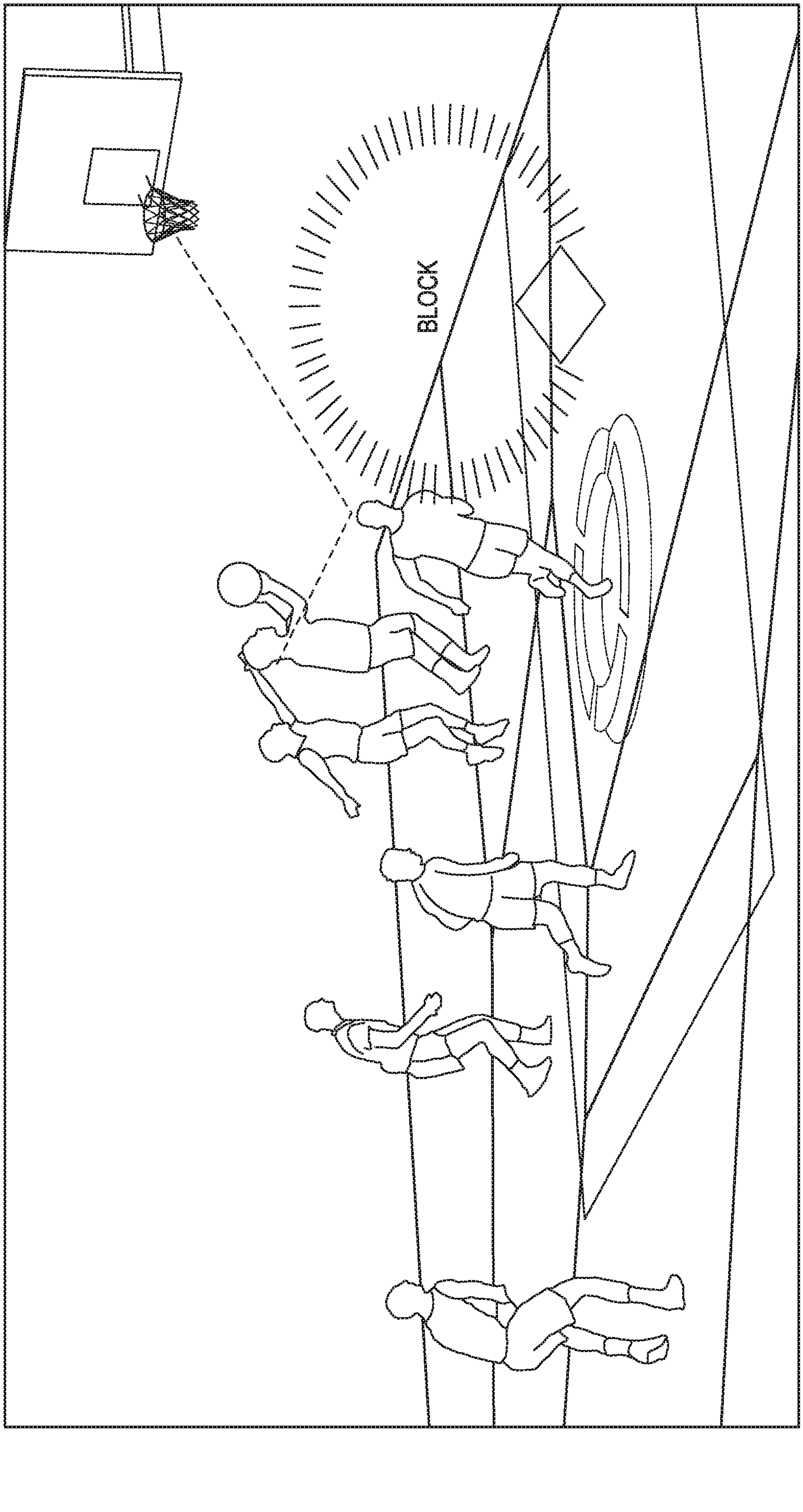
FIG. 34 illustrates an example according to an exemplary and non-limiting embodiment.
Figure 35:
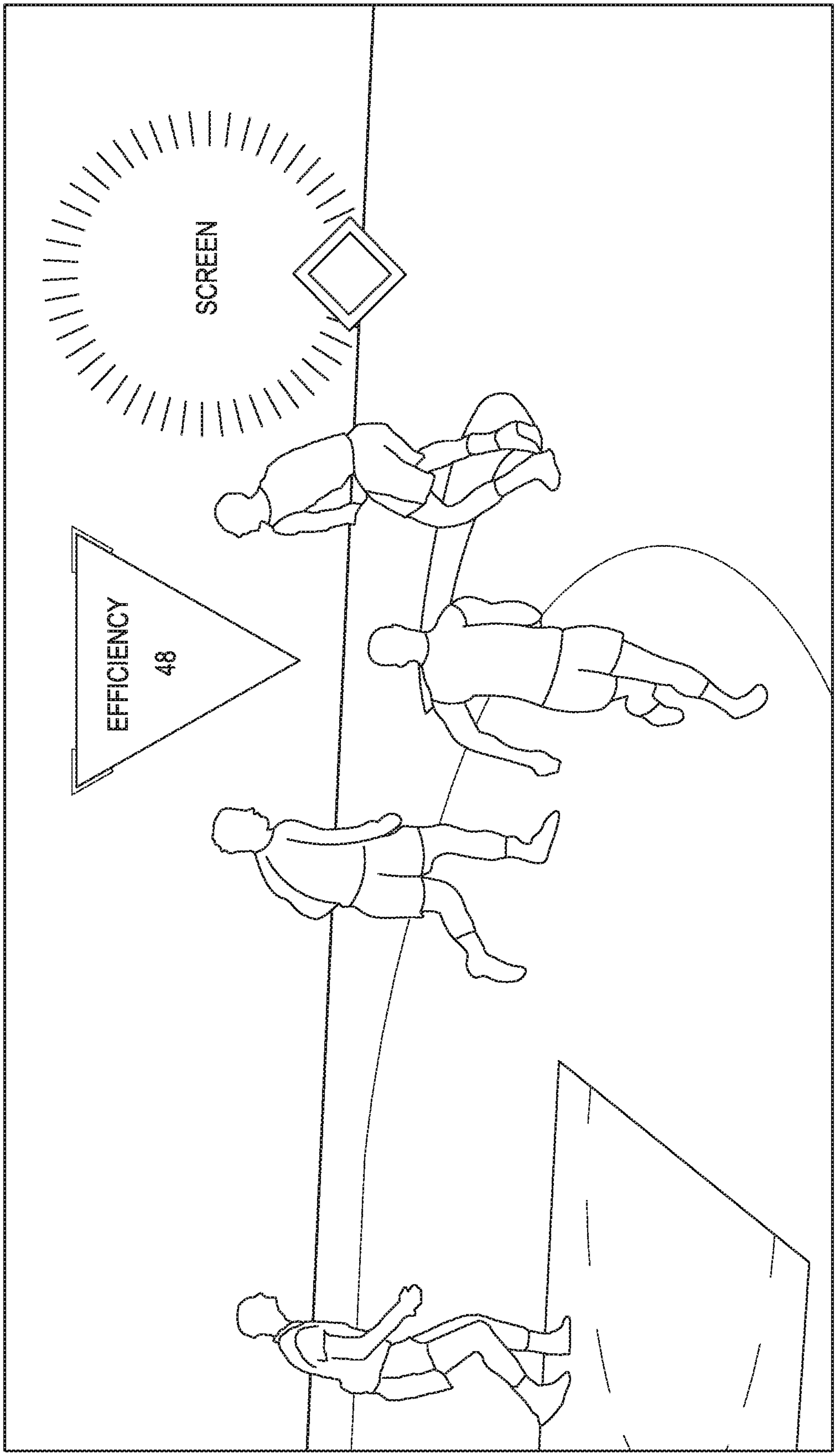
FIG. 35 illustrates an example according to an exemplary and non-limiting embodiment.
Figure 36:
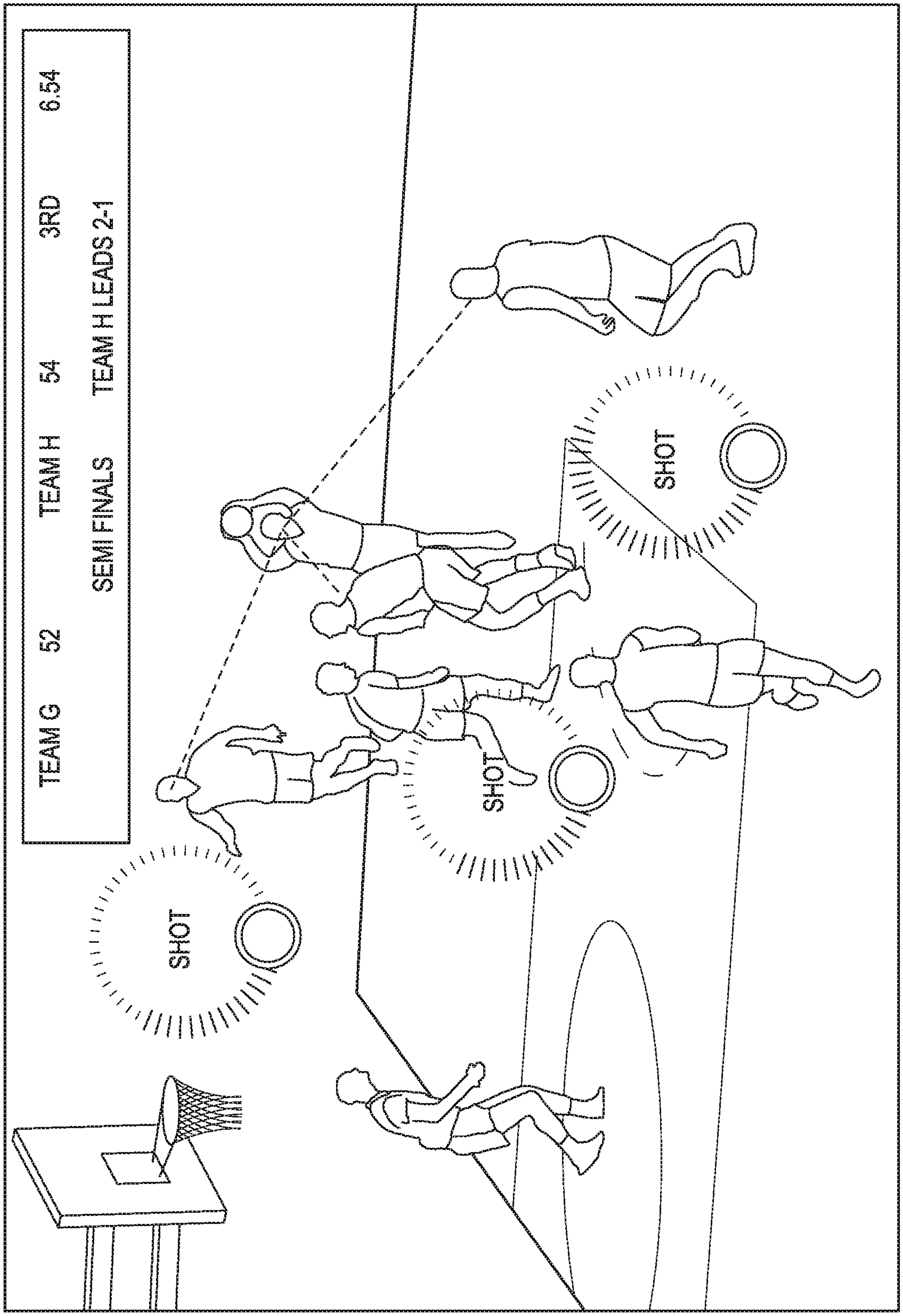
FIG. 36 illustrates an example according to an exemplary and non-limiting embodiment.
Figure 37:
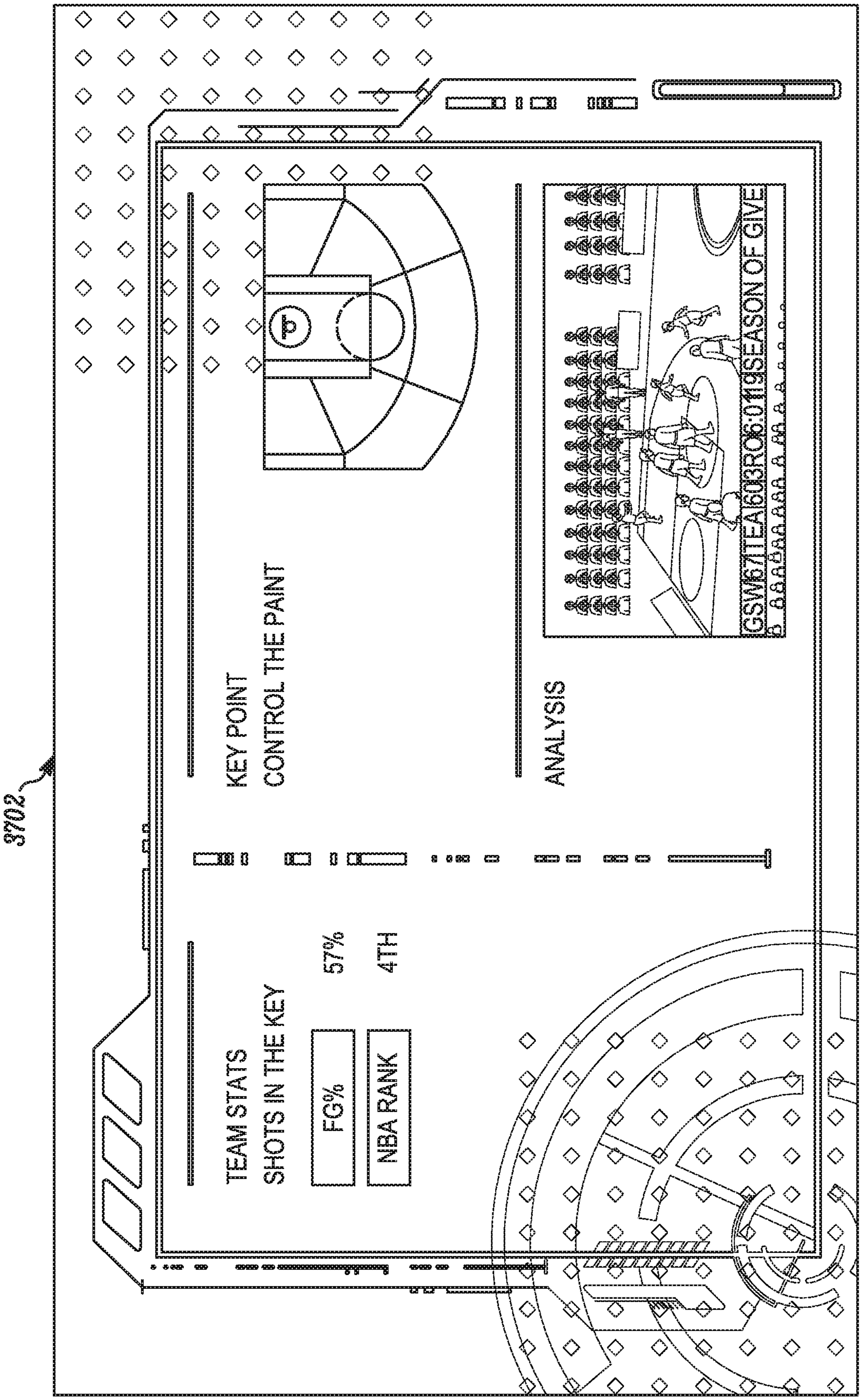
FIG. 37 illustrates an example according to an exemplary and non-limiting embodiment.
Figure 38:
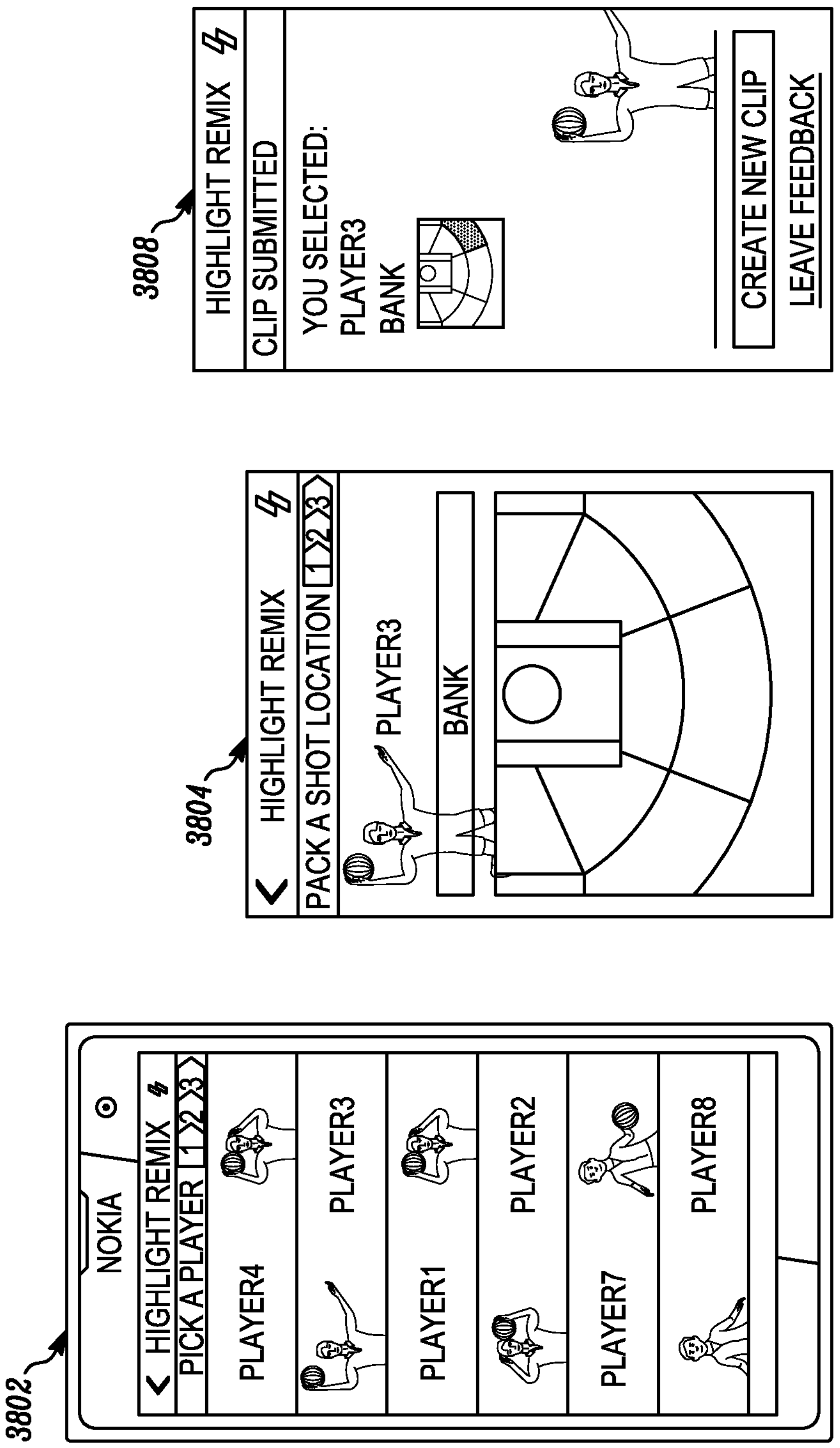
FIG. 38 illustrates a screen shot according to an exemplary and non-limiting embodiment.

FIGS. 31-38 show examples of DataFX visualizations. The visualization of FIG. 31 requires court position to be solved in order to lay down grid, player "puddles". Shot arc also requires backboard/hoop solution. In FIG. 32, Voronoi tessellation, heat map, shot and rebound arcs all require the camera pose solution. The highlight of the player uses rotoscoping. In FIG. 33, in addition to the above, players are rotoscoped for highlighting. FIGS. 34-38 show additional visualizations that are based on use of the methods and systems disclosed herein.

In embodiments, DataFX (video augmented with data-driven special effects) may be provided for pre-, during, or post-game viewing, for analytic and entertainment purposes. DataFX may combine advanced data with Hollywood-style special effects. Pure numbers can be boring, while pure special effects can be silly, but the combination of the two and the results can be very powerful. Example features used alone or in combination in DataFX can include use of a Voronoi overlay on court, a Grid overlay on court, a Heat map overlay on court, a Waterfall effect showing likely trajectories of the ball after a missed field goal attempt, a Spray effect on a shot, showing likely trajectories of the shot to the hoop, Circles and glows around highlighted players, Statistics and visual cues over or around players, Arrows and other markings denoting play actions, Calculation overlays on court, and effects showing each variable taken into account.

Figure 39A:
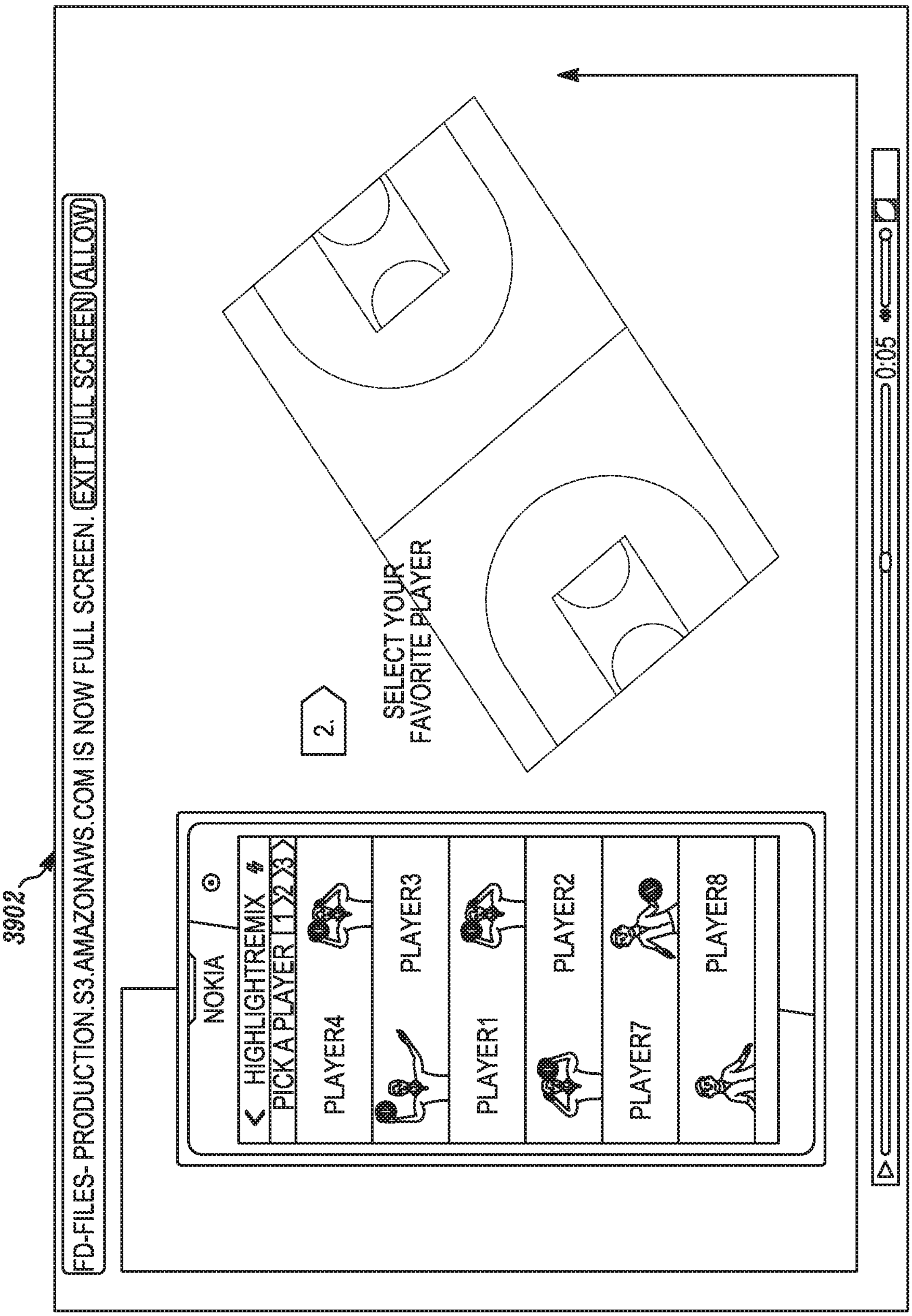
FIGS. 39A-39E illustrate a screen shot according to an exemplary and non-limiting embodiment.
Figure 39B:
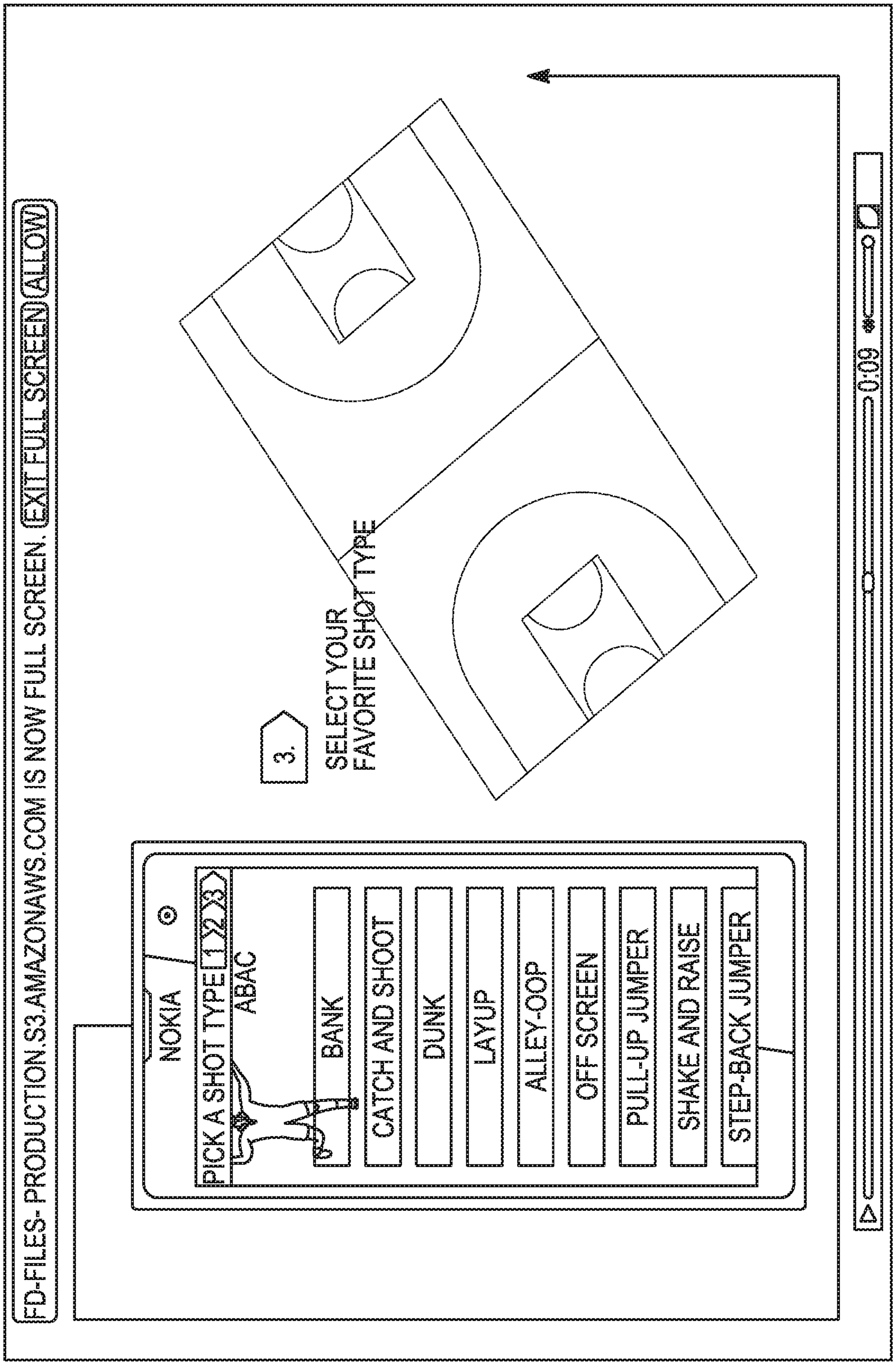
Figure 39C:
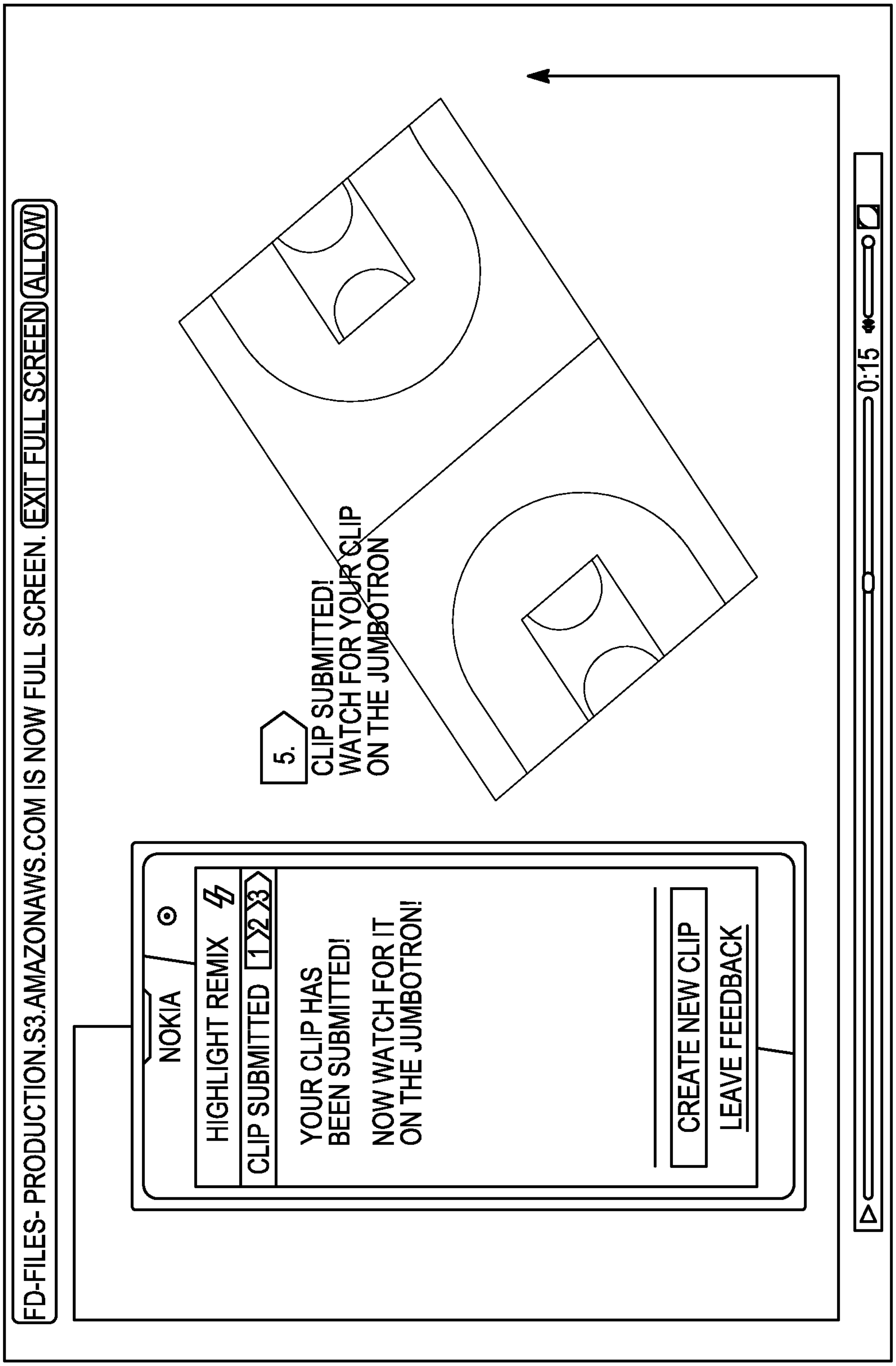
Figure 39D:
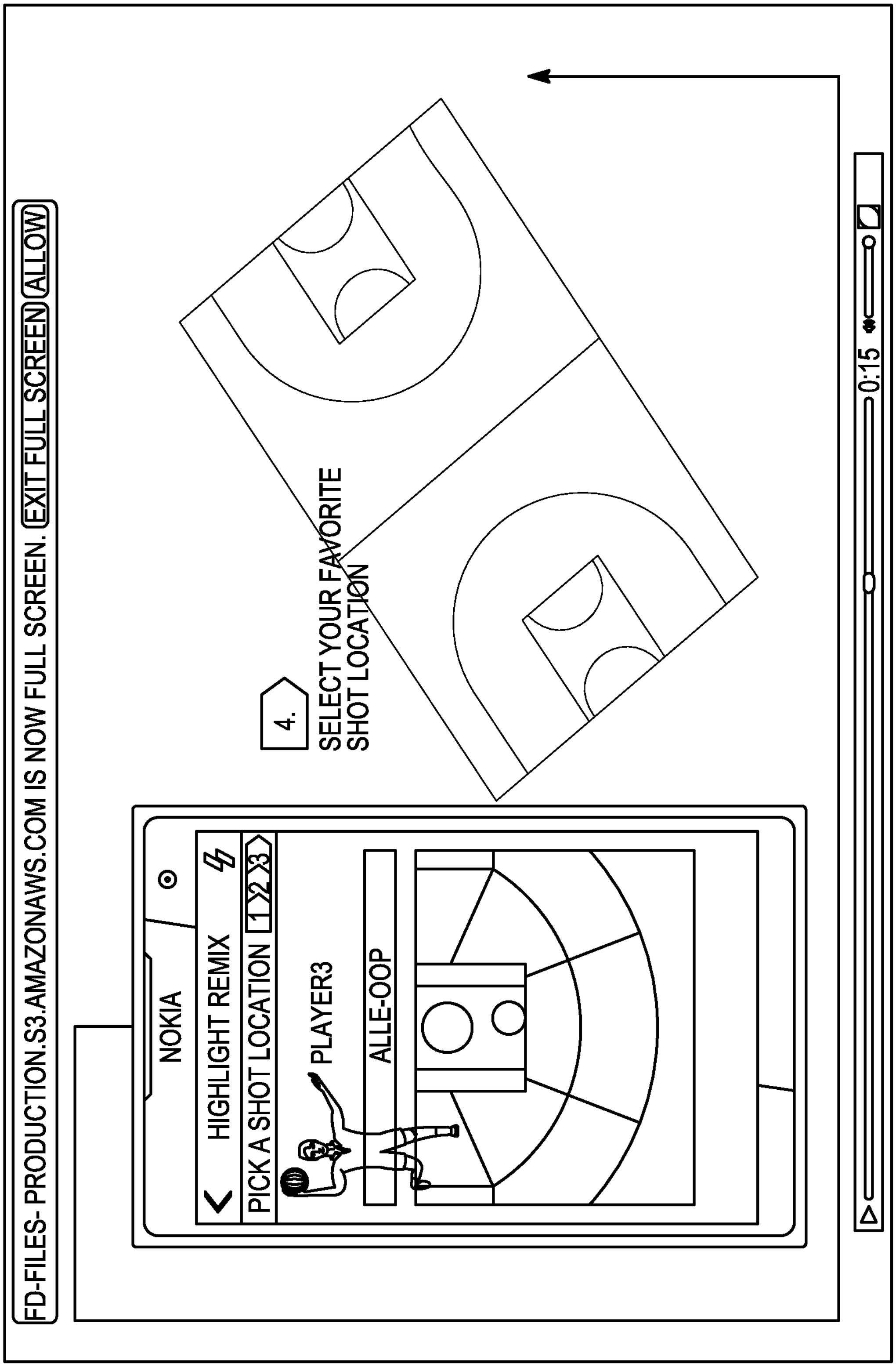
Figure 39E:
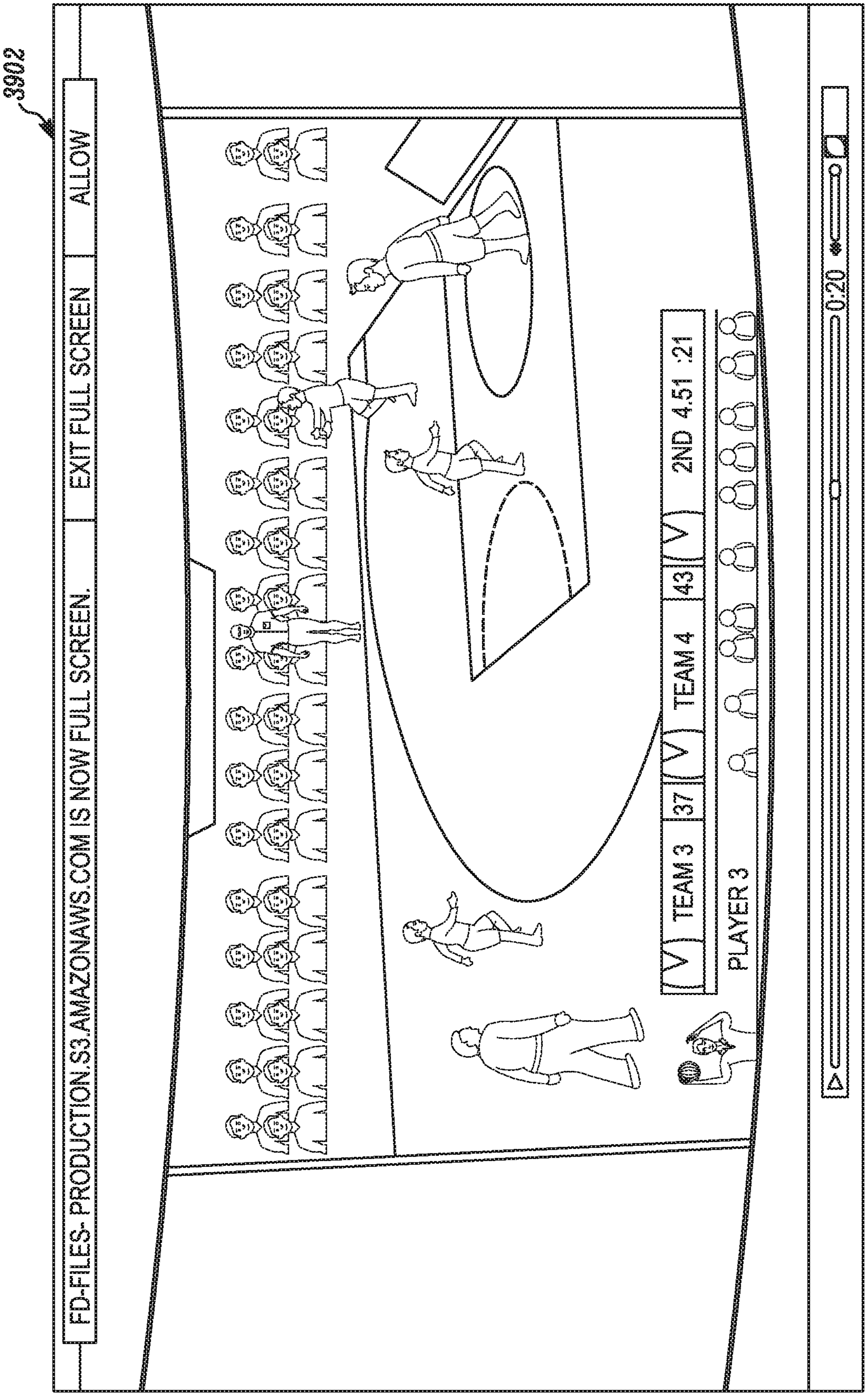
Figure 39F:
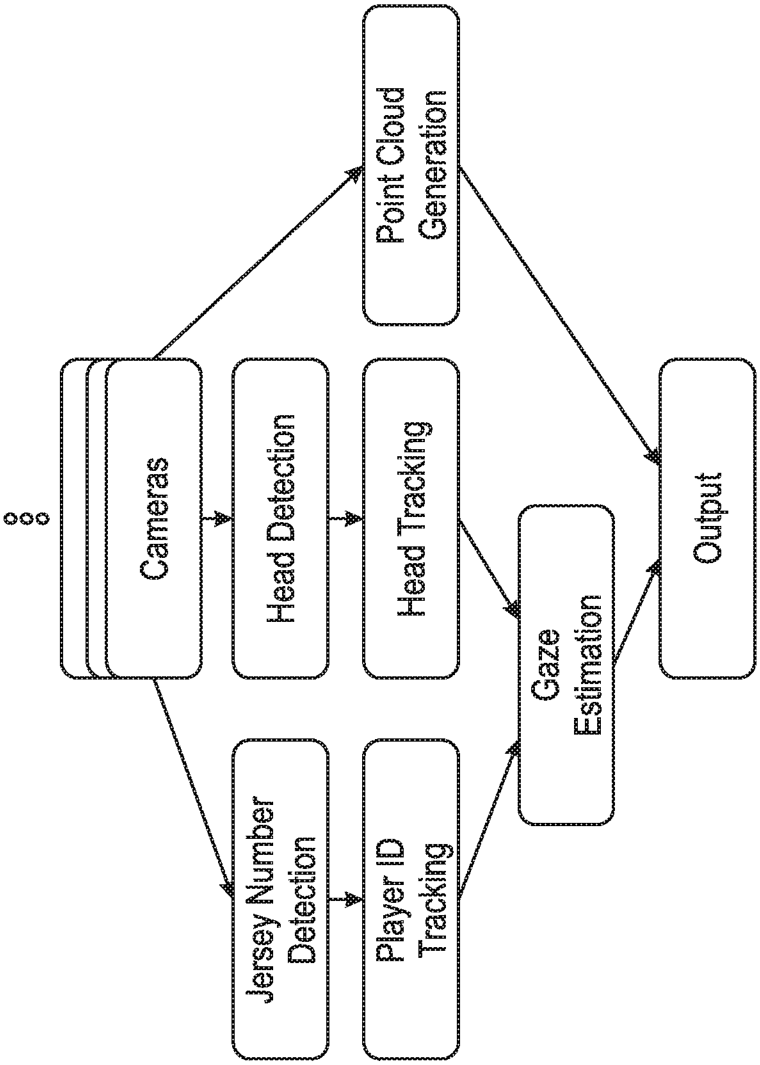
FIG. 39F illustrates a first person process according to an exemplary and non-limiting embodiment.
Figure 40:
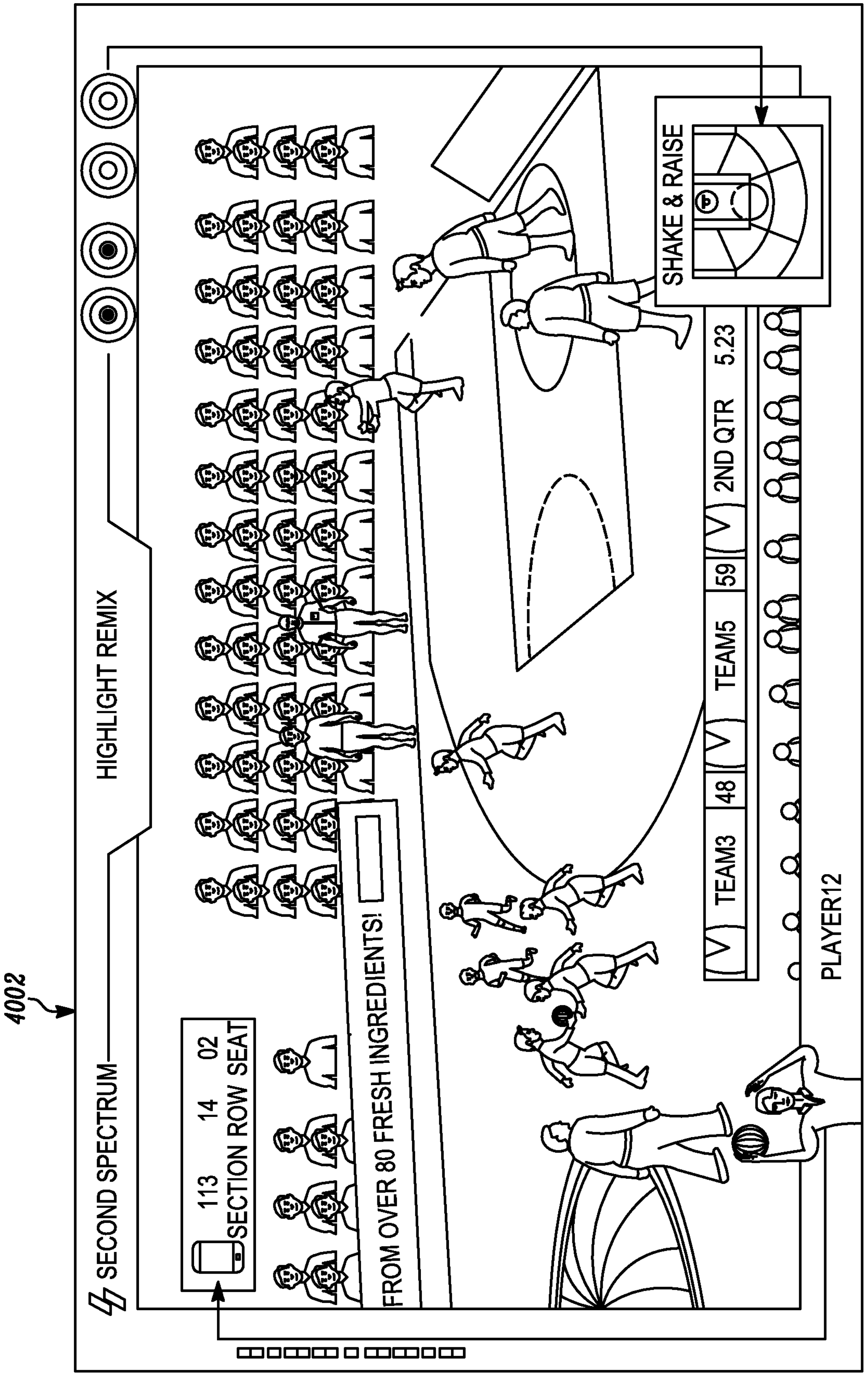
FIG. 40 illustrates a screen shot according to an exemplary and non-limiting embodiment.
Figure 41A:
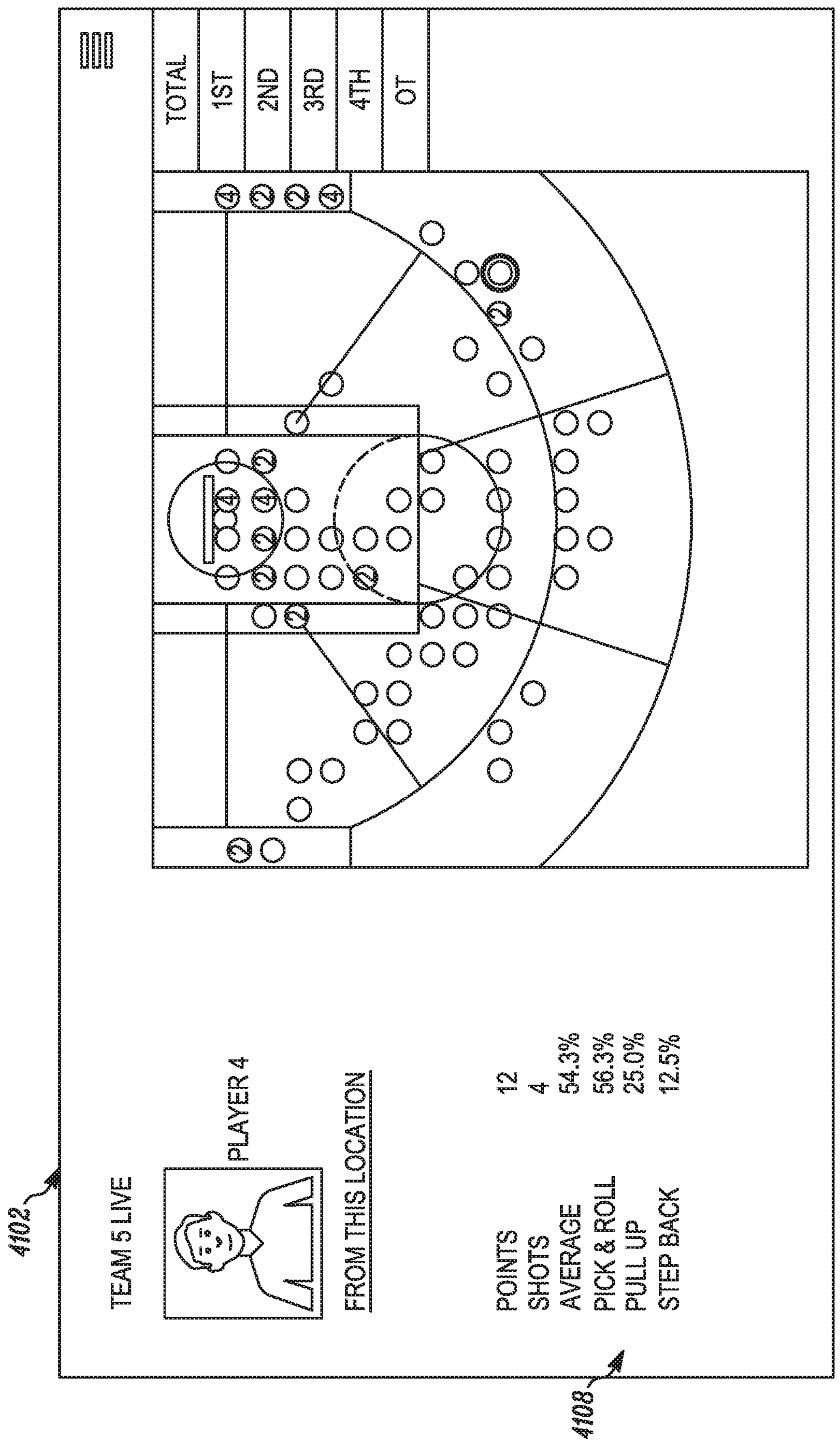
FIGS. 41A-41B illustrate a screen shot according to an exemplary and non-limiting embodiment.
Figure 41B:
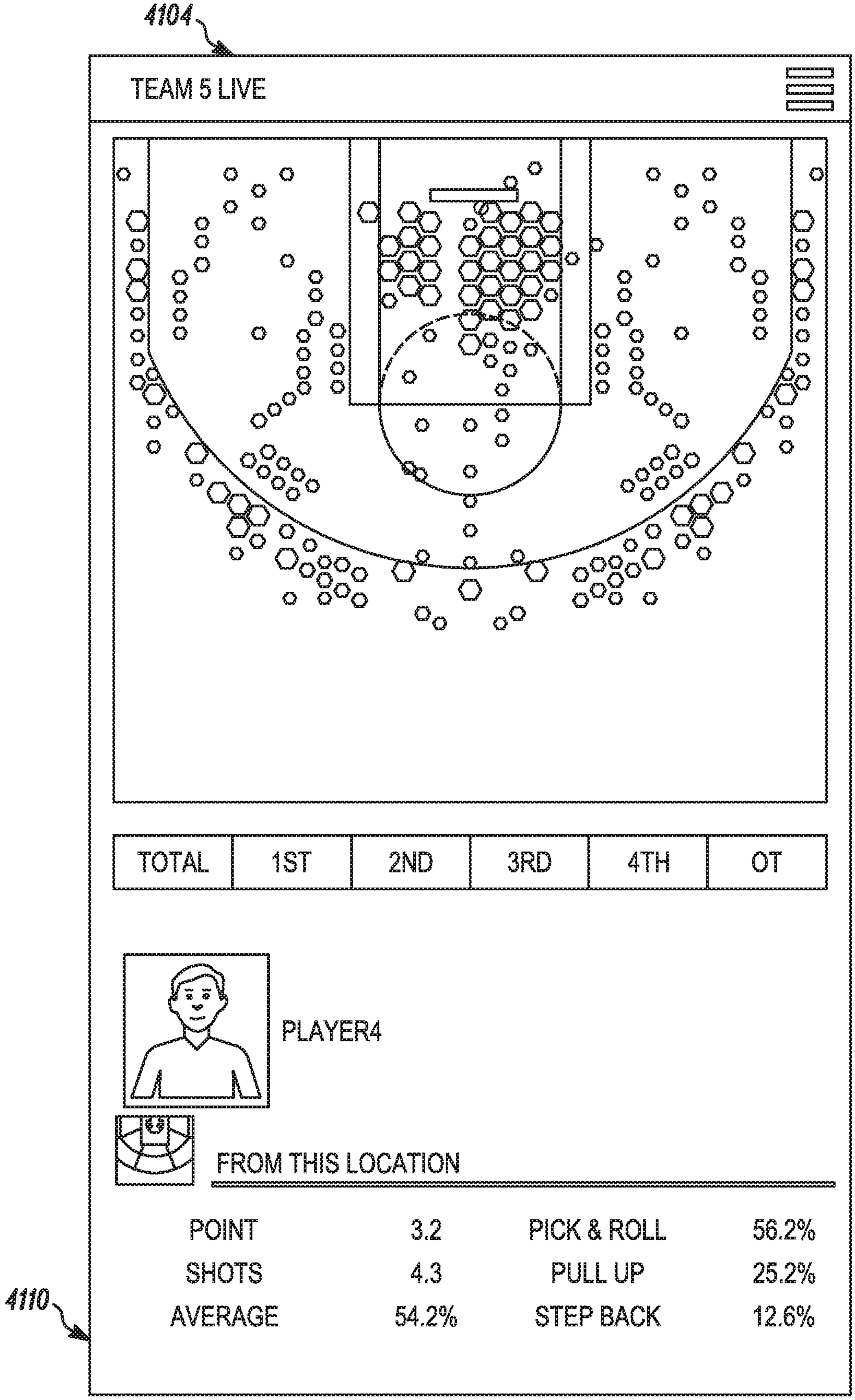

FIGS. 39-41 show a product referred to as "Clippertron." Provided is a method and system whereby fans can use their distributed mobile devices to control individually and/or collectively what is shown on the Jumbotron or video board(s). An embodiment enables the fan to go through mobile application dialogs in order to choose the player, shot type, and shot location to be shown on the video board. The fan can also enter in his or her own name, so that it is displayed alongside the highlight clip. Clips are shown on the Video Board in real time, or queued up for display. Variations include getting information about the fan's seat number. This could be used to show a live video feed of the fan while their selected highlight is being shown on the video board. Referred to as "FanMix" is a web-based mobile application that enables in-stadium fans to control the Jumbotron and choose highlight clips to push to the Jumbotron. An embodiment of FanMix enables fans to choose their favorite player, shot type, and shot location using a mobile device web interface. Upon pressing the submit button, a highlight showing this particular shot is sent to the Jumbotron and displayed according to placement order in a queue. Enabling this capability is that video is lined up to each shot within a fraction of a second. This allows many clips to be shown in quick succession, each showing video from the moment of release to the ball going through the hoop. In some cases, video may start from the beginning of a play, instead of when a play begins.

The methods and systems disclosed herein may include methods and systems for allowing a user or group of users to control presentation of a large scale display in an event venue, where the options for control are based on a context of the content as determined by machine extraction of semantically relevant events from the content.

The methods and systems disclosed herein may include methods and systems for enabling interaction with a large scale display system and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and providing an application by which at least one user can interact with the video content data structure, wherein the options for user interaction are based on the context information, wherein the interaction with the video content data structure controls the presentation of the content on a large scale display.

In embodiments, one or more users may interact with menus on an application, such as a smart phone application, in an arena or other location that has a large-scale display. The users may express preferences, such as by voting, for what content should be displayed, including selecting preferred types of events and/or contexts (which may be organized as noted above based on semantically relevant filters), selecting what metrics should be displayed (options for which may be offered based on context information for particular extracted video events), and the like. In embodiments, a large scale display in a venue where a live event is taking place may offer games, quizzes, or the like, where users may respond by text, SMS, or the like. The content of such games or quizzes may be constructed at least in part based on a machine semantic understanding of the live event, such as asking users which player has the most rebounds in the first quarter, or the like.

The methods and systems disclosed herein may include methods and systems for a user to control Jumbotron clips based on contextualized content filters.

The methods and systems disclosed herein may include methods and systems for a Jumbotron fan quiz based on machine semantic understanding of a live game.

The methods and systems disclosed herein may include methods and systems wherein the application comprises a quiz for a user, wherein the quiz is constructed based at least in part on a machine semantic understanding of a live game that is taking place in a venue where the large scale display is located. In embodiments, a fan quiz may ask questions based on proprietary machine learned metrics such as "which player took the hardest shots in this quarter." The methods and systems disclosed herein may include methods and systems for embedding a machine extracted video cut in an application, where the selection of the embedded cut for the application is based on the context of the video cut.

First Person Point of View (POV)

In embodiments, interactive visualization 218, as illustrated in FIG. 2, may include producing a reconstruction of an event, such as a game, such as a 3D reconstruction or rendering. In embodiments, a 3D reconstruction or rendering of an event may be produced using a process that presents the event from a defined point of view, such as the first person point of view of a participant in the event, such as a player. FIG. 39F illustrates an embodiment of such as process, referred to herein in some cases as a first person POV process, or simply a first person process.

A first person process may allow the user to select a player's view to follow. A first person process may automatically pin a user's view to the head of the selected player. The end result of a first person process may be dynamically rendered from the view of the selected player as a play occurs.

A first person process may be an automated first person process. An automated first person process may produce a 3D reconstruction or rendering of a game and render each frame from the view of a player selected by a user.

A first person process may be a virtual reality-based first person process. A virtual reality-based first person process may produce a 3D reconstruction or rendering of a game that allows a user to control the orientation of a view from the head movements of a user. In embodiments, the point of view may be controlled by, for example, player head tracking.

In embodiments, users may choose a player whose point of view will be presented. Location of a view may be controlled automatically via head tracking data. View orientation may be controlled by the head movements of a user. In embodiments, the head movements of a user may be recorded by virtual reality (VR) technology. VR technology may be Oculus Rift™ technology and the like.

Point Cloud Construction

As illustrated in FIG. 39F, a first person process may include constructing a point cloud that provides a 3D model of a real world scene.

Point cloud construction may begin by producing binary, background-subtracted images for each time-synchronized frame on each camera. Using these binary images and the calibrations of each camera, a 3D convex hull may be produced by discretizing the scene into voxels and filling each voxel, if the voxel is contained within the ray projected from the camera through the image visual hull. The image visual hull may be the silhouette of the scene, for example. The silhouette of the scene may be a shape-form silhouette.

The resulting convex hull may contain voxels that may not actually be present in the world, due to reconstructing only of the visual hull. In order to achieve a more precise point cloud, the 3D convex hull may be carved using photo consistency methods.

Photo consistency methods may back-project the surface of a 3D reconstructed visual hull onto each visible camera. Photo consistency methods may also check to ensure the color of the pixels is consistent with the same pixel from another camera, or with nearby pixels, such as to avoid unrealistic discontinuities. If the colors from each visible camera do not agree, the voxel may be carved. This process may be repeated for the entire convex hull, producing the final carved point cloud.

Point cloud construction may estimate the skeletal pose of all participants in a real world scene. Point cloud construction may fit a hand-made participant model to the estimated pose of each participant in a real world scene. In an example, the real world scene could be a sports court and the participants could be all the players on the sports court. In this example, point cloud construction could fit a hand-made player model to the estimated pose of each player on the sports court.

Point cloud construction may include meshing techniques, which may be used to improve the quality of a final visualization for a user. Meshing techniques may be used to mesh multiple point counts. Meshing techniques may be used to provide a view that may be very close to a point cloud, for example.

Player Identification

A first person process may use player identification to enable the user to select from which player's view to render the 3D reconstruction. Player identification may involve multiple steps in order to produce reliable results.

Player identification may start by performing jersey number detection, as illustrated in FIG. 39F. Jersey numbers may be mapped to player names. Jersey numbers may then be mapped to player names using official rosters and the like.

Jersey number detection may be performed frame-by-frame. Frame-by-frame jersey number detection may be performed by scanning and classifying each window as a number or as nothing, such as using a support vector machine (SVM), a supervised machine learning model used for classification. The SVM may be trained, such as using training sets of manually marked jersey numbers from game video, for example.

Results from individual frame-by-frame detection may be stitched together to form temporal tracks. Individual frame by frame detection may be stitched together to form temporal tracks using a k-shortest paths algorithm. Jersey number tracks may be associated with existing, more continuous player tracking data. Associating jersey number tracks with existing, more continuous player tracking data may produce robust tracks of identifiable players.

Head Tracking

A first person process may use head tracking in order to control the location of the view within a 3D reconstruction, as illustrated in FIG. 39F. Head tracking may involve multiple steps in order to produce reliable results.

The first step of head tracking may be the same as for player identification. The first step of head tracking may include head detection. Head detection may create a model on heads instead of on jersey numbers. Head detection may be performed frame by frame.

Head detection may include frame by frame head detection. Frame-by-frame head detection may be performed by scanning each image. Frame-by-frame head detection may be performed by scanning each image and classifying each window as a head or not.

Classifying each window as a head or not may be performed using an SVM. An SVM may be trained. An SVM may be trained using manually marked head samples from previously recorded games. An SVM maybe be a team-dk-SVM.

The results of the detection may then be used in 2D tracking to produce temporal 2D tracklets of each head within a camera's frame. 2D tracklets may then be triangulated using the results of all cameras to produce a 3D estimation of the location of all heads on the court. A 3D estimation of the location of all heads on the court may be 3D tracklets.

3D tracklets may then be stitched together. 3D tracklets may then be stitched together using an algorithm. An algorithm may be a k-shortest paths (KSP) algorithm. 3D tracklets may be stitched together to produce potential final head tracking results. Linear programming may be used to choose optimal head paths.

Gaze Estimation

As illustrated in FIG. 39F, a first person process may use gaze estimation. Gaze estimation may be used to control the orientation of a view mounted on the player's head within the 3D reconstruction. Gaze estimation may be computed by assuming a player is always looking in the direction opposite the numbers on the back of the player.

Jersey number detection may be performed frame by frame. Frame by frame jersey number detection may be performed by scanning and classifying each window as a number or nothing using an SVM. The SVM may be trained using manually marked jersey numbers from an existing game video.

An assumption may be made to determine the angle of a jersey number located on the back or front of a player's jersey. An assumption may be that a jersey number is only visible when the jersey number is perfectly aligned with a camera that made the detection.

Cameras may have a known location in space. Because the cameras have a known location in space, the vector between the jersey and the camera may be computed using the known location of the camera in space.

Frame-by-frame estimation may be performed after a vector is calculated. The results of the frame-by-frame estimation may be filtered to provide a smoothed experience for a first person process.

FIG. 41 relates to an offering referred to as "inSight." This offering allows pushing of relevant stats to fans' mobile devices 4104. For example, if player X just made a three-point shot from the wing, this would show statistics about how often he made those types of shots 4108, versus other types of shots, and what types of play actions he typically made these shots off of inSight does for hardcore fans what Eagle (the system described above) does for team analysts and coaches. Information, insights, and intelligence may be delivered to fans' mobile devices while they are seated in the arena. This data is not only beautiful and entertaining, but is also tuned into the action on the court. For example, after a seemingly improbable corner three by a power forward, the fan is immediately pushed information that shows the shot's frequency, difficulty, and likelihood of being made. In embodiments, the platform features described above as "Eagle," or a subset thereof may be provided, such as in a mobile phone form factor for the fan. An embodiment may include a storyboard stripped down, such as from a format for an 82" touch screen to a small 4" screen. Content may be pushed to a device that corresponds to the real time events happening in the game. Fans may be provided access to various effects (e.g., DataFX features described herein) and to the other features of the methods and systems disclosed herein.

Figure 42A:
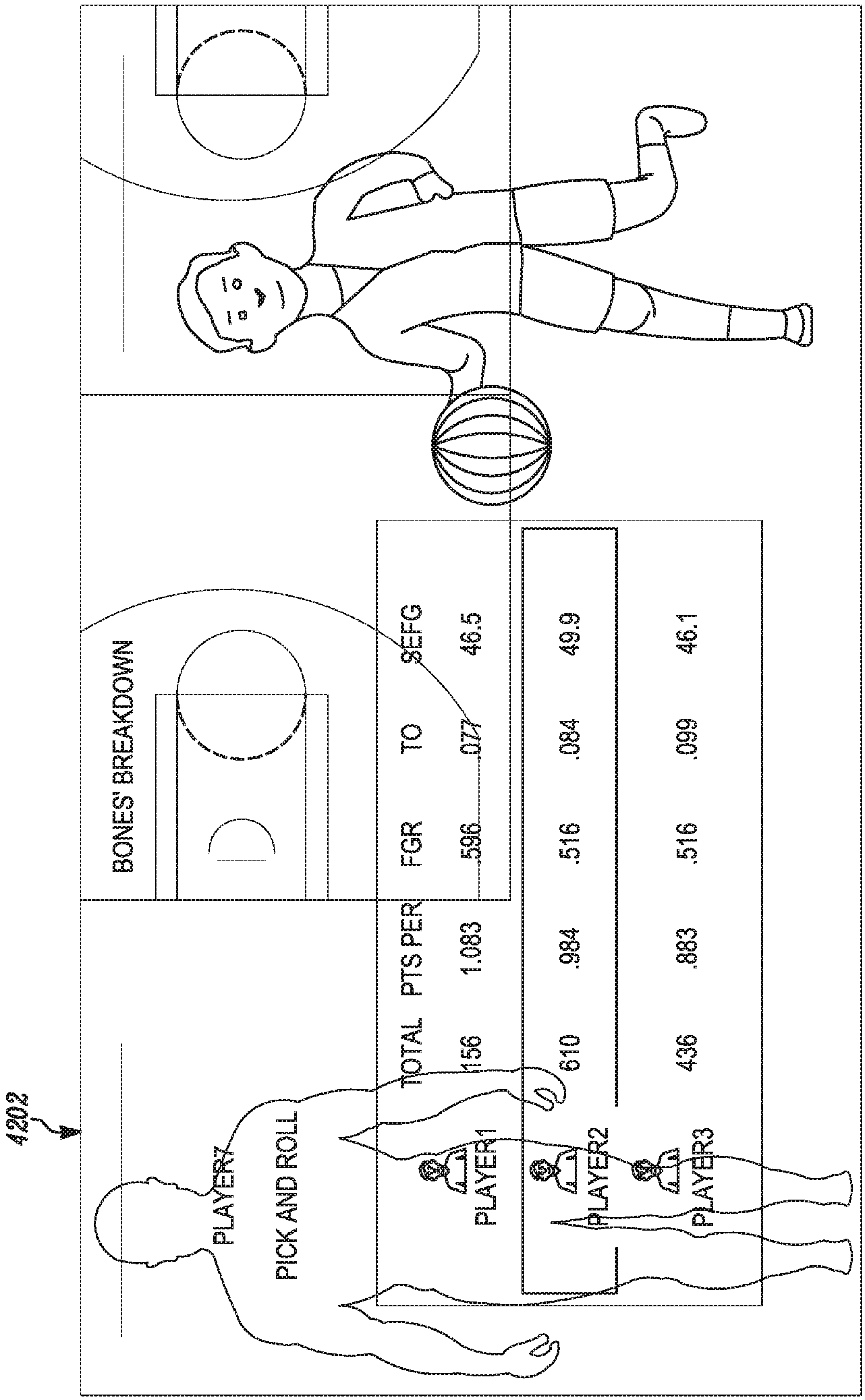
FIGS. 42A-42C illustrate a screen shot according to an exemplary and non-limiting embodiment.
Figure 42B:
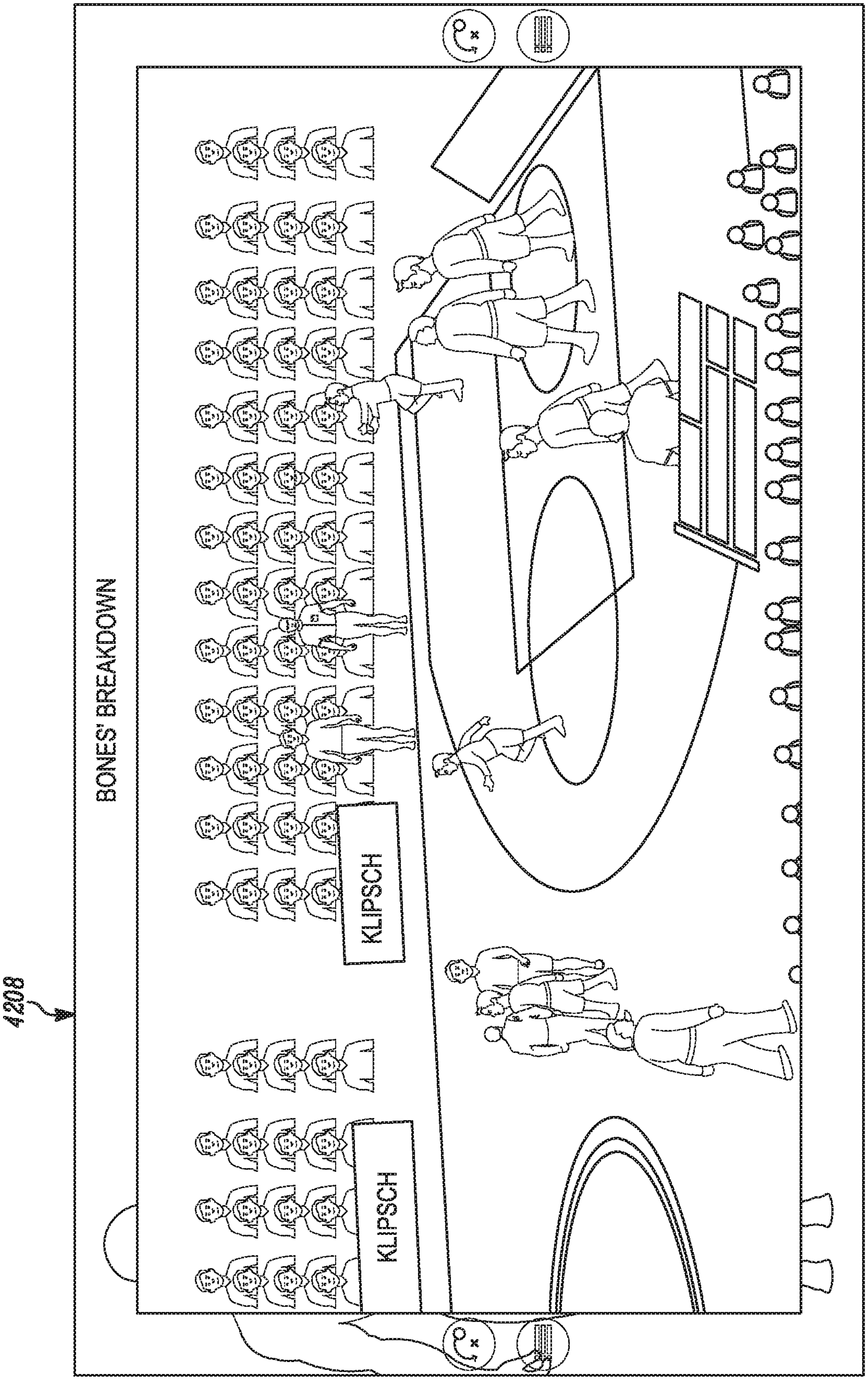
Figure 42C:
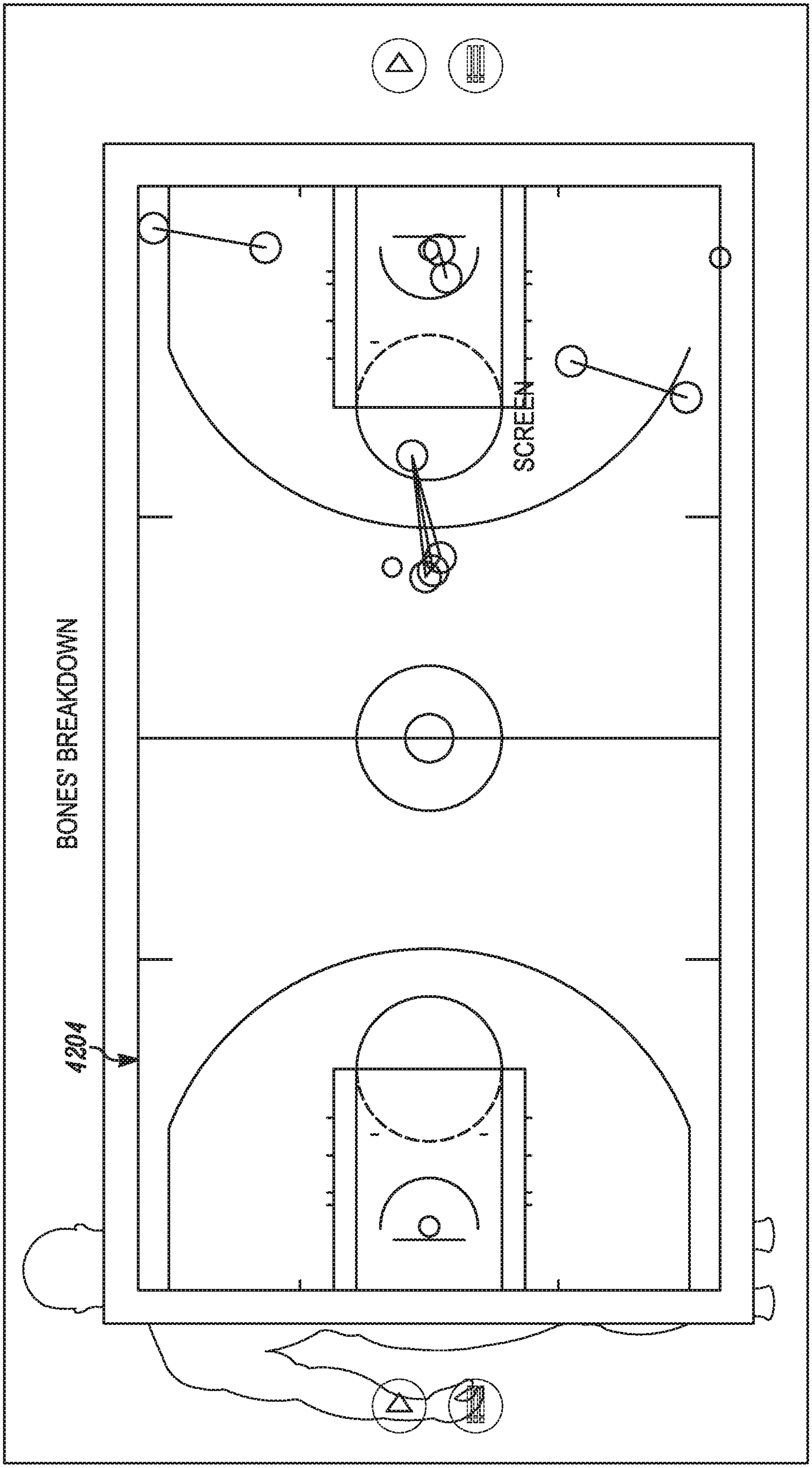
Figure 43:
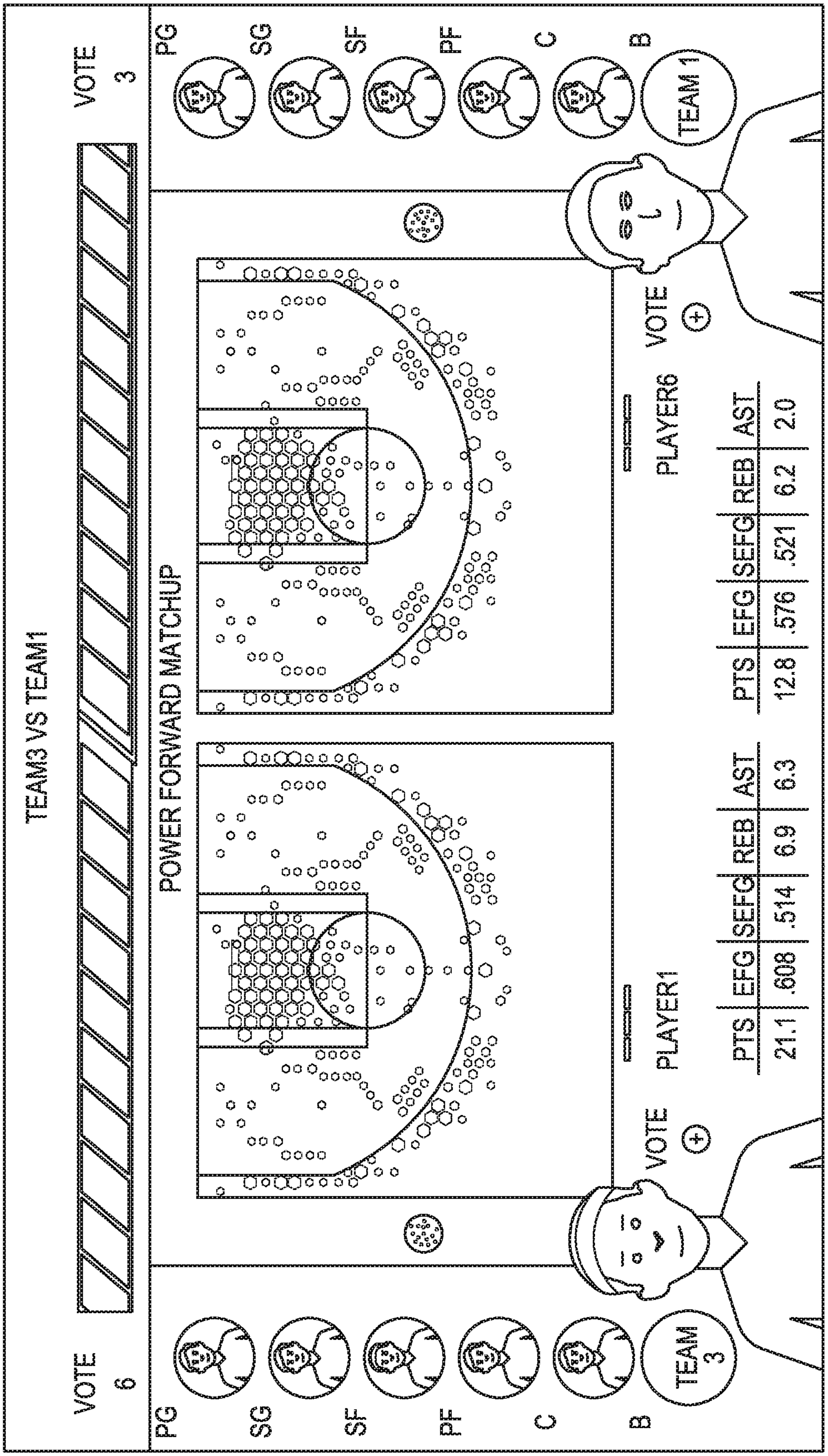
FIG. 43 illustrates a screen shot according to an exemplary and non-limiting embodiment.

FIGS. 42 and 43 show touchscreen product interface elements 4202, 4204, 4208, 4302 and 4304. These are essentially many different skins and designs on the same basic functionality described throughout this disclosure. Advanced stats are shown in an intuitive large-format touch screen interface. A touchscreen may act as a storyboard for showing various visualizations, metric and effects that conform to an understanding of a game or element thereof. Embodiments include a large format touch screen for commentators to use during a broadcast. While InSight serves up content to a fan, the Storyboard enables commentators on TV to access content in a way that helps them tell the most compelling story to audiences.

Features include providing a court view, a hexagonal Frequency+Efficiency View, a "City/Matrix" View with grids of events, a Face/Histogram View, Animated intro sequences that communicate to a viewer that each head's position means that player's relative ranking, an Animated face shuttle that shows re-ranking when metric is switched, a Scatter Rank View, a ranking using two variables (one on each axis), a Trends View, integration if metrics with on-demand video and the ability to r-skin or simplify for varying levels of commentator ability.

In embodiments, new metrics can be used for other activities, such as driving new types of fantasy games, e.g. point scoring in fantasy leagues could be based on new metrics.

In embodiments, DataFX can show the player how his points were scored, e.g. overlay that runs a counter over an RB's head showing yards rushed while the video shows RB going down the field. In embodiments, one can deliver, for example, video clips (possibly enhanced by DataFX effects) corresponding to plays that scored points for a fantasy user's team for that night or week.

Using an inSight-like mobile interface, a social game can be made so that much of the game play occurs in real time while the fan is watching the game.

Using Insight-like mobile device features, a social game can be managed so that game play occurs in real time while a fan is watching the game, experiencing various DataFX effects and seeing fantasy scoring-relevant metrics on screen during the game. In embodiments, the methods and systems may include a fantasy advice or drafting tool for fans, presenting rankings and other metrics that aid in player selection.

Just as Eagle enables teams to get more wins by devising better tactics and strategy, we could provide an Eagle-like service for fantasy players that gives the players a winning edge. The service/tool would enable fans to research all the possible players, and help them execute a better draft or select a better lineup for an upcoming week/game.

DataFX can also be used for instant replays with DataFX optimized so that it can produce "instant replays" with DataFX overlays. This relies on a completely automated solution for court detection, camera pose solving, player tracking, and player rotoscoping.

Interactive DataFX may also be adapted for display on a second screen, such as a tablet, while a user watches a main screen. Real time or instant replay viewing and interaction may be used to enable such effects. On a second screen-type viewing experience, the fan could interactively toggle on and off various elements of DataFX. This enables the fan to customize the experience and to explore many different metrics. Rather than only DataFX-enabled replays, the system could be further optimized so that DataFX is overlaid in true real time, enabling the user to toggle between a live video feed and a live video feed that is overlaid with DataFX. The user would then also be able to choose the type of DataFX to overlay, or which player(s) to overlay it on.

A touch screen UI may be established for interaction with DataFX.

Many of the above embodiments may be used for basketball, as well as for other sports and for other items that are captured in video, such as TV shows, movies, or live video (e.g., news feeds). For sports, we use the player tracking data layer to enable the computer to "understand" every second of every game. This enables the computer to deliver content that is extracting from portions of the game and to augment that content with relevant story-telling elements. The computer thus delivers personalized interactive augmented experiences to the end user.

For non-sports domains, such as TV shows or movies, there is no player tracking data layer that assists the computer in understanding the event. Rather, in this case, the computer must derive, in some other way, an understanding of each scene in a TV show or movie. For example, the computer might use speech recognition to extract the dialogue throughout a show. Or it could use computer vision to recognize objects in each scene, such as robots in the Transformer movie. Or is could use a combination of these inputs and others to recognize things like explosions. The sound track could also provide clues.

The resulting system would use this understand to deliver the same kind of personalized interactive augmented experience as we have described for the sports domain. For example, a user could request to see the Transformer movie series, but only a compilation of the scenes where there are robots fighting and no human dialogue. This enables "short form binge watching," where users can watch content created by chopping up and re-combining bits of content from original video. The original video could be sporting events, other events TV shows, movies, and other sources. Users can thus gorge on video compilations that target their individual preferences. This also enables a summary form of watching, suitable for catching up with current events or currently trending video, without having to watch entire episodes or movies.

Figure 44:
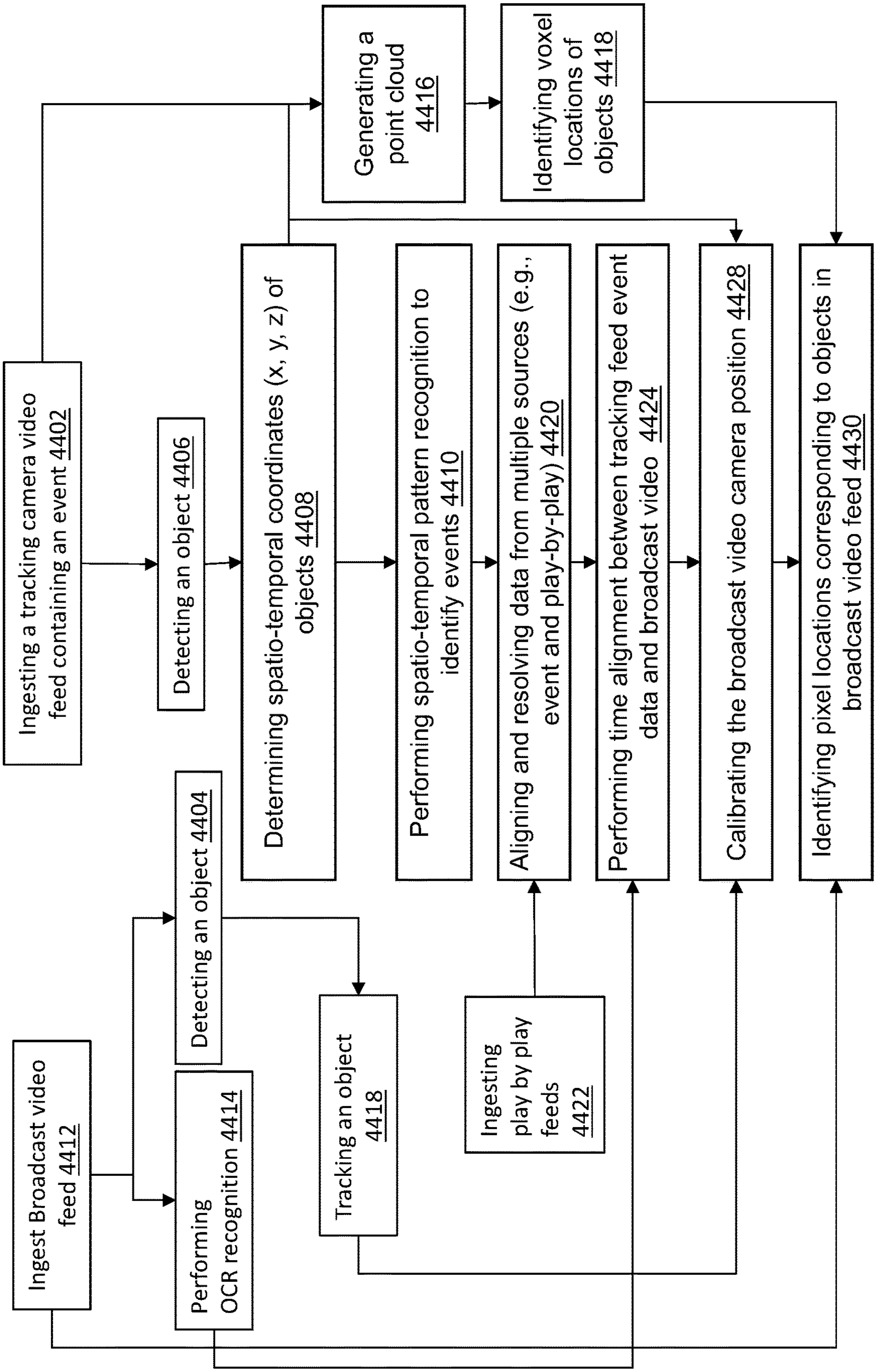
FIG. 44 illustrates a process flow according to an exemplary and non-limiting embodiment.

FIG. 44 provides a flow under which the platform may ingest and align content of one or more broadcast video feeds and one or more tracking camera video feeds. At a step 4412, a broadcast video feed may be ingested, which may consist of an un-calibrated and un-synchronized video feed. The ingested broadcast video feed may be processed by performing optical character recognition at a step 4414, such as to extract information from the broadcast video feed that may assist with aligning events within the feed with events identified in other sources of video for the same event. This may include recognizing text and numerical elements in the broadcast video feed, such as game scores, the game clock, player numbers, player names, text feeds displayed on the video, and the like. For example, the time on the game clock, or the score of a game, may assist with time-alignment of a broadcast feed with another video feed. At a step 4404 objects may be detected within the broadcast video feed 4404, such as using machine-based object-recognition technologies. Objects may include players (including based on recognizing player numbers), equipment (such as the ball in a basketball game), and many others. Once detected at the step 4404, objects may be tracked over time in a step 4418, such as in progressive frames of the broadcast video feed. Tracked objects may be used to assist in calibrating the broadcast video position by associating them with the same objects as identified in another source, such as a tracking camera video feed.

At a step 4402, in parallel with the steps involved in ingesting and processing a broadcast video feed, video feeds from tracking cameras, such as tracking cameras for capturing 3D motion in a venue (like a sports arena), may be ingested. The tracking camera video feeds may be calibrated and synchronized to a frame of reference, such as one defined by the locations of a set of cameras that are disposed at known locations within the venue where the tracking camera system is positioned. At a step 4406, one or more objects may be detected within the tracking camera video feed, including various objects of the types noted above, such as players, numbers, items of equipment, and the like. In embodiments, spatiotemporal coordinates of the objects may be determined by processing the information from the tracking camera video feed, the coordinates being determined for the recognized objects based on the frame of reference defined by the camera positions of the tracking system. In embodiments, the coordinates being determined for the recognized objects can be based on the court or the field on which the game is played. In embodiments, the coordinates being determined for the recognized objects are based on the boundaries, lines, markers, indications, and the like associated with the court or the field on which the game is played. The video feed from the tracking camera system and the information about spatiotemporal object positions may be used to generate a point cloud at a step 4416, within which voxel locations of the objects detected at the step 4406 may be identified at a step 4418. The tracking camera video feed that was processed to detect and track objects may be further processed at a step 4410 by using spatiotemporal pattern recognition (such as machine-based spatiotemporal pattern recognition as described throughout this disclosure) to identify one or more events, which may be a wide range of events as described throughout this disclosure, such as events that correspond to patterns in a game or sport.

In embodiments, other feeds may be available that may contain additional information about events that are contained in the tracking camera video feed. For example, a data feed, such as a play-by-play feed, for a game may be ingested at a step 4422. At a step 4420, the information from multiple sources may be aligned, such as aligning the play-by-play data feed from the step 4422 with events recognized at the step 4410. Similarly, at a step 4424 the recognized event data in the tracking camera video feed at the step 4410 may be aligned with events recognized in the broadcast video feed at the step 4414, resulting in time-aligned broadcast video, tracking camera, and other (e.g., play-by-play) feeds. Once the tracking camera video feed and the broadcast video feed are time-aligned for an event, objects detected at the step 4404 in the broadcast video feed and tracked at the step 4418 (e.g., players' heads) may be used at a step 4428 to calibrate the broadcast video camera position, such as by identifying the broadcast video camera position within the frame of reference of the tracking camera system used to capture the tracking camera video feed. This may include comparing sizes and orientations of the same object as it was detected at the step 4404 in the broadcast video feed and at the step 4406 in the tracking camera system video feed. In embodiments, calibration parameters of the broadcast camera can be determined by, among other things, comparing positions of detected objects in the video with detected three-dimensional positions of the corresponding objects that can be obtained using the calibrated tracking system. In embodiments, heads of the players in the game can be suitable objects because the heads of the players can be precisely located relative to other portions of the bodies of the players. Once calibrated, the broadcast video camera information can be processed as another source just like any of the tracking cameras. This may include re-calibrating the broadcast video camera position for each of a series of subsequent events, as the broadcast video camera may move or change zoom between events. Once the broadcast video camera position is calibrated to the frame of reference of the tracking camera system, at a step 4430 pixel locations in the broadcast video feed may be identified, corresponding to objects in the broadcast video feed, which may include using information about voxel locations of objects in the point cloud generated from the motion tracking camera feed at the step 4418 and/or using image segmentation techniques. The process of FIG. 44 thus provides time-aligned broadcast video feeds, tracking camera event feeds, and play-by-play feeds, where within each feed pixel locations or voxel locations of objects and backgrounds are known, so that various activities can be undertaken to process the feeds, such as for augmenting the feeds, performing pattern recognition on objects and events within them (such as to find plays following particular patterns), automatically clipping or cutting them to produce content (such as capturing a reaction in broadcast video to an event displayed in or detected by the tracking camera feeds based on a time sequence of time-aligned events), and many others as described throughout this disclosure.

The methods and systems disclosed herein may include methods and systems for enabling a user to express preferences relating to display of video content and may include using machine learning to develop an understanding of at least one event, one metric related to the event, or relationships between events, metrics, venue, or the like within at least one video feed to determine at least one type for the event; automatically, under computer control, extracting the video content displaying the event and associating the machine learning understanding of the type for the event with the video content in a video content data structure; providing a user interface by which a user can indicate a preference for at least one type of content; and upon receiving an indication of the preference by the user, retrieving at least one video content data structure that was determined by the machine learning to have content of the type preferred by the user and providing the user with a video feed containing the content of the preferred type.

In embodiments, the user interface is of at least one of a mobile application, a browser, a desktop application, a remote control device, a tablet, a touch screen device, a virtual reality or augmented reality headset, and a smart phone. In embodiments, the user interface further comprises an element for allowing a user to indicate a preference as to how content will be presented to the user. In embodiments, the machine learning further comprises determining an understanding of a context for the event and the context is stored with the video content data structure. In embodiments, the user interface further comprises an element for allowing a user to indicate a preference for at least one context. In embodiments, upon receiving an indication of a preference for a context, video content corresponding to the context preference is retrieved and displayed to the user. In embodiments, the context comprises at least one of the presence of a preferred player in the video feed, a preferred matchup of players in the video feed, a preferred team in the video feed, and a preferred matchup of teams in the video feed. In embodiments, the user interface allows a user to select at least one of a metric and a graphic element to be displayed on the video feed, wherein at least one of the metric and the graphic is based at least in part on the machine understanding.

The methods and systems disclosed herein may include methods and systems for enabling a mobile application allowing user interacting with video content method and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and using the context information for a plurality of such video content data structures to generate, automatically under computer control, producing a story or video clip that includes the video content data structure, wherein the content of the story is based on a user preference. In embodiments, the user preference for a type of content is based on at least one of a user expressed preference and a preference that is inferred based on user interaction with an item of content.

The methods and systems disclosed herein may include methods and systems for enabling a user to express preferences relating to display of video content and may include a machine learning facility for developing an understanding of at least one event within at least one video feed to determine at least one type for the event; a video production facility for automatically, under computer control, extracting the video content displaying the event and associating the machine learning understanding of the type for the event with the video content in a video content data structure; a server for serving data to a user interface by which a user can indicate a preference for at least one type of content; and upon receiving at the server an indication of the preference by the user, retrieving at least one video content data structure that was determined by the machine learning to have content of the type preferred by the user and providing the user with a video feed containing the content of the preferred type.

In embodiments, the user interface is of at least one of a mobile application, a browser, a desktop application, a remote control device, a tablet, and a smart phone. In embodiments, the user interface further comprises an element for allowing a user to indicate a preference as to how content will be presented to the user. In embodiments, the machine learning further comprises determining an understanding of a context for the event and the context is stored with the video content data structure. In embodiments, the user interface further comprises an element for allowing a user to indicate a preference for at least one context. In embodiments, upon receiving an indication of a preference for a context, video content corresponding to the context preference is retrieved and displayed to the user. In embodiments, the context comprises at least one of the presence of a preferred player in the video feed, a preferred matchup of players in the video feed, a preferred team in the video feed, and a preferred matchup of teams in the video feed. In embodiments, the user interface allows a user to select at least one of a metric and a graphic element to be displayed on the video feed, wherein the metric is based at least in part on the machine understanding.

The methods and systems disclosed herein may include methods and systems delivering personalized video content and may include using machine learning to develop an understanding of at least one event within at least one video feed to determine at least one type for the event; automatically, under computer control, extracting the video content displaying the event and associating the machine learning understanding of the type for the event with the video content in a video content data structure; developing a personal profile for a user based on at least one of expressed preferences of the user, information about the user, and information collected about actions taken by the user with respect to at least one type of video content; and upon receiving an indication of the user profile, retrieving at least one video content data structure that was determined by the machine learning to have content of the type likely to be preferred by the user based on the user profile.

The methods and systems disclosed herein may include methods and systems for delivering personalized video content and may include using machine learning to develop an understanding of at least one event within at least one video feed to determine at least one type for the event, wherein the video feed is a video feed for a professional game; using machine learning to develop an understanding of at least one event within a data feed relating to the motion of a non-professional player; based on the machine learning understanding of the video feed for the professional game and the data feed of the motion of the non-professional player, automatically, under computer control, providing an enhanced video feed that represents the non-professional player playing within the context of the professional game.

In embodiments, the methods and systems may further include providing a facility having cameras for capturing 3D motion data and capturing video of a non-professional player to provide the data feed for the non-professional player. In embodiments, the non-professional player is represented by mixing video of the non-professional player with video of the professional game. In embodiments, the non-professional player is represented as an animation having attributes based on the data feed about the non-professional player.

The methods and systems disclosed herein may also include one or more of the following features and capabilities: spatiotemporal pattern recognition (including active learning of complex patterns and learning of actions such as P&R, postups, play calls); hybrid methods for producing high quality labels, combining automated candidate generation from XYZ data, and manual refinement; indexing of video by automated recognition of game clock; presentation of aligned optical and video; new markings using combined display, both manual and automated (via pose detection etc.); metrics: shot quality, rebounding, defense and the like; visualizations such as Voronoi, heatmap distribution, etc.; embodiment on various devices; video enhancement with metrics & visualizations; interactive display using both animations and video; gesture and touch interactions for sports coaching and commentator displays; and cleaning of XYZ data using, for example, HMM, PBP, video, hybrid validation.

Further details as to data cleaning 204 are provided herein. Raw input XYZ is frequently noisy, missing, or wrong. XYZ data is also delivered with attached basic events such as possession, pass, dribble, shot. These are frequently incorrect. This is important because event identification further down the process (Spatiotemporal Pattern Recognition) sometimes depends on the correctness of these basic events. As noted above, for example, if two players' XY positions are switched, then "over" vs. "under" defense would be incorrectly switched, since the players' relative positioning is used as a critical feature for the classification. Also, PBP data sources are occasionally incorrect. First, one may use validation algorithms to detect all events, including the basic events such as possession, pass, dribble, shot, and rebound that are provided with the XYZ data. Possession/Non-possession may use a Hidden Markov Model to best fit the data to these states. Shots and rebounds may use the possession model outputs, combined with 1) projected destination of the ball, and 2) PBP information. Dribbles may be identified using a trained ML algorithm and also using the output of the possession model.

Specifically, once possessions are determined, dribbles may be identified with a hidden Markov model. The hidden Markov model consists of three states:

1. Holding the ball while the player is still able to dribble.
2. Dribbling the ball.
3. Holding the ball after the player has already dribbled.

A player starts in State 1 when he gains possession of the ball. At all times players are allowed to transition to either their current state, or the state with a number one higher than their current state, if such a state exists.

The players' likelihood of staying in their current state or transitioning to another state may be determined by the transition probabilities of the model as well as the observations. The transition probabilities may be learned empirically from the training data. The observations of the model consist of the player's speed, which is placed into two categories, one for fast movement, and one for slow movement, as well as the ball's height, which is placed into categories for low and high height. The cross product of these two observations represents the observation space for the model. Similar to the transition probabilities, the observation probabilities, given a particular state, may be learned empirically from the training data. Once these probabilities are known, the model is fully characterized and may be used to classify when the player is dribbling on unknown data.

Once it is known that the player is dribbling, it remains to be determined when the actual dribbles occur. This may be done with a Support Vector Machine that uses domain specific information about the ball and player, such as the height of the ball as a feature to determine whether at that instant the player is dribbling. A filtering pass may also be applied to the resulting dribbles to ensure that they are sensibly separated, so that for instance, two dribbles do not occur within 0.04 seconds of each other.

Returning to the discussion of the algorithms, these algorithms decrease the basic event labeling error rate by a significant factor, such as about 50%. Second, the system has a library of anomaly detection algorithms to identify potential problems in the data. These include temporal discontinuities (intervals of missing data are flagged); spatial discontinuities (objects traveling is a non-smooth motion, "jumping"); interpolation detection (data that is too smooth, indicating that post-processing was done by the data supplier to interpolate between known data points in order to fill in missing data). This problem data is flagged for human review so that events detected during these periods are subject to further scrutiny.

Spatio-player tracking may be undertaken in at least two types, as well as in a hybrid combined type. For tracking with broadcast video, the broadcast video is obtained from multiple broadcast video feeds. Typically, this will include a standard "from the stands view" from the center stands midway-up, a backboard view, a stands view from a lower angle from each corner, and potentially other views. Optionally, PTZ (pan tilt zoom) sensor information from each camera is also returned. An alternative is a Special Camera Setup method. Instead of broadcast feeds, this uses feeds from cameras that are mounted specifically for the purposes of player tracking. The cameras are typically fixed in terms of their location, pan, tilt, zoom. These cameras are typically mounted at high overhead angles; in the current instantiation, typically along the overhead catwalks above the court. A Hybrid/Combined System may be used. This system would use both broadcast feeds and feeds from the purpose-mounted cameras. By combining both input systems, accuracy is improved. Also, the outputs are ready to be passed on to the DataFX pipeline for immediate processing, since the DataFX will be painting graphics on top of the already-processed broadcast feeds. Where broadcast video is used, the camera pose must be solved in each frame, since the PTZ may change from frame to frame. Optionally, cameras that have PTZ sensors may return this info to the system, and the PTZ inputs are used as initial solutions for the camera pose solver. If this initialization is deemed correct by the algorithm, it will be used as the final result; otherwise, refinement will occur until the system receives a useable solution. As described above, players may be identified by patches of color on the court. The corresponding positions are known since the camera pose is known, and we can perform the proper projections between 3D space and pixel space.

Where purpose mounted cameras are used, multiple levels of resolution may be involved. Certain areas of the court or field require more sensitivity, e.g. on some courts, the color of the "paint" area makes it difficult to track players when they are in the paint. Extra cameras with higher dynamic range and higher zoom are focused on these areas. The extra sensitivity enables the computer vision techniques to train separate algorithms for different portions of the court, tuning each algorithm to its type of inputs and the difficulty of that task.

In a combination system, by combining the fixed and broadcast video feeds, the outputs of a player tracking system can feed directly into the DataFX production, enabling near-real-time DataFX. Broadcast video may also produce high-definition samples that can be used to increase accuracy.

The methods and systems disclosed herein may include methods and systems for enabling interaction with a broadcast video content stream and may include a machine learning facility for developing an understanding of at least one event within a video feed for a video broadcast, the understanding including identifying context information relating to the event; and a touch screen user interface by which a broadcaster can interact with the video feed, wherein the options for broadcaster interaction are based on the context information, wherein the interaction with the touch screen controls the content of the broadcast video event. In embodiments, the touch screen interface is a large screen adapted to be seen by viewers of the video broadcast as the broadcaster uses the touch screen. In embodiments, a smaller touch screen is used by a commentator on air to control the information content being displayed, and the images/video on the touch screen is simultaneously displayed on a larger screen that is filmed and broadcast or is simultaneously displayed directly in the broadcast feed. In embodiments, the broadcaster can select from a plurality of context-relevant metrics, graphics, or combinations thereof to be displayed on the screen. In embodiments, the broadcaster can display a plurality of video feeds that have similar contexts as determined by the machine learning facility. In embodiments, the similarity of contexts is determined by comparing events within the video feeds. In embodiments, the broadcaster can display a superimposed view of at least two video feeds to facilitate a comparison of events from a plurality of video feeds. In embodiments, the comparison is of similar players from different, similar, or identical time periods. In embodiments, a similarity of players is determined by machine understanding of the characteristics of the players from the different time periods. In embodiments, the broadcaster can display a plurality of highlights that are automatically determined by a machine understanding of a live sports event that is the subject of the video feed. In embodiments, the highlights are determined based on similarity to highlights that have been identified for other events.

The methods and systems disclosed herein may include methods and systems for enabling interaction with a broadcast video content stream and may include developing a machine learning understanding of at least one event within a video feed for a video broadcast, the understanding including identifying context information relating to the event; and providing a touch screen user interface by which a broadcaster can interact with the video feed, wherein the options for broadcaster interaction are based on the context information, wherein the interaction with the touch screen controls the content of the broadcast video event. In embodiments, the touch screen interface is a large screen adapted to be seen by viewers of the video broadcast as the broadcaster uses the touch screen. In embodiments, the broadcaster can select from a plurality of context-relevant metrics to be displayed on the screen. In embodiments, the broadcaster can display a plurality of video feeds that have similar contexts as determined by the machine learning facility. In embodiments, the similarity of contexts is determined by comparing events within the video feeds. In embodiments, the broadcaster can display a superimposed view of at least two video feeds to facilitate a comparison of events from a plurality of video feeds. In embodiments, the comparison is of similar players from different time periods.

In embodiments, a similarity of players is determined by machine understanding of the characteristics of the players from the different time periods. In embodiments, the broadcaster can display a plurality of highlights that are automatically determined by a machine understanding of a live sports event that is the subject of the video feed. In embodiments, the highlights are determined based on similarity to highlights that have been identified for other events.

The methods and systems disclosed herein may include methods and systems for enabling interaction with a broadcast video content stream and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and providing an application by which a user can interact with the video content data structure, wherein the options for user interaction are based on the context information, wherein the interaction with the video content data structure controls the presentation of a broadcast video event on a display screen.

Methods and systems disclosed herein may include tracklet stitching. Optical player tracking results in short to medium length tracklets, which typically end when the system loses track of a player or the player collides (or passes close to) with another player. Using team identification and other attributes, algorithms can stitch these tracklets together.

Where a human being is in the loop, systems may be designed for rapid interaction and for disambiguation and error handling. Such a system is designed to optimize human interaction with the system. Novel interfaces may be provided to specify the motion of multiple moving actors simultaneously, without having to match up movements frame by frame.

In embodiments, custom clipping is used for content creation, such as involving OCR. Machine vision techniques may be used to automatically locate the “score bug” and determine the location of the game clock, score, and quarter information. This information is read and recognized by OCR algorithms. Post-processing algorithms using various filtering techniques are used to resolve issues in the OCR. Kalman filtering/HMMs may be used to detect errors and correct them. Probabilistic outputs (which measure the degree of confidence) assist in this error detection/correction.

Sometimes, a score is non-existent or cannot be detected automatically (e.g. sometimes during PIP or split screens). In these cases, remaining inconsistencies or missing data is resolved with the assistance of human input. Human input is designed to be sparse so that labelers do not have to provide input at every frame. Interpolation and other heuristics are used to fill in the gaps. Consistency checking is done to verify game clock.

For alignment 2112, as discussed in connection with FIG. 21, another advance is to use machine vision techniques to verify some of the events. For example, video of a made shot will typically show the score being increased or will show a ball going through a hoop. Either kind of automatic observation serves to help the alignment process result in the correct video frames being shown to the end user.

In accordance with an exemplary and non-limiting embodiment, augmented or enhanced video with extracted semantics-based experience is provided based, at least in part, on 3D position/motion data. In accordance with other exemplary embodiments, there is provided embeddable app content for augmented video with an extracted semantics-based experience. In yet another exemplary embodiment, there is provided the ability to automatically detect the court/field, and relative positioning of the camera, in (near) real time using computer vision techniques. This may be combined with automatic rotoscoping of the players in order to produce dynamic augmented video content.

The methods and systems disclosed herein may include methods and systems for embedding video content in an application and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; taking an application that displays video content; and embedding the video content data structure in the application. In embodiments, the user interface of the application offers the user the option to control the presentation of the video content from the video content data structure in the application. In embodiments, the control of the presentation is based on at least one of a user preference and a user profile. In embodiments, the application is a mobile application that provides a story about an event and wherein the video content data structure comprises at least one of a content card and a digital still image.

The methods and systems disclosed herein may include methods and systems for enabling a mobile application that allows user interaction with video content and may include a video ingestion facility for taking a video feed; a machine learning facility for developing an understanding of an event within the video feed, the understanding including identifying context information relating to the event; and a video production facility for automatically, under computer control, extracting the content displaying the event, associating the extracted content with the context information and producing a video content data structure that includes the associated context information; and using the context information for a plurality of such video content data structures to generate, automatically under computer control, a story that includes a sequence of the video content data structures. In embodiments, the content of the story is based on a user profile that is based on at least one of an expressed user preference, information about a user interaction with video content, and demographic information about the user. In embodiments, the methods and systems may further include determining a pattern relating to a plurality of events in the video feed and associating the determined pattern with the video content data structure as additional context information. In embodiments, the pattern relates to a highlight event within the video feed. In embodiments, the highlight event is associated with at least one of a player and a team. In embodiments, the embedded application allows a user to indicate at least one of a player and a team for which the user wishes to obtain video feeds containing the highlight events. In embodiments, the pattern relates to a comparison of events occurring at least one of within the video feed or within a plurality of video feeds. In embodiments, the comparison is between events occurring over time. In embodiments, the embedded application allows a user to select at least one player to obtain a video providing a comparison between the player and at least one of a past representation of the same player and a representation of another player. In embodiments, the pattern is a cause-and-effect pattern related to the occurrence of a following type of event after the occurrence of a pre-cursor type of event. In embodiments, the embedded application allows the user to review video cuts in a sequence that demonstrate the cause-and-effect pattern. In embodiments, the application provides a user interface for allowing a user to enter at least one of text and audio input to provide a narrative for a sequence of events within the video feed. In embodiments, the user may select a sequence of video events from within the feed for display in the application. In embodiments, upon accepting the user narrative, the system automatically generates an electronic story containing the events from the video feed and the narrative.

The methods and systems disclosed herein may include methods and systems for enabling a mobile application that allows user interaction with video content and may include taking a video feed; using a machine learning facility to develop an understanding of an event within the video feed, the understanding including identifying context information relating to the event; and automatically, under computer control, extracting the content displaying the event, associating the extracted content with the context information and producing a video content data structure that includes the associated context information. In embodiments, the methods and systems may further include using the context information for a plurality of such video content data structures to generate, automatically under computer control, a story that includes a sequence of the video content data structures.

In embodiments, the user may interact with an application, such as on a phone, laptop, or desktop, or with a remote control, to control the display of broadcast video. As noted above in connection with interaction with a mobile application, options for user interaction may be customized based on the context of an event, such as by offering options to display context-relevant metrics for the event. These selections may be used to control the display of broadcast video by the user, such as by selecting preferred, context-relevant metrics that appear as overlays, sidebars, scrolling information, or the like on the video display as various types of events take place in the video stream. For example, a user may select settings for a context like a three point shot attempt, so that when the video displays three point shot attempts, particular metrics (e.g., the average success percentage of the shooter) are shown as overlays above the head of the shooter in the video.

The methods and systems disclosed herein may include methods and systems for personalizing content for each type of user based on determining the context of the content through machine analysis of the content and based on an indication by the user of a preference for a type of presentation of the content.

The methods and systems disclosed herein may include methods and systems for enabling a user to express preferences relating to display of video content and may include: taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and providing a user interface by which a user can indicate a preference for how content that is associated with a particular type of context will be presented to the user.

In embodiments, a user may be presented with an interface element for a mobile application, browser, desktop application, remote control, tablet, smart phone, or the like, for indicating a preference as to how content will be presented to the user. In embodiments, the preference may be indicated for a particular context, such a context determined by a machine understanding of an event. In embodiments, a user may select to see certain metrics, graphics or additional information overlaid on top of the existing broadcast for certain types of semantic events such as players expected field goal percentage when they possess the ball or the type and effectiveness of defense being played on a pick and roll.

The methods and systems disclosed herein may include methods and systems for automatically generating stories/content based on the personal profile of a viewer and their preferences or selections of contextualized content.

The methods and systems disclosed herein may include methods and systems for enabling a mobile application allowing user interacting with video content method and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and using the context information for a plurality of such video content data structures to generate, automatically under computer control, a story that includes the video content data structures, wherein the content of the story is based on a user preference. In embodiments, the user preference for a type of content is based on at least one of a user expressed preference and a preference that is inferred based on user interaction with an item of content.

In embodiments, items of content that are associated, based on machine understanding, with particular events in particular contexts can be linked together, or linked with other content, to produce modified content such as stories. For example, a game summary, such as extracted from an online report about an event, may be augmented with machine-extracted highlight cuts that correspond to elements featured in the game summary, such as highlights of important plays, images of particular players, and the like. These stories can be customized for a user, such as linking a story about a game played by the user's favorite team with video cuts of the user's favorite player that were taken during the game.

The methods and systems disclosed herein may include methods and systems for using machine learning to extract context information and semantically relevant events and situations from a video content stream, such that the events and situations may be presented according to the context of the content.

The methods and systems disclosed herein may include methods and systems for embedding video content in an application and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; taking an application that displays video content; and embedding the video content data structure in the application, wherein the location of the embedded video content in the application is based on the context information.

In embodiments, context-identified video cuts can be used to enrich or enhance applications, such as by embedding the cuts in relevant locations in the applications. For example, a mobile application displaying entertainment content may be automatically populated with video cuts of events that are machine-extracted and determined to be of the appropriate type (based on context), for the application. A video game application can be enhanced, such as by including real video cuts of plays that fit a particular context (e.g., showing a pick-and-roll play where players A and B are matched up against players C and D in a real game, and the same matchup is determined to occur in the video game).

To facilitate embedding the application, a set of protocols, such as APIs, may be defined, by which available categories (such as semantic categories, types of contexts, types of events, and the like) are specified, such that an application may call for particular types of events, which can, in turn, be embedded in the application. Similarly, an application may be constructed with appropriate pointers, calls, objects, or the like, that allow a designer to specify, and call for, particular types of events, which may be automatically extracted from a library of machine-extracted, context-identified events and then embedded where appropriate into the application code.

In embodiments, an application may provide stories about events, such as sporting events, and the machine-extracted content may include content cards or digital stills that are tagged by context so that they can be placed in appropriate locations in a story. The application can provide automatically generated content and stories, enhanced by content from a live game. In embodiments, an application may recommend video clips based on use of key words that match machine learned semantics that enable users to post or share video clips automatically tailored to text that they are writing. For example, clips may be recommended that include the presence of a particular player, that include a particular type of play (e.g., "dunks") and/or that are from a particular time period (e.g., "last night," etc.). In accordance with an exemplary and non-limiting embodiment, there is described a method for the extraction of events and situations corresponding to semantically relevant concepts. In yet other embodiments, semantic events may be translated and cataloged into data and patterns.

The methods and systems disclosed herein may include methods and systems for embedding content cards or digital stills with contextualized content stories/visualizations into a mobile application. They may include automatically generated content, such as stories, extracted from a live game delivered to users via an application, such as a mobile application, an augmented reality glasses application, a virtual reality glasses application, or the like. In embodiments, the application is a mobile application that provides a story about an event and wherein the video content data structure comprises at least one of a content card and a digital still image.

The methods and systems disclosed herein may include methods and systems for applying contextualized content from actual sporting events to video games to improve the reality of game play.

The methods and systems disclosed herein may include methods and systems for improving a video game and may include taking a video feed; using machine learning to develop an understanding of at least one first real event within the video feed, the understanding including identifying context information relating to the first real event; taking a game event coded for display within a video game; matching the context information for the real event with the context of the game event in the video game; comparing the display of the game event to the video for the real event; and modifying the coding of the game event based on the comparison.

In embodiments, context information can be used to identify video cuts that can be used to improve video games, such as by matching the context of a real event with a similar context in a coded video game event, comparing the video for the real event with the video game display of a similar event, and modifying the video event to provide a more faithful simulation of the real event. The methods and systems disclosed herein may include methods and systems for taking the characteristics of a user either from video capture of their recreational play or through user generated features and importing the user's avatar into a video game. The methods and systems disclosed herein may include methods and systems for interactive contextualized content that can be filtered and adjusted via a touch screen interface. In embodiments, the user interface is a touch screen interface.

The methods and systems disclosed herein may include methods and systems for real time display of relevant fantasy and betting metrics overlaid on a live game feed. The methods and systems disclosed herein may include methods and systems for real time adjustment of betting lines and/or additional betting option creation based on in-game contextual content.

The methods and systems disclosed herein may include methods and systems for taking a video feed and using machine learning to develop an understanding of at least one first event within the video feed. The understanding includes identifying context information relating to the first event. The methods and systems also include determining a metric based on the machine understanding. The metric is relevant to at least one of a wager and a fantasy sports outcome. The methods and systems include presenting the metric as an overlay for an enhanced video feed.

In embodiments, the metrics described throughout this disclosure may be placed as overlays on video feeds. For example, metrics calculated based on machine-extracted events that are relevant to betting lines, fantasy sports outcomes, or the like, can be presented as overlays, scrolling elements, or the like on a video feed. The metrics to be presented can be selected based on context information, such as showing fantasy metrics for players who are on screen at the time or showing the betting line where a scoring play impacts the outcome of a bet. As noted above, the displays may be customized and personalized for a user, such as based on that user's fantasy team for a given week or that user's wagers for the week.

The methods and systems disclosed herein may include methods and systems for taking a video feed of a recreational event; using machine learning to develop an understanding of at least one event within the video feed, the understanding including identifying context information relating to the event; and based on the machine understanding, providing content including information about a player in the recreational event based on the machine understanding and the context. The methods and systems may further include providing a comparison of the player to at least one professional player according to at least one metric that is based on the machine understanding.

In embodiments, machine understanding can be applied to recreational venues, such as for capturing video feeds of recreational games, practices, and the like. Based on machine understanding, highlight clips, metrics, and the like, as disclosed throughout this disclosure, may be extracted by processing the video feeds, including machine understanding of the context of various events within the video. In embodiments, metrics, video, and the like can be used to provide players with personalized content, such as a highlight reel of good plays, or a comparison to one or more professional players (in video cuts, or with semantically relevant metrics). Context information can allow identification of similar contexts between recreational and professional events, so that a player can see how a professional acted in a context that is similar to one faced by the recreational player. The methods and systems may enable the ability to use metrics and events recorded from a video stream to enable the creation of a recreational fantasy sports game with which users can interact. The methods and systems may enable the ability for to recognize specific events or metrics from a recreational game and compare them to similar or parallel events from a professional game to help coach a recreational player or team or for the creation of a highlight reel that features both recreational and professional video cuts.

The methods and systems disclosed herein may include methods and systems for providing enhanced video content and may include using machine learning to develop an understanding of a plurality of events within at least one video feed to determine at least one type for each of the plurality of events; extracting a plurality of video cuts from the video feed and indexing the plurality of video cuts based on at least one type of event determined by the understanding developed by machine learning; and making the indexed and extracted video cuts available to a user. In embodiments, the user is enabled to at least one of edit, cut, and mix the video cuts to provide an enhanced video containing at least one of the video cuts. In embodiments, the user is enabled to share the enhanced video. In embodiments, the methods and systems may further include indexing at least one shared, enhanced video with the semantic understanding of the type of events in that was determined by machine learning. In embodiments, the methods and systems may further include using the index information for the shared, enhanced video to determine a similarity between the shared, enhanced video and at least one other video content item. In embodiments, the similarity is used to identify additional extracted, indexed video cuts that may be of interest to the user. In embodiments, the similarity is used to identify other users who have shared similarly enhanced video. In embodiments, the similarity is used to identify other users who are likely to have an interest in the shared, enhanced video. In embodiments, the methods and systems may further include recommending at least one of the shared, enhanced video and one of the video cuts based on an understanding of the preferences of the other users. In embodiments, the similarity is based at least in part on user profile information for users who have indicated an interest in the video cut and the other video content item.

The methods and systems disclosed herein may include methods and systems for providing enhanced video content and may include using machine learning to develop an understanding of a plurality of events within at least one video feed to determine at least one type for each of the plurality of events; extracting a plurality of video cuts from the video feed and indexing the plurality of video cuts to form an indexed set of extracted video cuts, wherein the indexing is based on at least one type of event determined by the understanding developed by machine learning; determining at least one pattern relating to a plurality of events in the video feed; adding the determined pattern information to the index for the indexed set of video cuts; and making the indexed and extracted video cuts available to a user. In embodiments, the user is enabled to at least one of edit, cut, and mix the video cuts to provide an enhanced video containing at least one of the video cuts. In embodiments, the user is enabled to share the enhanced video. In embodiments, the video cuts are clustered based on the patterns that exist within the video cuts. In embodiments, the pattern is determined automatically using machine learning and based on the machine understanding of the events in the video feed. In embodiments, the pattern is a highlight event within the video feed. In embodiments, the highlight event is presented to the user when the indexed and extracted video cut is made available to the user. In embodiments, the user is prompted to watch a longer video feed upon viewing the indexed and extracted video cut.

In accordance with an exemplary and non-limiting embodiment, there is provided a touch screen or other gesture-based interface experience based, at least in part, on extracted semantic events.

The methods and systems disclosed herein may include methods and systems for machine extracting semantically relevant events from 3D motion/position data captured at a venue, calculating a plurality of metrics relating to the events, and presenting the metrics in a video stream based on the context of the video stream.

The methods and systems disclosed herein may include methods and systems for producing machine-enhanced video streams and may include taking a video feed from 3D motion and position data from a venue; using machine learning to develop an understanding of at least one first event within the video feed, the understanding including identifying context information relating to the first event; calculating a plurality of metrics relating to the events; and producing an enhanced video stream that presents the metrics in the video stream, wherein the presentation of at least one metric is based on the context information for the event with which the metric is associated in the video stream.

In embodiments, semantically relevant events determined by machine understanding of 3D motion/position data for an event from a venue can be used to calculate various metrics, which may be displayed in the video stream of the event. Context information, which may be determined based on the types and sequences of events, can be used to determine what metrics should be displayed at a given position within the video stream. These metrics may also be used to create new options for users to place wagers on or be integrated into a fantasy sports environment.

The methods and systems disclosed herein may include methods and systems enabling a user to cut or edit video based on machine learned context and share the video clips. These may further include allowing a user to interact with the video data structure to produce an edited video data stream that includes the video data structure. In embodiments, the interaction includes at least one of editing, cutting and sharing a video clip that includes the video data structure. The methods and systems may enable the ability for users to interact with video cuts through an interface to enhance the content with graphics or metrics based on a pre-set set of options, and then share a custom cut and enhanced clip. The methods and systems may include the ability to automatically find similarity in different video clips based on semantic context contained in the clips, and then cluster clips together or to recommend additional clips for viewing. The methods and systems may include the ability to extract contextualized content from a feed of a recreational event to immediately deliver content to players, including comparing a recreational player to a professional player based on machine learned understanding of player types.

In accordance with an exemplary and non-limiting embodiment, there is described a second screen interface unique to extracted semantic events and user selected augmentations. In yet other embodiments, the second screen may display real-time, or near real time, contextualized content.

In accordance with further exemplary and non-limiting embodiments, the methods and systems disclosed herein may include methods and systems for taking a video feed; using machine learning to develop an understanding of an event within the video feed, the understanding including identifying context information relating to the event; automatically, under computer control, extracting the content displaying the event and associating the extracted content with the context information; and producing a video content data structure that includes the associated context information. In embodiments, the methods and systems may further include determining a plurality of semantic categories for the context information and filtering a plurality of such video content data structures based on the semantic categories. In embodiments, the methods and systems may further include matching the events that occur in one video feed to those that occur in a separate video feed such that the semantic understanding captured in the first video feed can be used to at least one of filter and cut a separate second video feed based on the same events. In embodiments, the methods and systems may further include determining a pattern relating to a plurality of the events and providing a content data structure based on the pattern. In embodiments, the pattern comprises a plurality of important plays in a sports event that are identified based on comparison to similar plays from previous sports events. In embodiments, the pattern comprises a plurality of plays in a sports event that is determined to be unusual based on comparison to video feeds from other sports events. In embodiments, the methods and systems may further include extracting semantic events over time to draw a comparison of at least one of a player and a team over time.

In embodiments, the methods and systems may further include superimposing video of events extracted from video feeds from at least two different time periods to illustrate the comparison. In embodiments, the methods and systems may further include allowing a user to interact with the video data structure to produce an edited video data stream that includes the video data structure. In embodiments, the interaction includes at least one of editing, mixing, cutting, and sharing a video clip that includes the video data structure. In embodiments, the methods and systems may further include enabling users to interact with the video cuts through a user interface to enhance the video content with at least one graphic element selected from a menu of options.

In embodiments, the methods and systems may further include enabling a user to share the enhanced video content. In embodiments, the methods and systems may further include enabling a user to find similar video clips based on the semantic context identified in the clips. In embodiments, the methods and systems may further include using the video data structure and the context information to construct modified video content for a second screen that includes the video data structure. In embodiments, the content for the second screen correlates to the timing of an event displayed on a first screen. In embodiments, the content for the second screen includes a metric determined based on the machine understanding, wherein the metric is selected based on the context information.

The methods and systems disclosed herein may include methods and systems for displaying contextualized content of a live event on a second screen that correlates to the timing of the live event on the first screen. These may include using the video data structure and the context information to construct modified video content for a second screen that includes the video data structure. In embodiments, the content for the second screen correlates to the timing of an event displayed on a first screen. In embodiments, the content for the second screen includes a metric determined based on the machine understanding, wherein the metric is selected based on the context information.

In embodiments, machine extracted metrics and video cuts can be displayed on a second screen, such as a tablet, smart phone, or smart remote control screen, such as showing metrics that are relevant to what is happening, in context, on a main screen.

The methods and systems disclosed herein may include methods and systems for an ingestion facility adapted or configured to ingest a plurality of video feeds; a machine learning system adapted or configured to apply machine learning on a series of events in a plurality of video feeds in order to develop an understanding of an event within the video feed, the understanding including identifying context information relating to the event; an extraction facility adapted or configured to automatically, under computer control, extract the content displaying the event and associate the extracted content with the context information; and a video publishing facility for producing a video content data structure that includes the associated context information. In embodiments, the methods and systems may further include an analytic facility adapted or configured to determine a plurality of semantic categories for the context information and filter a plurality of such video content data structures based on the semantic categories. In embodiments, the methods and systems may further include a matching engine adapted or configured to match the events that occur in one video feed to those that occur in a separate video feed such that the semantic understanding captured in the first video feed can be used to at least one of filter and cut a separate second video feed based on the same events. In embodiments, the methods and systems may further include a pattern recognition facility adapted or configured to determine a pattern relating to a plurality of the events and providing a content data structure based on the pattern.

The methods and systems disclosed herein may include methods and systems for displaying machine extracted, real time, contextualized content based on machine identification of a type of event occurring in a live video stream.

The methods and systems disclosed herein may include methods and systems for taking a video feed; using machine learning to develop an understanding of an event within the video feed, the understanding including identifying context information relating to the event; automatically, under computer control, extracting the content displaying the event and associating the extracted content with the context information; and producing a video content data structure that includes the associated context information. The methods and systems disclosed herein may include methods and systems for providing context information in video cuts that are generated based on machine extracted cuts that are filtered by semantic categories.

The methods and systems disclosed herein may include methods and systems for determining a plurality of semantic categories for the context information and filtering a plurality of the video content data structures based on the semantic categories. The methods and systems disclosed herein may include methods and systems for matching the events that occur in one video feed to those that occur in a separate video feed such that the semantic understanding captured in the first video feed can be used to filter and cut a separate second video feed based on these same events.

The methods and systems disclosed herein may include methods and systems for enabling user interaction with a mobile application that displays extracted content, where the user interaction is modified based on the context of the content (e.g., the menu is determined by context).

The methods and systems disclosed herein may include methods and systems for enabling an application allowing user interaction with video content and may include an ingestion facility adapted or configured to access at least one video feed, wherein the ingestion facility may be executing on at least one processor; a machine learning facility operating on the at least one video feed to develop an understanding of an event within the video feed, the understanding including identifying context information relating to the event; an extraction facility adapted or configured to automatically, under computer control, extract the content displaying the event and associate the extracted content with the context information; a video production facility adapted or configured to produce a video content data structure that includes the associated context information; and an application having a user interface by which a user can interact with the video content data structure, wherein the options for user interaction are based on the context information. In embodiments, the application is a mobile application. In embodiments, the application is at least one of a smart television application, a virtual reality headset application and an augmented reality application. In embodiments, the user interface is a touch screen interface. In embodiments, the user interface allows a user to enhance the video feed by selecting a content element to be added to the video feed. In embodiments, the content element is at least one of a metric and a graphic element that is based on the machine understanding. In embodiments, the user interface allows the user to select content for a particular player of a sports event. In embodiments, the user interface allows the user to select content relating to a context involving the matchup of two particular players in a sports event.

In embodiments, the system takes at least two video feeds from different time periods, the machine learning facility determines a context the includes a similarity between at least one of a plurality of players and a plurality of plays in the two feeds and the user interface allows the user to select at least one of the players and the plays to obtain a video feed that illustrates a comparison. In embodiments, the user interface includes options for at least one of editing, cutting and sharing a video clip that includes the video data structure.

In embodiments, the video feed comprises 3D motion camera data captured from a live sports venue. In embodiments, the ability of the machine learning facility to develop the understanding is developed by feeding the machine learning facility a plurality of events for which context has already been identified.

The methods and systems disclosed herein may include methods and systems for enabling a mobile application allowing user interaction with video content and may include taking at least one video feed; applying machine learning on the at least one video feed to develop an understanding of an event within the video feed, the understanding including identifying context information relating to the event; automatically, under computer control, extracting the content displaying the event and associating the extracted content with the context information; producing a video content data structure that includes the associated context information; and providing a mobile application having a user interface by which a user can interact with the video content data structure, wherein the options for user interaction are based on the context information. In embodiments, the user interface is a touch screen interface. In embodiments, the user interface allows a user to enhance the video feed by selecting a content element to be added to the video feed. In embodiments, the content element is at least one of a metric and a graphic element that is based on the machine understanding. In embodiments, the user interface allows the user to select content for a particular player of a sports event. In embodiments, the user interface allows the user to select content relating to a context involving the matchup of two particular players in a sports event.

In embodiments, the system takes at least two video feeds from different time periods, the machine learning facility determines a context the includes a similarity between at least one of a plurality of players and a plurality of plays in the two feeds and the user interface allows the user to select at least one of the players and the plays to obtain a video feed that illustrates a comparison. In embodiments, the user interface includes options for at least one of editing, cutting and sharing a video clip that includes the video data structure. In embodiments, the video feed comprises 3D motion camera data captured from a live sports venue. In embodiments, the ability of the machine learning facility to develop the understanding is developed by feeding the machine learning facility a plurality of events for which context has already been identified.

The methods and systems disclosed herein may include methods and systems for enabling a mobile application allowing user interacting with video content and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and providing a mobile application by which a user can interact with the video content data structure, wherein the options for user interaction are based on the context information.

In embodiments, machine extracted content, with associated context information, may be provided to users via a mobile application, through which the users may display and interact with the content, such as by selecting particular types of content based on a desired semantic category (such as by selecting the category in list, menu, or the like), playing content (including pausing, rewinding, fast forwarding, and the like), and manipulating content (such as positioning content within a display window, zooming, panning, and the like). In embodiments, the nature of the permitted interaction may be governed by the context information associated with the content, where the context information is based on a machine understanding of the content and its associated context. For example, where the content is related to a particular type of play within a context of an event like a game, such as rebounding opportunities in basketball, the user may be permitted to select from a set of metrics that are relevant to rebounding, so that the selected metrics from a context-relevant set are displayed on the screen with the content. If the context is different, such as if the content relates to a series of pick-and-roll plays by a particular player, different metrics may be made available for selection by the user, such as statistics for that player, or metrics appropriate for pick-and-rolls. Thus, the machine-extracted understanding of an event, including context information, can be used to customize the content displayed to the user, including to allow the user to select context-relevant information for display.

The methods and systems disclosed herein may include methods and systems for allowing a user to control a presentation of a broadcast video event, where the options for control are based on a context of the content as determined by machine extraction of semantically relevant events from the content.

In accordance with an exemplary and non-limiting embodiment, there is described a method for "painting" translated semantic data onto an interface.

In accordance with an exemplary and non-limiting embodiment, there is described spatiotemporal pattern recognition based, at least in part, on optical XYZ alignment for semantic events. In yet other embodiments, there is described the verification and refinement of spatiotemporal semantic pattern recognition based, at least in part, on hybrid validation from multiple sources.

In accordance with an exemplary and non-limiting embodiment, there is described human identified video alignment labels and markings for semantic events. In yet other embodiments, there is described machine learning algorithms for spatiotemporal pattern recognition based, at least in part, on human identified video alignment labels for semantic events.

In accordance with an exemplary and non-limiting embodiment, there is described automatic game clock indexing of video from sporting events using machine vision techniques, and cross-referencing this index with a semantic layer that indexes game events. The product is the ability to query for highly detailed events and return the corresponding video in near real-time.

In accordance with an exemplary and non-limiting embodiment, there is described unique metrics based, at least in part, on spatiotemporal patterns including, for example, shot quality, rebound ratings (positioning, attack, conversion) and the like.

In accordance with an exemplary and non-limiting embodiment, there is described player tracking using broadcast video feeds.

In accordance with an exemplary and non-limiting embodiment, there is described player tracking using multi-camera system.

In accordance with an exemplary and non-limiting embodiment, there is described video cut-up based on extracted semantics. A video cut-up is a remix made up of small clips of video that are related to each other in some meaningful way. The semantic layer enables real-time discovery and delivery of custom cut-ups. The semantic layer may be produced in one of two ways: (1) Video combined with data produces semantic layer, or (2) video directly to a semantic layer. Extraction may be through ML or human tagging. In some exemplary embodiments, video cut-up may be based, at least in part, on extracted semantics, controlled by users in a stadium and displayed on a Jumbotron. In other embodiments, video cut-up may be based, at least in part, on extracted semantics, controlled by users at home and displayed on broadcast TV. In yet other embodiments, video cut-up may be based, at least in part, on extracted semantics, controlled by individual users and displayed on web, tablet, or mobile for that user. In yet other embodiments, video cut-up may be based, at least in part, on extracted semantics, created by an individual user, and shared with others. Sharing could be through inter-tablet/inter-device communication, or via mobile sharing sites.

In accordance with further exemplary and non-limiting embodiments, the methods and systems disclosed herein may include methods and systems for enabling an application allowing user interaction with video content and may include an ingestion facility for taking at least one video feed; a machine learning facility operating on the at least one video feed to develop an understanding of an event within the video feed, the understanding including identifying context information relating to the event; an extraction facility for automatically, under computer control, extracting the content displaying the event and associating the extracted content with the context information; a video production facility for producing a video content data structure that includes the associated context information; and an application having a user interface by which a user can interact with the video content data structure, wherein the options for user interaction are based on the context information. In embodiments, the application is a mobile application. In embodiments, the application is at least one of a smart television application, a virtual reality headset application and an augmented reality application. In embodiments, the user interface is a touch screen interface. In embodiments, the user interface allows a user to enhance the video feed by selecting a content element to be added to the video feed. In embodiments, the content element is at least one of a metric and a graphic element that is based on the machine understanding. In embodiments, the user interface allows the user to select content for a particular player of a sports event. In embodiments, the user interface allows the user to select content relating to a context involving the matchup of two particular players in a sports event.

In embodiments, the system takes at least two video feeds from different time periods, the machine learning facility determines a context the includes a similarity between at least one of a plurality of players and a plurality of plays in the two feeds and the user interface allows the user to select at least one of the players and the plays to obtain a video feed that illustrates a comparison. In embodiments, the user interface includes options for at least one of editing, cutting and sharing a video clip that includes the video data structure.

In embodiments, the video feed comprises 3D motion camera data captured from a live sports venue. In embodiments, the ability of the machine learning facility to develop the understanding is developed by feeding the machine learning facility a plurality of events for which context has already been identified.

The methods and systems disclosed herein may include methods and systems for enabling a mobile application allowing user interaction with video content and may include taking at least one video feed; applying machine learning on the at least one video feed to develop an understanding of an event within the video feed, the understanding including identifying context information relating to the event; automatically, under computer control, extracting the content displaying the event and associating the extracted content with the context information; producing a video content data structure that includes the associated context information; and providing a mobile application having a user interface by which a user can interact with the video content data structure, wherein the options for user interaction are based on the context information. In embodiments, the user interface is a touch screen interface. In embodiments, the user interface allows a user to enhance the video feed by selecting a content element to be added to the video feed. In embodiments, the content element is at least one of a metric and a graphic element that is based on the machine understanding. In embodiments, the user interface allows the user to select content for a particular player of a sports event. In embodiments, the user interface allows the user to select content relating to a context involving the matchup of two particular players in a sports event.

In embodiments, the system takes at least two video feeds from different time periods, the machine learning facility determines a context the includes a similarity between at least one of a plurality of players and a plurality of plays in the two feeds and the user interface allows the user to select at least one of the players and the plays to obtain a video feed that illustrates a comparison. In embodiments, the user interface includes options for at least one of editing, cutting and sharing a video clip that includes the video data structure.

In embodiments, the video feed comprises 3D motion camera data captured from a live sports venue. In embodiments, the ability of the machine learning facility to develop the understanding is developed by feeding the machine learning facility a plurality of events for which context has already been identified.

The methods and systems disclosed herein may include methods and systems for an analytic system and may include a video ingestion facility for ingesting at least one video feed; a machine learning facility that develops an understanding of at least one event within the video feed, wherein the understanding identifies at least a type of the event and a time of the event in an event data structure; a computing architecture enabling a model that takes one or more event data structures as input and applies at least one calculation to transform the one or more event data structures into an output data structure; and a data transport layer of the computing architecture for populating the model with the event data structures as input to the model. In embodiments, the output data structure includes at least one prediction. In embodiments, the prediction is of an outcome of at least one of a sporting event and at least one second event occurring within a sporting event. In embodiments, the video feed is of a live sporting event, wherein the prediction is made during the live sporting event, and wherein the prediction relates to the same sporting event. In embodiments, the prediction is based on event data structures from a plurality of video feeds.

In embodiments, the prediction is used for at least one of placing a wager, setting a line for a wager, interacting with a fantasy program, setting a parameter of a fantasy program, providing insight to a coach and providing information to a fan. In embodiments, the model takes inputs from a plurality of data sources in addition to the event data structures obtained from the video feed. In embodiments, the methods and systems may further include a pattern analysis facility that takes a plurality of the event data structures and enables analysis of patterns among the event data structures. In embodiments, the pattern analysis facility includes at least one tool selected from the group consisting of a pattern visualization tool, a statistical analysis tool, a machine learning tool, and a simulation tool. In embodiments, the methods and systems may further include a second machine learning facility for refining the model based on outcomes of a plurality of predictions made using the model.

The methods and systems disclosed herein may include methods and systems for an analytic method and may include ingesting at least one video feed in a computing platform capable of handling video data; developing an understanding of at least one event within the video feed using machine learning, wherein the understanding identifies at least a type of the event and a time of the event in an event data structure; providing a computing architecture that enables a model that takes one or more event data structures as input and applies at least one calculation to transform the one or more event data structures into an output data structure; and populating the model with the event data structures as input to the model. In embodiments, the output data structure includes at least one prediction. In embodiments, the prediction is of an outcome of at least one of a sporting event and at least one second event occurring within a sporting event. In embodiments, the video feed is of a live sporting event, wherein the prediction is made during the live sporting event, and wherein the prediction relates to the same sporting event. In embodiments, the prediction is based on event data structures from a plurality of video feeds. In embodiments, the prediction is used for at least one of placing a wager, setting a line for a wager, interacting with a fantasy program, setting a parameter of a fantasy program, providing insight to a coach and providing information to a fan. In embodiments, the model takes inputs from a plurality of data sources in addition to the event data structures obtained from the video feed. In embodiments, the methods and systems may further include providing a pattern analysis facility that takes a plurality of the event data structures and enables analysis of patterns among the event data structures. In embodiments, the pattern analysis facility includes at least one tool selected from the group consisting of a pattern visualization tool, a statistical analysis tool, a machine learning tool, and a simulation tool. In embodiments, the methods and systems may further include at least one of providing and using a second machine learning facility to refine the model based on outcomes of a plurality of predictions made using the model.

The methods and systems disclosed herein may include methods and systems for taking a video feed; using machine learning to develop an understanding of a semantically relevant event within the video feed; indexing video segments of the video feed with information indicating the semantically relevant events identified within the feed by the machine learning; and applying machine learning to a plurality of the semantically relevant events to determine a pattern of events. In embodiments, the pattern is within a video feed. In embodiments, the pattern is across a plurality of video feeds. In embodiments, the pattern corresponds to a narrative structure. In embodiments, the narrative structure corresponds to a recurring pattern of events. In embodiments, the narrative structure relates to a sporting event and wherein the pattern relates to at least one of a blow-out victory pattern, a comeback win pattern, a near comeback pattern, a back-and-forth game pattern, an individual achievement pattern, an injury pattern, a turning point moment pattern, a close game pattern, and a team achievement pattern.

In embodiments, the indexed video segments are arranged to support the narrative structure. In embodiments, the arranged segments are provided in an interface for developing a story using the segments that follow the narrative structure and wherein a user may at least one of edit and enter additional content for the story. In embodiments, summary content for the narrative structure is automatically generated, under computer control, to provide a story that includes the video sequences. In embodiments, the methods and systems may further include delivering a plurality of the automatically generated stories from at least one of a defined time period and of a defined type, allowing a user to indicate whether they like or dislike the delivered stories, and using the indications to inform later delivery of at least one additional story. In embodiments, the pattern is relevant to a prediction. In embodiments, the prediction is related to a wager, and the pattern corresponds to similar patterns that were used to make predictions that resulted in successful wagers in other situations.

The methods and systems disclosed herein may include methods and systems for machine-extracting semantically relevant events from a video content stream and determining a pattern relating to the events. The methods and systems also include providing a content stream based on the pattern. In embodiments, the content stream is used to provide coaching information based on the pattern. In embodiments, the content stream is used to assist prediction of an outcome in a fantasy sports contest. In embodiments, the pattern is used to provide content for a viewer of a sporting event.

The methods and systems disclosed herein may include methods and systems for machine-extracting semantically relevant events from a video content stream; determining a pattern relating to the events; storing the pattern information with the extracted events; and providing a user with the option to view and interact with the patterns, wherein at least one of the patterns and the interaction options are personalized based on a profile of the user. In embodiments, the profile is based on at least one of user indication of a preference, information about actions of the user, and demographic information about the user. In embodiments, the pattern comprises at least one of a trend and a statistic that is curated to correspond with the user profile. In embodiments, the pattern relates to a comparison of a professional athlete to another athlete. In embodiments, the other athlete is the user and the comparison is based on a playing style of the user as determined by at least one of information indicated by the user and a video feed of the user. In embodiments, the pattern relates to an occurrence of an injury. In embodiments, the pattern information is used to provide coaching to prevent an injury. In embodiments, the methods and systems may further include automatically generating, under computer control, an injury prevention regimen based on the pattern and based on information about the user.

The methods and systems disclosed herein may include methods and systems for machine-extracting semantically relevant events from a video content stream, determining a pattern relating to the events, and providing a content stream based on the pattern. The methods and systems may further include determining a pattern relating to a plurality of the events and providing a content data structure based on the pattern.

In embodiments, machine-extracted information about events and contexts may be used to determine on or more patterns, such as by analyzing time series, correlations, and the like in the machine-extracted events and contexts. For example, tendencies of a team to follow running a certain play with a particular play may be determined by comparing instances of the two plays over time. Embodiments may include extracting particularly interesting or potential "game changing" plays by understanding the context of an individual event and comparing it to similar events from previous games. Embodiments may include extracting situations or plays that are particularly rare or unique by understanding the context of an individual event and comparing it to similar events from previous games. Embodiments may include extracting semantic events over time to draw a comparison of a player's or team's trajectory over time and superimposing video to draw out this comparison.

The methods and systems disclosed herein may include methods and systems for a model to predict the outcome of a game or events within a game based on contextualized understanding of a live event for use in betting/fantasy, coaching, augmented fan experiences, or the like.

The methods and systems disclosed herein may include methods and systems for an analytic system and may include taking a video feed; using machine learning to develop an understanding of at least one first event within the video feed, the understanding including identifying context information relating to the first event; taking a model used to predict the outcome of at least one of a live game and at least one second event within a live game; and populating the model with the machine understanding of the first event and the context information to produce a prediction of an outcome of at least one of the game and the second event. In embodiments, the model is used for at least one of placing a wager, setting a line for a wager, interacting with a fantasy program, setting a parameter of a fantasy program, providing insight to a coach and providing information to a fan.

In embodiments, machine-extracted event and context information can be used to populate one or more predictive models, such as models used for betting, fantasy sports, coaching, and entertainment. The machine understanding, including various metrics described throughout this disclosure, can provide or augment other factors that are used to predict an outcome. For example, outcomes from particular matchups can be machine extracted and used to predict outcomes from similar matchups in the future. For example, based on the machine understood context of a moment in an individual game, and the machine understanding of similar moments from previous games, a model can be created to predict the outcome of an individual play or a series of plays on which an individual can place a bet or on which a betting line may be set.

In embodiments, the methods and systems disclosed herein may include methods and systems for suggestions of bets to make based on patterns of previously successful bets. For example, a user may be prompted with an option to place a bet based on previous betting history on similar events or because a particular moment is an opportunistic time to place a bet based on the context of a game and other user generated preferences or risk tolerances.

The methods and systems disclosed herein may include methods and systems for automated storytelling, such as the ability to use patterns extracted from semantic events, metrics derived from tracking data, and combinations thereof to populate interesting stories about the content.

The methods and systems disclosed herein may include methods and systems for enabling automated generation of stories and may include taking a video feed; using machine learning to develop an understanding of a semantically relevant event within the video feed, the understanding including identifying context information relating to the event; providing a narrative structure for a story, wherein the narrative structure is arranged based on the presence of semantic types of events and the context of those events; and automatically, under computer control, generating a story following the narrative structure, wherein the story is populated based on a sequence of the machine-understood events and the context information.

In embodiments, patterns from semantic events may be used to populate stories. Various narrative structures can be developed, corresponding to common patterns of events (e.g., stories about blow-out victories, comeback wins, back-and-forth games, games that turned on big moments, or the like). Machine extracting of events and contexts can allow identification of patterns in the events and contexts that allow matching to one or more of the narrative structures, as well as population of the story with content for the events, such as video cuts or short written summaries that are determined by the machine extraction (e.g., "in the first quarter, Team A took the lead, scoring five times on the pick-and-roll.").

The methods and systems disclosed herein may include methods and systems for enabling a mobile application allowing user interacting with video content and may include taking a video feed; using machine learning to develop an understanding of an event within the video feed, the understanding including identifying context information relating to the event; automatically, under computer control, extracting the content displaying the event and associating the extracted content with the context information; producing a video content data structure that includes the associated context information; and providing a mobile application by which a user can interact with the video content data structure, wherein the options for user interaction are based on the context information.

In embodiments, machine extracted content, with associated context information, may be provided to users via a mobile application, through which the users may display and interact with the content, such as by selecting particular types of content based on a desired semantic category (such as by selecting the category in list, menu, or the like), playing content (including pausing, rewinding, fast forwarding, and the like), and manipulating content (such as positioning content within a display window, zooming, panning, and the like). In embodiments, the nature of the permitted interaction may be governed by the context information associated with the content, where the context information is based on a machine understanding of the content and its associated context. For example, where the content is related to a particular type of play within a context of an event like a game, such as rebounding opportunities in basketball, the user may be permitted to select from a set of metrics that are relevant to rebounding, so that the selected metrics from a context-relevant set are displayed on the screen with the content. If the context is different, such as if the content relates to a series of pick-and-roll plays by a particular player, different metrics may be made available for selection by the user, such as statistics for that player, or metrics appropriate for pick-and-rolls. Thus, the machine-extracted understanding of an event, including context information, can be used to customize the content displayed to the user, including to allow the user to select context-relevant information for display.

The methods and systems disclosed herein may include methods and systems for allowing a user to control presentation of a broadcast video event, where the options for control are based on a context of the content as determined by machine extraction of semantically relevant events from the content.

In accordance with an exemplary and non-limiting embodiment, X, Y, and Z data may be collected for purposes of inferring player actions that have a vertical component.

The methods and systems disclosed herein may employ a variety of computer vision, machine learning, and/or active learning techniques and tools to extract, analyze and process data elements originating from sources, such as, but not limited to, input data sources relating to sporting events and items in them, such as players, venues, items used in sports (such as balls, pucks, and equipment), and the like. These data elements may be available as video feeds in an example, such that the video feeds may be captured by image recognition devices, video recognition devices, image and video capture devices, audio recognition devices, and the like, including by use of various devices and components such as a camera (such as a tracking camera or broadcast camera), a microphone, an image sensor, or the like. Audio feeds may be captured by microphones and similar devices, such as integrated on or with cameras or associated with independent audio capture systems. Input feeds may also include tracking data from chips or sensors (such as wearable tracking devices using accelerometers and other motion sensors), as well as data feeds about an event, such as a play-by-play data feed, a game clock data feed, and the like. In the case of input feeds, facial recognition systems may be used to capture facial images of players, such as to assist in recognition of players (such as in cases where player numbers are absent or obscured) and to capture and process expressions of players, such as emotional expressions, micro-expressions, or the like. These expressions may be associated with events, such as to assist in machine understanding (e.g., an expression may convey that the event was exciting, meaningful, the like, that it was disappointing to one constituency, that it was not important, or the like). Machine understanding may thus be trained to recognize expressions and provide expression-based understanding of events, such as to augment one or more data structures associated with an event for further use in the various embodiments described herein. For example, a video feed may be processed based on a machine understanding of expressions to extract cuts that made players of one team happy. As another example, a cut showing an emotional reaction (such as by a player, fan, teammate, or coach) to an event may be associated with a cut of the event itself, providing a combined cut that shows the event and the reaction it caused. The various embodiments described throughout this disclosure the involve machine understanding, extraction of cuts, creation of data structures that are used or processed for various purposes, combining cuts, augmenting data feeds, producing stories, personalizing content, and the like should all be understood to encompass, where appropriate, use of machine understanding of emotional expression within a video feed, including based on use of computer vision techniques, including facial recognition techniques and expression recognition techniques.

The computer vision, machine learning and/or active learning tools and techniques (together referred to as computer-controlled intelligent systems for simplicity herein) may receive the data elements from various input feeds and devices as a set of inputs either in real-time (such as in case of a live feed or broadcast) or at a different time (such as in case of a delayed broadcast of the sporting or any other event) without limitations. The computer-controlled intelligent systems may process the set of inputs, apply machine learning and natural language processing using artificial intelligence (AI) and natural language processing (NLP) capabilities to produce a set of services and outputs.

In an example, the set of services and outputs may signify spatial-temporal positions of the players and sport accessories/objects such as a bat, ball, football, and the like. In an example, the set of services and outputs may represent spatial-temporal alignments of the inputs such as the video feeds, etc. For example, a broadcast video feed may be aligned in time with another input feed, such as input from one or more motion tracking cameras, inputs from player tracking systems (such as wearable devices), and the like. The set of services and outputs may include machine understood contextual outputs involving machine learning or understanding that may be built using various levels of artificial intelligence, algorithmic processes, computer-controlled tasks, custom rules, and the like, such as described throughout this disclosure. The machine understanding may include various levels of semantic identification, as well as information of position and speed information for various items or elements, identification of basic events such as various types of shots and screens during a sporting event, and identification of complex events or a sequence of events such as various types of plays, higher level metrics and patterns involving such as game trajectory, style of play, strengths and weaknesses of teams and team members/players from each team, and the like. The machine learning tools and input feed alignment may allow automatic generation of content and information such as statistics, predictions, comparisons, and analysis. The machine learning tools may further allow to generate outputs based on a user query input such as to determine various predictive analytics for a particular team player in view of historical shots and screens in a particular context, determine possibilities of success and failures in particular zones and game scenarios conditioned to particular user inputs, and the like. The machine understanding tools may simulate entire aspects of real-life sporting events on a computer screen utilizing visualization and modeling examples. The services and outputs generated by the intelligent computer-controlled systems may be used in a variety of ways such as generation of a live feed or a delayed feed during a sporting event in real time or at a later broadcasting time after the sporting event. The services and outputs may allow generating various analysis of statistics, trends, and strategy before events or across multiple events. The services and outputs may facilitate an interactive user session to extract contextual details relating to instantaneous sporting sessions of the sporting events in association with user defined queries, constraints, and rules.

In an example, the services and outputs generated by the computer-controlled intelligent systems may enable spatiotemporal analysis of various game attributes and elements for exploring, learning, analyzing such sporting events and utilize analytics results to generate predictive models and predictive analytics for gaming strategy. These services and outputs may provide valuable insights and learnings that are otherwise not visible.

The methods and systems disclosed herein may employ delay-dependent computer vision and machine learning systems (or the intelligent computer-controlled systems) for providing delay-dependent services and outputs with respect to occurrence of a sporting event. The services and outputs as discussed herein may be employed in different applications with varying time delays relative to actual occurrence of the sporting event. For example, the actual event may occur at a time T1 and the content feeding or broadcasting may occur at a time T2 with a time delay of T2−T1. The time delay may be small such as of a few seconds so as the content is useful in a live commentary or augmentation of a live video. In such cases, the machine learning tools may for example utilize real-time services and outputs and benefit from the spatiotemporal features and attributes to generate game patterns and automatic validations during the event itself such as to highlight certain event aspects in the commentary and/or validate momentary sessions when there are confusions during the event for decision making. The time delay may be longer in certain situations such as for replays, post-event analysis, predictive modeling, and future strategies, and the like.

The methods and systems disclosed herein may support provision of the services and outputs at various time delays by determining processing steps and their order of execution according to delay requirements. The system may be configured to operate such that the services and outputs may be obtained at arbitrary times with an increasing accuracy or time resolution or such that the system targets specific delay requirements as specified by users or defined in accordance with intended applications. For example, if in an application, computational resources are insufficient to process all frames originating from input devices such as cameras etc. at maximum accuracy at a video frame rate within a desired delay, then instead of processing the input video frames in sequential orders, processing may be ordered in such a way that at any time there is a uniform or approximately uniform distribution of processed frames. In some cases, processing decisions may also be influenced by other computational efficiency considerations for certain tasks that operate on video segments, such as an opportunity to reuse certain computations across successive frames in tracking algorithms. In some examples, processing techniques such as inference and interpolation over processed frames may be used to provide a tracking output whose accuracy and time resolution improves with delay as more frames are processed. If a target delay is specified, each component of processing application (such as background subtraction, detection of various elements) may be assigned an execution time budget within which to compute its output, such that the specified delay is met by a combination of the components. In some examples, the specified time delays may also consider video qualities needed at sending destinations so as to ensure that enough computation resources are allocated for appropriate resolutions and transmission rates at the destinations during broadcasting of the content. In certain cases, a normal resolution may be sufficient while in other cases a higher resolution may be needed. In various embodiments, the intelligent computer-controlled systems may be capable of defining appropriate resolutions, data transmission rates, and computation resources allocation in view of the delay requirements.

The methods and systems disclosed herein may facilitate enabling calibration of a moving camera or any other image recognition device via tracking of moving points in a sporting event. Existing techniques for finding unknown camera calibration parameters from captured images or videos of sporting events rely on identifying a set of known locations, such as intersections of lines on the court or field. In accordance with such techniques, calibrating the moving camera as it changes its position or zooms across frames is challenging since there may be only a few of such known locations in the frames. The methods and systems disclosed herein may enable finding the calibration parameters of the moving or operator-controlled camera by using positions of moving points located by an associated tracking system. In an example, these positions may represent locations and spatial coordinates of a player's or a referee's head or hand or legs in the sporting event which may be identified by the tracking system. The tracking system may be an optical tracking system, or a chip-based tracking system which may be configured to determine positions of locations tags. In various examples, several other types of camera controlling, calibration, and position determining systems may be employed along with the tracking systems. For example, a fixed spotting camera may be used to capture a view and a moving camera contained within the tracking system may be used to capture the positions of the moving points in the frames. The moving camera may be configured to perform several functions such as zoom, tilt, pan, and the like. The tracking system may be configured to perform calibration and identification of the positions based on a tracking algorithm that may execute pre-defined instructions to compute relevant information necessary to drive the tracking system across the frames.

The methods and systems disclosed herein may facilitate enabling pre-processing of images from calibrated cameras to improve object detection and recognition. The methods and systems disclosed herein may enable providing for accurate detection and recognition of humans, such as players or referees, and objects, such as a ball, a game clock, jersey numbers and the like with better performance and lower complexity. In embodiments, the tasks of object detection and recognition may be performed on the basis of knowledge of known calibration parameters of the cameras in the tracking system and known properties of the objects being detected such as their size, orientation, or positions etc. For example, perspectives and distortions introduced by the cameras can be undone by applying a transformation such that the objects being detected may have a consistent scale and orientation in transformed images. The transformed images may be used as inputs to detection and recognition algorithms by image processing devices so as to enable faster and more accurate object detection and recognition performance with lower complexity as compared to performing object detection and recognition directly on original images. In such cases, an output generated by the image processing devices may be used as inputs, along with other inputs described herein, to enable or refine the various machine learning and algorithmic capabilities described throughout this disclosure. In some embodiments, machine learning capabilities may be introduced to build improved processing utilizing machine learning tools as discussed above in the document.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples but is to be understood in the broadest sense allowable by law.

All documents referenced herein are hereby incorporated by reference in their entirety.

What is claimed is:

1. A method for animating motion of a feature in an enhanced video feed, comprising:

processing at least one video feed through at least one spatiotemporal pattern recognition algorithm that is trained through a use of a machine learning system to detect at least one event within the at least one video feed, the training based on adjusting an input feature and a weight within the machine learning system, wherein the machine learning system input feature is selected from at least one spatiotemporal pattern group consisting of:

duration of relative motion of visible features with respect to each other, rate of motion of at least two visible features with respect to each other, acceleration of motion of at least two visible features with respect to each other, and projected point of intersection of at least two visible features with respect to each other;

applying a second video feed to the machine learning system to detect an event in the second video feed;

generating an animation of a feature present in the event in the second video feed, the animation having attributes based on motion of the feature in the event;

automatically, under computer control, providing an enhanced video feed that represents the animation within the detected at least one event within the at least one video feed, the animation being represented within a context of the at least one event within the at least one video feed and the attributes of motion of the feature in the event in the second video feed, the context being based on characteristics of at least one spatiotemporal pattern used to detect the event within the at least one video feed.

2. The method of claim 1, wherein the context is based on characteristics of a plurality of spatiotemporal patterns associated with the at least one event within the at least one video feed.

3. The method of claim 1, further comprising providing a comparison of at least one playing style represented in the at least one event within the at least one video feed with at least one playing style represented in the event in the second video feed, the comparison based on a similarity of at least one spatiotemporal pattern associated with each of the at least one event within the at least one video feed and the event in the second video feed.

4. The method of claim 3, wherein the comparison is based on a similarity of a playing style represented in the at least one event within the at least one video feed, as determined by the machine learning system, with at least one feature of the playing style represented in the event in the second video feed.

5. The method of claim 3, further comprising presenting at least one metric based on the comparison in the enhanced video feed.

6. The method of claim 5, wherein the at least one metric is spatiotemporally aligned in the enhanced video feed with at least one feature of the at least one video feed on which the similarity is based.

7. The method of claim 1, wherein the training is further based on a visible feature state transition model that combines transition probabilities of a model learned empirically from training data with observed features of movement of at least one of the two visible features.

8. A method for animating motion of a feature in an enhanced video feed, comprising:

processing at least one video feed through at least one spatiotemporal pattern recognition algorithm that is trained through a use of a machine learning system to detect at least one event within the at least one video feed, the at least one spatiotemporal pattern recognition algorithm is based on at least one pattern recognized by adjusting an input feature of a plurality of input features and a weight thereof within the machine learning system, wherein the machine learning system is constructed to process the plurality of input features of the at least one video feed, the plurality of input features comprising:

duration of relative motion of visible features with respect to each other, rate of motion of at least two visible features with respect to each other, relative acceleration of motion of at least two visible features, and relative projected point of intersection of at least two visible features;

applying a second video feed to the machine learning system to detect an event in the second video feed;

generating an animation of a feature present in the event in the second video feed, the animation having attributes based on motion of the feature in the event;

automatically, under computer control, providing an enhanced video feed that represents the animation within the detected event within the at least one video feed, the animation being represented within a context of the event within the at least one video feed and the attributes of motion of the feature in the event in the second video feed, the context being based on characteristics of at least one spatiotemporal pattern used to detect the event within the at least one video feed.

* * * * *

UNITED STATES PATENT AND TRADEMARK OFFICE
CERTIFICATE OF CORRECTION

PATENT NO. : 11,023,736 B2
APPLICATION NO. : 16/824884
DATED : June 1, 2021
INVENTOR(S) : Yu-Han Chang et al.

It is certified that error appears in the above-identified patent and that said Letters Patent is hereby corrected as shown below:

In the Specification

Column 58, Line 3, delete "|(shot=" and insert -- I(shot= --, therefor.

Signed and Sealed this
Thirty-first Day of January, 2023

*Katherine Kelly Vidal*

Katherine Kelly Vidal
*Director of the United States Patent and Trademark Office*